United States Patent
Johnson et al.

(10) Patent No.: US 10,438,176 B2
(45) Date of Patent: Oct. 8, 2019

(54) MULTIPLE MERCHANT PAYMENT PROCESSOR PLATFORM APPARATUSES, METHODS AND SYSTEMS

(71) Applicant: VISA INTERNATIONAL SERVICE ASSOCIATION, San Francisco, CA (US)

(72) Inventors: Alan Johnson, Foster City, CA (US); Ajay Kumar, Foster City, CA (US); John Wang, Foster City, CA (US); Rajiv Dutta, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 89 days.

(21) Appl. No.: 14/230,327

(22) Filed: Mar. 31, 2014

(65) Prior Publication Data

US 2014/0249999 A1    Sep. 4, 2014

Related U.S. Application Data

(63) Continuation of application No. PCT/US2012/047092, filed on Jul. 17, 2012, which is
(Continued)

(51) Int. Cl.
*G06Q 20/40* (2012.01)
*G06Q 20/02* (2012.01)
(Continued)

(52) U.S. Cl.
CPC ....... *G06Q 20/027* (2013.01); *G06Q 20/0855* (2013.01); *G06Q 20/12* (2013.01);
(Continued)

(58) Field of Classification Search
CPC .................................................... G06Q 20/40
(Continued)

(56) References Cited

U.S. PATENT DOCUMENTS

| 789,106 A | 5/1905 | Seymour |
|---|---|---|
| 5,237,164 A | 8/1993 | Takada |

(Continued)

FOREIGN PATENT DOCUMENTS

| EP | 0855659 A1 | 7/1998 |
|---|---|---|
| JP | 2008545210 A | 12/2008 |

(Continued)

OTHER PUBLICATIONS

Maestro Readies a Global Internet Debit Solution Publication info: ATM & Debit News : 1. SourceMedia, Inc. (Jun. 28, 2001) (Year: 2001).*

(Continued)

*Primary Examiner* — Bruce I Ebersman
*Assistant Examiner* — John A Anderson
(74) *Attorney, Agent, or Firm* — Loeb & Loeb LLP

(57) ABSTRACT

The MULTIPLE MERCHANT PAYMENT PROCESSOR PLATFORM APPARATUSES, METHODS AND SYSTEMS ("MID-PLATFORM") enable merchants to customize the way payments made to them are processed. For example, a computer-implemented MID-Platform receives a payment request associated with a site (e.g., a website) and identifies a site profile associated with the site. The site profile is associated with one or more account processors and one or more transaction preference rules for selecting one of the account processors. The MID-Platform processes information associated with the payment request according to one or more transaction preference rules to select one of the account processors. Then, the MID-Platform sends a payment processing request to the selected account processor.

20 Claims, 103 Drawing Sheets

Related U.S. Application Data a continuation of application No. 13/278,173, filed on Oct. 20, 2011.

(60) Provisional application No. 61/508,679, filed on Jul. 17, 2011, provisional application No. 61/618,670, filed on Mar. 30, 2012, provisional application No. 61/570,230, filed on Dec. 13, 2011, provisional application No. 61/806,788, filed on Mar. 29, 2013.

(51) Int. Cl.
| | |
|---|---|
| *G06Q 20/08* | (2012.01) |
| *G06Q 20/12* | (2012.01) |
| *G06Q 20/20* | (2012.01) |
| *G06Q 20/32* | (2012.01) |
| *G06Q 20/34* | (2012.01) |
| *G06Q 20/38* | (2012.01) |
| *G06Q 30/02* | (2012.01) |

(52) U.S. Cl.
CPC ........... *G06Q 20/20* (2013.01); *G06Q 20/322* (2013.01); *G06Q 20/3278* (2013.01); *G06Q 20/34* (2013.01); *G06Q 20/382* (2013.01); *G06Q 30/0207* (2013.01)

(58) Field of Classification Search
USPC .......................................................... 705/39
See application file for complete search history.

(56) References Cited

U.S. PATENT DOCUMENTS

| | | |
|---|---|---|
| 5,311,594 A | 5/1994 | Penzias |
| 5,446,890 A | 8/1995 | Renslo |
| 5,459,656 A | 10/1995 | Fields |
| 5,510,777 A | 4/1996 | Pilc |
| 5,521,362 A | 5/1996 | Powers |
| 5,530,438 A | 6/1996 | Bickham |
| 5,536,045 A | 7/1996 | Adams |
| 5,588,105 A | 12/1996 | Foster |
| 5,615,110 A | 3/1997 | Wong |
| 5,615,264 A | 3/1997 | Kazmierczak |
| 5,649,118 A | 7/1997 | Carlisle |
| 5,815,657 A | 9/1998 | Williams |
| 5,850,446 A | 12/1998 | Berger |
| 5,878,337 A | 3/1999 | Joao |
| 5,903,830 A | 5/1999 | Joao |
| 5,943,624 A | 8/1999 | Fox |
| 5,963,924 A | 10/1999 | Williams |
| 6,061,660 A | 5/2000 | Eggleston |
| 6,064,990 A | 5/2000 | Goldsmith |
| 6,092,053 A | 7/2000 | Boesch |
| 6,202,052 B1 | 3/2001 | Miller |
| 6,202,933 B1 | 3/2001 | Poore |
| 6,263,447 B1 | 7/2001 | French |
| 6,267,292 B1 | 7/2001 | Walker |
| 6,304,886 B1 | 10/2001 | Bernardo |
| 6,330,593 B1 | 12/2001 | Roberts |
| 6,336,099 B1 | 1/2002 | Barnett |
| 6,374,250 B2 | 4/2002 | Ajtai |
| 6,473,500 B1 | 10/2002 | Risafi |
| 6,529,725 B1 | 3/2003 | Joao |
| 6,535,855 B1 | 3/2003 | Cahill |
| 6,601,761 B1 | 8/2003 | Katis |
| 6,643,652 B2 | 11/2003 | Helgeson |
| 6,735,572 B2 | 5/2004 | Landesmann |
| 6,799,165 B1 | 9/2004 | Boesjes |
| 6,842,741 B1 | 1/2005 | Fujimura |
| 6,853,386 B1 | 2/2005 | Keim |
| 6,853,982 B2 | 2/2005 | Smith |
| 6,857,073 B2 | 2/2005 | French |
| 6,873,974 B1 | 3/2005 | Schutzer |
| 6,898,598 B2 | 5/2005 | Himmel |
| 6,915,279 B2 | 7/2005 | Hogan |
| 6,934,528 B2 | 8/2005 | Loureiro |
| 6,963,859 B2 | 11/2005 | Stefik |
| 6,999,943 B1 | 2/2006 | Johnson |
| 7,015,912 B2 | 3/2006 | Marais |
| 7,024,383 B1 | 4/2006 | Mancini |
| 7,028,052 B2 | 4/2006 | Chapman |
| 7,047,041 B2 | 5/2006 | Vanska |
| 7,051,002 B2 | 5/2006 | Keresman, III |
| 7,089,208 B1 | 8/2006 | Levchin |
| 7,096,003 B2 | 8/2006 | Joao |
| 7,111,789 B2 | 9/2006 | Rajasekaran |
| 7,155,411 B1 | 12/2006 | Blinn |
| 7,165,041 B1 | 1/2007 | Guheen |
| 7,167,844 B1 | 1/2007 | Leong |
| 7,177,848 B2 | 2/2007 | Hogan |
| 7,194,437 B1 | 3/2007 | Britto |
| 7,206,847 B1 | 4/2007 | Alberth |
| 7,212,979 B1 | 5/2007 | Matz |
| RE39,736 E | 7/2007 | Morrill |
| 7,268,667 B2 | 9/2007 | Beenau |
| 7,268,668 B2 | 9/2007 | Beenau |
| 7,290,704 B1 | 11/2007 | Ball |
| 7,318,049 B2 | 1/2008 | Iannacci |
| 7,337,119 B1 | 2/2008 | Geschwender |
| 7,337,144 B1 | 2/2008 | Blinn |
| 7,343,149 B2 | 3/2008 | Benco |
| 7,343,351 B1 | 3/2008 | Bishop |
| 7,349,885 B2 | 3/2008 | Gangi |
| 7,356,505 B2 | 4/2008 | March |
| 7,357,310 B2 | 4/2008 | Calabrese |
| 7,359,880 B2 | 4/2008 | Abel |
| 7,373,669 B2 | 5/2008 | Eisen |
| 7,379,899 B1 | 5/2008 | Junger |
| 7,392,222 B1 | 6/2008 | Hamilton |
| 7,395,242 B2 | 7/2008 | Blinn |
| 7,398,250 B2 | 7/2008 | Blinn |
| 7,413,113 B1 | 8/2008 | Zhu |
| 7,450,966 B2 | 11/2008 | Vanska |
| 7,477,780 B2 | 1/2009 | Boncyk |
| 7,499,889 B2 | 3/2009 | Golan |
| 7,500,607 B2 | 3/2009 | Williams |
| 7,533,064 B1 | 5/2009 | Boesch |
| 7,536,360 B2 | 5/2009 | Stolfo |
| 7,571,139 B1 | 8/2009 | Giordano |
| 7,571,140 B2 | 8/2009 | Weichert |
| 7,593,858 B2 | 9/2009 | Matz |
| 7,603,311 B1 | 10/2009 | Yadav-Ranjan |
| 7,630,937 B1 | 12/2009 | Mo |
| 7,634,295 B2 | 12/2009 | Hayaashi |
| 7,644,037 B1 | 1/2010 | Ostrovsky |
| 7,644,859 B1 | 1/2010 | Zhu |
| 7,645,194 B2 | 1/2010 | Van Luchene |
| 7,660,749 B2 | 2/2010 | Koski |
| 7,676,434 B2 | 3/2010 | Evans |
| 7,685,067 B1 | 3/2010 | Britto |
| 7,698,221 B2 | 4/2010 | Blinn |
| 7,707,113 B1 | 4/2010 | Dimartino |
| 7,708,194 B2 | 5/2010 | Vawter |
| 7,708,198 B2 | 5/2010 | Gangi |
| 7,712,658 B2 | 5/2010 | Gangi |
| 7,716,141 B2 | 5/2010 | Stewart |
| 7,734,630 B2 | 6/2010 | Kato |
| 7,739,194 B2 | 6/2010 | Blinn |
| 7,742,984 B2 | 6/2010 | Mohsenzadeh |
| 7,756,752 B2 | 7/2010 | Duvall |
| 7,765,166 B2 | 7/2010 | Beringer |
| 7,774,076 B2 | 8/2010 | Skowronek |
| 7,779,360 B1 | 8/2010 | Jones |
| 7,783,569 B2 | 8/2010 | Abel |
| 7,784,684 B2 | 8/2010 | Labrou |
| 7,801,829 B2 | 9/2010 | Gray |
| 7,802,719 B2 | 9/2010 | Johnson |
| 7,810,720 B2 | 10/2010 | Lovett |
| 7,819,307 B2 | 10/2010 | Lyons |
| 7,828,206 B2 | 11/2010 | Hessburg |
| 7,828,992 B2 | 11/2010 | Kilickiran |
| 7,837,125 B2 | 11/2010 | Biskupski |
| 7,844,530 B2 | 11/2010 | Ziade |
| 7,849,014 B2 | 12/2010 | Erikson |

(56) References Cited

U.S. PATENT DOCUMENTS

| | | | |
|---|---|---|---|
| 7,870,027 B1 | 1/2011 | Tannenbaum | |
| 7,877,299 B2 | 1/2011 | Bui | |
| 7,878,400 B2 | 2/2011 | Harris | |
| 7,890,370 B2 | 2/2011 | Whitsitt | |
| 7,890,393 B2* | 2/2011 | Talbert | G06Q 20/04 705/35 |
| 7,895,119 B2 | 2/2011 | Praisner | |
| 7,899,744 B2 | 3/2011 | Bishop | |
| 7,904,360 B2 | 3/2011 | Evans | |
| 7,908,227 B2 | 3/2011 | Zizzimopoulos | |
| 7,926,714 B1 | 4/2011 | Zhu | |
| 7,933,779 B2 | 4/2011 | Rooks | |
| 7,942,337 B2 | 5/2011 | Jain | |
| 7,962,418 B1 | 6/2011 | Wei | |
| 7,967,196 B1 | 6/2011 | Bierbaum | |
| 7,971,782 B1 | 7/2011 | Shams | |
| 7,996,259 B1 | 8/2011 | Distefano, III | |
| 8,016,192 B2 | 9/2011 | Messerges | |
| 8,020,763 B1 | 9/2011 | Kowalchyk | |
| 8,024,260 B1 | 9/2011 | Hogl | |
| 8,028,041 B2 | 9/2011 | Olliphant | |
| 8,032,438 B1 | 10/2011 | Barton | |
| 8,041,338 B2 | 10/2011 | Chen | |
| 8,050,997 B1 | 11/2011 | Nosek | |
| 8,060,413 B2 | 11/2011 | Castell | |
| 8,074,876 B2 | 12/2011 | Foss | |
| 8,086,535 B2 | 12/2011 | Zweig | |
| 8,090,618 B1 | 1/2012 | Chu | |
| 8,108,261 B2 | 1/2012 | Carlier | |
| 8,127,982 B1 | 3/2012 | Casey | |
| 8,140,418 B1 | 3/2012 | Casey | |
| 8,145,188 B2 | 3/2012 | Park | |
| 8,145,561 B1 | 3/2012 | Zhu | |
| 8,145,566 B1 | 3/2012 | Ahuja | |
| 8,145,569 B2 | 3/2012 | Gong | |
| 8,145,898 B2 | 3/2012 | Kamalakantha | |
| 8,150,767 B2 | 4/2012 | Wankmueller | |
| 8,150,772 B2 | 4/2012 | Mardikar | |
| 8,151,328 B1 | 4/2012 | Lundy | |
| 8,151,330 B2 | 4/2012 | Vishik | |
| 8,151,336 B2 | 4/2012 | Savoor | |
| 8,155,999 B2 | 4/2012 | De Boer | |
| 8,156,000 B1 | 4/2012 | Thompson | |
| 8,156,026 B2 | 4/2012 | Junger | |
| 8,156,042 B2 | 4/2012 | Winkleman, III | |
| 8,156,549 B2 | 4/2012 | Rice | |
| 8,157,178 B2 | 4/2012 | Dewan | |
| 8,157,181 B2 | 4/2012 | Bates | |
| 8,160,935 B2 | 4/2012 | Bui | |
| 8,160,959 B2 | 4/2012 | Rackley, III | |
| 8,165,961 B1 | 4/2012 | Dimartino | |
| 8,166,068 B2 | 4/2012 | Stevens | |
| RE43,351 E | 5/2012 | Jordan | |
| 8,170,921 B2 | 5/2012 | Stocker | |
| 8,175,235 B2 | 5/2012 | Mumford | |
| 8,175,965 B2 | 5/2012 | Moore | |
| 8,175,967 B2 | 5/2012 | OLeary | |
| 8,175,968 B2 | 5/2012 | OLeary | |
| 8,175,975 B2 | 5/2012 | Cai | |
| 8,175,979 B2 | 5/2012 | Baentsch | |
| 8,176,416 B1 | 5/2012 | Williams | |
| 8,179,563 B2 | 5/2012 | King | |
| 8,180,289 B1 | 5/2012 | Glickman | |
| 8,180,705 B2 | 5/2012 | Kowalchyk | |
| 8,185,439 B2 | 5/2012 | Webb | |
| 8,190,513 B2 | 5/2012 | Felger | |
| 8,191,775 B2 | 6/2012 | Hildred | |
| 8,195,233 B2 | 6/2012 | Morikuni | |
| 8,195,544 B2 | 6/2012 | Horsfall | |
| 8,195,547 B2 | 6/2012 | Aaltonen | |
| 8,195,565 B2 | 6/2012 | Bishop | |
| 8,195,576 B1 | 6/2012 | Grigg | |
| 8,196,131 B1 | 6/2012 | Von Behren | |
| 8,200,582 B1 | 6/2012 | Zhu | |
| 8,204,774 B2 | 6/2012 | Chwast | |
| 8,204,829 B2 | 6/2012 | Alvarez | |
| 8,209,217 B1 | 6/2012 | Griffith | |
| 8,209,245 B2 | 6/2012 | Dennes | |
| 8,209,744 B2 | 6/2012 | Zhu | |
| 8,214,288 B2 | 7/2012 | Olliphant | |
| 8,214,289 B2 | 7/2012 | Scipioni | |
| 8,214,291 B2 | 7/2012 | Pelegero | |
| 8,214,292 B2 | 7/2012 | Duggal | |
| 8,214,293 B2 | 7/2012 | Powell | |
| 8,214,886 B2 | 7/2012 | Foley | |
| 8,215,546 B2 | 7/2012 | Lin | |
| 8,219,411 B2 | 7/2012 | Matz | |
| 8,219,474 B2 | 7/2012 | Sutton | |
| 8,219,490 B2 | 7/2012 | Hammad | |
| 8,220,047 B1 | 7/2012 | Soghoian | |
| 8,224,702 B2 | 7/2012 | Mangerink | |
| 8,224,754 B2 | 7/2012 | Pastusiak | |
| 8,224,773 B2 | 7/2012 | Spiegel | |
| 8,225,997 B1 | 7/2012 | Bierbaum | |
| 8,227,936 B1 | 7/2012 | Folk | |
| 8,229,354 B2 | 7/2012 | Sklovsky | |
| 8,229,808 B1 | 7/2012 | Heit | |
| 8,229,844 B2 | 7/2012 | Felger | |
| 8,229,851 B2 | 7/2012 | Doran | |
| 8,229,854 B2 | 7/2012 | Stephen | |
| 8,233,841 B2 | 7/2012 | Griffin | |
| 8,234,183 B2 | 7/2012 | Smith | |
| 8,239,276 B2 | 8/2012 | Lin | |
| 8,244,580 B2 | 8/2012 | Mankoff | |
| 8,249,965 B2 | 8/2012 | Tumminaro | |
| 8,255,278 B1 | 8/2012 | Young | |
| 8,255,323 B1 | 8/2012 | Casey | |
| 8,255,324 B2 | 8/2012 | Bercy | |
| 8,275,704 B2 | 9/2012 | Bishop | |
| 8,280,777 B2 | 10/2012 | Mengerink | |
| 8,281,998 B2 | 10/2012 | Tang | |
| 8,282,002 B2 | 10/2012 | Shams | |
| 8,285,640 B2 | 10/2012 | Scipioni | |
| 8,285,820 B2 | 10/2012 | Olliphant | |
| 8,285,832 B2 | 10/2012 | Schwab | |
| 8,286,875 B2 | 10/2012 | Tang | |
| 8,290,433 B2 | 10/2012 | Fisher | |
| 8,290,819 B2 | 10/2012 | Bawcutt | |
| 8,290,829 B1 | 10/2012 | Katz | |
| 8,295,898 B2 | 10/2012 | Ashfield | |
| 8,296,187 B2 | 10/2012 | Light | |
| 8,296,204 B2 | 10/2012 | Templeton | |
| 8,296,228 B1 | 10/2012 | Kloor | |
| 8,296,231 B2 | 10/2012 | Britto | |
| 8,301,500 B2 | 10/2012 | Pharris | |
| 8,301,510 B2 | 10/2012 | Boesch | |
| 8,301,556 B2 | 10/2012 | Hogl | |
| 8,311,520 B2 | 11/2012 | Choi | |
| 8,312,096 B2 | 11/2012 | Cohen | |
| 8,321,267 B2 | 11/2012 | Hoerenz | |
| 8,321,294 B2 | 11/2012 | Carlier | |
| 8,321,315 B2 | 11/2012 | Abel | |
| 8,321,338 B2 | 11/2012 | Baumgart | |
| 8,321,343 B2 | 11/2012 | Ramavarjula | |
| 8,326,756 B2 | 12/2012 | Egendorf | |
| 8,326,769 B1 | 12/2012 | Weisman | |
| 8,326,770 B1 | 12/2012 | Weisman | |
| 8,327,450 B2 | 12/2012 | Clement | |
| 8,332,272 B2 | 12/2012 | Fisher | |
| 8,332,275 B2 | 12/2012 | Poon | |
| 8,332,323 B2 | 12/2012 | Stals | |
| 8,335,720 B2 | 12/2012 | Juang | |
| 8,335,726 B1 | 12/2012 | Ling | |
| 8,335,822 B2 | 12/2012 | Ahmed | |
| 8,335,921 B2 | 12/2012 | Von Behren | |
| 8,335,932 B2 | 12/2012 | Von Behren | |
| 8,340,666 B2 | 12/2012 | Ramer | |
| 8,341,029 B1 | 12/2012 | Ramalingam | |
| 8,346,643 B2 | 1/2013 | Boyer | |
| 8,346,659 B1 | 1/2013 | Mohsenzadeh | |
| 8,346,663 B2 | 1/2013 | Kawan | |
| 8,352,323 B2 | 1/2013 | Fisher | |
| 8,352,362 B2 | 1/2013 | Mohsenzadeh | |
| 8,352,499 B2 | 1/2013 | Bharat | |

(56) References Cited

U.S. PATENT DOCUMENTS

| | | |
|---|---|---|
| 8,352,749 B2 | 1/2013 | Von Behren |
| 8,355,987 B2 | 1/2013 | Hirson |
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,380,177 B2 | 2/2013 | Laracey |
| 8,401,904 B1 | 3/2013 | Simakov |
| 8,412,586 B1 | 4/2013 | Foulser |
| 8,412,630 B2 | 4/2013 | Ross |
| 8,417,633 B1 | 4/2013 | Chmara |
| 8,423,462 B1 | 4/2013 | Amacker |
| 8,429,013 B2 | 4/2013 | Symons |
| 8,504,559 B1 | 8/2013 | Elman |
| 8,606,649 B2 | 12/2013 | Keener, Jr. |
| 8,639,685 B2 | 1/2014 | Huang |
| 8,788,935 B1 | 7/2014 | Hirsch |
| 9,355,393 B2 | 5/2016 | Purves |
| 9,430,579 B2 | 8/2016 | Hsu |
| 9,471,332 B2 | 10/2016 | Li |
| 9,582,598 B2 | 2/2017 | Kalgi |
| 9,622,142 B2 | 4/2017 | Burton |
| 9,710,807 B2 | 7/2017 | Theurer |
| 9,760,871 B1 | 9/2017 | Pourfallah |
| 9,940,610 B1 | 4/2018 | Davison |
| 2001/0037297 A1 | 3/2001 | McNair |
| 2001/0044774 A1 | 11/2001 | Sasazawa |
| 2001/0056359 A1 | 12/2001 | Abreu |
| 2002/0016765 A1 | 2/2002 | Sacks |
| 2002/0019777 A1 | 2/2002 | Schwab |
| 2002/0040325 A1 | 4/2002 | Takae |
| 2002/0077976 A1 | 6/2002 | Meyer |
| 2002/0082919 A1 | 6/2002 | Laundau |
| 2002/0107755 A1 | 8/2002 | Steed |
| 2002/0112014 A1 | 8/2002 | Bennett |
| 2002/0116271 A1 | 8/2002 | Mankoff |
| 2002/0120859 A1 | 8/2002 | Lipkin |
| 2002/0143614 A1 | 10/2002 | MacLean |
| 2003/0014307 A1 | 1/2003 | Heng |
| 2003/0014331 A1 | 1/2003 | Simons |
| 2003/0020748 A1 | 1/2003 | Charpentier |
| 2003/0026404 A1 | 2/2003 | Joyce |
| 2003/0028481 A1 | 2/2003 | Flitcroft |
| 2003/0061170 A1 | 3/2003 | Uzo |
| 2003/0061482 A1 | 3/2003 | Emmerichs |
| 2003/0080185 A1 | 5/2003 | Werther |
| 2003/0097318 A1 | 5/2003 | Yu |
| 2003/0101134 A1 | 5/2003 | Liu |
| 2003/0135734 A1 | 7/2003 | Fagan |
| 2003/0135842 A1 | 7/2003 | Frey |
| 2003/0158811 A1 | 8/2003 | Sanders |
| 2003/0174823 A1 | 9/2003 | Justice |
| 2003/0177361 A1 | 9/2003 | Wheeler |
| 2003/0191711 A1 | 10/2003 | Jamison |
| 2003/0200142 A1 | 10/2003 | Hicks |
| 2003/0200184 A1 | 10/2003 | Dominguez |
| 2003/0212642 A1 | 11/2003 | Weller |
| 2003/0233286 A1 | 12/2003 | Hahn-Carlson |
| 2004/0054625 A1 | 3/2004 | Kellogg |
| 2004/0059659 A1 | 3/2004 | Safaei |
| 2004/0078332 A1 | 4/2004 | Ferguson |
| 2004/0103037 A1 | 5/2004 | Wetmore |
| 2004/0117358 A1 | 6/2004 | von Kaenel |
| 2004/0128197 A1 | 7/2004 | Bam |
| 2004/0138999 A1 | 7/2004 | Friedman |
| 2004/0148255 A1 | 7/2004 | Beck |
| 2004/0215963 A1 | 10/2004 | Kaplan |
| 2004/0230536 A1 | 11/2004 | Fung |
| 2004/0236646 A1 | 11/2004 | Wu |
| 2004/0254836 A1 | 12/2004 | Emoke Barabas |
| 2004/0254891 A1 | 12/2004 | Blinn |
| 2004/0267608 A1 | 12/2004 | Mansfield |
| 2005/0010483 A1 | 1/2005 | Ling |
| 2005/0015338 A1 | 1/2005 | Lee |
| 2005/0037735 A1 | 2/2005 | Courts |
| 2005/0065819 A1 | 3/2005 | Pamela |
| 2005/0080747 A1 | 4/2005 | Anderson |
| 2005/0080821 A1 | 4/2005 | Breil |
| 2005/0097320 A1 | 5/2005 | Golan |
| 2005/0137969 A1 | 6/2005 | Shah |
| 2005/0171894 A1 | 8/2005 | Traynor |
| 2005/0177464 A1 | 8/2005 | Komem |
| 2005/0192893 A1 | 9/2005 | Keeling |
| 2005/0192895 A1 | 9/2005 | Rogers |
| 2005/0220326 A1 | 10/2005 | Sim |
| 2005/0234817 A1 | 10/2005 | VanFleet |
| 2005/0246278 A1 | 11/2005 | Gerber |
| 2005/0253840 A1 | 11/2005 | Kwon |
| 2005/0254714 A1 | 11/2005 | Anne |
| 2005/0261967 A1 | 11/2005 | Barry |
| 2006/0004713 A1 | 1/2006 | Korte |
| 2006/0005207 A1 | 1/2006 | Louch |
| 2006/0015399 A1 | 1/2006 | Alberth |
| 2006/0041618 A1 | 2/2006 | Chang |
| 2006/0053056 A1 | 3/2006 | Alspach-Goss |
| 2006/0053077 A1 | 3/2006 | Mourad |
| 2006/0085328 A1 | 4/2006 | Cohen |
| 2006/0085477 A1 | 4/2006 | Phillips |
| 2006/0089962 A1 | 4/2006 | Tsukazaki |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano |
| 2006/0190347 A1 | 8/2006 | Cuervo |
| 2006/0212722 A1 | 9/2006 | Ginter |
| 2006/0218153 A1 | 9/2006 | Voon |
| 2006/0226216 A1 | 10/2006 | Keithley |
| 2006/0268007 A1 | 11/2006 | Gopalakrishnan |
| 2006/0277143 A1 | 12/2006 | Almonte |
| 2006/0293947 A1 | 12/2006 | Nicholson |
| 2007/0011025 A1 | 1/2007 | Cracchiolo |
| 2007/0038515 A1 | 2/2007 | Postrel |
| 2007/0038516 A1 | 2/2007 | Apple |
| 2007/0055571 A1 | 3/2007 | Fox |
| 2007/0060315 A1 | 3/2007 | Park |
| 2007/0061250 A1 | 3/2007 | Kuo |
| 2007/0087820 A1 | 4/2007 | Van |
| 2007/0087822 A1 | 4/2007 | Van Luchene |
| 2007/0094066 A1 | 4/2007 | Kumar |
| 2007/0100691 A1 | 5/2007 | Patterson |
| 2007/0100728 A1 | 5/2007 | Rotman |
| 2007/0101276 A1 | 5/2007 | Yuen |
| 2007/0106607 A1 | 5/2007 | Seib |
| 2007/0113289 A1 | 5/2007 | Blumenau |
| 2007/0143204 A1 | 6/2007 | Claus |
| 2007/0150413 A1 | 6/2007 | Morgenstern |
| 2007/0180119 A1 | 8/2007 | Khivesara |
| 2007/0189579 A1 | 8/2007 | Crookham |
| 2007/0208662 A1 | 9/2007 | Jeronimus |
| 2007/0214078 A1 | 9/2007 | Coppinger |
| 2007/0214250 A1 | 9/2007 | Ahmed |
| 2007/0226152 A1 | 9/2007 | Jones |
| 2007/0233590 A1 | 10/2007 | Hardison |
| 2007/0239502 A1 | 10/2007 | Babu |
| 2007/0239552 A1 | 10/2007 | Sundaresan |
| 2007/0255653 A1 | 11/2007 | Tumminaro |
| 2007/0267479 A1 | 11/2007 | Nix |
| 2007/0276765 A1 | 11/2007 | Hazel |
| 2007/0299976 A1 | 12/2007 | Zafar |
| 2008/0004116 A1 | 1/2008 | Van |
| 2008/0004952 A1 | 1/2008 | Koli |
| 2008/0010096 A1 | 1/2008 | Patterson |
| 2008/0021829 A1 | 1/2008 | Kranzley |
| 2008/0034309 A1 | 2/2008 | Louch |
| 2008/0077489 A1 | 3/2008 | Gilley |
| 2008/0086365 A1 | 4/2008 | Zollino |
| 2008/0091553 A1 | 4/2008 | Koski |
| 2008/0091616 A1 | 4/2008 | Helwin |
| 2008/0097856 A1 | 4/2008 | Blagg |
| 2008/0097871 A1 | 4/2008 | Williams |
| 2008/0104496 A1 | 5/2008 | Williams |
| 2008/0114737 A1 | 5/2008 | Neely |
| 2008/0120194 A1 | 5/2008 | Juras |
| 2008/0126145 A1 | 5/2008 | Racklet, III |

(56) References Cited

U.S. PATENT DOCUMENTS

| | | |
|---|---|---|
| 2008/0133351 A1 | 6/2008 | White |
| 2008/0140568 A1 | 6/2008 | Henry |
| 2008/0147480 A1 | 6/2008 | Sarma |
| 2008/0147883 A1 | 6/2008 | Philyaw |
| 2008/0148283 A1 | 6/2008 | Allen |
| 2008/0154915 A1 | 6/2008 | Flake |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0181463 A1 | 7/2008 | Error |
| 2008/0195510 A1 | 8/2008 | Olliphant |
| 2008/0195664 A1 | 8/2008 | Maharajh |
| 2008/0208704 A1 | 8/2008 | Wang |
| 2008/0208712 A1 | 8/2008 | Yerkes |
| 2008/0222170 A1 | 9/2008 | Farnham |
| 2008/0223918 A1 | 9/2008 | Williams |
| 2008/0235123 A1 | 9/2008 | Olliphant |
| 2008/0244509 A1 | 10/2008 | Buchs |
| 2008/0263460 A1 | 10/2008 | Altberg |
| 2008/0270300 A1 | 10/2008 | Jones |
| 2008/0272188 A1 | 11/2008 | Keithley |
| 2008/0319905 A1 | 12/2008 | Carlson |
| 2009/0006181 A1 | 1/2009 | Ghosh |
| 2009/0024452 A1 | 1/2009 | Martinez |
| 2009/0024527 A1 | 1/2009 | Sellen |
| 2009/0031228 A1 | 1/2009 | Buchs |
| 2009/0037255 A1 | 2/2009 | Chiu |
| 2009/0048934 A1 | 2/2009 | Haddad |
| 2009/0055757 A1 | 2/2009 | Chaney |
| 2009/0061884 A1 | 3/2009 | Rajan |
| 2009/0063261 A1 | 3/2009 | Scribner |
| 2009/0064056 A1 | 3/2009 | Anderson |
| 2009/0076934 A1 | 3/2009 | Shahbazi |
| 2009/0076953 A1 | 3/2009 | Saville |
| 2009/0076966 A1 | 3/2009 | Bishop |
| 2009/0089176 A1 | 4/2009 | Mccabe |
| 2009/0089193 A1 | 4/2009 | Paintin |
| 2009/0096812 A1 | 4/2009 | Boixel |
| 2009/0099925 A1 | 4/2009 | Mehta |
| 2009/0099961 A1 | 4/2009 | Ogilvy |
| 2009/0104888 A1 | 4/2009 | Cox |
| 2009/0106151 A1 | 4/2009 | Nelsen |
| 2009/0119176 A1 | 5/2009 | Johnson |
| 2009/0119211 A1 | 5/2009 | Johnson |
| 2009/0132347 A1 | 5/2009 | Anderson |
| 2009/0132395 A1 | 5/2009 | Lam |
| 2009/0132403 A1 | 5/2009 | Titus |
| 2009/0132435 A1 | 5/2009 | Titus |
| 2009/0138525 A1 | 5/2009 | Mattox |
| 2009/0144104 A1 | 6/2009 | Johnson |
| 2009/0150388 A1 | 6/2009 | Roseman |
| 2009/0164315 A1 | 6/2009 | Rothman |
| 2009/0164344 A1 | 6/2009 | Shiftan |
| 2009/0171760 A1 | 7/2009 | Aarnlo |
| 2009/0171778 A1 | 7/2009 | Powell |
| 2009/0182664 A1 | 7/2009 | Trombley |
| 2009/0182762 A1 | 7/2009 | Chang |
| 2009/0182837 A1 | 7/2009 | Roberts |
| 2009/0210300 A1 | 8/2009 | Cansler |
| 2009/0222302 A1 | 9/2009 | Higgins |
| 2009/0222347 A1 | 9/2009 | Whitten |
| 2009/0222511 A1 | 9/2009 | Hays |
| 2009/0233579 A1 | 9/2009 | Castell |
| 2009/0234751 A1 | 9/2009 | Chan |
| 2009/0241159 A1 | 9/2009 | Campagna |
| 2009/0248996 A1 | 10/2009 | Mandyam |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271265 A1 | 10/2009 | Lay |
| 2009/0271283 A1 | 10/2009 | Fosnacht |
| 2009/0288012 A1 | 11/2009 | Hertel |
| 2009/0307135 A1 | 12/2009 | Gupta |
| 2009/0313132 A1 | 12/2009 | McKenna |
| 2009/0327040 A1 | 12/2009 | McInerny |
| 2009/0327045 A1 | 12/2009 | Olives |
| 2009/0327088 A1 | 12/2009 | Puthupparambil |
| 2010/0004989 A1 | 1/2010 | Bonalle |
| 2010/0005025 A1 | 1/2010 | Kumar |
| 2010/0009663 A1 | 1/2010 | Chang |
| 2010/0010964 A1 | 1/2010 | Skowronek |
| 2010/0017501 A1 | 1/2010 | Yen |
| 2010/0023386 A1 | 1/2010 | Avisar |
| 2010/0023455 A1 | 1/2010 | Dispensa |
| 2010/0036741 A1 | 2/2010 | Cleven |
| 2010/0036775 A1 | 2/2010 | Edens |
| 2010/0042456 A1 | 2/2010 | Stinchcombe |
| 2010/0042537 A1 | 2/2010 | Smith |
| 2010/0042540 A1 | 2/2010 | Graves |
| 2010/0049879 A1 | 2/2010 | Leavitt |
| 2010/0063873 A1 | 3/2010 | McGucken |
| 2010/0063903 A1 | 3/2010 | Whipple |
| 2010/0076873 A1 | 3/2010 | Taylor |
| 2010/0076987 A1 | 3/2010 | Schreiner |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0094730 A1 | 4/2010 | Koski |
| 2010/0100480 A1 | 4/2010 | Altman |
| 2010/0121707 A1 | 5/2010 | Goeldi |
| 2010/0125492 A1 | 5/2010 | Lin |
| 2010/0125495 A1 | 5/2010 | Smith |
| 2010/0125803 A1 | 5/2010 | Johnson |
| 2010/0130853 A1 | 5/2010 | Chandonnet |
| 2010/0131347 A1 | 5/2010 | Sarptipi |
| 2010/0131415 A1 | 5/2010 | Sartipi |
| 2010/0131569 A1 | 5/2010 | Lawyer |
| 2010/0131589 A1 | 5/2010 | Lawyer |
| 2010/0155470 A1 | 6/2010 | Woronec |
| 2010/0161433 A1 | 6/2010 | White |
| 2010/0174599 A1 | 7/2010 | Rosenblatt |
| 2010/0185505 A1 | 7/2010 | Sprogoe |
| 2010/0185531 A1 | 7/2010 | Van |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D'Angelo et al. |
| 2010/0211499 A1 | 8/2010 | Zanzot |
| 2010/0211863 A1 | 8/2010 | Jones |
| 2010/0216542 A1 | 8/2010 | Van Luchene |
| 2010/0217682 A1 | 8/2010 | Chan |
| 2010/0218128 A1 | 8/2010 | Bonat |
| 2010/0223119 A1 | 9/2010 | Klish |
| 2010/0227675 A1 | 9/2010 | Luxton |
| 2010/0241499 A1 | 9/2010 | Crispo |
| 2010/0241507 A1 | 9/2010 | Quinn |
| 2010/0250351 A1 | 9/2010 | Gillenson |
| 2010/0268648 A1 | 10/2010 | Wiesman |
| 2010/0276484 A1 | 11/2010 | Banerjee |
| 2010/0303230 A1 | 12/2010 | Taveau |
| 2010/0305848 A1 | 12/2010 | Stallman |
| 2010/0306075 A1 | 12/2010 | Drance |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0332262 A1 | 12/2010 | Horvitz |
| 2010/0332283 A1 | 12/2010 | Ng |
| 2011/0022482 A1 | 1/2011 | Florek |
| 2011/0035594 A1 | 2/2011 | Fox |

(56) References Cited

U.S. PATENT DOCUMENTS

| | | |
|---|---|---|
| 2011/0047075 A1 | 2/2011 | Fourez |
| 2011/0059784 A1 | 3/2011 | Lutnick |
| 2011/0060663 A1 | 3/2011 | McPhie |
| 2011/0071843 A1 | 3/2011 | Gilvar |
| 2011/0078082 A1 | 3/2011 | Gupta |
| 2011/0082789 A1 | 4/2011 | Boyd |
| 2011/0085667 A1 | 4/2011 | Berrios |
| 2011/0087534 A1 | 4/2011 | Strebinger |
| 2011/0099057 A1 | 4/2011 | Tenyer |
| 2011/0105183 A1 | 5/2011 | Hsiao |
| 2011/0106698 A1 | 5/2011 | Issacson |
| 2011/0137742 A1 | 6/2011 | Parikh |
| 2011/0161882 A1 | 6/2011 | Dasgupta |
| 2011/0178896 A1 | 7/2011 | Nakajima |
| 2011/0184827 A1 | 7/2011 | Hubert |
| 2011/0191210 A1 | 8/2011 | Blackhurst |
| 2011/0196724 A1 | 8/2011 | Fenton |
| 2011/0201299 A1 | 8/2011 | Kamdar |
| 2011/0202406 A1 | 8/2011 | Suomela |
| 2011/0208629 A1 | 8/2011 | Benefieid |
| 2011/0209049 A1 | 8/2011 | Ghosh |
| 2011/0212762 A1 | 9/2011 | Ocko |
| 2011/0215146 A1 | 9/2011 | Shams |
| 2011/0218838 A1 | 9/2011 | Byce |
| 2011/0218846 A1 | 9/2011 | Fieldman |
| 2011/0218849 A1* | 9/2011 | Rutigliano ............ G06Q 20/20 705/14.25 |
| 2011/0218870 A1 | 9/2011 | Shams |
| 2011/0246290 A1 | 10/2011 | Howard |
| 2011/0258031 A1 | 10/2011 | Valin |
| 2011/0258123 A1 | 10/2011 | Dawkins |
| 2011/0276507 A1 | 11/2011 | OMalley |
| 2011/0296508 A1 | 12/2011 | Os |
| 2011/0320250 A1 | 12/2011 | Gemmell |
| 2011/0320344 A1 | 12/2011 | Faith |
| 2012/0005030 A1 | 1/2012 | Valin |
| 2012/0011063 A1 | 1/2012 | Killian |
| 2012/0020973 A1 | 1/2012 | Crowe |
| 2012/0022943 A1 | 1/2012 | Howard |
| 2012/0022981 A1 | 1/2012 | Morgenstern |
| 2012/0023026 A1 | 1/2012 | Chen |
| 2012/0030101 A1 | 2/2012 | Boyd |
| 2012/0036071 A1 | 2/2012 | Fulton |
| 2012/0054049 A1 | 3/2012 | Hayes |
| 2012/0078735 A1 | 3/2012 | Bauer |
| 2012/0084135 A1 | 4/2012 | Nissan |
| 2012/0084204 A1 | 4/2012 | Castell |
| 2012/0089446 A1 | 4/2012 | Gupta |
| 2012/0095895 A1 | 4/2012 | Aston |
| 2012/0101881 A1 | 4/2012 | Taylor |
| 2012/0116966 A1 | 5/2012 | Tan |
| 2012/0118950 A1 | 5/2012 | Belk |
| 2012/0123838 A1 | 5/2012 | Sparks |
| 2012/0130853 A1 | 5/2012 | Petri |
| 2012/0136780 A1 | 5/2012 | El-Awady |
| 2012/0150598 A1 | 6/2012 | Griggs |
| 2012/0158580 A1 | 6/2012 | Eram |
| 2012/0158584 A1* | 6/2012 | Behren ................ G06Q 20/10 705/41 |
| 2012/0166333 A1 | 6/2012 | von Behren |
| 2012/0173431 A1 | 7/2012 | Ritchie |
| 2012/0190386 A1 | 7/2012 | Anderson |
| 2012/0197756 A1 | 8/2012 | Stocker |
| 2012/0209677 A1 | 8/2012 | Mehta |
| 2012/0215640 A1 | 8/2012 | Ramer |
| 2012/0215650 A1 | 8/2012 | Oba |
| 2012/0215701 A1 | 8/2012 | Mehta |
| 2012/0221421 A1 | 8/2012 | Hammad |
| 2012/0221502 A1 | 8/2012 | Jerram |
| 2012/0231844 A1 | 9/2012 | Coppinger |
| 2012/0259763 A1 | 10/2012 | Pessin |
| 2012/0304273 A1 | 11/2012 | Bailey |
| 2012/0310826 A1 | 12/2012 | Chatterjee |
| 2012/0323664 A1 | 12/2012 | Klems |
| 2013/0030922 A1 | 1/2013 | Shalabi |
| 2013/0041811 A1 | 2/2013 | Vazquez |
| 2013/0090750 A1 | 4/2013 | Herrman |
| 2013/0095910 A1 | 4/2013 | Chu |
| 2013/0151417 A1 | 6/2013 | Gupta |
| 2013/0185135 A1 | 7/2013 | Mason |
| 2013/0246943 A1 | 9/2013 | Goodman |
| 2013/0268763 A1 | 10/2013 | Sweet |
| 2013/0290203 A1 | 10/2013 | Purves |
| 2013/0304637 A1* | 11/2013 | McCabe ................ G06Q 20/12 705/39 |
| 2013/0346302 A1 | 12/2013 | Purves |
| 2014/0052617 A1 | 2/2014 | Chawla |
| 2014/0172472 A1 | 6/2014 | Florimond |
| 2014/0207662 A1 | 7/2014 | Isaacson |
| 2014/0282371 A1 | 9/2014 | Hirsch |
| 2014/0351048 A1* | 11/2014 | Fordyce ................ G06Q 20/10 705/14.53 |
| 2015/0221316 A1 | 8/2015 | Mufti |
| 2015/0262168 A1 | 9/2015 | Armstrong |
| 2015/0347989 A1 | 12/2015 | Kumar |
| 2016/0117780 A1 | 4/2016 | Semlani |
| 2016/0232515 A1 | 8/2016 | Jhas |
| 2016/0328693 A1 | 11/2016 | Mao |
| 2017/0185989 A1 | 6/2017 | Bozovich, Jr. |
| 2017/0193475 A1 | 7/2017 | Mercille |
| 2017/0193490 A1 | 7/2017 | Mercille |
| 2017/0221062 A1 | 8/2017 | Katz |
| 2017/0228711 A1 | 8/2017 | Chawla |
| 2017/0278085 A1 | 9/2017 | Anderson |
| 2018/0096321 A1 | 4/2018 | Haldenby |

FOREIGN PATENT DOCUMENTS

| | | |
|---|---|---|
| KR | 100432430 B1 | 5/2004 |
| KR | 20060117177 A | 11/2006 |
| KR | 20070104087 A | 10/2007 |
| WO | 0165502 A2 | 9/2001 |
| WO | 03023674 A1 | 3/2003 |
| WO | 2010148737 A1 | 12/2010 |

OTHER PUBLICATIONS

Office Action dated Apr. 2, 2019 for U.S. Appl. No. 13/278,173 (pp. 1-18).

Office Action dated Apr. 18, 2019 for U.S. Appl. No. 13/278,166 (pp. 1-13).

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

Gopalan, NP & Selvan, B Siva. TCP/IP Illustrated. Prentice-Hall. 2008. pp. 101-102, 175-176 and 235. 7 pages.

Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?amumber=5369384, pp. 449-452.

International Search Report for PCT/US09/54921 dated Oct. 21, 2009. (2 pages).

International Search Report and Written Opinion for PCT/US2010/048344 dated Nov. 15, 2010. (7 pages).

International Search Report and Written Opinion for PCT/US2010/041860 dated Feb. 1, 2011. (8 pages).

Jones, Peter, "SAP Business Information Warehouse Reporting: Building Better BI with SAP BI 7.0," Jan. 18, 2008, McGraw-Hill Osborne Media, Sections 3.1, 13.1, 15.2, 138 pages.

International Search Report for PCT/US11/49393 dated Dec. 5, 2011. (2 pages).

International Search Report and Written Opinion for PCT/US11/57179 dated Jan. 5, 2012. (7 pages).

International Search Report and Written Opinion for PCT/US11/57173 dated Mar. 15, 2012. (11 pages).

International Search Report and Written Opinion for PCT/US2012/026205, dated May 29, 2012. 2 pages.

(56) References Cited

OTHER PUBLICATIONS

International Search Report for PCT/US11/65305 dated Apr. 16, 2012. 2 pages.
International Search Report for PCT/US12/23856 dated Jun. 6, 2012. 3 pages.
International Search Report for PCT/US12/24772 dated Jul. 24, 2012. 3 pages.
International Search Report for PCT/US12/25530 dated Aug. 7, 2012. 4 pages.
International Search Report PCT/US12/27620 dated Aug. 10, 2012. 3 pages.
International Search Report and Written Opinion for PCT/US12/41437 dated Aug. 24, 2012. (20 pages).
International Search Report and Written Opinion for PCT/US12/37597 dated Sep. 21, 2012 (11 pages).
International Search Report for PCT/US12/39638 dated Sep. 24, 2012. 4 pages.
International Search Report for PCT/US12/45875 dated Nov. 16, 2012. 4 pages.
International Search Report and Written Opinion for PCT/US12/47092 dated Nov. 26, 2012. 11 pages.
International Search Report for PCT/US12/57577 dated Nov. 29, 2012. 2 pages.
International Search Report and Written Opinion for PCT/US12/57528 dated Dec. 17, 2012. 8 pages.
International Search Report and Written Opinion for PCT/US12/66898 dated Feb. 11, 2013. 14 pages.
International Search Report and Written Opinion for PCT/US12/56759 dated Feb. 25, 2013. 12 pages.
International Search Report and Written Opinion for PCT/US2013/020411 dated May 21, 2013. 18 pages.
International Search Report and Written Opinion for PCT/US2013/024538, dated May 31, 2013. 15 pages.
Wikipedia, modified Aug. 26, 2010, "Social Graph"; http://web.archive.Org/web/20100914055833/http://en.wikipedia.org/wiki/Social_Graph, Accessed Aug. 29, 2013. 3 pages.
International Search Report and Written Opinion for PCT/US2013/031084, dated Jun. 4, 2013. 9 pages.
International Search Report for PCT/US2010/033229 dated Dec. 29, 2010, 8 pages.
Written Opinion for PCT/US12/27620 dated Aug. 10, 2012. 5 pages.
David Breitkopf, "ACS to Take Over Mich. WC Distribution Program", American Banker, New York, NY: Jul. 20, 2006, vol. 171. Issue 138, p. 6.
International Search Report and Written Opinion for PCT/US2010/033861 dated Dec. 9, 2010 (7 pages).
International Search Report for PCT/US2010/033547 dated Dec. 14, 2010 (3 pages).
International Search Report for PCT/US2010/045445 dated Feb. 24, 2011 (3 pages).
International Search Report for PCT/US2010/045500 dated Mar. 29, 2011 (3 pages).
International Search Report and Written Opinion for PCT/US2011/024941 dated Apr. 19, 2011 (6 pages).
International Search Report and Written Opinion for PCT/US2010/046833 dated Apr. 26, 2011 (8 pages).
PCT International Preliminary Report on Patentability dated Mar. 6, 2012 corresponding to application PCT/US2010/046833. 6 pages.
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report for PCT/US2011/035268 dated Aug. 5, 2011 (3 pages).
International Search Report and Written Opinion for PCT/US2011/032093 dated Aug. 24, 2011 (11 pages).
International Search Report and Writtten Opinion for PCT/US2011/039178 dated Sep. 16, 2011 (7 pages).
International Search Report and Written Opinion issued in connection with PCT/US11/42062 dated Sep. 29, 2011 (8 pages).
International Search Report and Written Opinion for PCT/US11/57180 dated Mar. 15, 2012 (11 pages).
International Search Report for PCT/US12/21000 dated May 15, 2012. 2 pages.
International Search Report and Written Opinion for PCT/US2012/027043 dated Jul. 13, 2012. 15 pages.
International Search Report and Written Opinion for PCT/US12/55636 dated Nov. 30, 2012. 2 pages.
International Search Report and Written Opinion for PCT/US2012/045601 dated Feb. 1, 2013. 11 pages.
International Search Report and Written Opinion for PCT/US2012/069557 dated Feb. 22, 2013. 8 pages.
International Search Report and Written Opinion for PCT/US12/65738 dated Apr. 19, 2013. 9 pages.
International Search Report and Written Opinion for PCT/US2010/033229 dated Dec. 29, 2010. (8 pages).
Office Action dated Mar. 28, 2018 for U.S. Appl. No. 13/278,173 (pp. 1-22).
Office Action dated May 8, 2018 for U.S. Appl. No. 13/278,166 (pp. 1-17).
Notice of Allowanace dated May 18, 2018 for U.S. Appl. No. 13/714,090 (pp. 1-7).
Notice of Allowability dated May 31, 2018 for U.S. Appl. No. 13/714,090 (pp. 1-2).
Office Action dated Jun. 15, 2018 for U.S. Appl. No. 13/966,098 (pp. 1-8).
Office Action dated Jun. 20, 2018 for U.S. Appl. No. 14/037,131 (pp. 1-20).
Office Action dated Aug. 24, 2018 for U.S. Appl. No. 13/278,173 (pp. 1-19).
Office Action dated Sep. 17, 2018 for U.S. Appl. No. 13/278,166 (pp. 1-15).
Office Action dated Jan. 10, 2019 for U.S. Appl. No. 15/701,391 (pp. 1-24).
Han, Hui and Trimi, Silvana; "Social Commerce Design: A Framework and Application", May 27, 2017, Journal of Theoretical and Applied Electronic Commerce Research, vol. 12, Issue 3; www.jtaer.com (Year: 2017) 20 pages.
Notice of Allowance dated Jan. 24, 2019 for U.S. Appl. No. 13/966,098 (pp. 1-10).

* cited by examiner

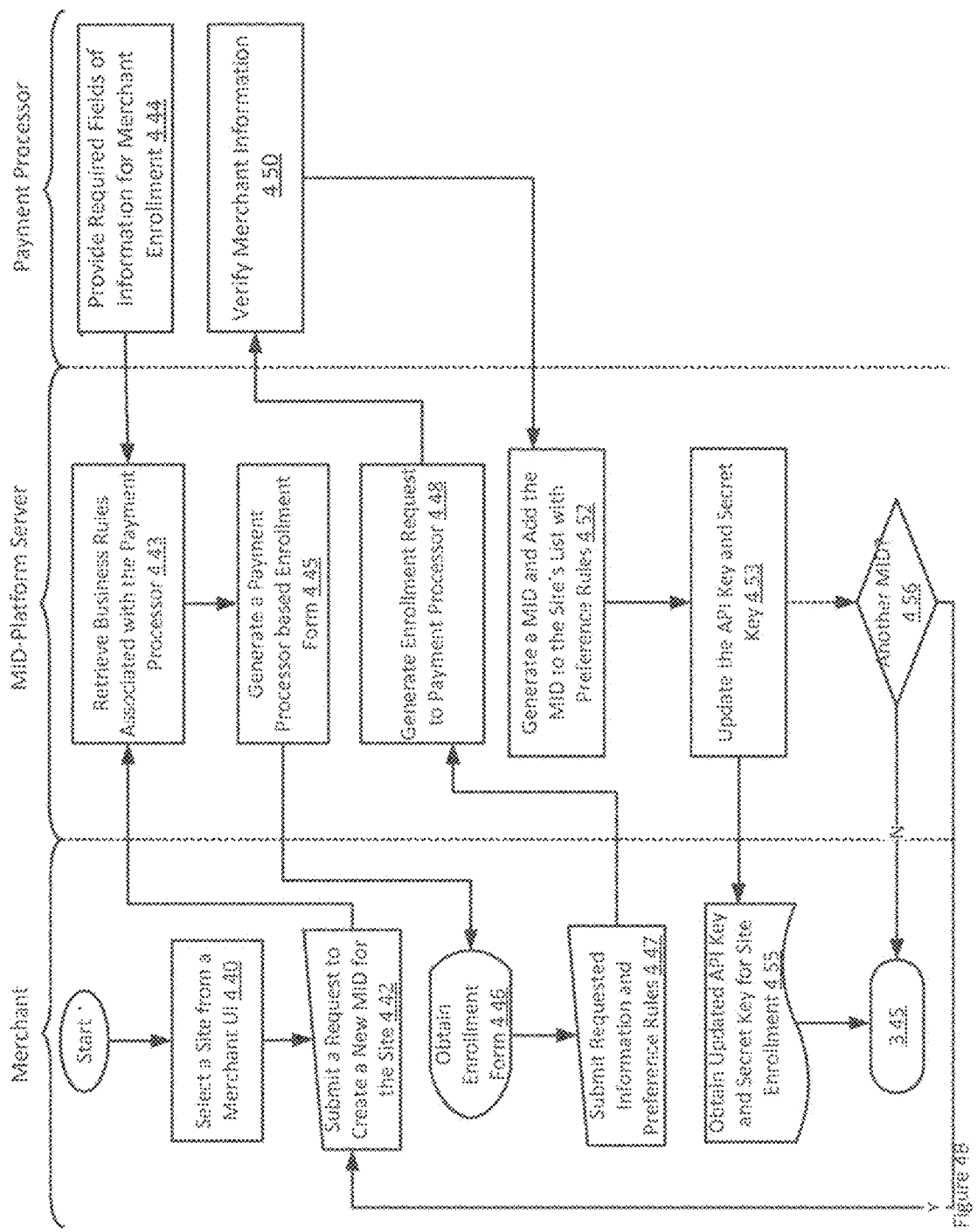

MULTIPLE MERCHANT PAYMENT PROCESSOR PLATFORM APPARATUSES, METHODS AND SYSTEMS

PRIORITY CLAIM

This application claims priority to U.S. provisional patent application Ser. No. 61/806,788, filed Mar. 29, 2013, entitled "Multiple Merchant Payment Processor Platform Apparatus, Methods, and Systems"; PCT International Application Serial no. PCT/US2012/047092, filed Jul. 17, 2012, entitled "Merchant Control Platform Apparatuses, Methods and Systems," which in turn claims priority under Patent Cooperation Treaty and 35 USC § 119 and § 120 to U.S. provisional patent application Ser. No. 61/508,679, filed Jul. 17, 2011, entitled "Cross Channel Merchant Consumer Bridging Apparatuses, Methods And Systems"; U.S. provisional patent application Ser. No. 61/618,670, filed Mar. 30, 2012, entitled "Developer Console And Merchant Control Panel Apparatuses, Methods And Systems"; U.S. provisional patent application Ser. No. 61/570,230, filed Dec. 13, 2011, entitled "Dynamic Widget Generator Apparatuses, Methods And Systems"; and U.S. application Ser. No. 13/278,173, filed Oct. 20, 2011, entitled "Flexible Monetization Service Apparatuses, Methods And Systems."

The entire contents of the aforementioned applications are expressly incorporated by reference herein.

This application for letters patent discloses and describes various novel innovations and inventive aspects of MULTIPLE MERCHANT PAYMENT PROCESSOR PLATFORM technology (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for electronic transactions, and more particularly, include MULTIPLE MERCHANT PAYMENT PROCESSOR PLATFORM APPARATUSES, METHODS AND SYSTEMS ("MID-PLATFORM").

BACKGROUND

A merchant is a manufacturer, a retailer or a distributor who produces, distributes or sells products. Consumers may shop with a merchant for products and pay for the product at a point of sale (POS) terminal at the merchant store to complete the purchase. Merchants who allow a consumer to pay with a credit card need to register for credit card payment. A merchant may send personnel to a local bank branch to interact with a bank representative to establish a credit card payment channel for the merchant store. Upon registration, the merchant can attach a label "major credit card accepted" at its POS terminal so that a consumer can pay by credit cards.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIGS. 4A-4C provides a logic flow diagram illustrating merchant analytics based campaign set up within embodiments of the MID-Platform;

Figure 1A:
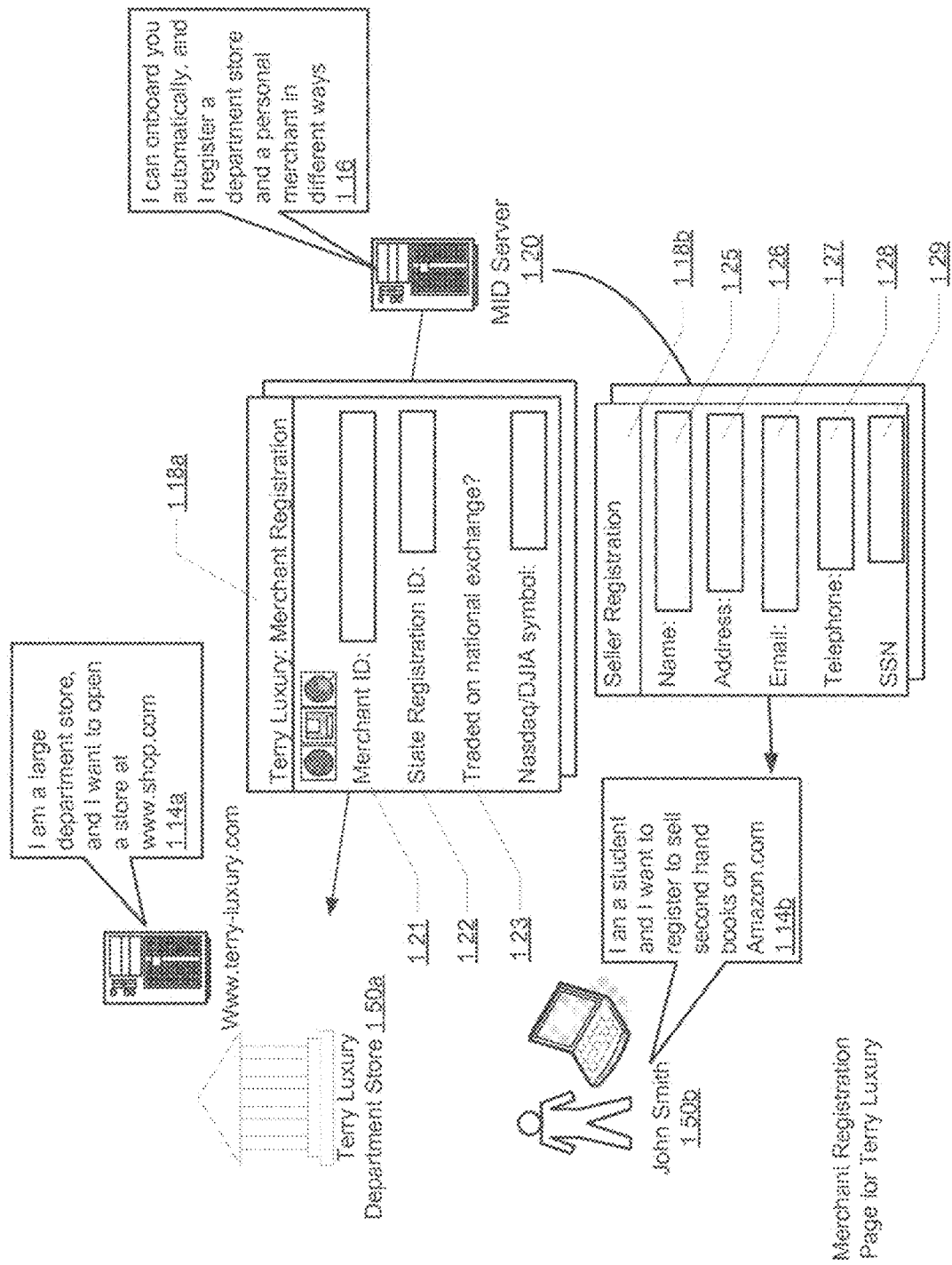
FIGS. 1A-C show block diagrams illustrating example aspects of the MID-PLATFORM.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The MULTIPLE MERCHANT PAYMENT PROCESSOR PLATFORM APPARATUSES, METHODS AND

SYSTEMS (hereinafter "MID-Platform") provides an advertising tracking and payment platform which combines online tracking of consumer behaviors and merchant advertising into purchase data. In one embodiment, MID-Platform may provide a platform for a merchant to automatically enroll with a payment platform (e.g., Visa V.me wallet service, etc.), and provide consumer purchasing analytics for the merchant to devise a campaign.

Integration of an electronic wallet, a desktop application, a plug-in to existing applications, a standalone mobile application, a web based application, a smart prepaid card, and/or the like in capturing payment transaction related objects such as purchase labels, payment cards, barcodes, receipts, and/or the like reduces the number of network transactions and messages that fulfill a transaction payment initiation and procurement of payment information (e.g., a user and/or a merchant does not need to show an advertisement in the print media or obtain and send digital images of paper bills, hand in a physical payment card to a cashier, etc., to initiate a payment transaction, fund transfer, and/or the like). In this way, with the reduction of network communications, the number of transactions that may be processed per day is increased, i.e., processing efficiency is improved.

It should be noted that although a mobile platform is depicted (e.g., see FIGS. 6A-6F), a digital/electronic wallet, a smart/prepaid card linked to a user's various payment accounts, and/or other payment platforms are contemplated embodiments as well; as such, subset and superset features and data sets of each or a combination of the aforementioned payment platforms may be accessed, modified, provided, stored, etc. via cloud/server services and a number of varying client devices throughout the instant specification. Similarly, although mobile wallet user interface elements are depicted, alternative and/or complementary user interfaces are also contemplated including: desktop applications, plug-ins to existing applications, stand alone mobile applications, web based applications (e.g., applications with web objects/frames, HTML 5 applications/wrappers, web pages, etc.), and other interfaces are contemplated. It should be further noted that the MID-Platform payment processing component may be integrated with an digital/electronic wallet (e.g., a Visa V-Wallet, etc.), comprise a separate stand alone component instantiated on a user device, comprise a server/cloud accessed component, be loaded on a smart/prepaid card that can be substantiated at a PoS terminal, an ATM, a kiosk, etc., which may be accessed through a physical card proxy, and/or the like. In further implementations, the MID-Platform may provide a merchant configuration UI for a merchant to create a campaign, set ad revenue sharing rules, and/or the like. In one implementation, the MID-Platform may provide a merchant information collecting page based on the merchant type. In this way, the MID-Platform reduces redundant information for merchant enrollment, and thus improves network transmission and processing efficiency.

Multiple Merchant Payment Processor Platform
(Mid-Platform)

Figure 1B:
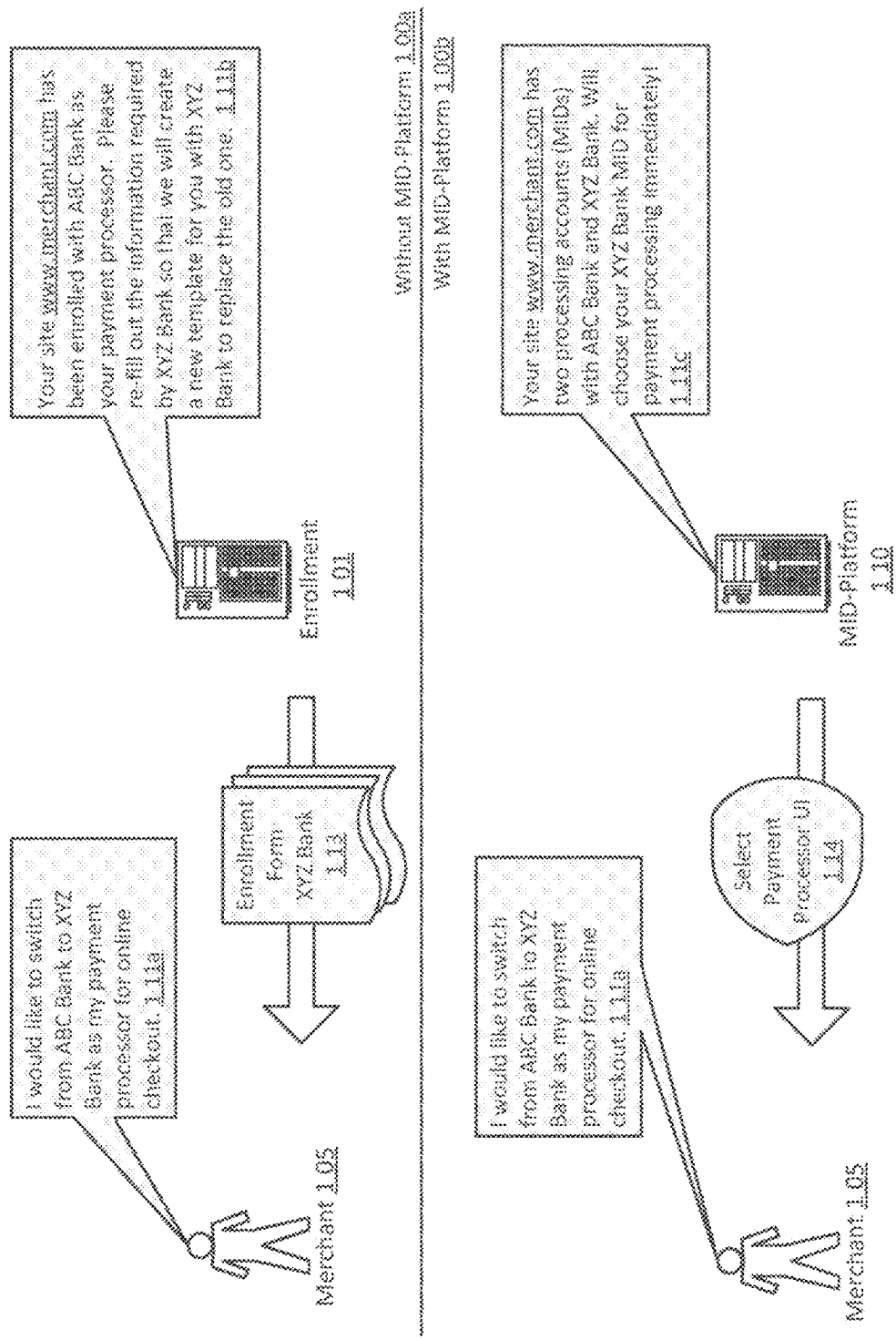
Figure 1C:
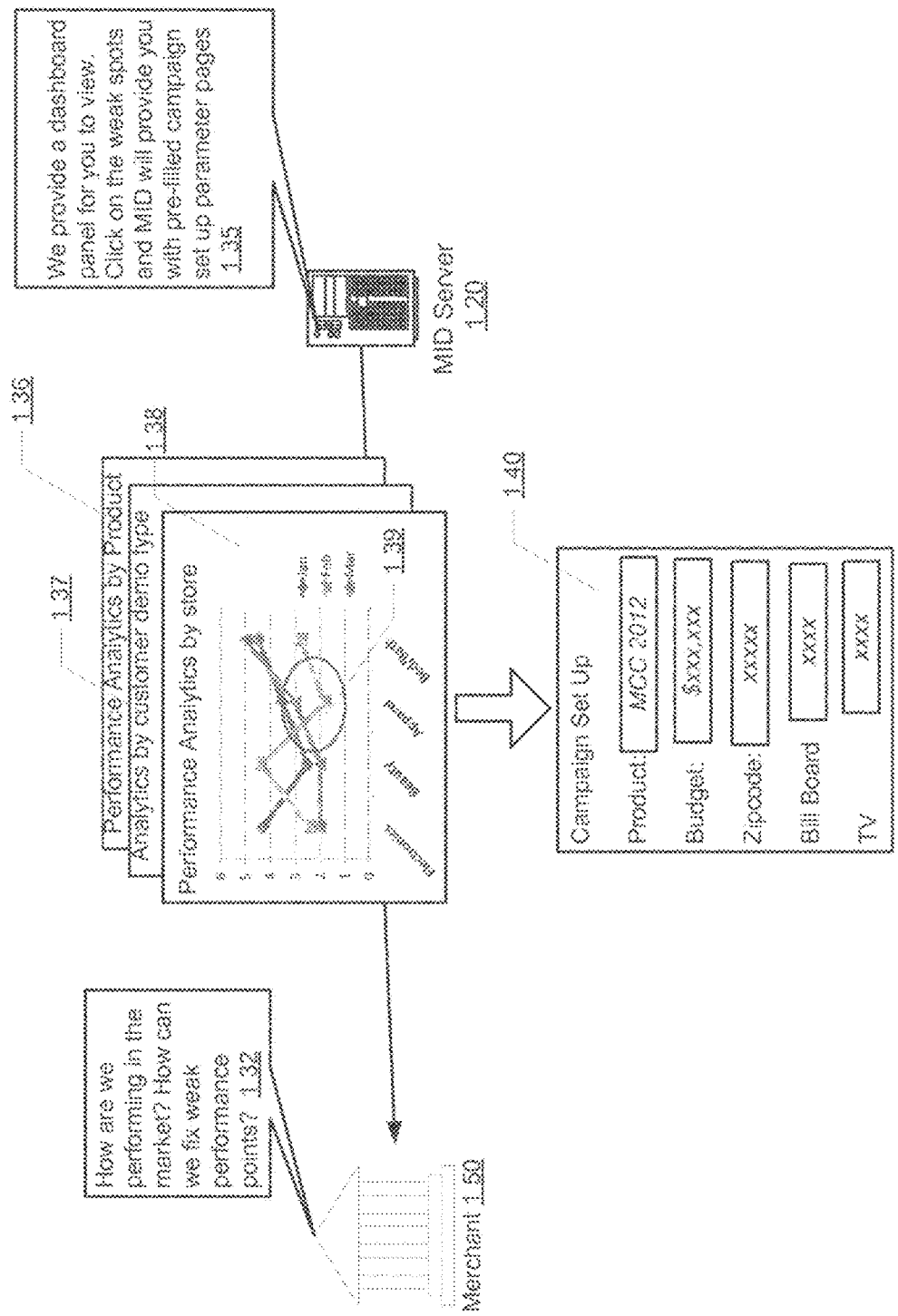

FIGS. 1A-1C provide block diagrams illustrating example aspects of merchant onboarding and merchant campaign analytics within embodiments of the MID-Platform. Within embodiments, as shown in FIG. 1A, various merchants may register with a payment platform 114*a-b*, e.g., the Visa V.me wallet payment platform, and/or the like, an online shopping site (e.g., Amazon.com, shop.com, etc.), and/or the like. In one implementation, the MID-Platform may generate customized registration forms via a user interface (UI), e.g., a web-based application, a mobile UI, and/or the like. For example, in one implementation, a merchant may comprise a large business, e.g., "Terry Luxury Department Store" 150*a* with an online shopping site (e.g., www.terry-luxury-.com), and/or a small business such as an individual seller 150*b*. The MID-Platform server 120 may evaluate the type of the merchant and determine the required information for registration based on the merchant type 116.

For example, for a large business merchant such as "Terry Luxury Department Store" 150*a*, the merchant may receive a merchant registration page 118*a* including information fields such as merchant ID 121, merchant state registration ID 122, Nasdaq/DJIA symbol 123 of the merchant if it is listed on the national exchange, and/or the like. In another example, for a small business such as an individual seller 150*b*, the merchant may receive a seller registration page 118*b*, which may require information such as the merchant name 125, address 126, email 127, telephone 128, credit card information 129, and/or the like. The MID-Platform server 120 may receive information from the merchants and verify eligibility of the merchant based on the merchant type.

FIG. 1B provides an exemplary block diagram illustrating aspects of merchant enrollment with payment processors within embodiments of the MID-Platform. In one embodiment, a merchant may enroll with a payment platform (e.g., Visa V.me, PlaySpan, etc.) and obtain a payment checkout widget (e.g., a Visa V.me checkout lightbox, etc.) for its online shopping site. In one implementation, the merchant may need to create a merchant account and/or create a merchant entity in the payment platform system. For example, as discussed in FIG. 1A, the merchant may fill out a registration form (e.g., see 118*a-b* in FIG. 1A) providing information to set up an online shopping site, including fields such as but not limited to site name, shipping regions enabled, whether or not to receive post-steps, data format, and/or the like. Upon merchant submitting registration information, the merchant may obtain an API key and a shared secret key (e.g., see 1205*c-d* in FIG. 12A), which are used to invoke the V.Me lightbox at checkout of the merchant online shopping site. Such API keys may also provide information as to the shopping site configurations. In one implementation, the shopping site may be assigned a processing account (a merchant ID, "MID") having its own configurations such as but not limited to payment type accepted, currency accepted, whom the provider was (e.g. Chase, FirstData, etc.), purchase data, and/or the like. The MID may further include routing configurations (e.g., where to route the transaction to), which may be routed to a third party payment gateway (e.g., Cybersource platform, etc.), which receives a payment request routed from the merchant site, and routes the payment request to the merchant issuer bank, and then responds to V.Me/Playspan, etc. Further implementations of merchant enrollment with a payment platform are discussed in FIGS. 2A-2B and 10A-10E.

As shown at 100*a*, when a merchant 105 may need to change a payment processor (e.g., from "ABC bank" to "XYZ bank," etc.), without the MID-Platform 121*b*, the enrollment server 101 may request the merchant to re-register with all the requested information by the new payment processor 121*b*. For example, the merchant 105 may fill in enrollment form from "XYZ Bank" 123, which may facilitate the enrollment server 101 to re-create a MID associated with "XYZ Bank" as the payment processor for the merchant 105. In another implementation, with the MID-Platform 100*b*, the MID-Platform may facilitate generation of more than one processing accounts (e.g., MIDs, etc.) associated with a merchant created shopping sites, e.g., allowing multiple processing accounts per merchant, each processing account with its own settings and fields pre enrollment requirement of the payment processor, etc. In this way, the merchant 105 may choose a processing account the merchant would like to use for a transaction on the fly at the site level. For example, when the merchant 105 desires to switch to another payment processor 121*a*, the MID-Platform may allow the merchant to choose the MID the merchant 105 wants to process with from a list of previously stored MIDs 121*c*, e.g., the MID-Platform may provide a merchant UI 124 for the merchant to choose from a list of payment processors for a transaction. In further implementations, the merchant may configure a type and/or a category of transactions (e.g., per shopping site, shopping item category, SKU range, and/or the like) to be processed by a selected payment processor, as further illustrated in FIG. 10E.

With reference to FIG. 1B, a merchant 150 may access a merchant control analytics platform to design a campaign to improve their sales performance 132. In one implementation, the MID-Platform server 120 may provide an analytics platform to the merchant 150 via a UI, e.g., including graphic presentation of the merchant's sales data 135, etc., so that the merchant may identify unsatisfactory spots of the sales performance for the MID-Platform server to design a campaign plan. For example, various performance analytics including sales data segmented by store 138, by customer demographics type 137, by product type 136, etc., may be provided to the merchant 150. The merchant may circle or tap on a "weak" spot on a sales curve, e.g., 139, to indicate an interested spot. In one implementation, the MID-Platform server 120 may provide a campaign set-up UI 140 to the merchant to obtain campaign parameters.

Figure 2A:
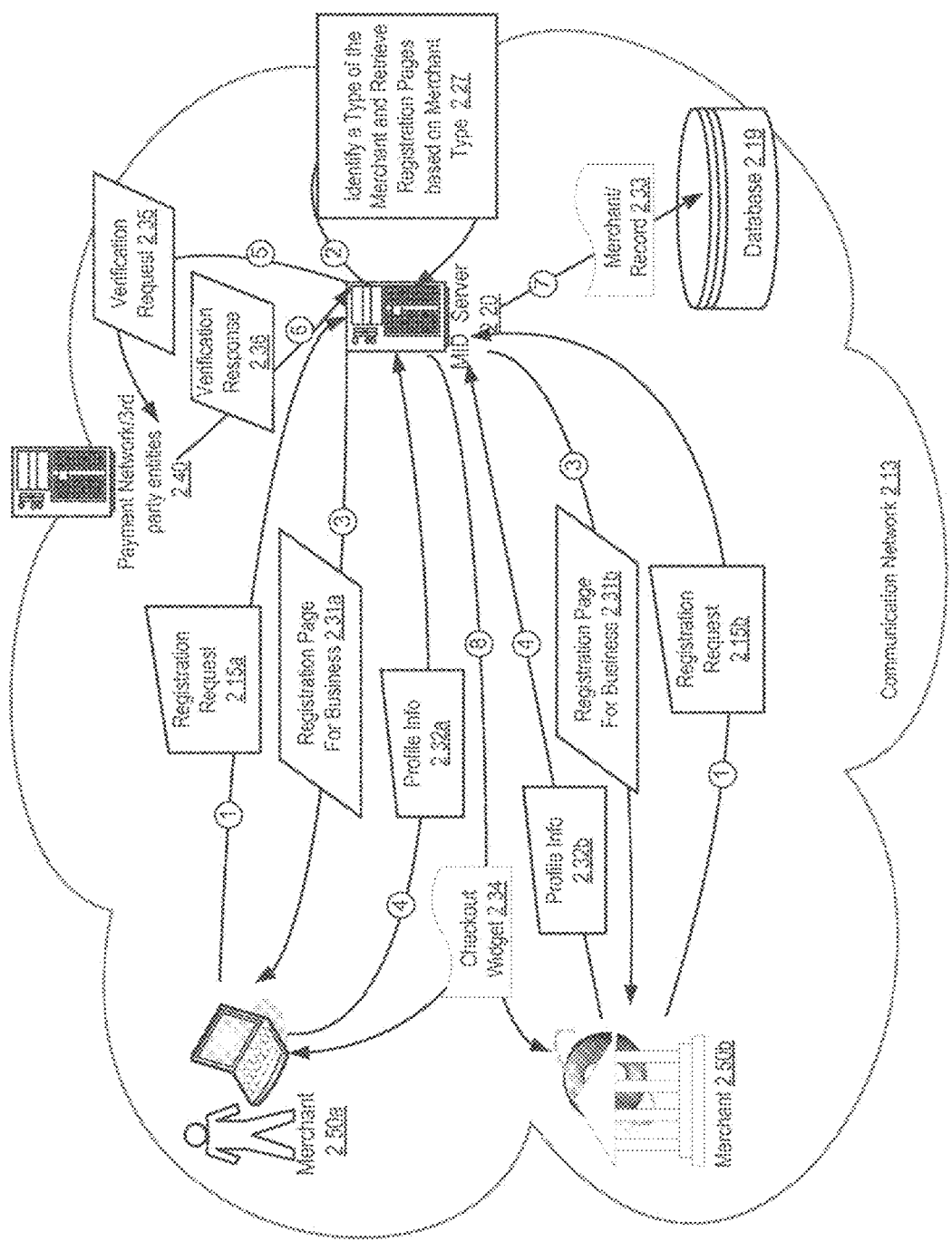
FIGS. 2A-2C show a block diagram illustrating data flows between MID-Platform affiliated entities within embodiments of MID-PLATFORM.
Figure 2B:
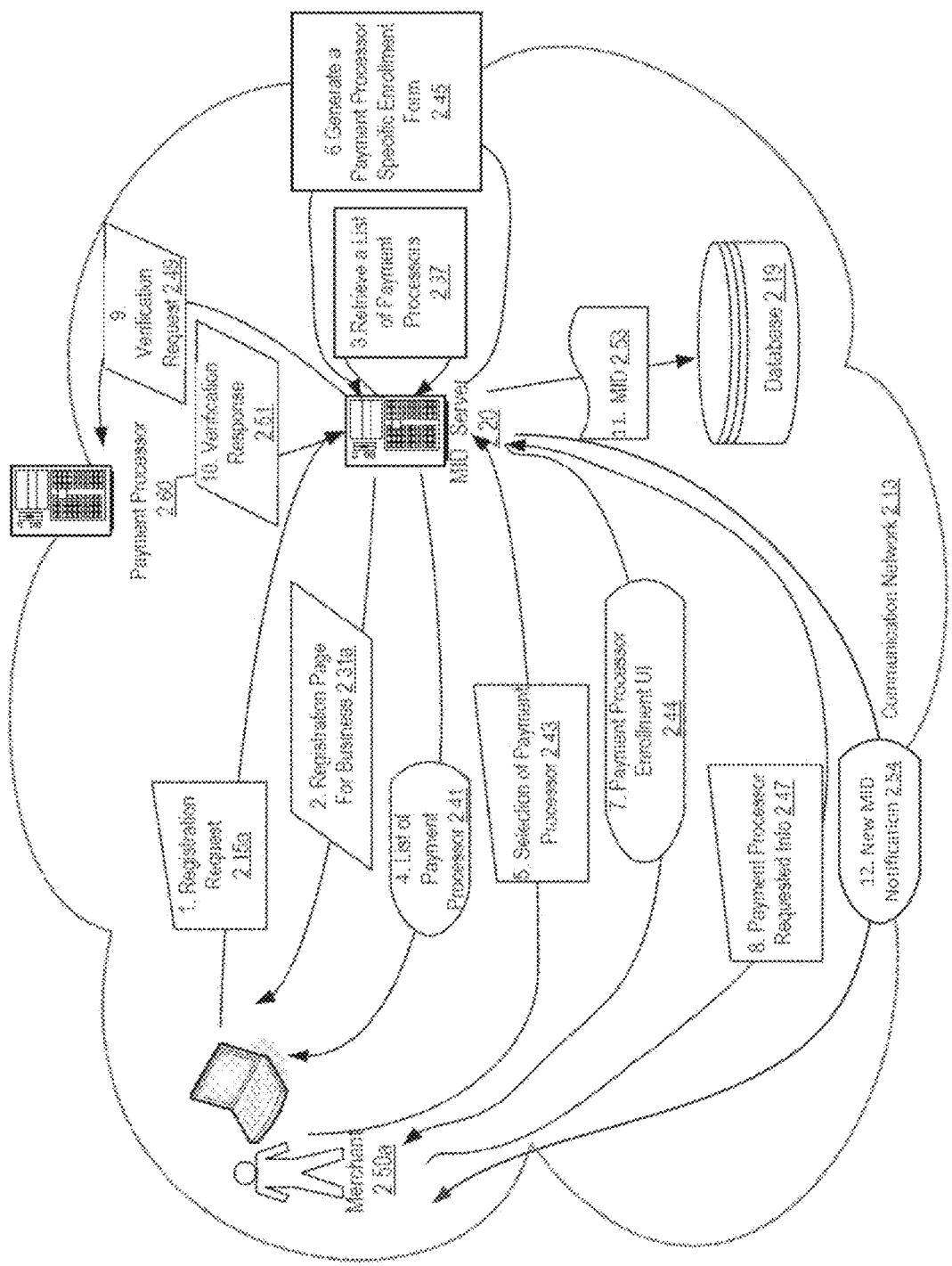

FIGS. 2A-2B show block diagrams illustrating data flows between MID-Platform server and affiliated entities within various embodiments of the MID-Platform. Within various embodiments, one or more merchants 250*a-b*, MID-Platform server 220, MID-Platform database(s) 219, a payment network 240*a* and/or a third party entity 240*b* (e.g., a credit check company, etc.), and/or the like are shown to interact via various communication network 213.

In one embodiment, a merchant 250*a-b*, may operate a wide variety of different user devices, including communications devices and technologies within embodiments of MID-Platform operation. For example, in one embodiment, the merchant may comprise a small business with one or more individual seller 250*a*, who may operate a variety of devices including, but are not limited to, computer terminals, work stations, cellular telephony handsets, smart phones, tablets, personal digital assistants (PDAs), and/or the like. In another example, the merchant 250*b* may comprise a large business entity, e.g., a department store, a manufacturer, etc., which may be equipped with a web server, etc. In one implementation, the MID-Platform component may be instantiated on a personal device to conduct MID-Platform analysis. In another embodiment, the MID-Platform server 220 may be a remote server which is accessed by the merchants 250*a-b* via a communication network 213, such as, but not limited to local area network (LAN), in-house intranet, the Internet, and/or the like.

In one embodiment, a merchant 250*a-b* may send a registration request 250*a-b* to a MID-Platform server 220. For example, a merchant 250*a-b* may enter basic information via a web-based registration UI page (e.g., see FIGS. 23A-26C).

For example, in one implementation, the merchant device (e.g., a web browser instantiated on a merchant computer, etc.) may provide a registration request 215*a-b* to the MID-Platform server 220 as a HTTP(S) POST message including XML-formatted data. An example listing of a merchant registration request message 215*a-b*, substantially in the form of a HTTP(S) POST message including XML-formatted data, is provided below:

```
POST /registration_request.php HTTP/1.1
Host: www.MID-Platform.com
Content-Type: Application/XML
Content-Length: 667
<?XML version = "1.0" encoding = "UTF-8"?>
<registration_request>
    <request_ID> req_001 </request_ID>
    <user_id> JS-001 </user_id>
    <merchant_id> JS-001 </merchant_id>
    <timestamp> 2015-12-15 17:15:56 </timestamp>
    <Source>
        <hardware_id> JS-00923 <hardware_id>
        <hardware_type> Apple iPhone </hardware_type>
        <IP_address> 206.205.82.130 </IP_address>
        <session_type> browser </session_type>
        <session_id> G656TD <session_id>
        ...
    </Source>
    <request_type> V.me onboarding </request_type>
    <business_type> individual </business_type>
    <user_name> John Smith </user_name>
    ...
</registration_request>
```

In one implementation, the MID-Platform server 220 may identify a type of the merchant and retrieve registration pages based on the merchant type 227 (e.g., whether the merchant is a sole proprietor, a registered company, etc.). In one implementation, the MID-Platform server 220 may provide registration pages for business 231*a-b* (e.g. see FIGS. 24A-24C) to the merchant 250*a-b* for the merchant to provide requested information 232*a-b*. In one implementation, with reference to FIG. 25, the registration pages 231*a-b* may vary based on requirement of an issuer, as different issuer may require different requirements to register. The MID-Platform may automatically inquire the issuer's informational requirements in an issuer database, and generate a form for the merchant so as to require the requisite information automatically. For example, the merchant may provide information including, but not limited to company/seller information, customer service information, primary contact information, term of service, payment information, and/or the like.

For example, in one implementation, the merchant device (e.g., a web browser instantiated on a merchant computer, etc.) may provide a profile information message 232*a* for a sole proprietor to the MID-Platform server 220 as a HTTP(S) POST message including XML-formatted data. An example listing of a merchant registration request message 232*a*, substantially in the form of a HTTP(S) POST message including XML-formatted data, is provided below:

```
POST /registration.php HTTP/1.1
Host: www.MID-Platform.com
Content-Type: Application/XML
Content-Length: 667
<?XML version = "1.0" encoding = "UTF-8"?>
<registration >
    <request_ID> req_001 </request_ID>
    <timestamp> 2015-12-15 17:17:56 </timestamp>
    <user_id> TL-001 </user_id>
```

```
            <merchant_id> TL-001 </merchant_id>
            <Source>
                <hardware_id> JS-00923 <hardware_id>
                <hardware_type> Apple iPhone </hardware_type>
                <IP_address> 206.205.82.130 </IP_address>
                <session_type> browser </session_type>
                <session_id> G656TD <session_id>
                ...
            </Source>
            <request_type> V.me onboarding </request_type>
            <business_type> individual </business_type>
            <user_name> John Smith </user_name>
            <user_address>
                <line1> 123 Palm St </line1>
                <city> Palm Beach </city>
                <State> CA </state>
                <zipcode> 00000 </zipcode>
                ...
            </user_address>
            <user_email> js@email.com </user_email>
            <business_type> individual </business_type>
            <SSN> 00000 </SSN>
            <payment>
                <type> credit </type>
                <account_no> 0000 0000 0000 0000 </account_no>
                <CCV> 000 </CCV>
                ...
            </payment>
            <customer_service>
                <tel> 000 000 0000 </tel>
                ...
            </customer_service>
            <term> 365 days </term>
            ...
        </registration>
```

In another example, when the merchant 250b comprises a company, the merchant 250b may provide a federal tax ID (EIN) instead of the social security number. For example, an example listing of a merchant registration request message 232b for a company, substantially in the form of a HTTP(S) POST message including XML-formatted data, is provided below:

```
POST /registration.php HTTP/1.1
Host: www.MID-Platform.com
Content-Type: Application/XML
Content-Length: 667
<?XML version = "1.0" encoding = "UTF-8"?>
<registration>
        <request_ID> req_002 </request_ID>
        <timestamp> 2015-12-15 17:17:56 </timestamp>
        <Source>
            <hardware_id> TL-001 <hardware_id>
            <hardware_type> work station </hardware_type>
            <IP_address> 206.205.82.130 </IP_address>
            <session_type> browser </session_type>
            <session_id> G656TD <session_id>
            ...
        </Source>
        <request_type> V.me onboarding </request_type>
        <business_type> LLC </business_type>
        <user_name> Terry Luxury </user_name>
        <user_address>
            <file> "store_location.xls" </file>
            ...
        </user_address>
        <user_email> customerservice@terry_luxury.com </user_email>
        <business_type> retail </business_type>
        <EIN> 00000 </EIN>
        <payment>
            <type> checking </type>
            <account_no> 00000 </account_no>
            <routing_no> 0000000 </routing_no>
            ...
        </payment>
        <customer_service>
            <tel> 000 000 0000 </tel>
            <online> www.terry.com/customerservice</online>
            ...
        </customer_service>
        <term> 365 days </term>
        ...
</registration>
```

Within embodiment, upon receiving registration information 232a-b, the MID-Platform server 220 may send a verification request 235 to a payment network 240 to verify the merchant's account validity. In another implementation, the MID-Platform server 220 may perform various checks with third parties, e.g., credit check, background check, etc.

For example, in one implementation, the MID-Platform server 220 may provide an account verification request message 235 to a payment network 240 as a HTTP(S) POST message including XML-formatted data. An example listing of a merchant registration request message 235, substantially in the form of a HTTP(S) POST message including XML-formatted data, is provided below:

```
POST /verification_request.php HTTP/1.1
Host: www.MID-Platform.com
Content-Type: Application/XML
Content-Length: 667
<?XML version = "1.0" encoding = "UTF-8"?>
<verification_request>
        <request_ID> VR001 </request_ID>
        <timestamp> 2015-12-15 17:17:56 </timestamp>
        <inquiry_type> account standing </inquiry_type>
        <user_name> John Smith </user_name>
        <user_address>
            <line1> 123 Palm St </line1>
            <city> Palm Beach </city>
            <State> CA </state>
            <zipcode> 00000 </zipcode>
            ...
        </user_address>
        <user_email> js@email.com </user_email>
        <payment>
            <type> credit </type>
            <account_no> 0000 0000 0000 0000 </account_no>
            <CCV> 000 </CCV>
            ...
        </payment>
        <ssn> 0000000000 </ssn>
        <individual_credit_check> yes </individual_credit_check>
        <credit_check_min_threshold> $1,000
        </credit_check_min_threshold>
        <Experian_credit_report>
        yes
        </Experian_credit_report>
        ...
</verification_request>
```

In another implementation, if the merchant is a business merchant, an example verification request may include request for bankruptcy information, back tax in recent years, liens, Better Business Bureau violations, Done in Brandstreet report, and/or the like. An example listing of a merchant registration request message 235 for a business merchant, substantially in the form of a HTTP(S) POST message including XML-formatted data, is provided below:

```
POST /verification_request.php HTTP/1.1
Host: www.MID-Platform.com
Content-Type: Application/XML
Content-Length: 667
```

```
<?XML version = "1.0" encoding = "UTF-8"?>
<verification_request>
    <request_ID> VR001 </request_ID>
    <timestamp> 2015-12-15 17:17:56 </timestamp>
    <inquiry_type> background and credit </inquiry_type>
    <user_name> Terry Luxury </user_name>
    <user_address>
        <line1> 1200 5 ave </line1>
        <city> New York </city>
        <State> NY</state>
        <zipcode> 00000 </zipcode>
        ...
    </user_address>
    <user_email> contact@terry-luxury.com </user_email>
    <payment>
        <type> checking </type>
        <account_no> 0000 0000 0000 0000 </account_no>
        <routing> 0000000 </routing>
        ...
    </payment>
    <EIN> 0000000000 </EIN>
    <request_items>
        <notice_of_bankrupcy> yes </ notice_of_bankrupcy>
    <notice_of_back_tax> yes </notice_of_back_tax>
    <notice_of_lien> yes </notice_of_lien>
    <DoneinBrandstreet_credit_report>
        yes
    </DoneinBrandstreet_report>
    </requested_item>
    ...
</verification_request>
```

Within implementations, the payment network 240 may generate a response 236 to confirm the financial status of the merchant's account for registration. For example, in one implementation, the payment network 240 may provide an account verification response message 236 to the MID-Platform server 220 as a HTTP(S) POST message including XML-formatted data. An example listing of a merchant registration response message 236, substantially in the form of a HTTP(S) POST message including XML-formatted data, is provided below:

```
POST /verification_response.php HTTP/1.1
Host: www.MID-Platform.com
Content-Type: Application/XML
Content-Length: 667
<?XML version = "1.0" encoding = "UTF-8"?>
<verification_response>
    <request_ID> VR001 </request_ID>
    <timestamp> 2015-12-15 17:17:56 </timestamp>
    <inquiry_type> account standing </inquiry_type>
    <user_name> John Smith </user_name>
    <user_address>
        <line1> 123 Palm St </line1>
        <city> Palm Beach </city>
        <State> CA </state>
        <zipcode> 00000 </zipcode>
        ...
    </user_address>
    <account>
        <type> credit </type>
        <account_no> 0000 0000 0000 0000 </account_no>
        <CCV> 000 </CCV>
        ...
    </account>
    <account_status> good </account_status>
    <alert> no </alert>
    <monthly_rating> good </monthly_rating>
    <Experian_report>
                    <flag> no </flag>
                    <report> "Experian_JS.pdf" </report>
                    <score> 700 </score>
                    ...
    </Experian_report>
    <indication_bankrupcy> none </indication_bankrupcy>
    ...
</verification_response>
```

In another implementation, the verification response for a business merchant may comprise a message substantially in the form of a HTTP(S) POST message including XML-formatted data, is provided below:

```
POST /verification_response.php HTTP/1.1
Host: www.MID-Platform.com
Content-Type: Application/XML
Content-Length: 667
<?XML version = "1.0" encoding = "UTF-8"?>
<verification_response>
    <request_ID> VR001 </request_ID>
    <timestamp> 2015-12-15 17:17:56 </timestamp>
    <inquiry_type> account standing </inquiry_type>
        <inquiry_type> background and credit </inquiry_type>
        <user_name> Terry Luxury </user_name>
        <user_address>
        <line1> 1200 5 ave </line1>
        <city> New York </city>
        <State> NY</state>
        <zipcode> 00000 </zipcode>
        ...
    </user_address>
<user_email> contact@terry-luxury.com </user_email>

<notice_of_bankrupcy>
            clear </ notice_of_bankrupcy>
            <notice_of_back_tax>
            clear </notice_of_back_tax>
            <notice_of_lien> clear </notice_of_lien>
            <DoneinBradstreet_report>
                    <flag> no </flag>
                    <report> " TL.pdf" </report>
                    ...
            </DoneinBradstreet_report>

...
</verification_response>
```

Figure 37:
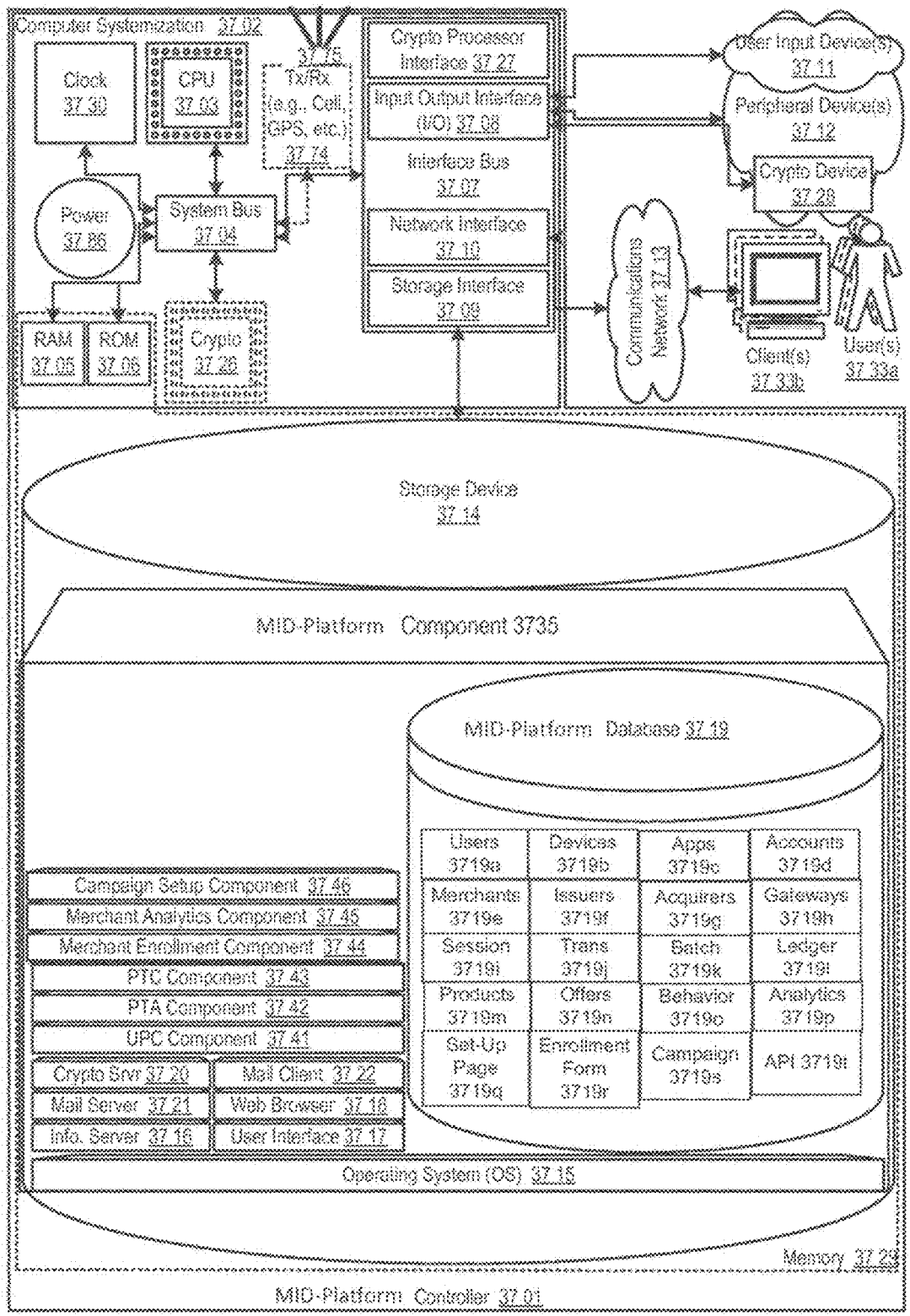
FIG. 37 shows a block diagram illustrating example aspects of a MID-PLATFORM controller.

In one implementation, upon verifying the merchant submitted information, the MID-Platform server 220 may generate and store a merchant record to the database table (such as FIG. 37, Merchant 3719e). An example merchant record store command 233, substantially in the form of PHP/SQL commands, is provided below:

```
<?PHP
header('Content-Type: text/plain');
mysql_connect("254.92.185.103",$DBserver,$password); // access
database server
mysql_select("MID-PLATFORM_DB.SQL"); // select database
to append
mysql_query("INSERT INTO MerchantTable (registration_date,
merchant_id,
    merchant_name, merchant_password, merchant_type,
    merchant_EIN, account_no, merchant_customer_serice,
    merchant_number, merchant_url, ...)
VALUES ($registration_date$, $merchant_id$, $merchant_name$,
    $merchant_password$, $merchant_type$, $merchant_EIN$,
    $account_no$, $merchant_customer_serice$,
    $merchant_number$, $merchant_url $ ...); //
add data to table in database ; // add data to table in database
mysql_close("MID-PLATFORM_DB.SQL"); // close connection to
database
?>
```

In one implementation, the MID-Platform server 220 may send a checkout widget 234 to the merchant 250*a-b* so that the merchant may display a checkout lightbox (e.g., "V.me" checkout, etc.) if the merchant has an online shopping page. For example, the checkout widget 234 may comprise a block of XML codes in the form similar to the following:

```
<?xml version="1.0" encoding = "UTF=8"?>
...
<!==
HTTP Request URI:
https://www.terry-luxury.com:443/pb-primary-
    api/store/DSTR/user/checkout/refid/...
HTTP Request Method: POST
HTTP Request Headers: Array
<Widget>
<method>
        <ultimatepay-info>
                <accept-url> www.mydomain.com/payment
                accepted </accept-url>
                <reject-url> ww.mydomain.com/payment
                rejected </reject-url>
                <display> lightbox </display>
                ...
        </ultimatepay-info>
        <custom-data>
                <payment_option>
                        <option_1> Visa </option_1>
                        <option_2> Mastercard </option_2>
                        <option_3> Merchant Store
                        points </option_3>
                        ...
                        <option_4> PayPal </option_4>
                        ...
        </method>
...
    </Widget>
```

Further UIs and implementations of the automatically generated checkout widget 234 are discussed in FIGS. 13A-13D.

With reference to FIG. 2B, the MID-Platform may facilitate the merchant to enroll multiple payment processors with a merchant site. In one implementation, continuing on with obtaining a registration page based on merchant type 231*a*, the MID-Platform may retrieve a list of payment processors 237, and provide the list of payment processors to the merchant 241 (e.g., see FIG. 10D, etc.).

In one implementation, the merchant may select a payment processor 243, For example, the payment processor selection message 243 may indicate a new MID request, which may be substantially in the form of a HTTP(S) POST message including XML-formatted data, as provided below:

```
POST/New_MID_selection.php HTTP/1.1
Host: www.MCP.com
Content-Type: Application/XML
Content-Length: 667
<?XML version = "1.0" encoding = "UTF-8"?>
<new_MID_selection>
    <timestamp> 2015-12-15 17:15:56 </timestamp>
    <Source>
        <hardware_id> JS-00923 <hardware_id>
        <hardware_type> Apple iPhone </hardware_type>
        <IP_address> 206.205.82.130 </IP_address>
        <session_type> browser </session_type>
        <session_id> G656TD <session_id>
        <PoS_id> PSMC0234 </PoS_id>
        <Merchant_id> 3243e </Merchant_id>
    ...
    </Source>
<merchant_name> Terry Luxury </merchant_name>
<request_type> Add a Payment Processor </request_type>
```

-continued

```
<site_id> site1Terry </site_id>
<site_API_key> ewrewr4524rrtwt </site_API_key>
<site_secret_key> 32434wrDEREFSEw34w35 </site_secret_key>
<Payment_Processor_id> CHASE 123 </Payment_Processor_id>
<routing_no> 123456799 </routing_no>
...
</new_MID_selection>
```

Within implementations, the MID-Platform server may generate a payment processor specific enrollment form 245. In one implementation, the MID-Platform may employ a JAVA/XML/Spring Webflow Opensource scheme to create a processor-specific merchant UI from the various collected inputs for each processor, and read to determine the display shown to the user, who in this case is either the merchant, pay network internal administrator (e.g., Visa), resellers, and/or the like.

For example, the payment enrollment UI 244 may be provided by the MID server 220 to the merchant 250*a*, in the form of a webpage, wherein the webpage may use any number of template designs, and the webpage may have varying form payment processor payloads. The form payment processor payloads may be provided in HTML, or alternatively an XML to be incorporated into a template's style sheet. For example, in one implementation, a payment processor specific merchant UI 244 substantially in the form of a HTTP(S) POST message including XML-formatted data, is provided below:

```
POST/chase_UI.php HTTP/1.1
Host: www.MCP.com
Content-Type: Application/XML
Content-Length: 667
<?XML version = "1.0" encoding = "UTF-8"?>
<Chase_UI>
    <timestamp> 2015-12-15 17:15:56 </timestamp>
    <merchant_name> Terry Luxury </merchant_name>
    <request_type> Add a Payment Processor </request_type>
    <site_id> site1Terry </site_id>
    <site_API_key> ewrewr4524rrtwt </site_API_key>
    <site_secret_key> 32434wrDEREFSEw34w35 </site_secret_key>
    <Payment_Processor_id> CHASE 123 </Payment_Processor_id>
    <routing_no> 123456799 </routing_no>
    <form>
        <field_1>
                <field_name> account number </field_name>
                <data_type> long int </data_type>
                ...
        </field_1>
        <field_2>
                <field_name> chase reward number </field_name>
                <data_type> long int </data_type>
                ...
        </field_2>
        <field_3>
                <field_name> accepted currency </field_name>
                <data_type> string </data_type>
                ...
        </field_3>
        <field_4>
                <field_name> accepted currency </field_name>
                <data_type> string </data_type>
                ...
        </field_4>
        <field_5>
                <field_name> accepted currency </field_name>
                <data_type> string </data_type>
                ...
        </field_5>
        <field_6>
                <field_name> accepted payment </field_name>
                <data_type> int </data_type>
```

```
            <option_1> Visa </option_1>
            <option_2> master card </option_2>
            <option_3> discover </option_3>
            <option_4> amex </option_4>
            ...
        </field_6>
        ...
    </form>
</Chase_UI>
```

In one implementation, the user may submit required information 247 in response to the obtained enrollment UI. For example, in one implementation, user submitted information 247 substantially in the form of a HTTP(S) POST message including XML-formatted data, is provided below:

```
POST/user_enrollment_info.php HTTP/1.1
Host: www.MCP.com
Content-Type: Application/XML
Content-Length: 667
<?XML version = "1.0" encoding = "UTF-8"?>
< user_enrollment_info >
    <timestamp> 2015-12-15 17:15:56 </timestamp>
    <Source>
        <hardware_id> JS-00923 <hardware_id>
        <hardware_type> Apple iPhone </hardware_type>
        <IP_address> 206.205.82.130 </IP_address>
        <session_type> browser </session_type>
        <session_id> G656TD <session_id>
        <PoS_id> PSMC0234 </PoS_id>
        <Merchant_id> 3243e </Merchant_id>
        ...
    </Source>
    ...
    <merchant_name> Terry Luxury </merchant_name>
    <request_type> Add a Payment Processor </request_type>
    <site_id> site1Terry </site_id>
    <site_API_key> ewrewr4524rrtwt </site_API_key>
    <site_secret_key> 32434wrDEREFSEw34w35 </site_secret_key>
    <Payment_Processor_id> CHASE 123 </Payment_Processor_id>
    <routing_no> 123456799 </routing_no>
    <account_no> 123456789 </account_no>
    <chase reward number> 34235 </chase_reward_number>
    <accepted_currency> US dollar </accepted_currency>
    <accepted payment> Visa Mastercard </accepted_payment>
    ...
</user_enrollment_info >
```

In further implementations, the merchant may establish preference rules for the payment processor, e.g., the merchant may define a category of transactions via a MID-Platform UI (e.g., see FIG. 10E) may be processed via the payment processor; such category of transaction may be described by the product item category, purchase amount range, SKU range, date, transaction time of the day, location of transaction origins, currency type, and/or the like. For example, such preference rules may be substantially in the form of an XML-formatted data, as provided below:

```
<?XML version = "1.0" encoding = "UTF-8"?>
<preference_rule>
    <timestamp> 2015-12-15 17:15:56 </timestamp>
    <Source>
        <hardware_id> JS-00923 <hardware_id>
        <hardware_type> Apple iPhone </hardware_type>
        <IP_address> 206.205.82.130 </IP_address>
        <session_type> browser </session_type>
        <session_id> G656TD <session_id>
        ...
    </Source>
    <merchant_name> Terry Luxury </merchant_name>
    <site_id> site1Terry </site_id>
    ...
    <Payment_Processor_id> CHASE 123 </Payment_Processor_id>
    <preference_rule_1>
        <parameter_type> amount </parameter_type>
        <min> 1000.00 </min>
        ...
    </preference_rule_1>
    <preference_rule_2>
        <parameter_type> currency </parameter_type>
        <currency> USD </currency>
        ...
    </preference_rule_2>
    ...
</preference_rule>
```

In the above example, the merchant has set preference rules that any transaction using US dollars that exceeds an amount of 1000.00 would be sent to the payment processor "Chase 123."

In one implementation, upon obtaining user submitted information, the MID server 220 may send a verification request 249 (which may be similar to 235 in FIG. 2A) to the payment processor, and obtain a verification response 251 (which may be similar to 236 in FIG. 2A) to confirm the payment processor enrollment.

Figure 20:
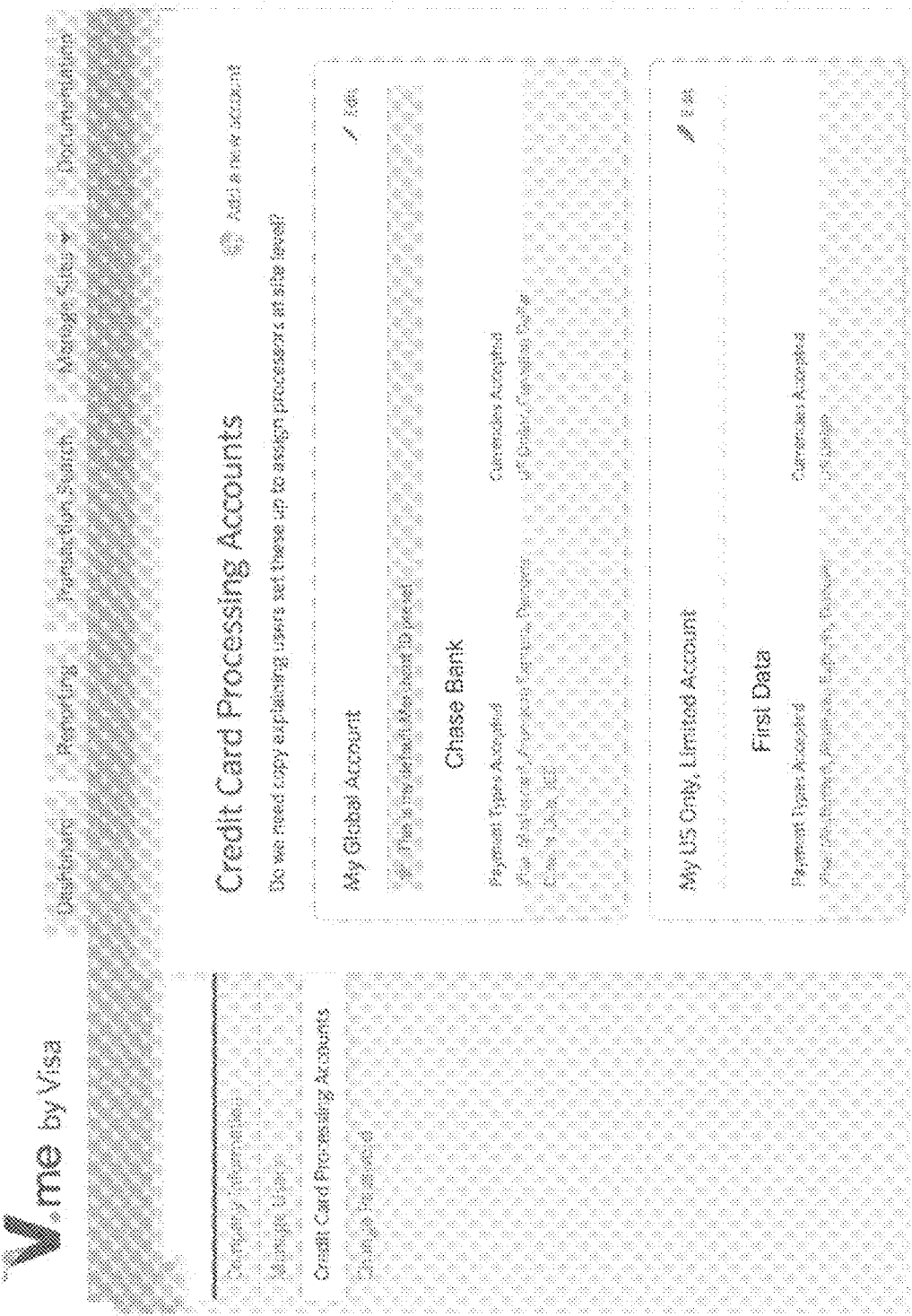
Figure 21:
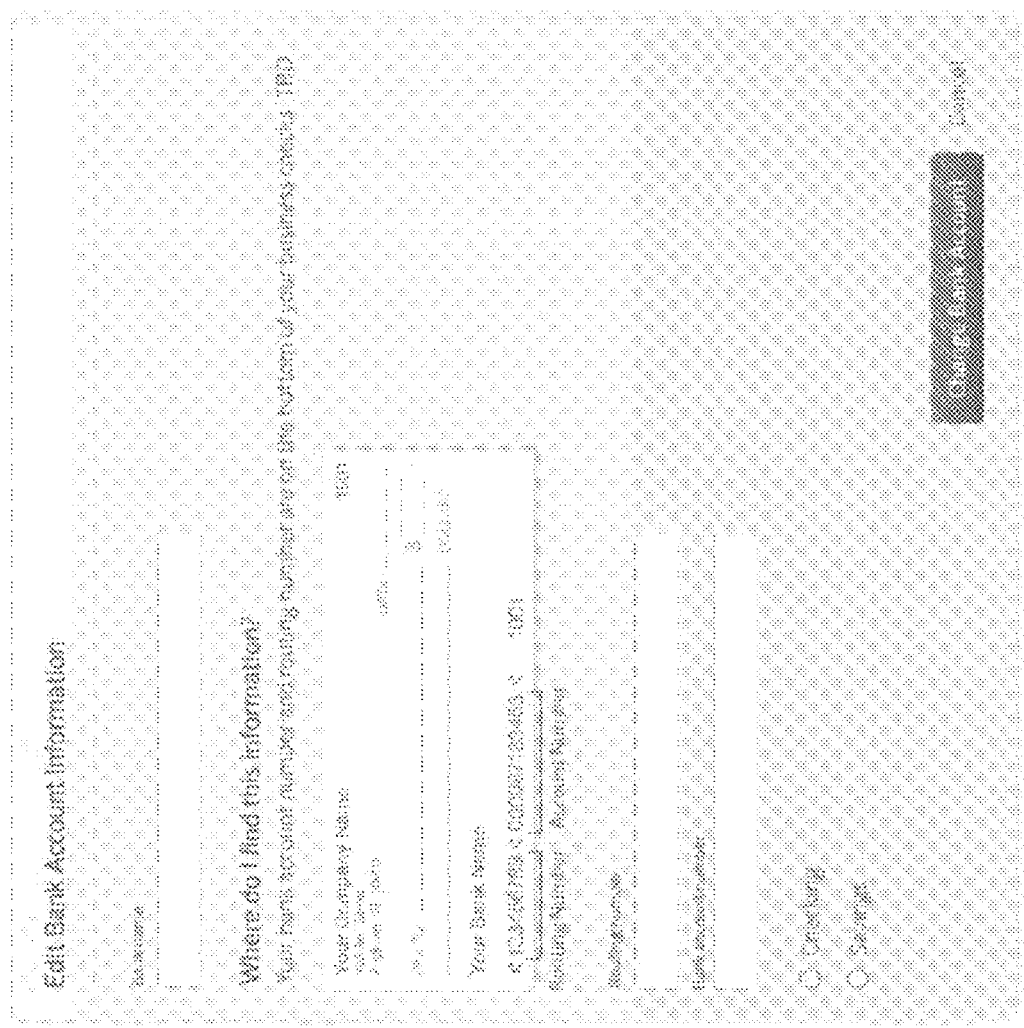

In one implementation, the MID server may generate a new MID 253 associated with the payment processor, and save it to the database 219. The MID 253 store command may take a form similar to that at 233 in FIG. 2A. In one implementation, the MID-Platform may send the new MID notification 254 to the merchant, e.g., via the MID-Platform enrollment UI (e.g., see FIG. 20, etc.).

Figure 2C:
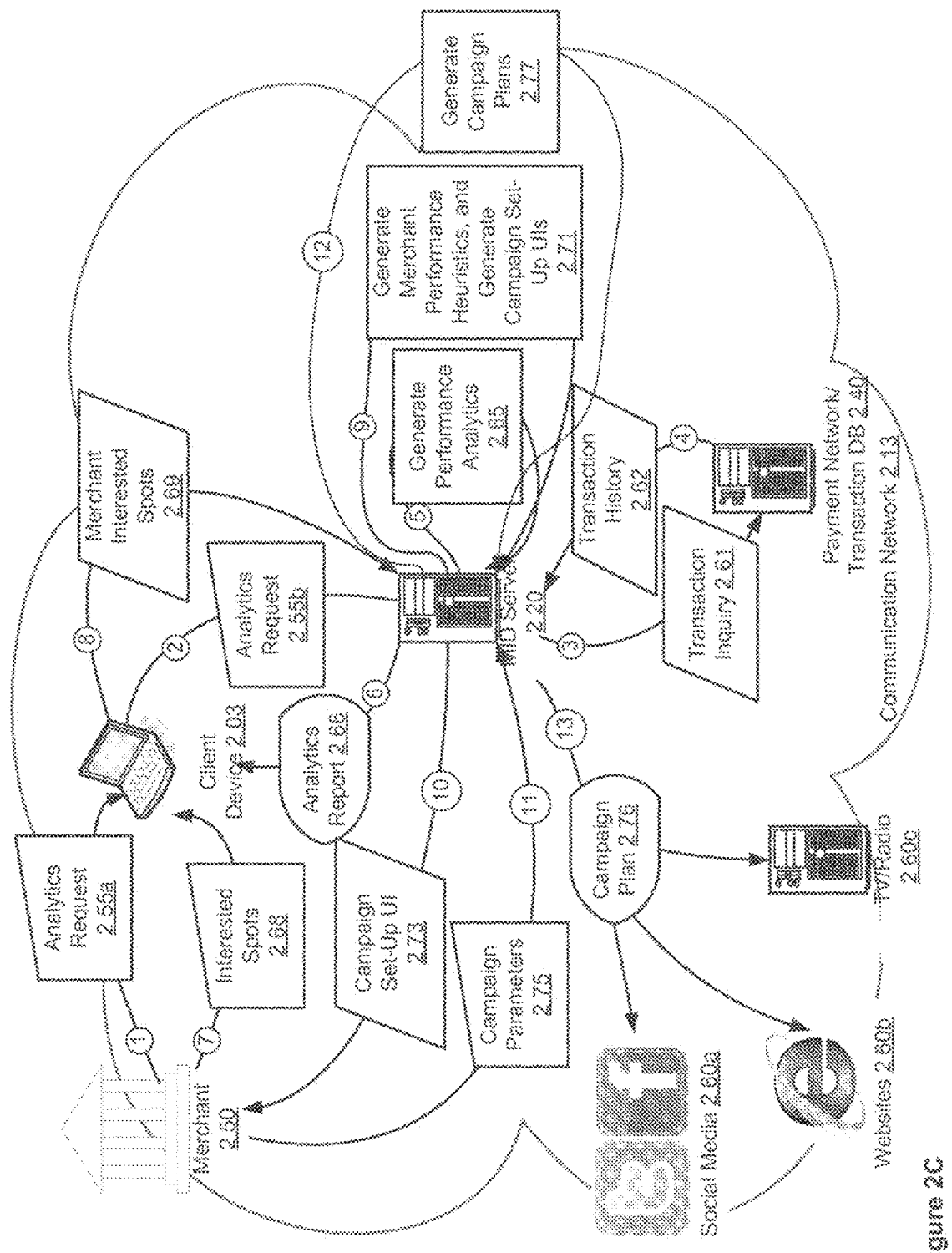

With reference to FIG. 2C, the MID-Platform server 200 may provide analytics based merchant campaign set-up to merchants 250. Within embodiments, a merchant may submit an analytics request 255a, e.g., via a client device 203. The client device 203 may forward the analytics request 255b to the MID-Platform server 220. For example, in one implementation, the merchant device (e.g., a web browser instantiated on a merchant computer, etc.) may provide an analytics request 255b to the MID-Platform server 220 as a HTTP(S) POST message including XML-formatted data. In one implementation, FIGS. 5 and 6A-6B may be used by the merchant to select various parameters for which they are interested in obtaining analytics, and once the user makes a request, e.g., clicking a button 522-523 in FIG. 5, the MID-Platform may generate the analytics request message. An example listing of a merchant analytics request message 255b, substantially in the form of a HTTP(S) POST message including XML-formatted data, is provided below:

```
POST /analytics_request.php HTTP/1.1
Host: www.MID-Platform.com
Content-Type: Application/XML
Content-Length: 667
<?XML version = "1.0" encoding = "UTF-8"?>
<analytics_request>
    <request_ID> req_008 </request_ID>
    <timestamp> 2015-12-25 17:17:56 </timestamp>
    <Source>
        <hardware_id> JS-00923 <hardware_id>
        <hardware_type> Apple iPhone </hardware_type>
        <IP_address> 206.205.82.130 </IP_address>
        <session_type> browser </session_type>
        <session_id> G656TD <session_id>
        ...
    </Source>
```

```
        <request_type> analytics </request_type>
        <business_type> individual </business_type>
        <user_id> JS-001 </user_id>
        <user_name> John Smith </user_name>
        ...
        <term>
            <start> 10-01-2015 </start>
            <end> 10-31-2015 </end>
            <sampling> daily </sampling>
            ...
        </term>
        <requested_data>
            <data1> past transaction value </data1>
            <data2> number of customers </data2>
            <data3> revenue per store </data3>
            ...
        </requested_data>
        ...
    </analytics_request>
```

The MID-Platform server 220 may generate a transaction inquiry 261 to a payment network 240 to obtain analytics query results, e.g., the merchant's transaction history 262. In another implementation, the MID-Platform server 220 may access a transaction database to make the merchant transaction inquiry. For example, the transaction inquiry may be conducted based on a specific store location, an item category, a zipcode, a product code, and/or the like. For example, the MID-Platform server 220 may issue PHP/SQL commands to query a database table (such as FIG. 37, transactions table) for merchant data. An example transaction query 261, substantially in the form of PHP/SQL commands, is provided below:

```
<?PHP
header('Content-Type: text/plain');
mysql_connect("254.93.179.112",$DBserver,$password); // access
database server
mysql_select_db("MID-PLATFORM_DB.SQL"); // select
database table to search
//create query
$query = "SELECT Transaction_id, transaction_time,
    transaction_amount, transaction_product_id number_customers,
    FROM TransactionTable WHERE merchant LIKE '%' $Terry
    Luxury" AND category LIKE '%' $skin care$ AND time LIKE '%'
    $last quarter$;
$result = mysql_query($query); // perform the search query
mysql_close("MID-PLATFORM_DB.SQL"); // close database access
```

Figure 7A:
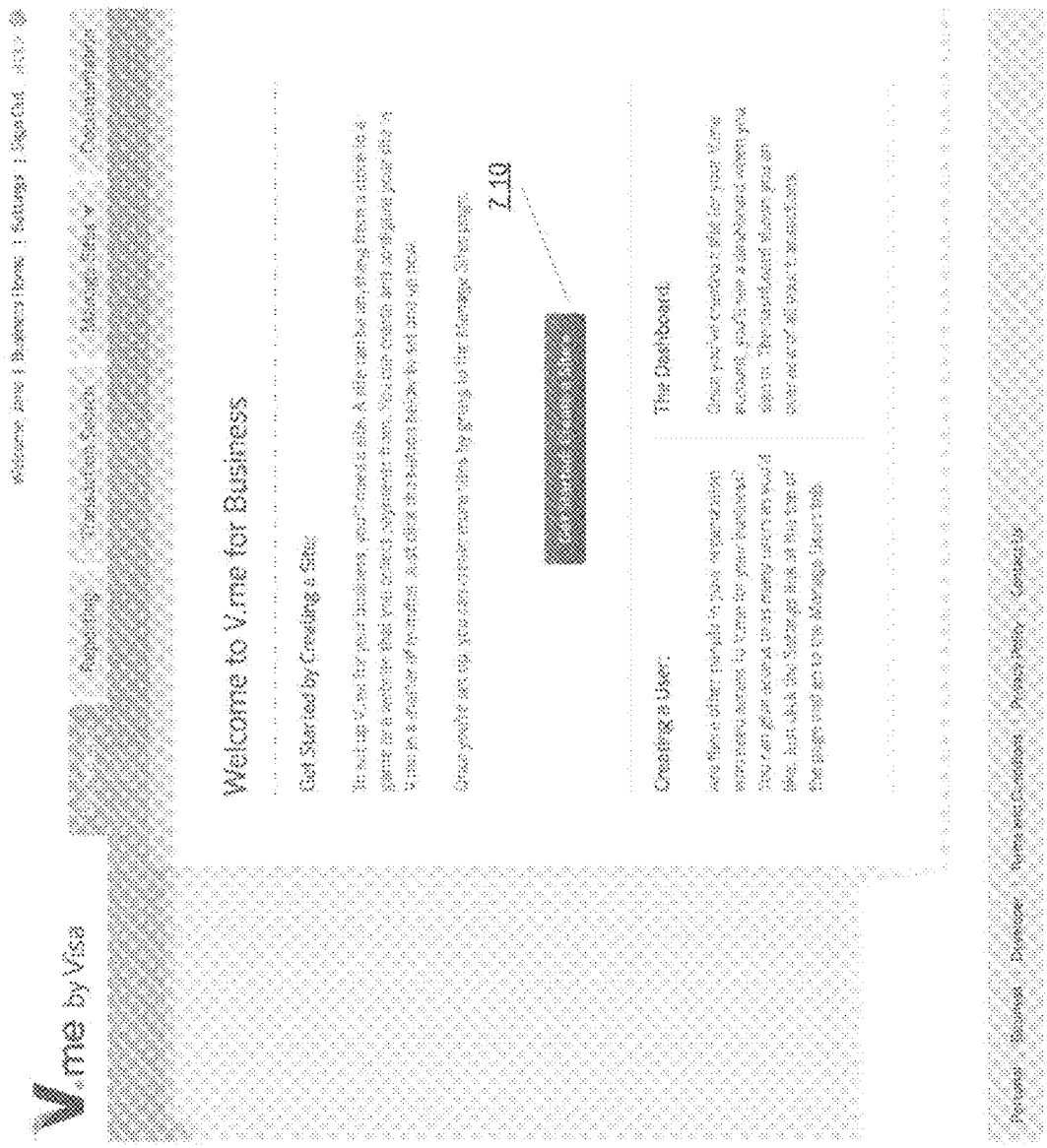
FIGS. 7A-22B show user interface diagrams illustrating example aspects of merchant control platform in some embodiments of the MID-PLATFORM.
Figure 7B:
Figure 7C:

Within embodiments, the MID-Platform server 220 may generate performance analytics 265 based on the obtained transaction history (e.g., Flotr, JfreeChart, RGraph, jqPlug, etc. are example charting library kits that may obtain inquiry results for user chart interaction mechanisms) and provide analytics reports 266 to the merchants with various graphic representations via a UI (e.g., see FIGS. 7A-7C).

In one implementation, the merchant 250 may indicate an interested spot 268, e.g., by clicking/tapping on and/or circling out a "weak" spot on a performance curve displayed on a screen UI, etc., and submit such interested spot 269 to the MID-Platform server. For example, in one implementation, the merchant interested spots message 269 may comprise information such as a start date and an end date of the merchant interested period of time to request the MID-Platform server 220 to run heuristics of the sales performance and generate a campaign set-up UI 271 (e.g., see FIGS. 5 and 6A-6D). In one implementation, the user selection may be represented by a Cartesian coordinates and/or a region around the Cartesian coordinates, and be incorporated into a HTTP POST message to send back to the MID-Platform.

Figure 5:
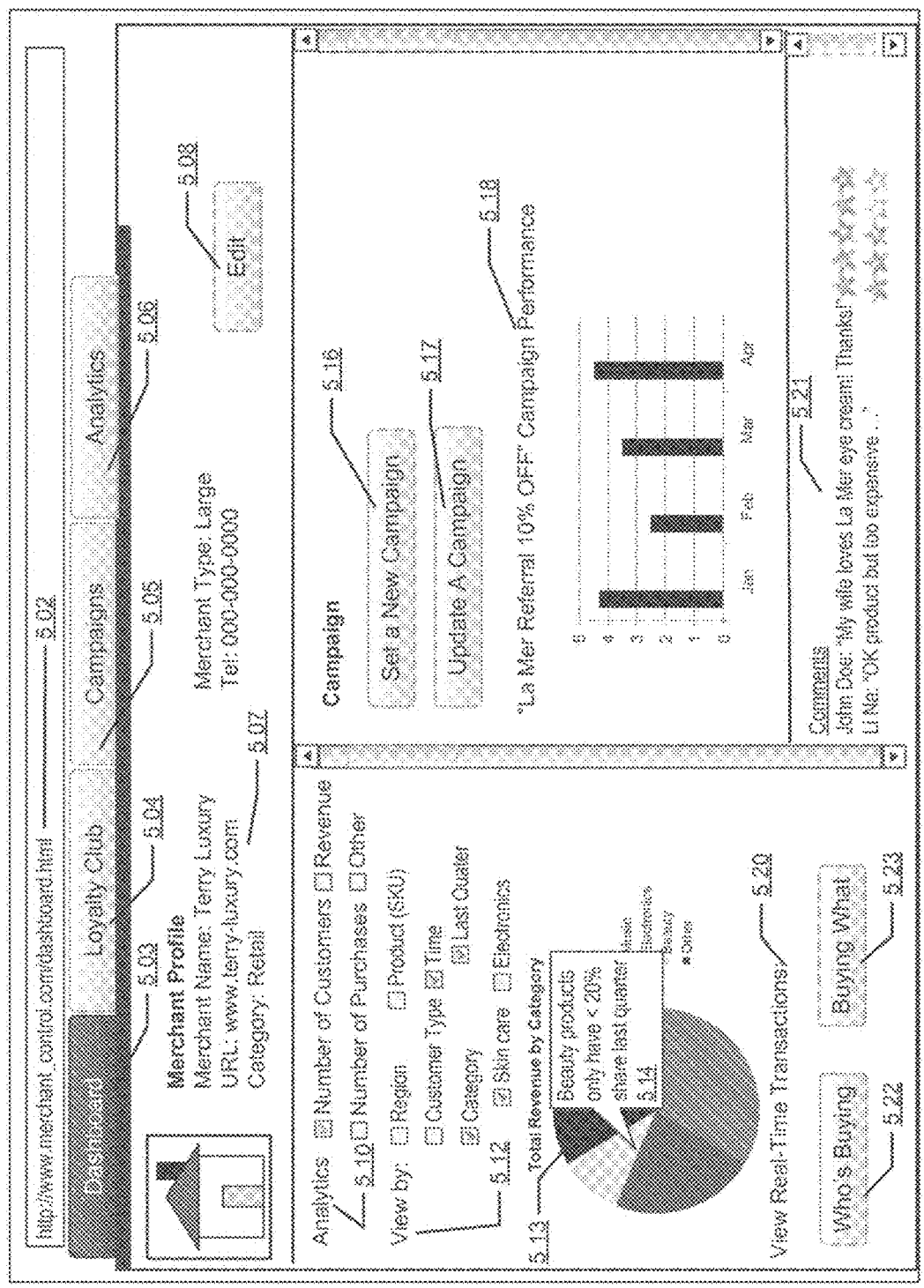
FIGS. 5 and 6A-6F provide exemplary user interface diagrams illustrating example aspects of merchant analytics and campaign set-up with the MID-Platform.

For example, in one implementation, as shown at 514 in FIG. 5, a merchant may move a mouse around a graphic representation of sales performance, e.g., a revenue by category pie chart 513, and the MID-Platform may generate a heuristics message if the mouse moves to a area of "beauty," showing a relatively low performance of the beauty products. In one implementation, if the merchant clicks at 514, the MID-Platform may automatically generate recommended parameters for a beauty product campaign which pre-populate a campaign a series of stackable campaign control blocks (e.g., 609-612, 645-646, 650-652, 682, 683, 691, 693, etc. in FIGS. 6A-6F), e.g., a loyalty campaign for a skin care brand "La Mer" as shown in FIGS. 6C-6D. It should be noted each of the stackable blocks in FIGS. 6A-6F may have its own set of parameters, and may modify constraints on any generated campaign, and a merchant may stack a few or as many of such constraints as desired.

Within implementations, the MID-Platform server 220 may provide campaign set-up pages 273 to the merchant 250 (e.g., see FIG. 6C), which may in turn submit campaign parameters 275 to the MID-Platform server 220. In one implementation, the campaign UI pages (FIGS. 6C-6D) may be pre-populated with recommended default values to improve merchant identified "weak" spots.

For example, the campaign parameters may include data such as, but not limited to merchant interested campaign objective data, campaign duration, offer target, offer contents, targeted consumers, and/or the like. An example listing of a campaign parameter message 275, substantially in the form of a HTTP(S) POST message including XML-formatted data, is provided below:

```
POST /campaign_parameters.php HTTP/1.1
Host: www.MID-Platform.com
Content-Type: Application/XML
Content-Length: 667
<?XML version = "1.0" encoding = "UTF-8"?>
<campaign_parameters>
    <campaign_id> TL-001 </campaign_id>
    <timestamp> 2015-06-25 17:17:56 </timestamp>
    ...
    <campaign_name> "July Faces at Terry Luxury" </campaign_name>
    <merchant>
        <merchant_id> TL-001 </merchant_id>
        <merchant_name> Terry Luxury </merchant_name>
        <merchant_url> www.terry-luxury.com </merchant_url>
        ...
    </merchant>
    <campaign_term>
        <duration> 1 year </duration>
        <available_upon_first_purchase> 24 hours
        </available_upon_first_purchase>
        ...
    </campaign_term>
    <offer>
        <Offer1>
            <type> loyalty </type>
            <discount> 50% </discount>
            <count> 5 </count>
            ...
        </offer1>
        ...
    </offer>
    <target_product>
        <brand> La Mer </Brand>
        ...
    </target_product>
    <target_consumers>
        <existing_consumers> all </existing_consumers>
        <new_consumers>
            <label1> La Mer </Label1>
            <label2> skin care </label2>
            <frequency> 1 /week </frequency>
```

```
    ...
    </new_consumers>
    ...
  </target_consumers>
  <business_type> individual </business_type>
  <user_name> John Smith </user_name>
  ...
</campaigin_parameters>
```

In the above example, the merchant has set a campaign for all products of the brand "La Mer" for all returning customers, and new customers who has purchased any "La Mer" products at stores other than "Terry Luxury," and/or are frequent buyers of skin care products. The MID-Platform server 220 may then generate a campaign plan 277 and distribute the campaign plan 276 with the campaign parameters 275 to various media channels, e.g., social media 260*a*, websites 260*b*, TV/radio 260*c*, and/or the like. For example, the campaign parameters may be compiled and stored with a merchant profile. These settings may be used to author, e.g., advertising campaign expenditures, etc., in various segments, demographics, target consumer groups, and/or the like. For example, if a merchant has a current advertising campaign, allocating 50% of its budget to its northern region, and 50% to its southern region, and the MID-Platform identifies weak performance in the southern region, additional advertising expenditure resources may be provided to the southern regions (e.g., see 519*a-b* in FIG. 5). For example, when the dashboard 503 identifies the weak performance of southern region and the merchant clicks on the segment (e.g., 518*a*) to show interest to improve, a stackable campaign block may be pre-populated, suggesting ads spend restricted to southern district, e.g., see 661*d* in FIG. 6E.

Figure 3A:
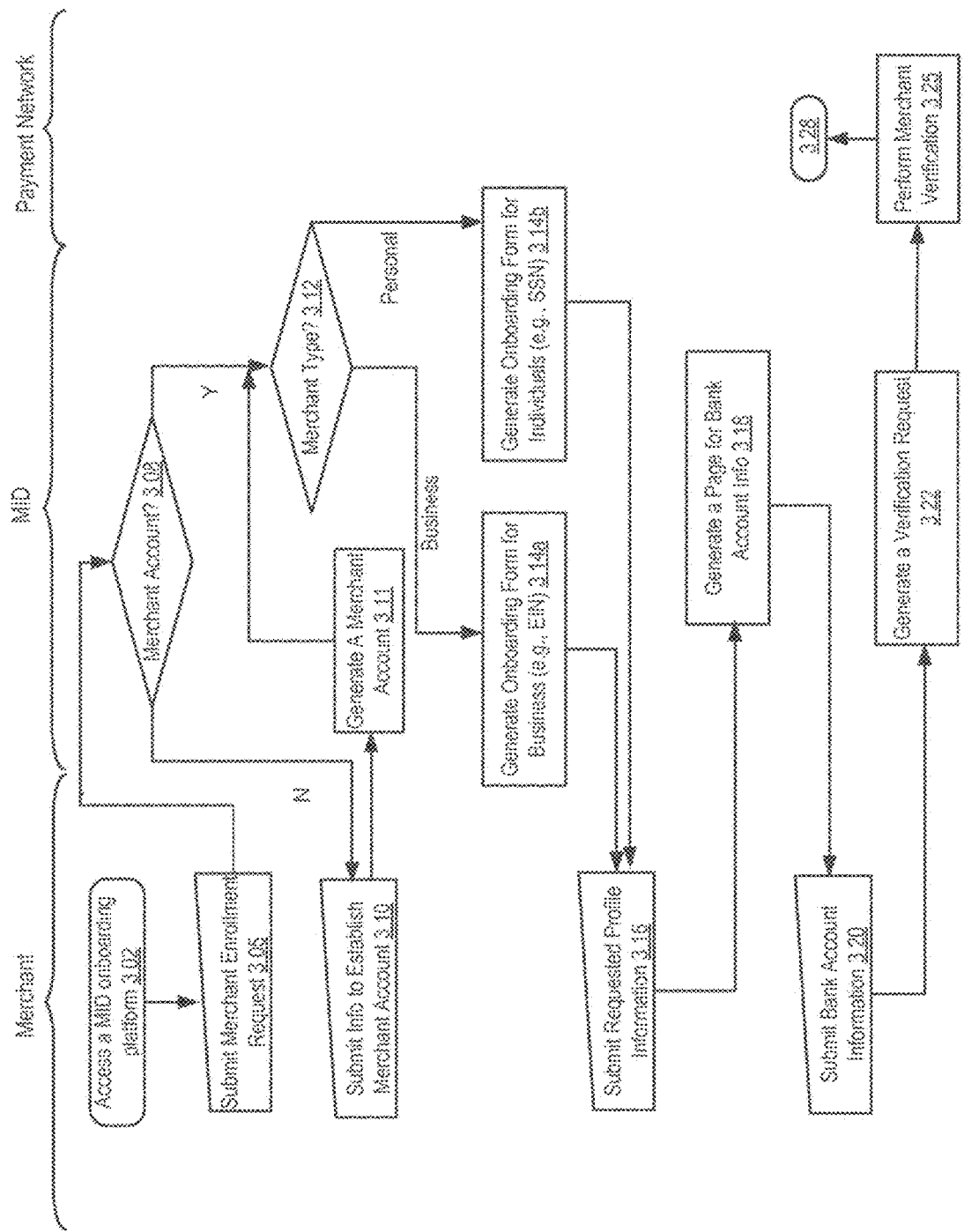
FIGS. 3A-3H provide logic flow diagrams illustrating consumer merchant onboarding within embodiments of the MID-Platform.
Figure 3B:
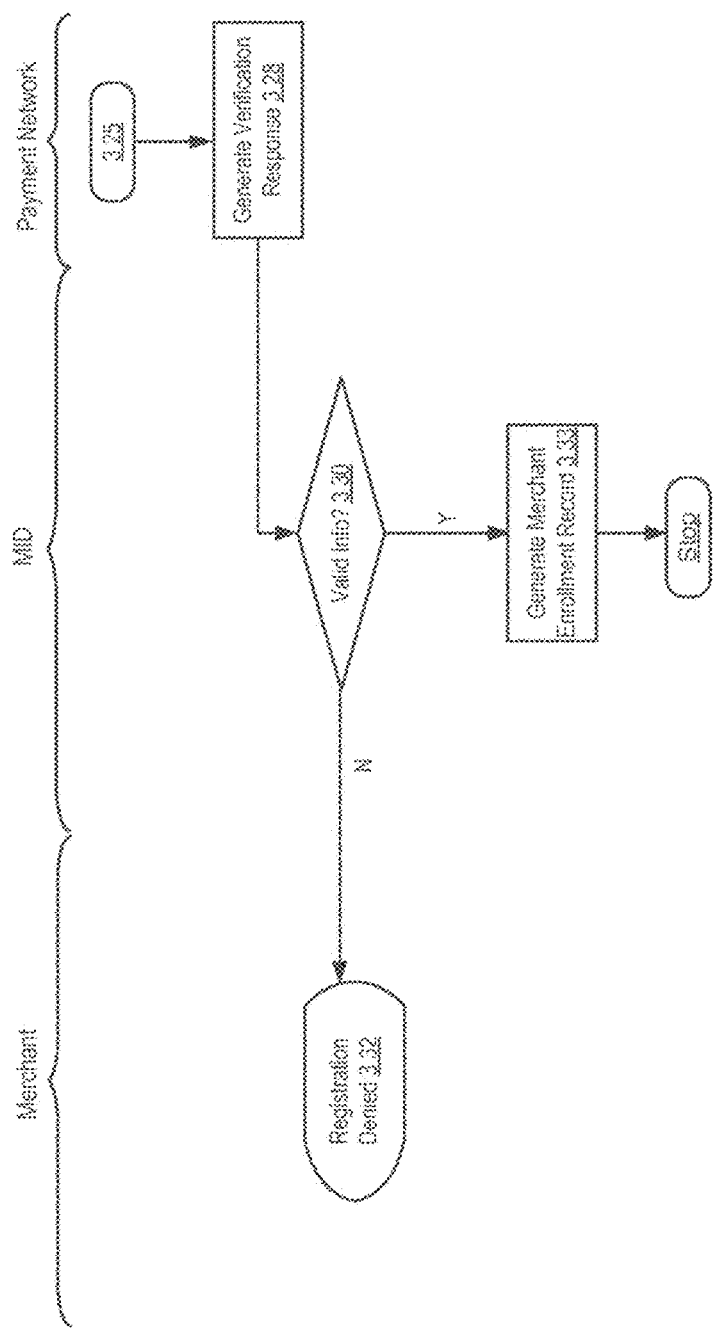
Figure 3C:
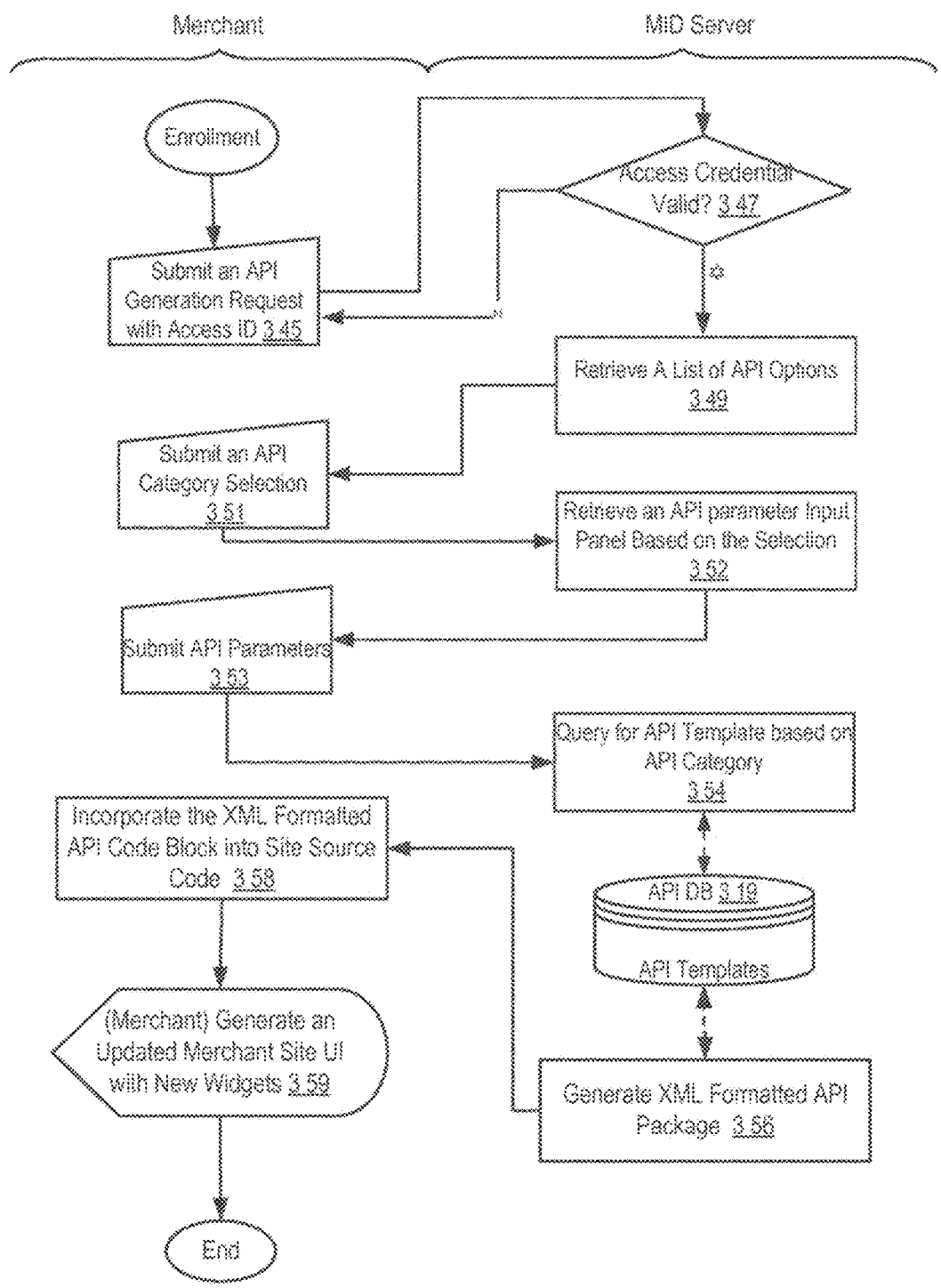

FIGS. 3A-3C provide exemplary logic flow diagrams illustrating aspects of merchant onboarding within embodiments of the MID-Platform. Within embodiment, a merchant may access a MID-Platform onboarding platform 302, e.g., via a web-based application, via a mobile application, etc. For example, an exemplary welcome page of MID-Platform onboarding platform is provided in FIG. 23A, and a merchant may enter an email address 305 to sign up with the MID-Platform platform.

Figure 23A:
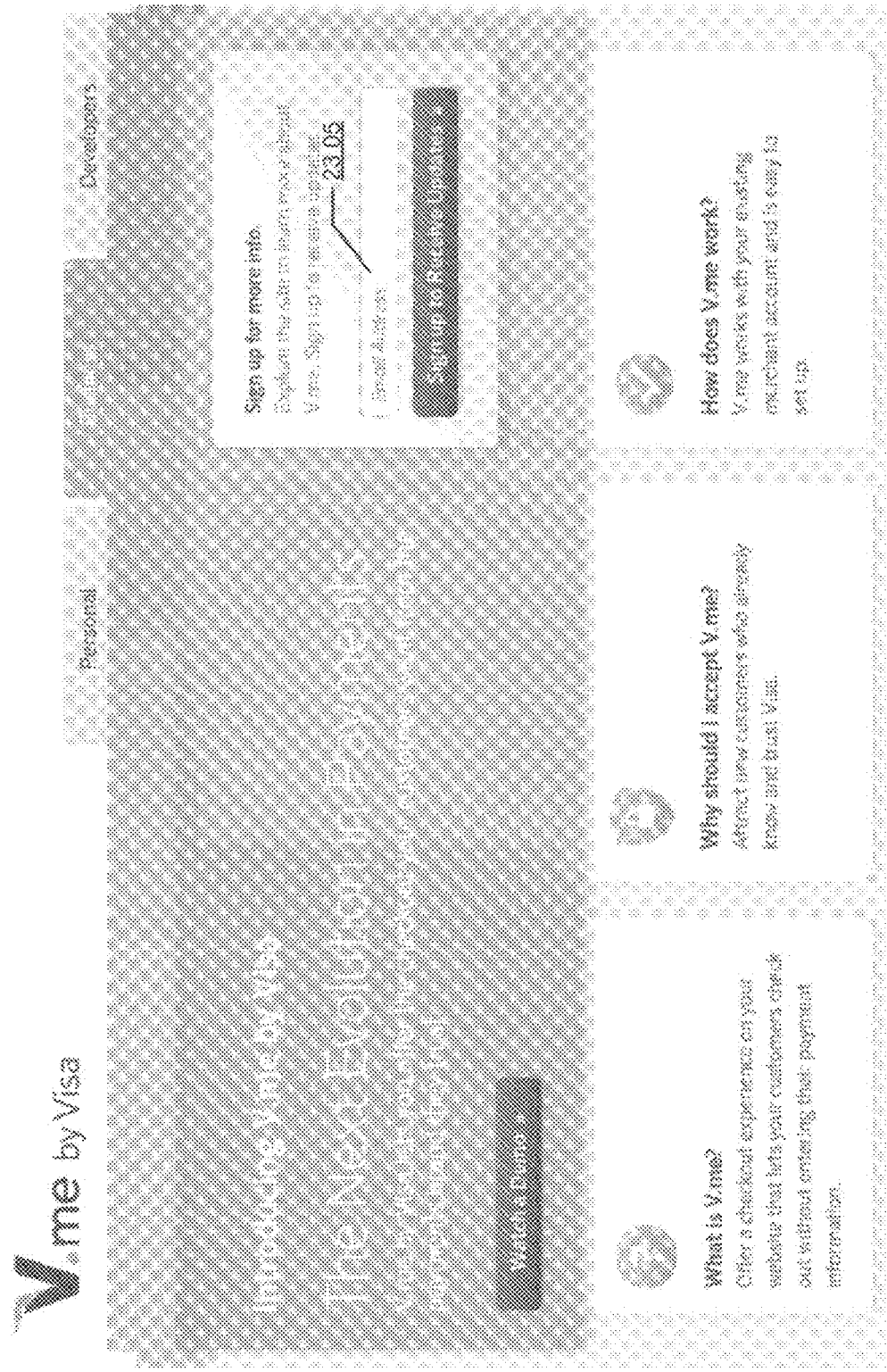
FIGS. 23A-26C show user interface diagrams illustrating example aspects of merchant onboarding in some embodiments of the MID-PLATFORM.
Figure 23B:
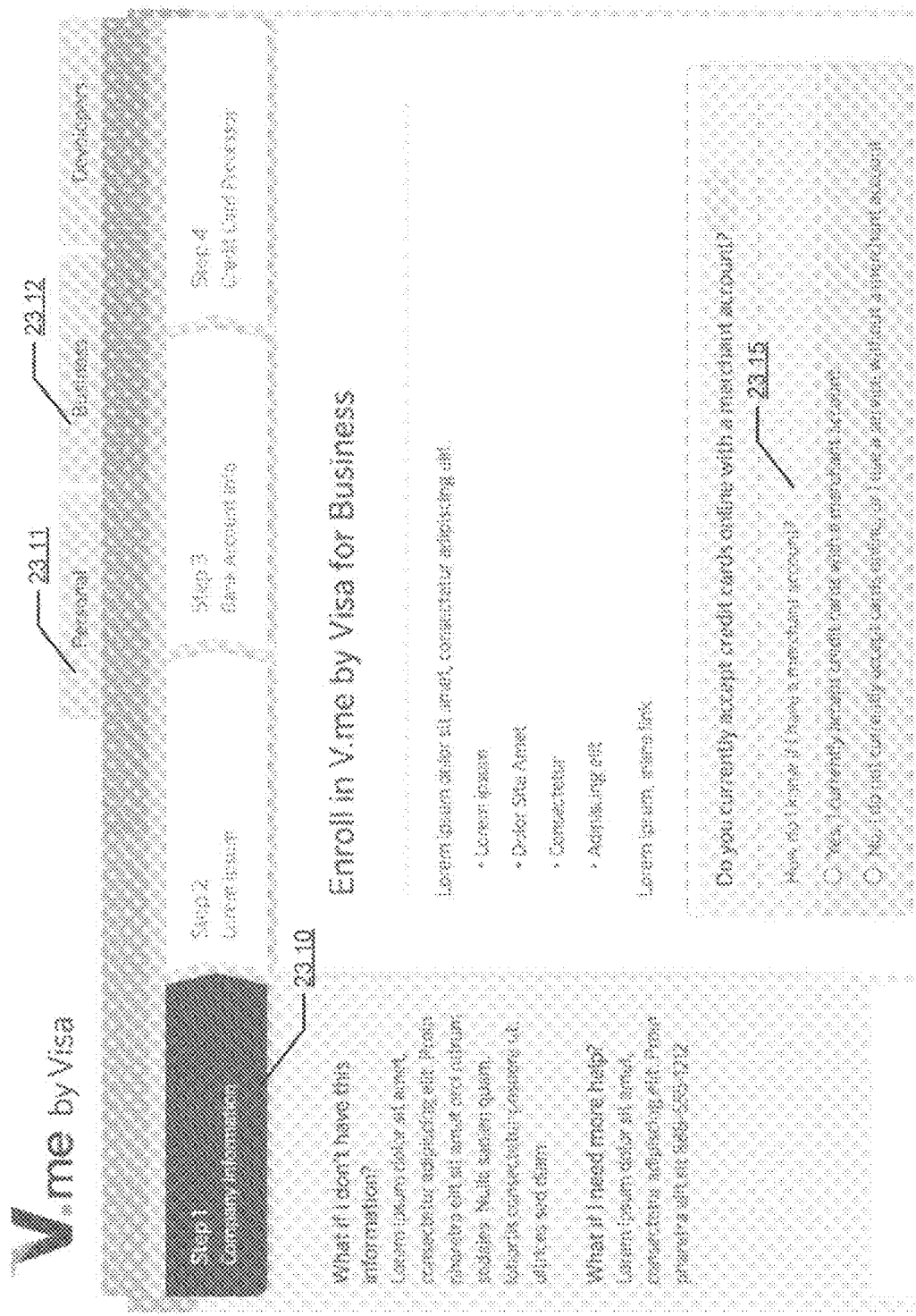

Within implementations, a merchant may submit merchant login request 305 (e.g., see 215*a-b* in FIG. 2A), and proceed with step 1 of the merchant onboarding process (e.g., see 2310 in FIG. 23B). In one implementation, the MID-Platform may determine whether the requesting merchant has a merchant account with MID-Platform 308. For example, a merchant may select whether it accepts credit cards payment with a merchant account, e.g., see 2315 in FIG. 23B.

Figure 23C:
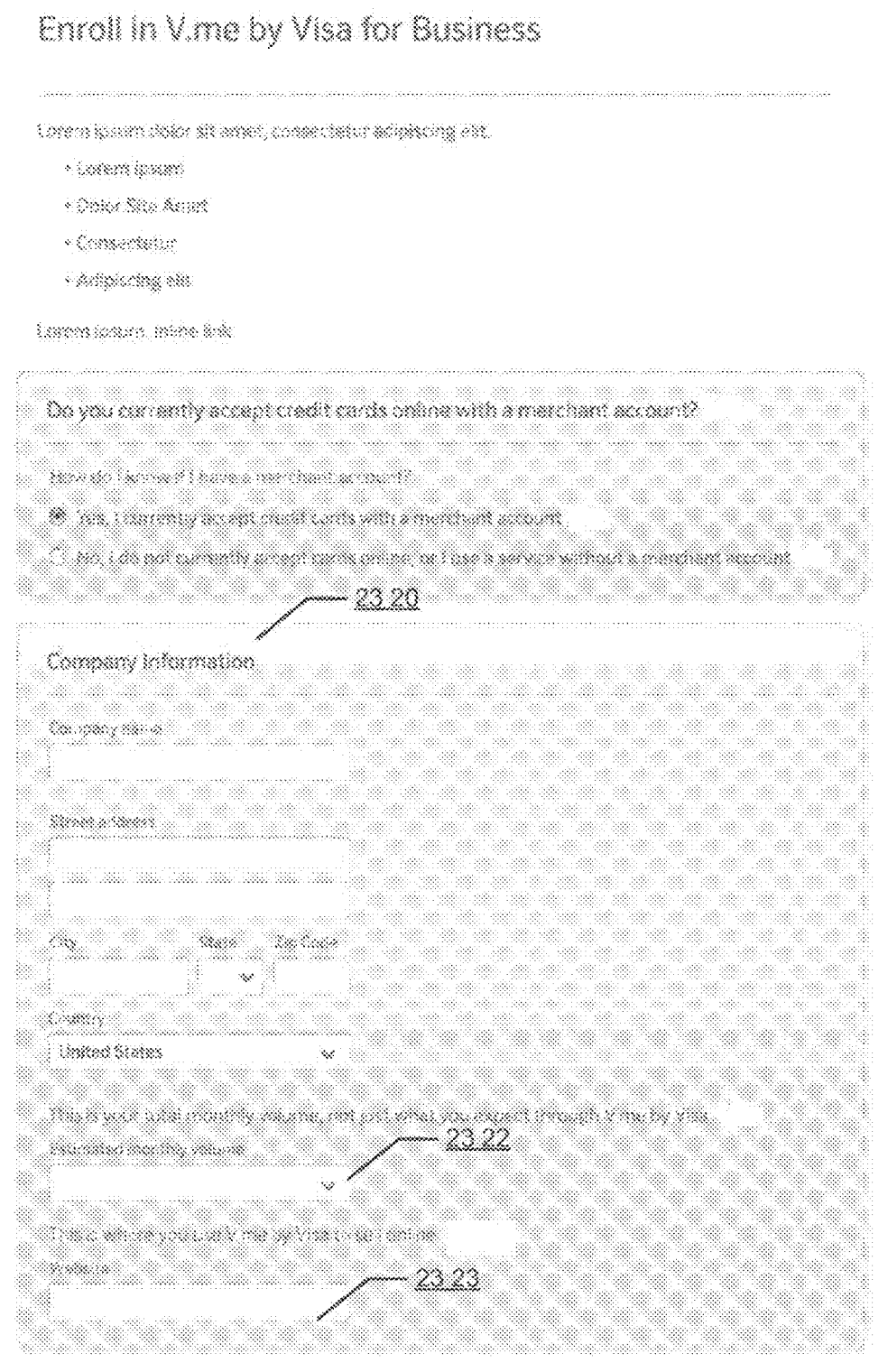
Figure 23D:
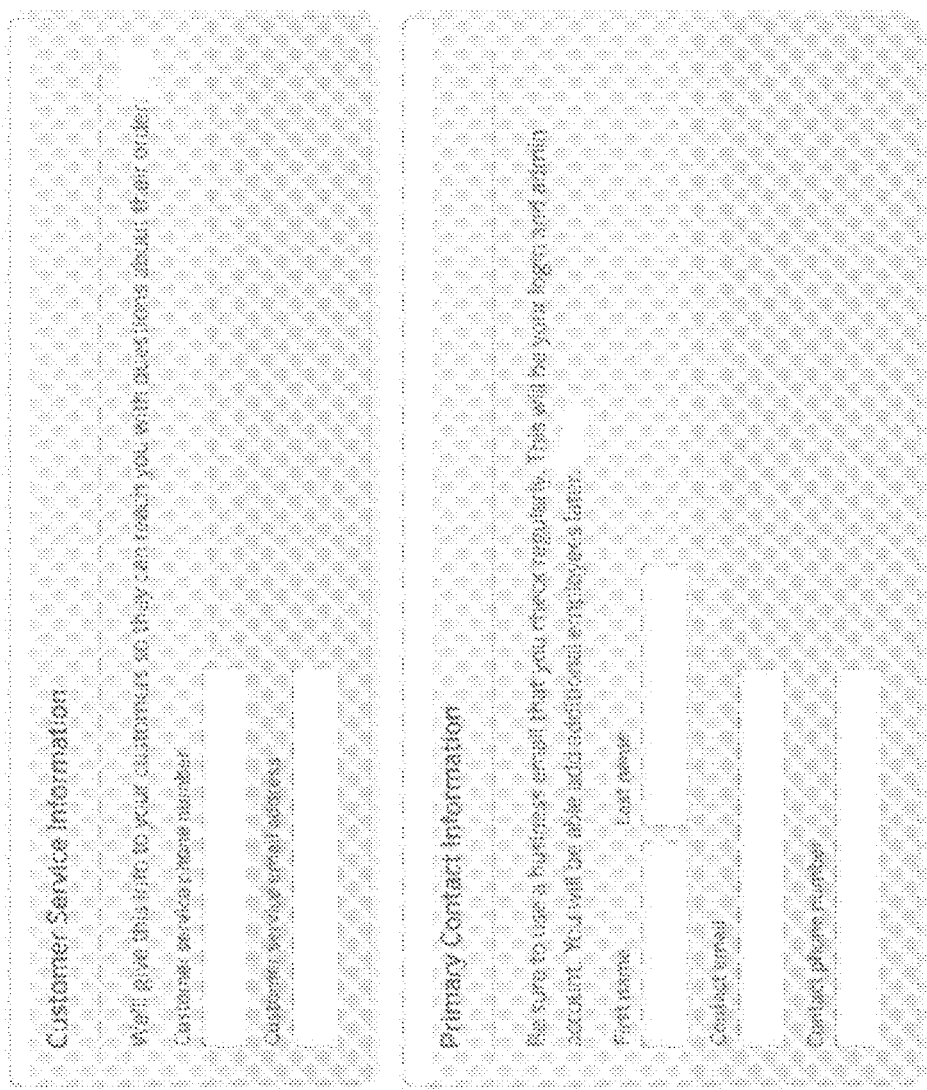
Figure 23E:
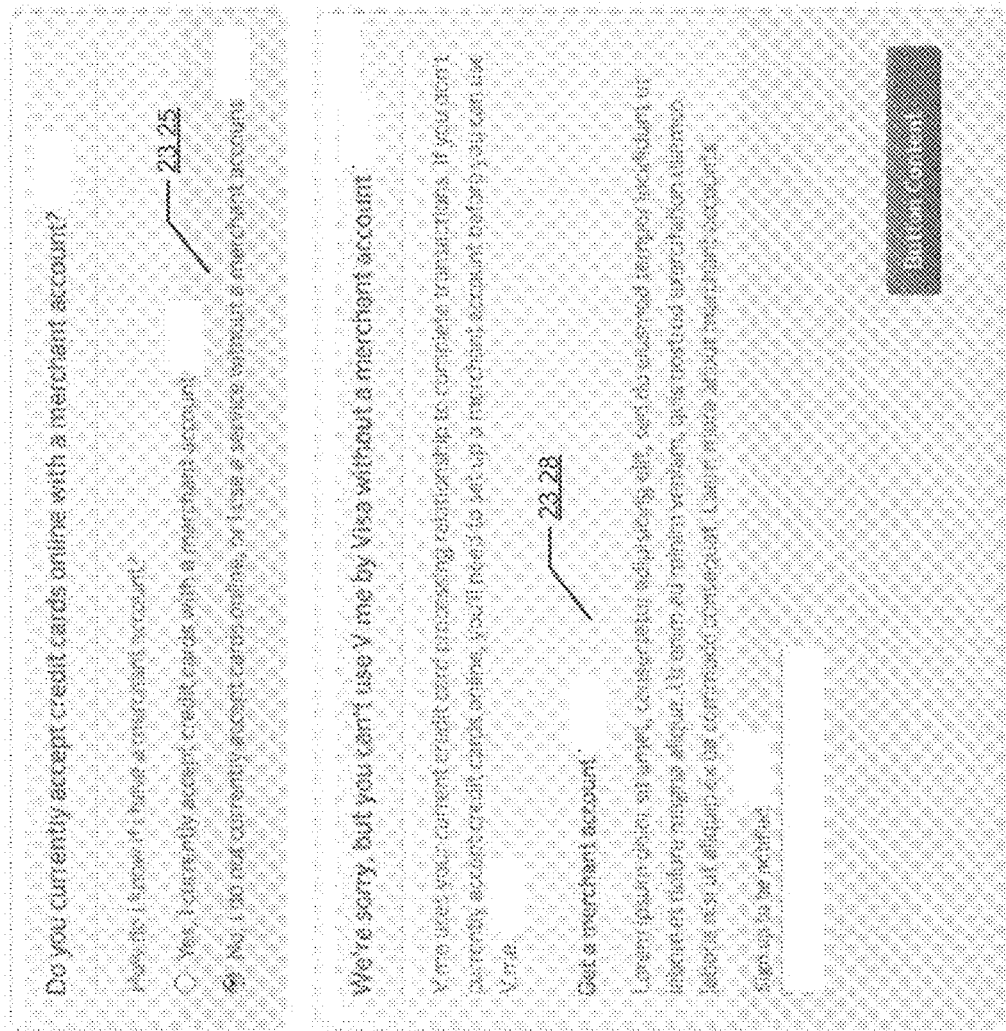

If yes, the MID-Platform may proceed to determine a merchant type 312. For example, as shown in FIG. 23B, a merchant may select a "personal" 2311 or business 2312 tab for enrollment. If the merchant is a business merchant (e.g., a manufacturer, a distributor, a retailer, etc.), the MID-Platform may generate an onboarding form for business 314*a*. For example, the business merchant onboarding form as shown in FIGS. 23C-D comprise information such as company information 2320, contact information, an estimate of monthly sales volume 2322, website URL 2323, and/or the like. In another example, if the merchant is an individual, the MID-Platform may determine whether the individual has a wallet account with MID-Platform as an individual consumer 313. If yes, the MID-Platform may populate profile information 314*c* from the individual's wallet profile into a registration page if the individual attempts to register as a merchant. If the individual merchant does not have a wallet account, the MID-Platform may generate an onboarding form for the individual to provide profile information, e.g., including user name, address, contact information, identification information such as the social security, etc., 341*b*.

In another implementation, if the merchant does not have a MID-Platform account at 308, the merchant may be denied enrollment (e.g., see 2325 in FIG. 23E), and/or be prompted a sign-up page 309 to create a MID-Platform account with MID-Platform. Upon establishing a merchant account type 310 (e.g., see 2328 in FIG. 23E), the MID-Platform may proceed with 312 for enrollment.

Figure 24A:
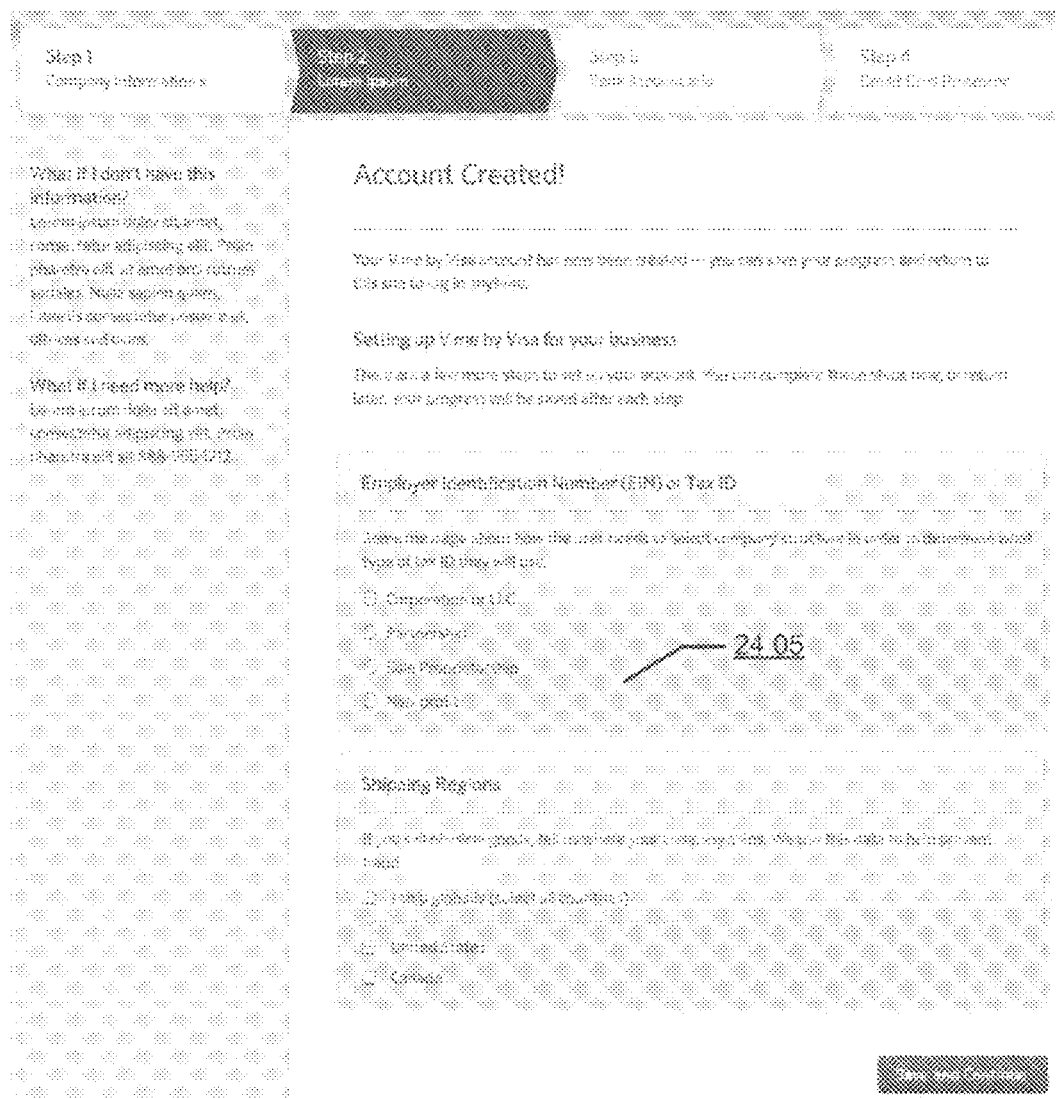
Figure 24B:
Figure 24C:
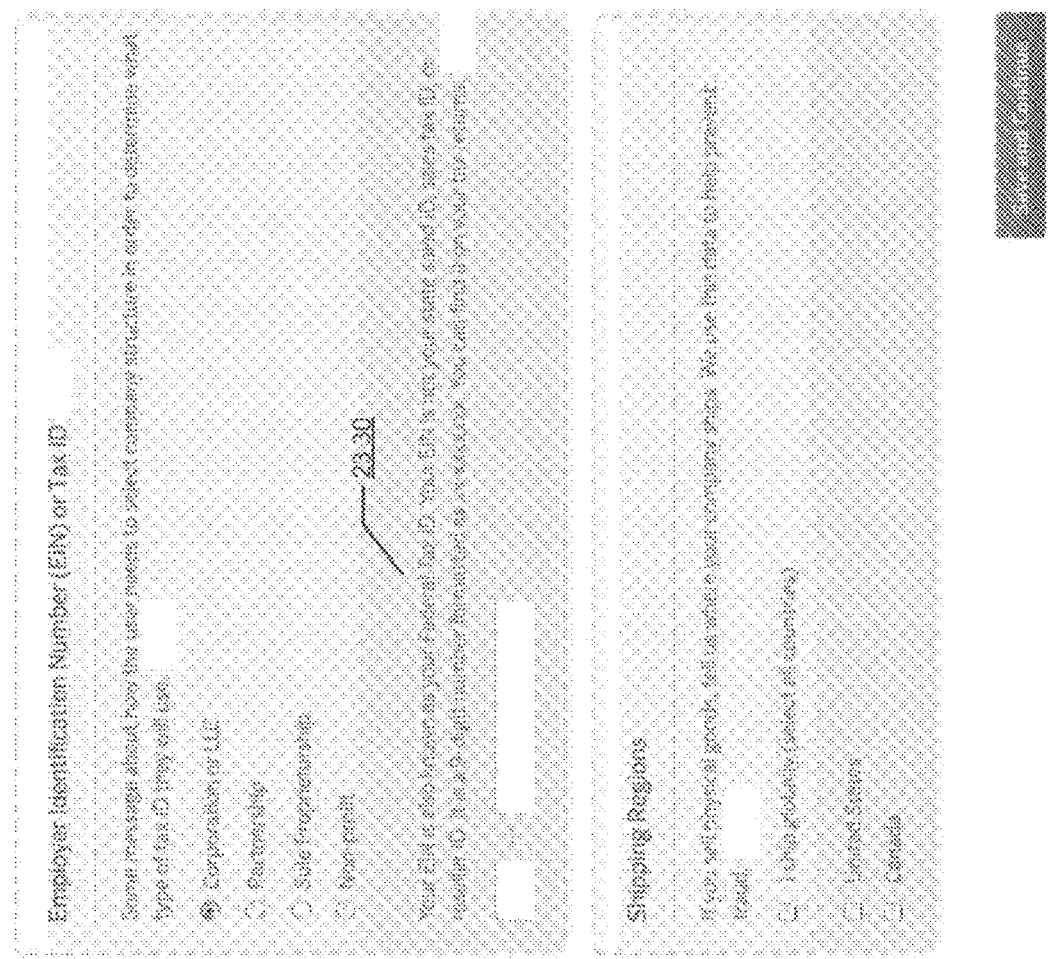

In one implementation, upon generating the merchant account, the MID-Platform may generate onboarding form based on merchant type 312 (e.g., the merchant may click to identify itself as a corporation LLC, partnership, sole proprietor, or non-profit, 2405 in FIG. 24A). For example, as shown in FIG. 24C, a corporate LLC merchant onboarding form may request merchant information such as the EIN. In another example, an individual merchant may need to submit SSN information 314*b* for enrollment, e.g., see 2328 in FIG. 24B.

Figure 26A:
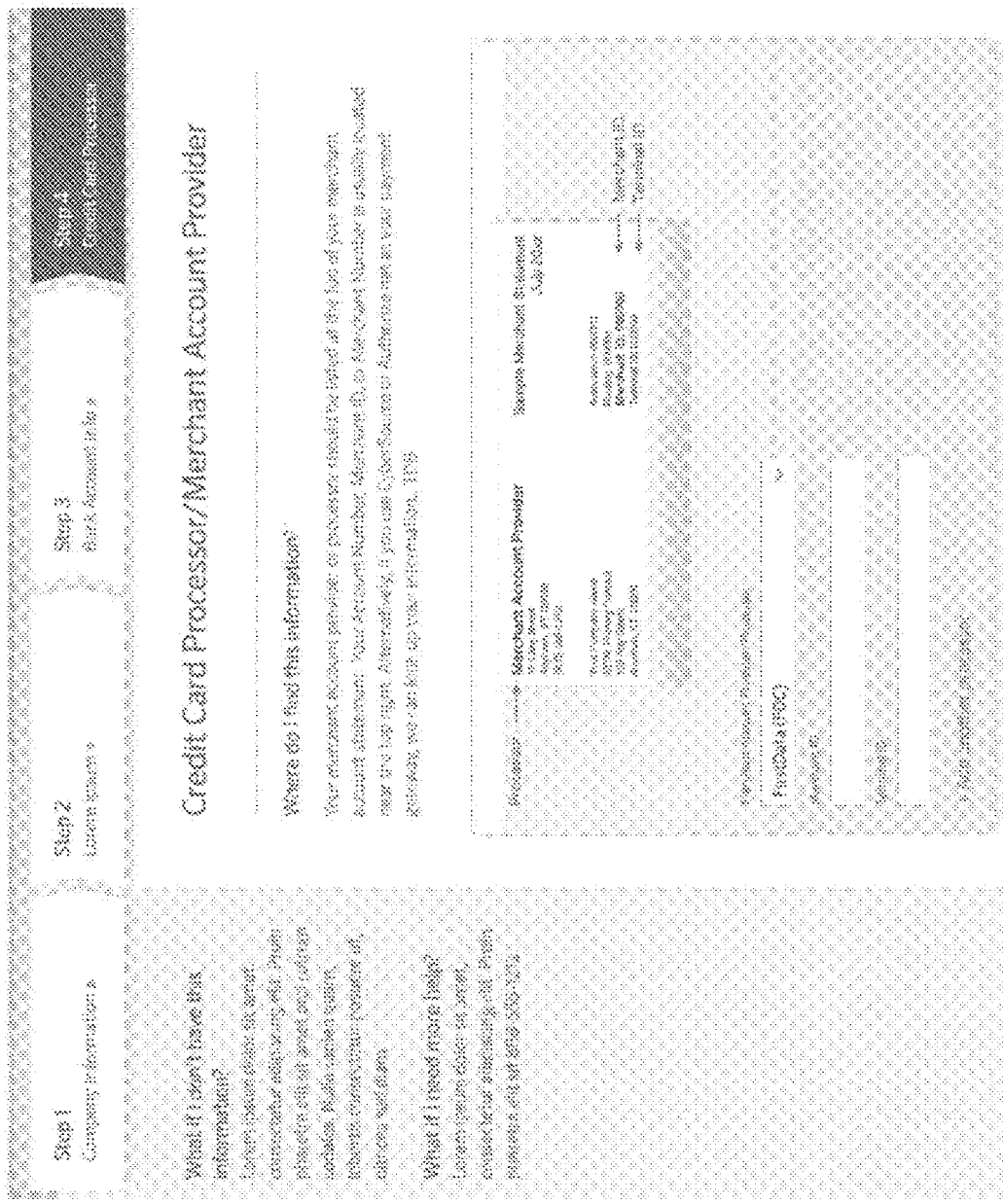
Figure 26B:
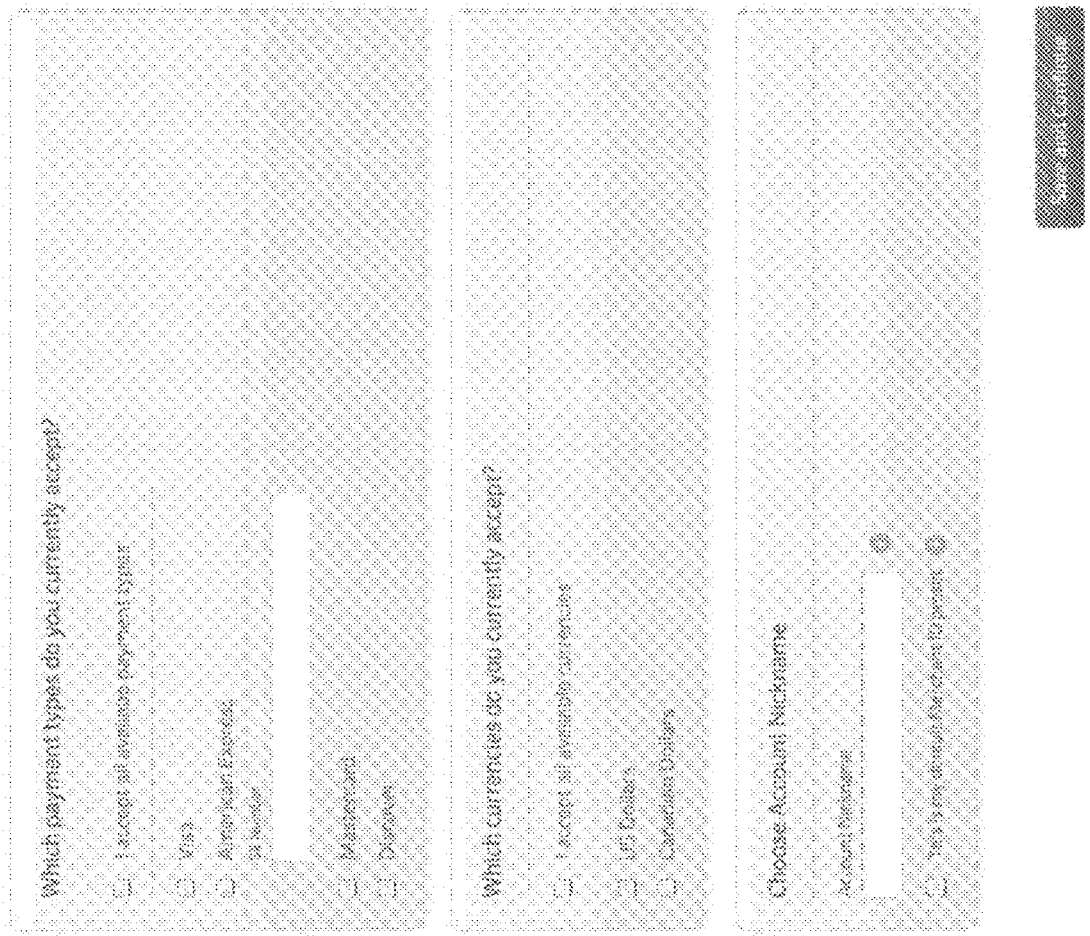
Figure 26C:
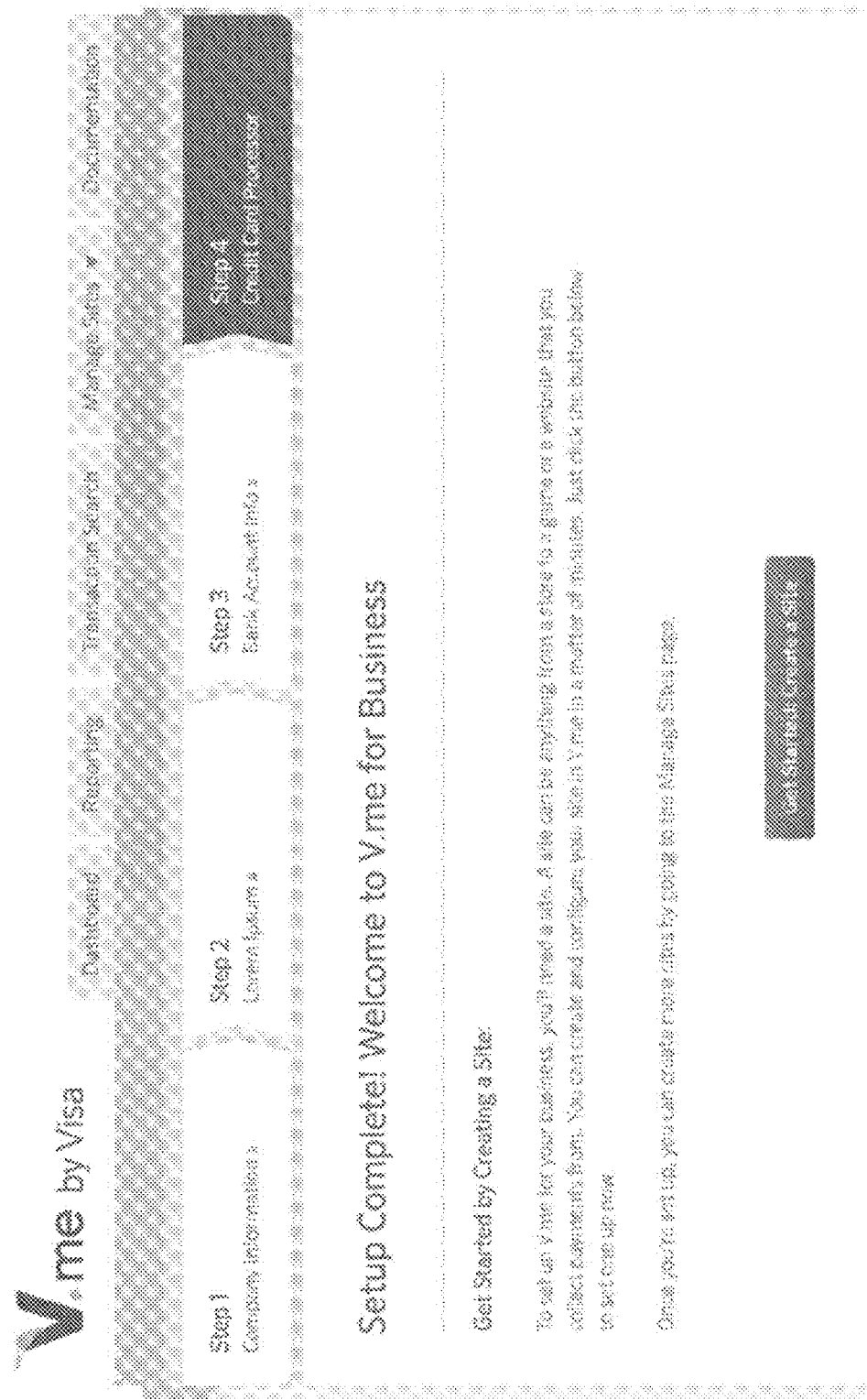

In further implementation, the MID-Platform may request the merchant to identify a credit card processor or merchant account provider, and the account number, e.g., see FIG. 26A. For example, the merchant may identify types of payment it accept, e.g., Visa, Mastercard, American Express, Discover, PayPal, and/or the like, and the merchant accepted currency type, e.g., see FIG. 26B.

Figure 25:
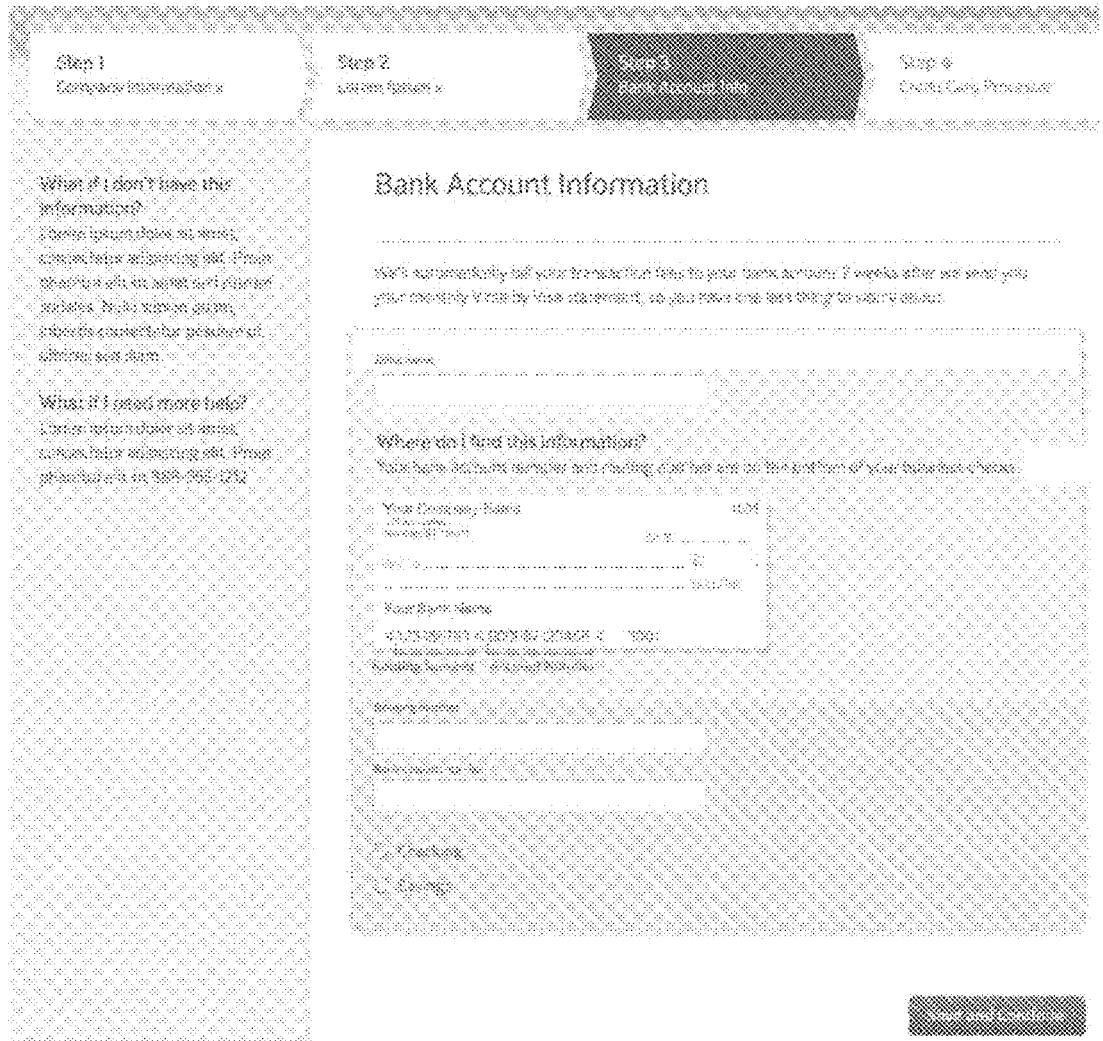

In one implementation, upon merchant submitting requested profile information 316 (e.g., an EIN for business merchants, SSN for individual merchants, name of an issuing bank, etc.) the MID-Platform may look up issuer application informational requirements 317, and retrieve web forms segments to be used based on issuer requirements and generate a page for bank account information 318, e.g., see FIG. 25. Upon the merchant submitting bank account information 320, the MID-Platform may generate a verification request 322 (e.g., see 235 in FIG. 2A) to a payment processing network (e.g., Visa Net, etc.), which may perform merchant verification 325 to determine whether the merchant is in good status. In further implementation, such verification request may be sent to a third party background/credit check entity. In one implementation, the merchant verification request may be passed on to a third party entity, such as Experian credit reports, etc., to conduct a business background check of a business merchant.

Continuing on with FIG. 3B, the payment network may generate a verification response 328 to MID-Platform, which may then determine whether the merchant submitted profile and financial information is valid 330 to rule out fraudulent activities. If valid, the MID-Platform may generate a merchant enrollment record 333 (e.g., see 233 in FIG. 2A), and deliver a registration complete page to the merchant (e.g., see FIG. 26C). Otherwise, the merchant may receive a denial notice 332, e.g., due to unsatisfactory credit history, credit card debts, and/or the like. In one implementation, upon successfully enrollment, the MID-Platform may instantiate merchant record for merchant facilities 334, e.g., to allow a merchant to login to view sales performance analytics and set up campaigns (e.g., see FIGS. 5 and 6A-6F), to generate a merchant site and a lightbox checkout (e.g., FIGS. 10A-12B), and/or the like.

Figure 12A:
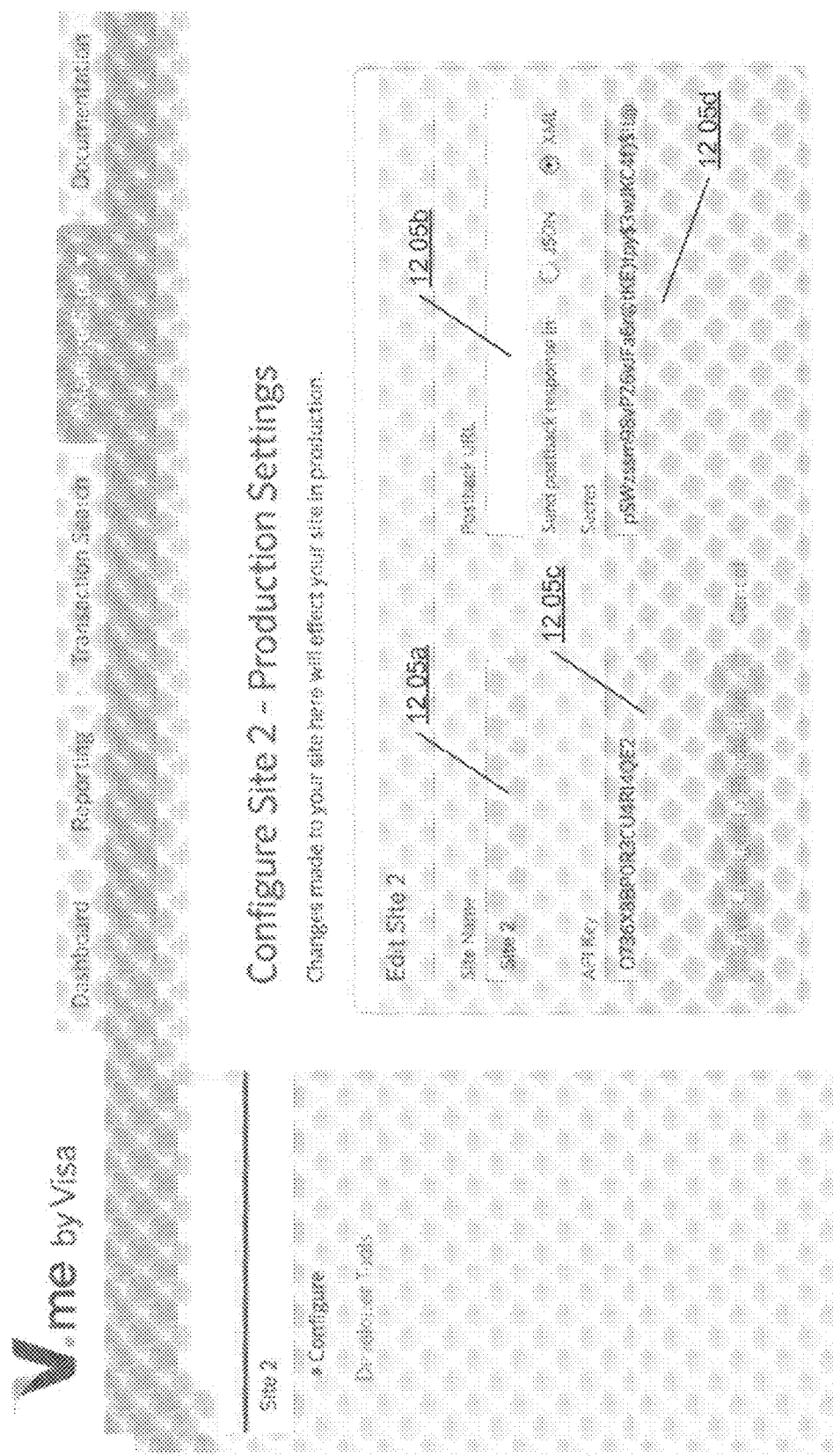

With reference to FIG. 3C, a user of the MID-Platform onboarding platform (e.g., a web developer at the merchant, etc.) may submit an API generation request with access ID 345, e.g., a request to generate a "V.me" checkout lightbox (e.g., see merchant Manage sites in FIG. 12A). The MID-Platform server may verify whether the merchant entered access ID, merchant ID, an API key, and/or other access credentials are valid 347. If valid, the MID-Platform server may proceed to retrieve a list of API options 349, such as but not limited to user profile API, user subscription API, virtual wallet API, checkout API, and/or the like.

Figure 4A:
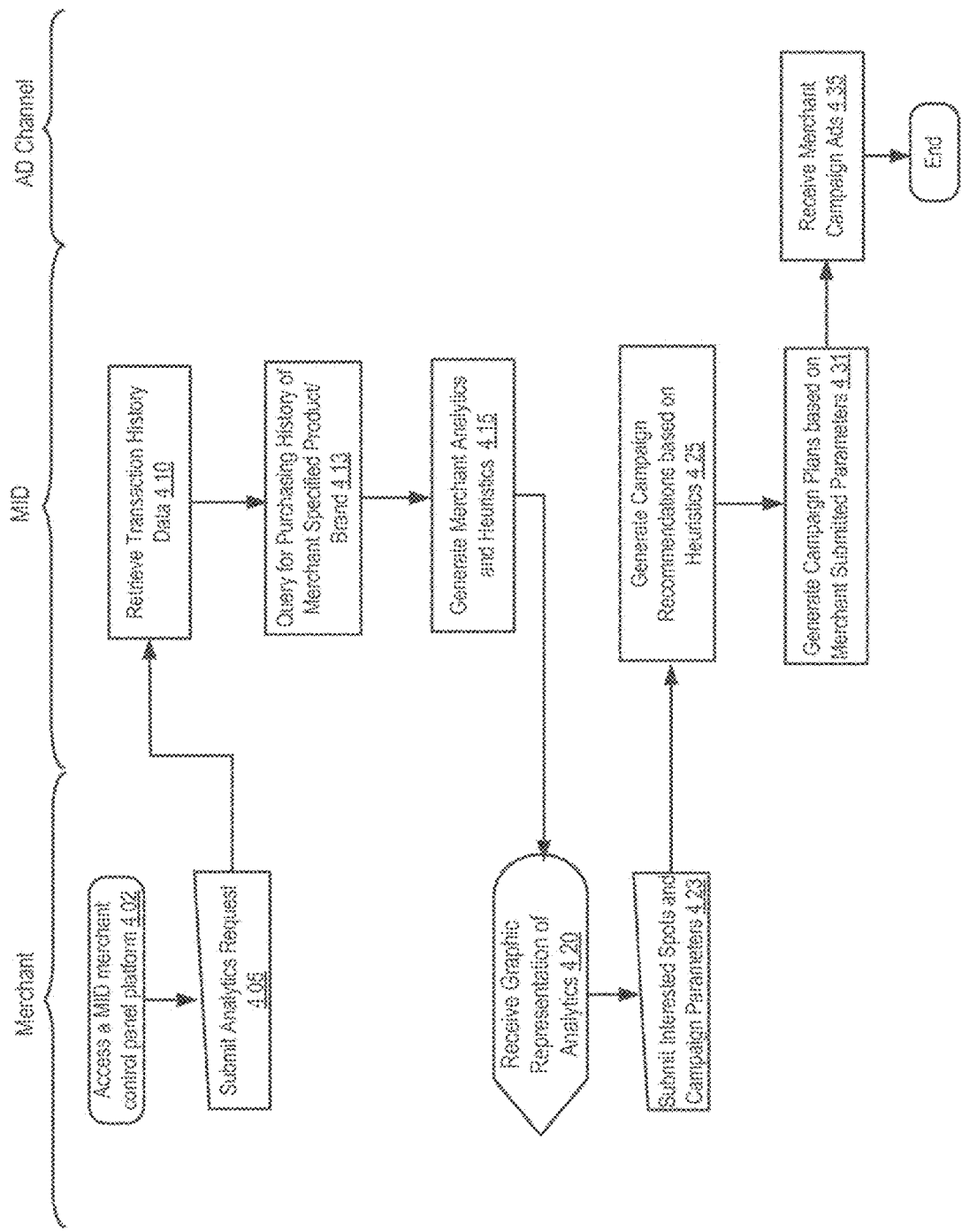

In one implementation, the user may select an API category 351, based on which the MID-Platform server may retrieve an API parameter input panel based on the selection 352 (e.g., see 406a-b in FIG. 4A, etc.). In one implementation, the user may then submit requested API parameters (e.g., 1305a-f in FIG. 13A), such as but not limited to a user id, a partner name, and/or the like. In one implementation, the MID-Platform server may query for API template from an API database 319 based on the category 354. For example, when the user selects a "checkout and order API," the MID-Platform server may retrieve templates for checkout and order widgets. For example, the MID-Platform server may issue PHP/SQL commands to query a database table (such as FIG. 37, API table) for an API template. In one implementation, the query may be formatted to request a json, XML, etc. template (e.g., see FIG. 12C), e.g., to provide the proper post back response template type, etc. Additionally, the API key, secret and site name may help to form the query request (e.g., see FIG. 12C). An exemplary query for an API template is provided below:

```
<?PHP
header('Content-Type: text/plain');
mysql_connect("254.93.179.112",$DBserver,$password); // access database server
mysql_select_db("MID-PLATFORM_DB.SQL"); // select database table to search
//create query
$query = "SELECT API_id, API_site_name, API_site_id,
    API_type API_template_id, API_key, secret, token, sample_code,
    FROM APITable WHERE API_site_name LIKE '%' $site2"
    AND API_type LIKE '%' lightbox";
$result = mysql_query($query); // perform the search query
mysql_close("MID-PLATFORM_DB.SQL"); // close database access
```

In one implementation, the MID-Platform may select the appropriate template from its MID-Platform database and pre-fill it with an API key, token, etc., and thereby providing a form (e.g., see FIG. 13A) allowing the merchant to further customize the desired merchant widget, e.g., a pre-configured product purchase checkout button, e.g., 1315.

Figure 13A:
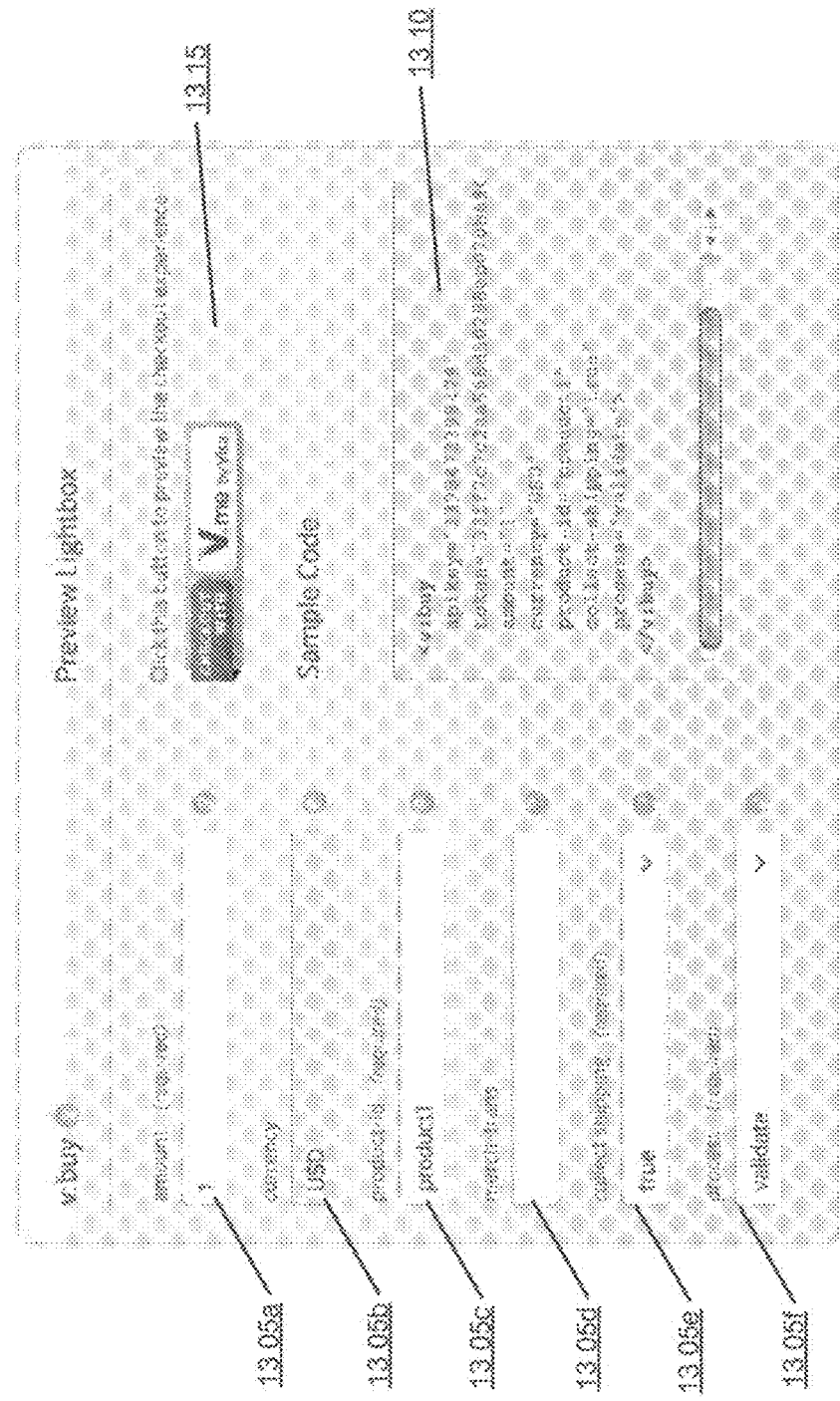
Figure 13B:
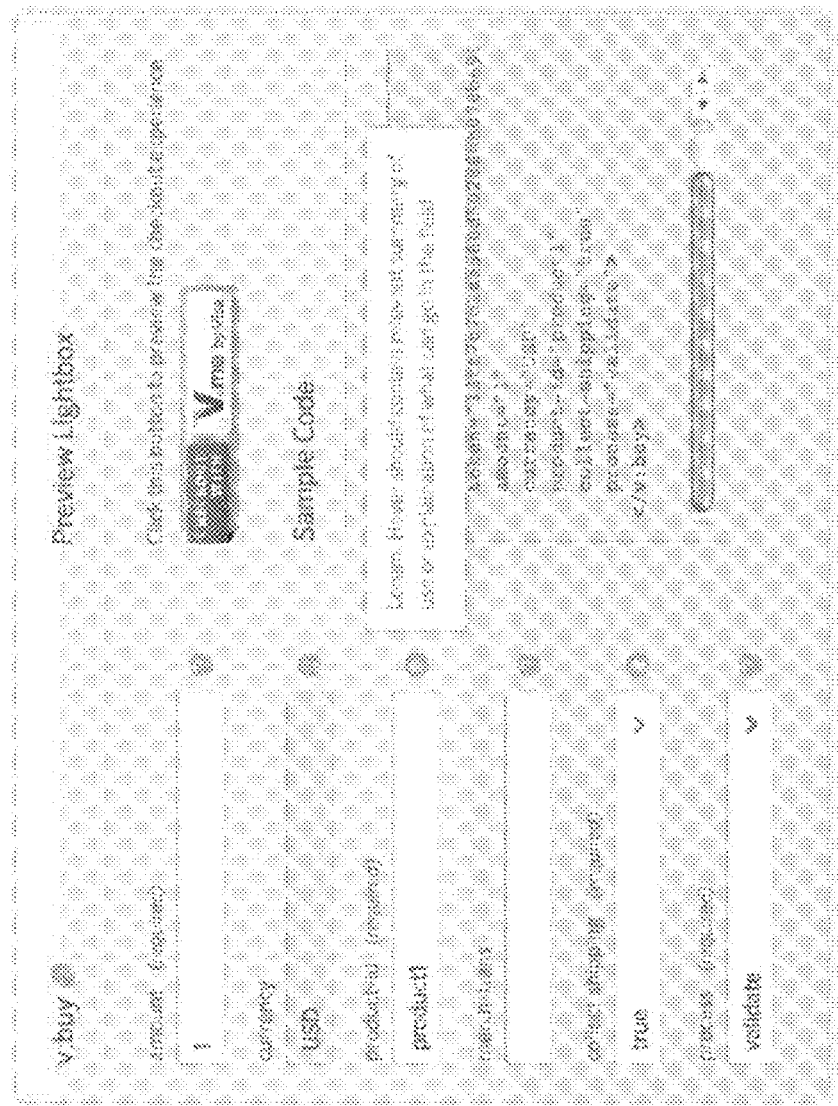
Figure 13C:
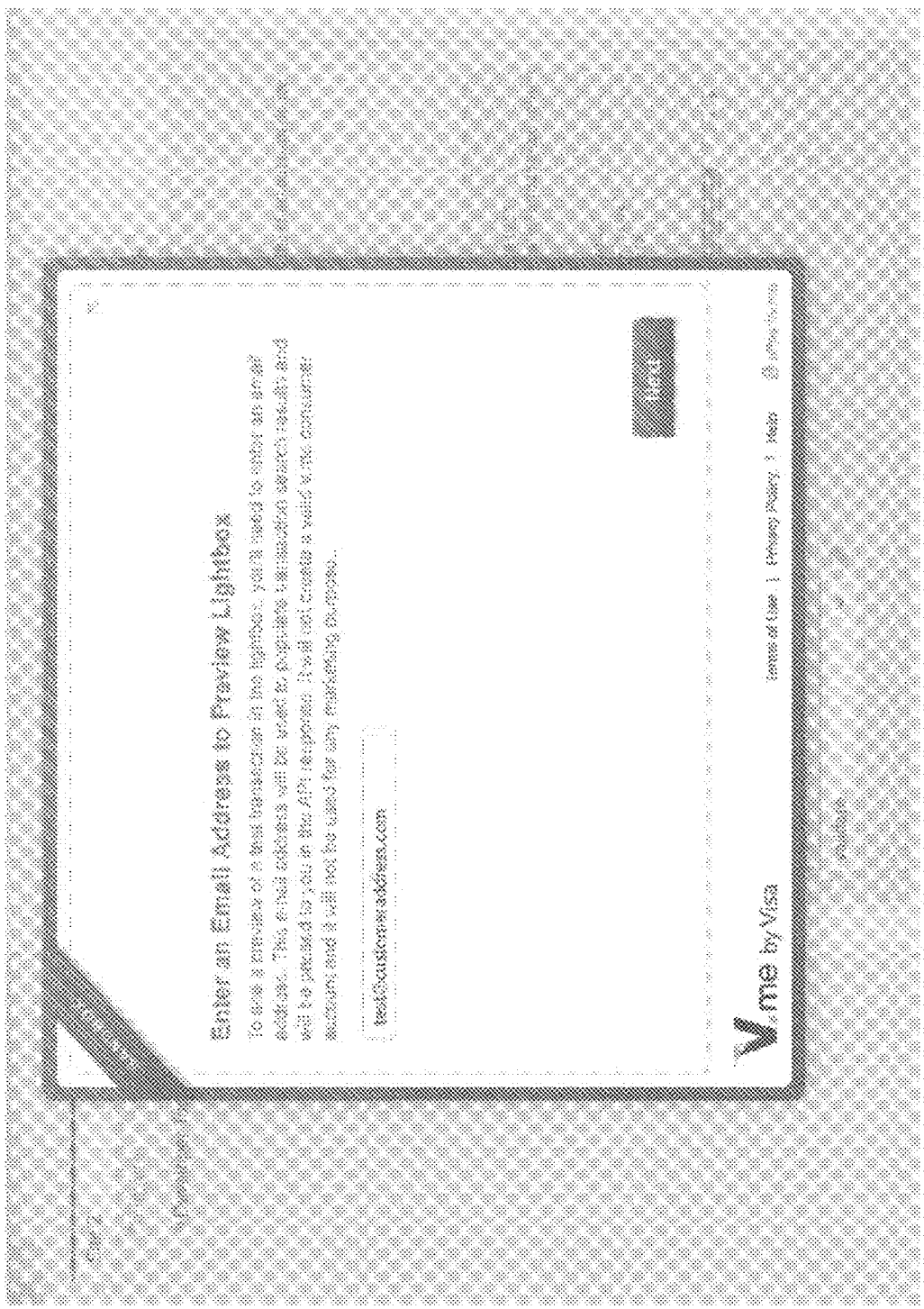
Figure 13D:
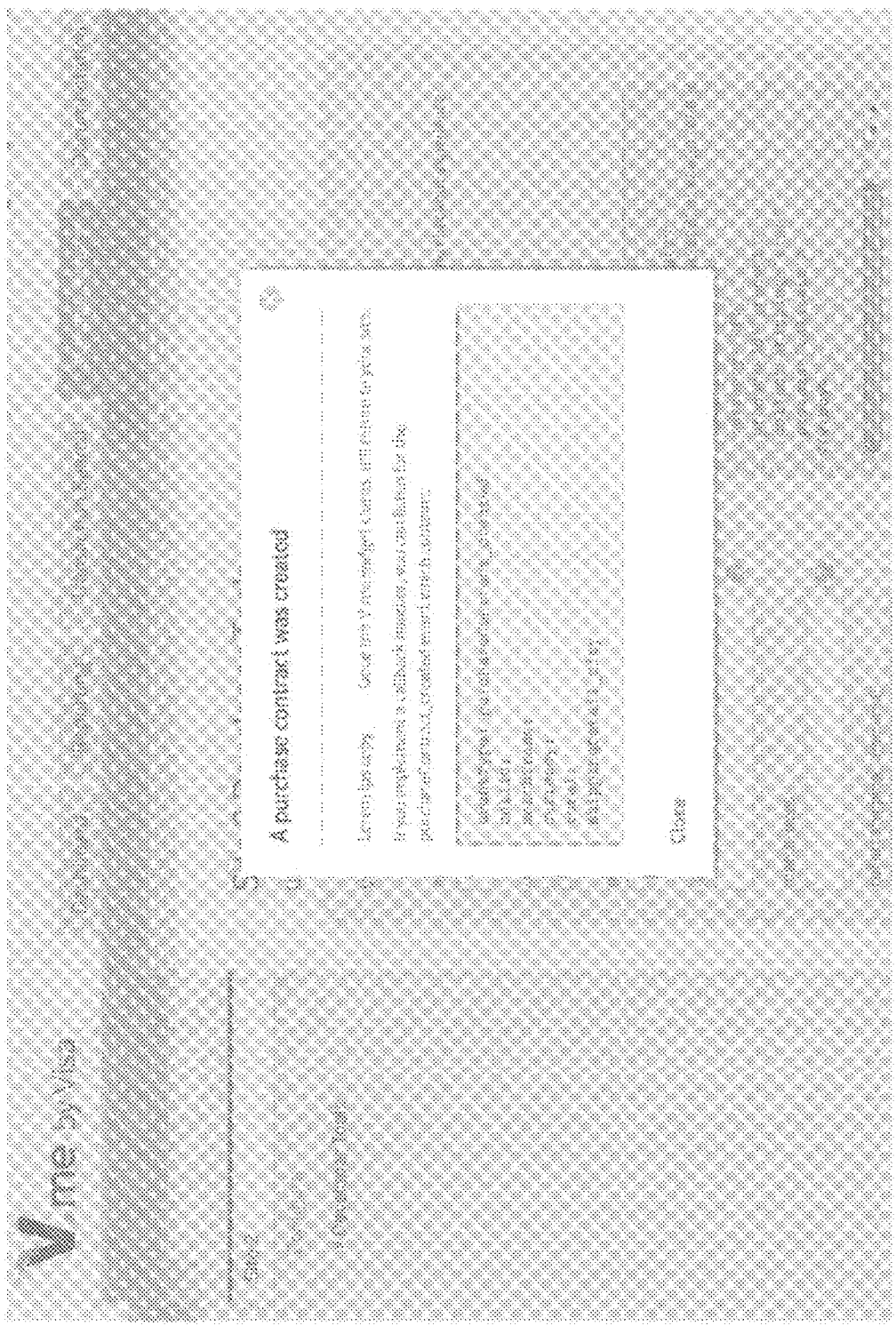
Figure 14A:
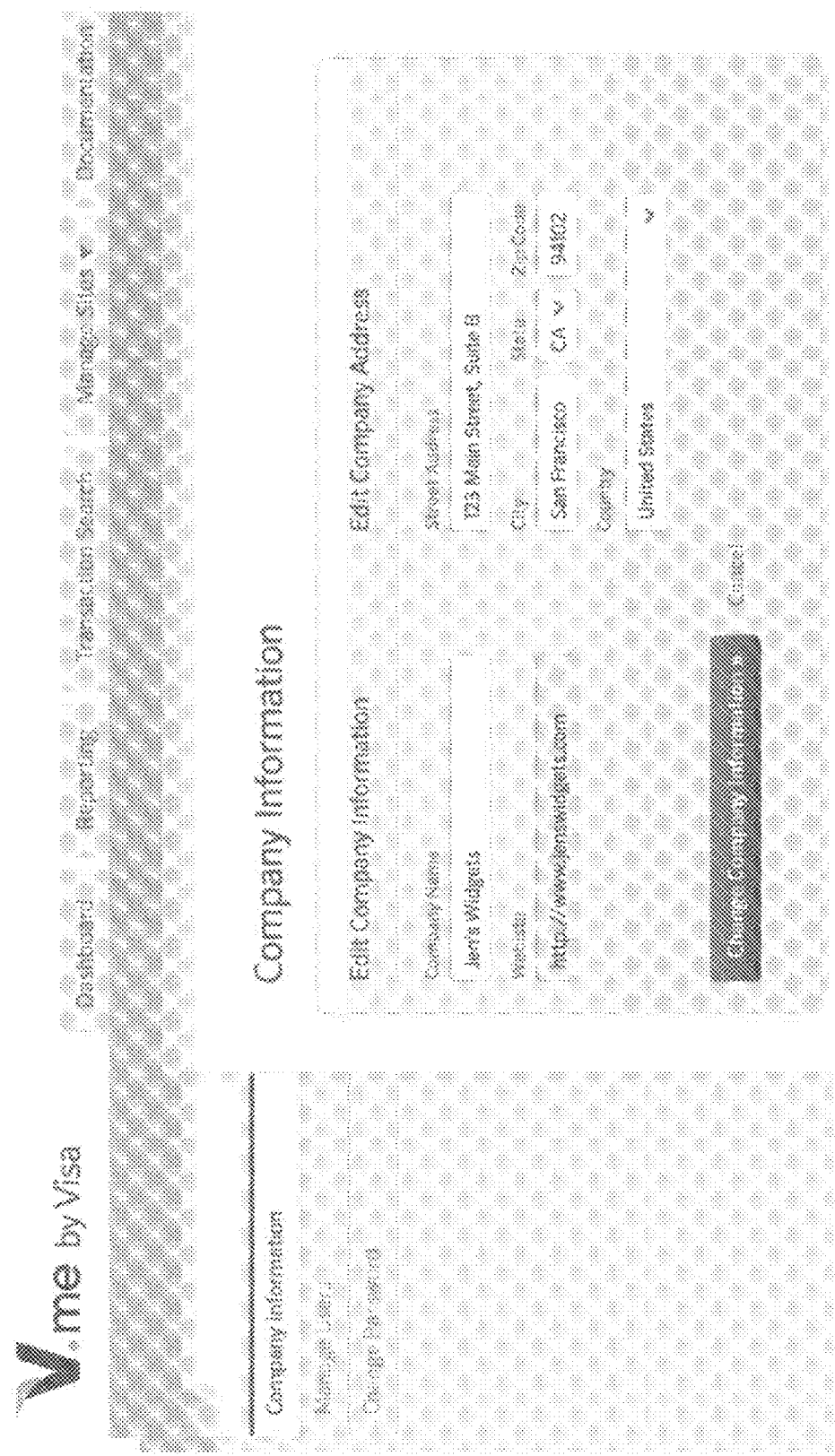
Figure 14B:
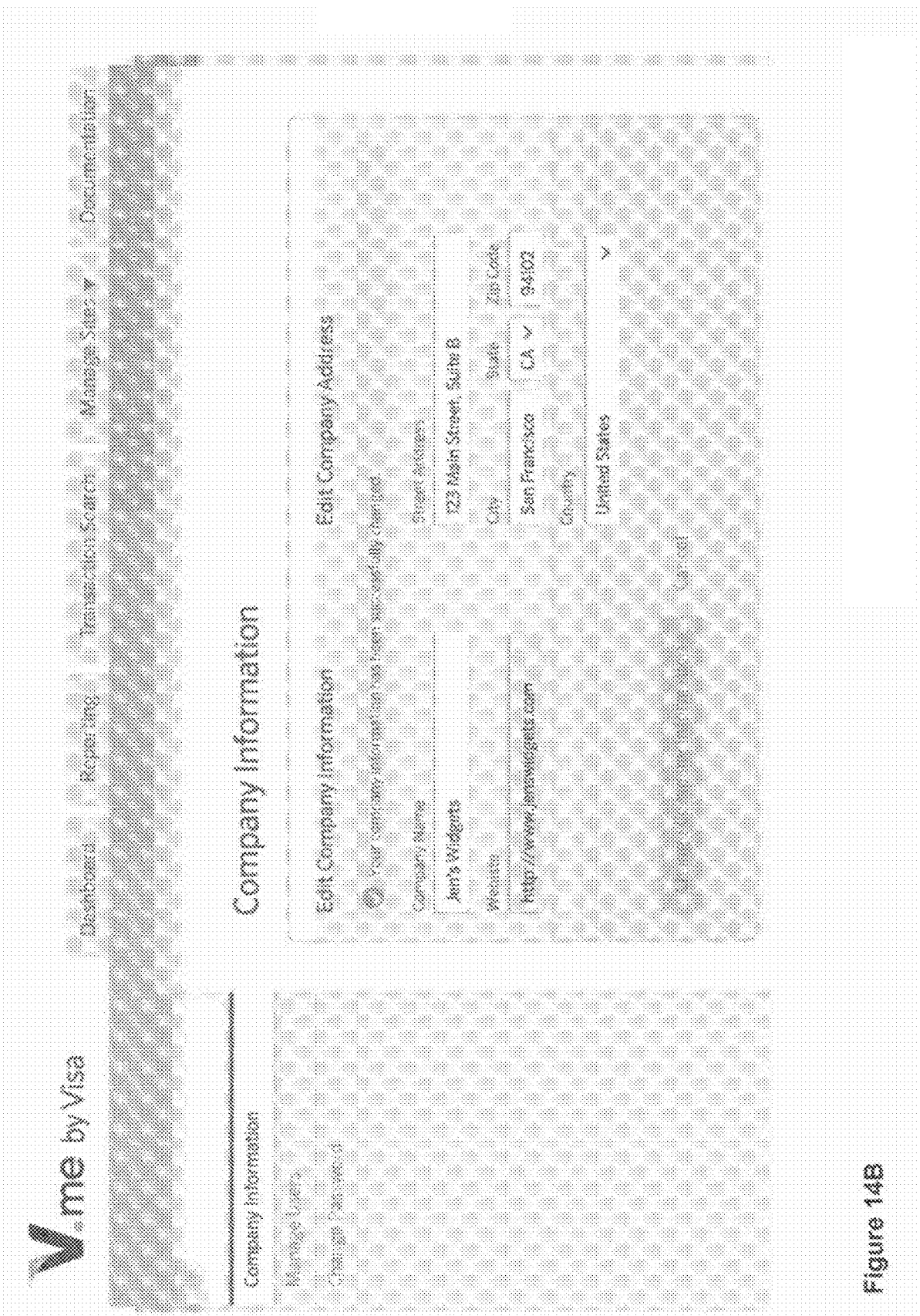
Figure 15A:
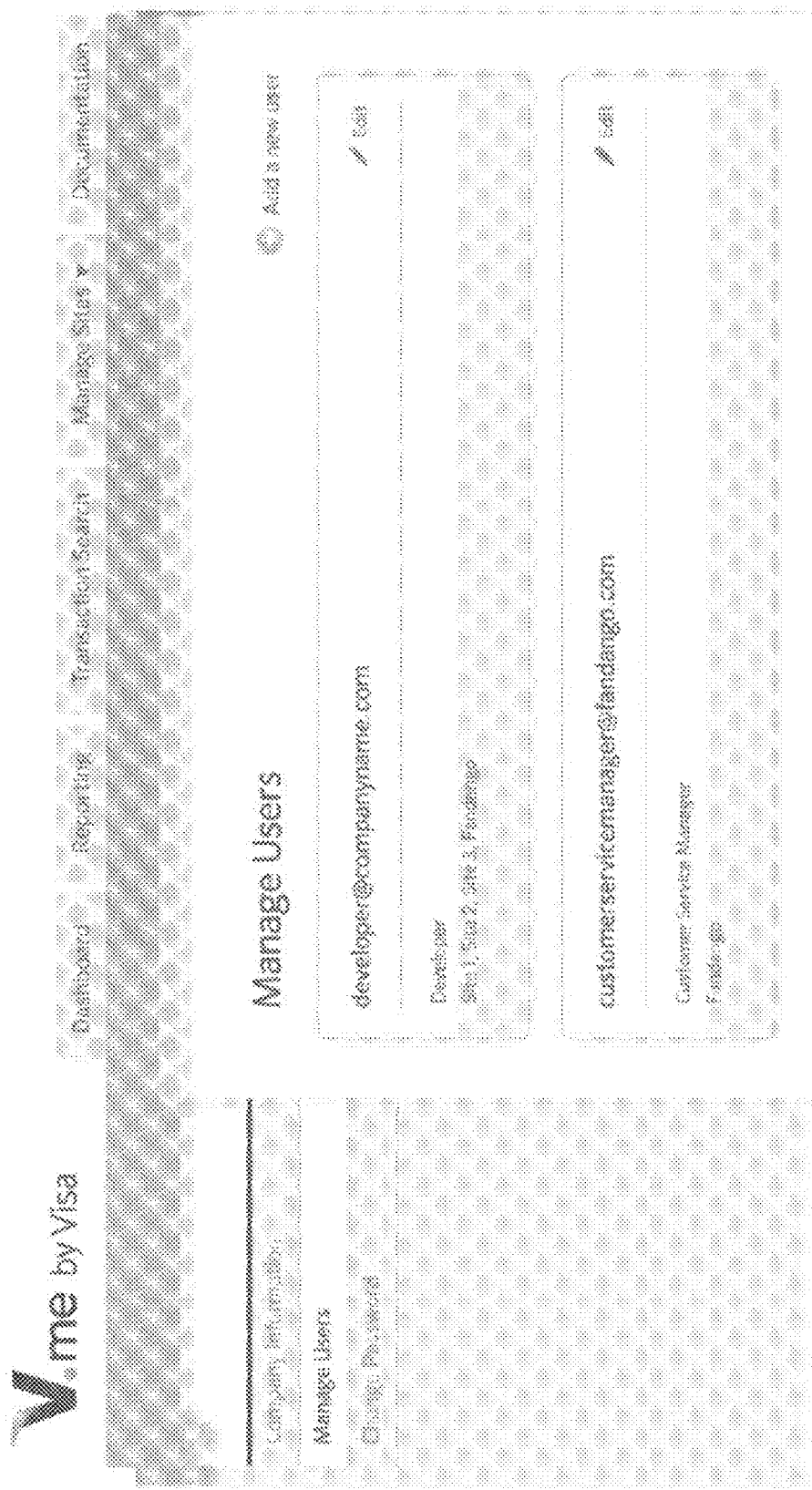
Figure 15B:
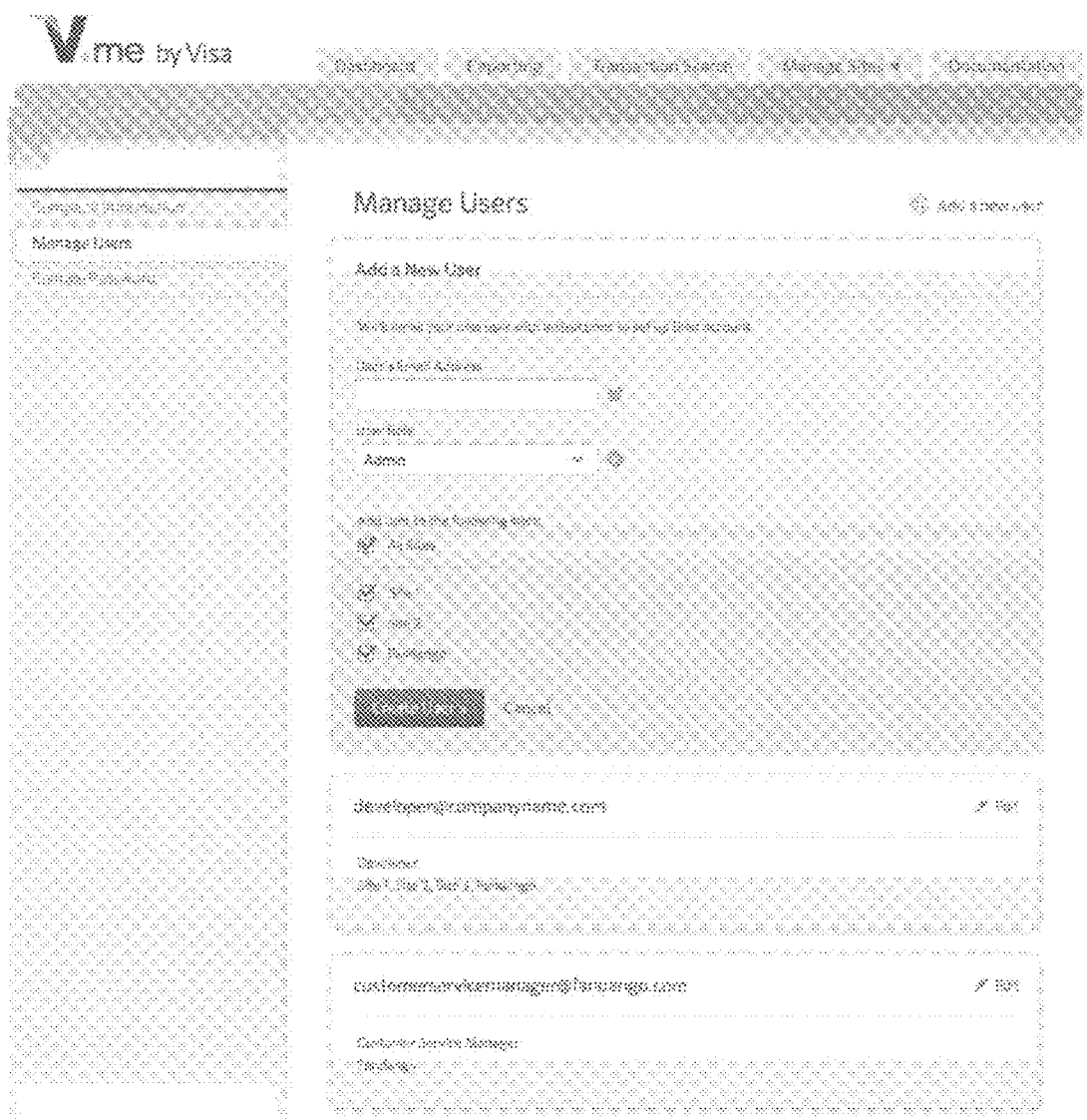
Figure 15C:
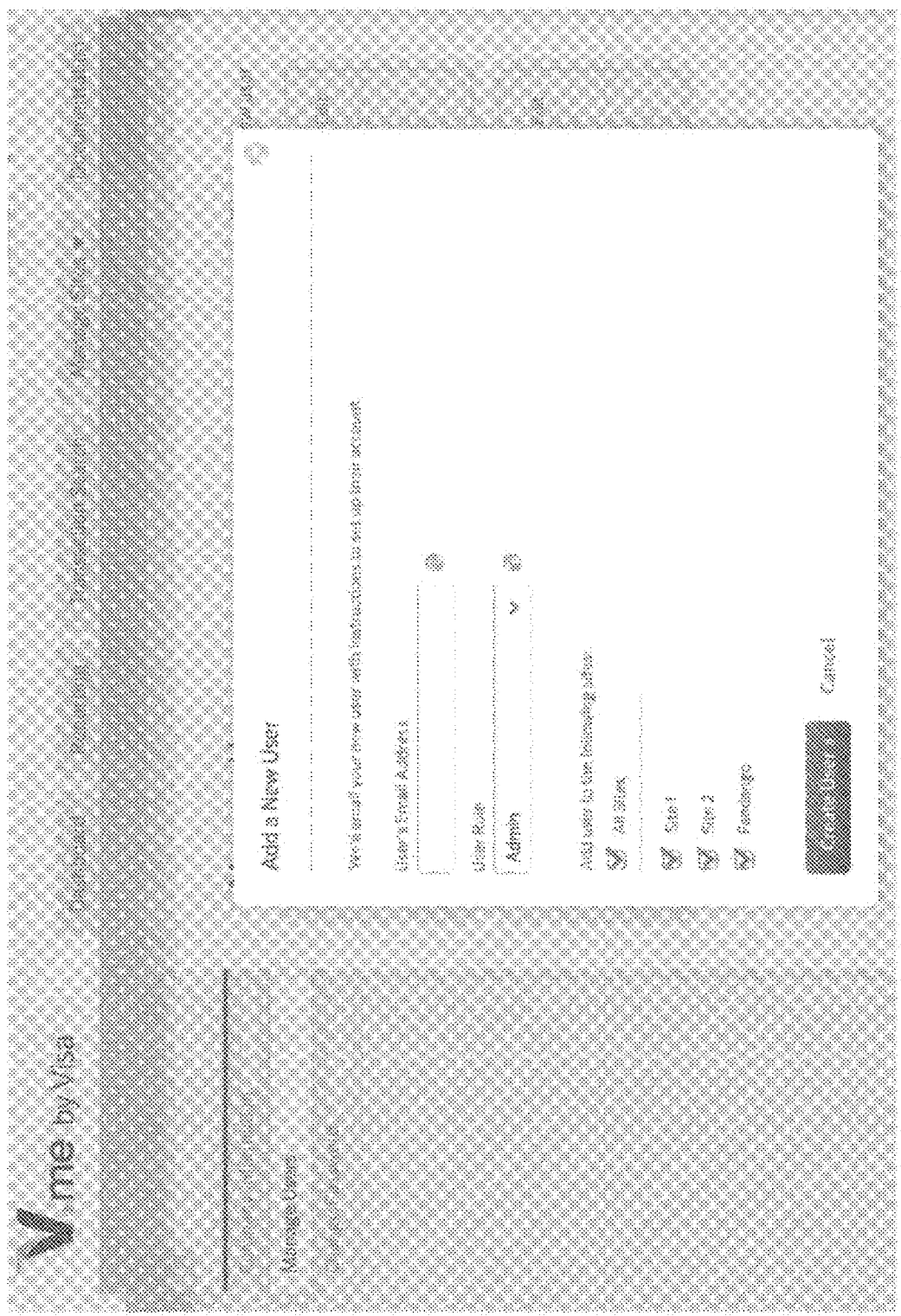
Figure 16A:
Figure 16B:
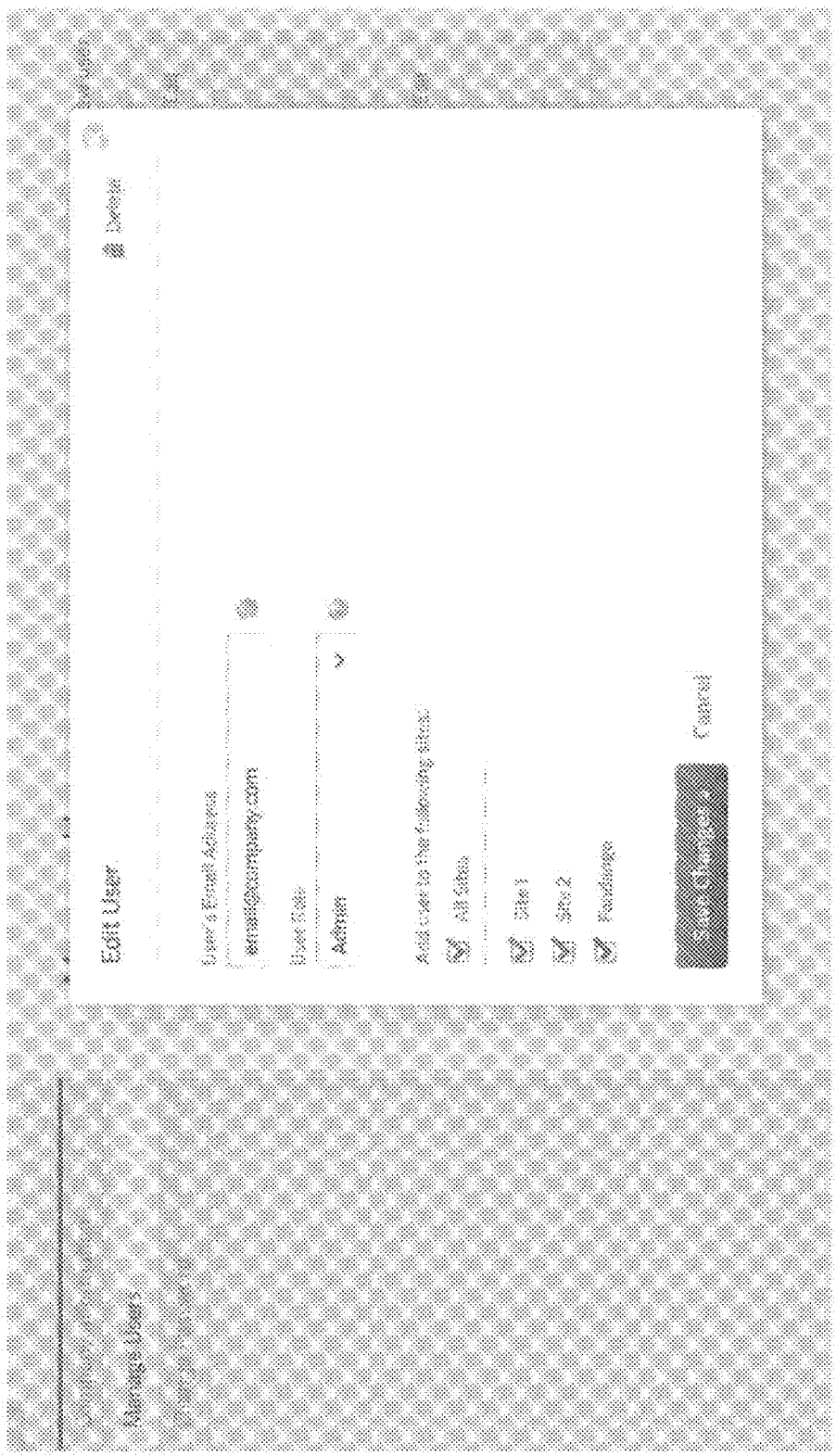
Figure 16C:
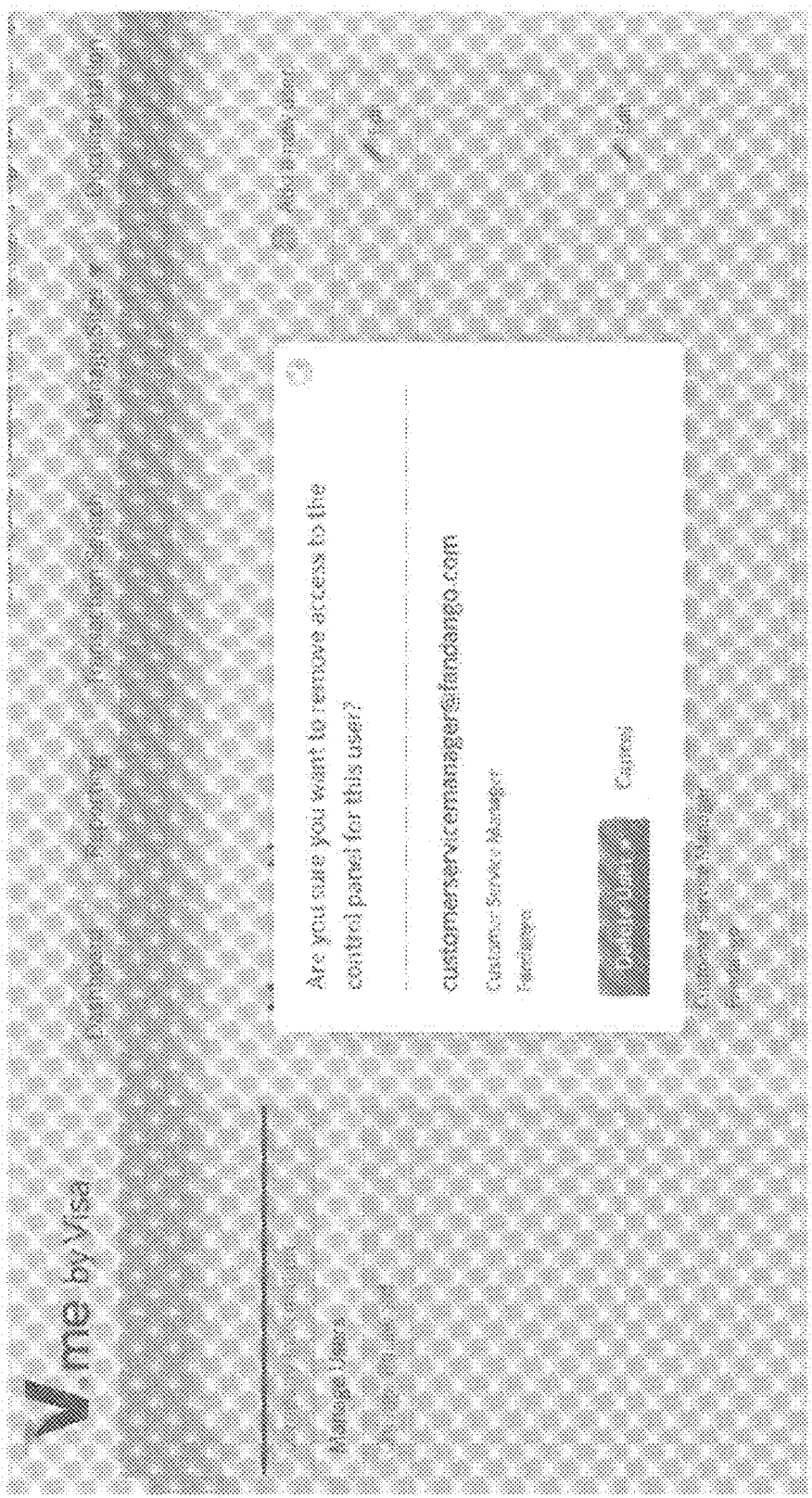

In one implementation, the MID-Platform server may generate an XML formatted API package (e.g., the widget 234 in FIG. 2A) and provide to the merchant, e.g., see 1310 in FIG. 13A. In one implementation, a developer at the merchant site may copy and paste the XML formatted code from the MID-Platform UI into the merchant site source code 358 to generate updated merchant site UI with a new widget 359.

In alternative implementations, the MID-Platform server 310 may send the generated XML formatted API package to a merchant site server, which may automatically incorporate it to update the site page.

Figure 3D:
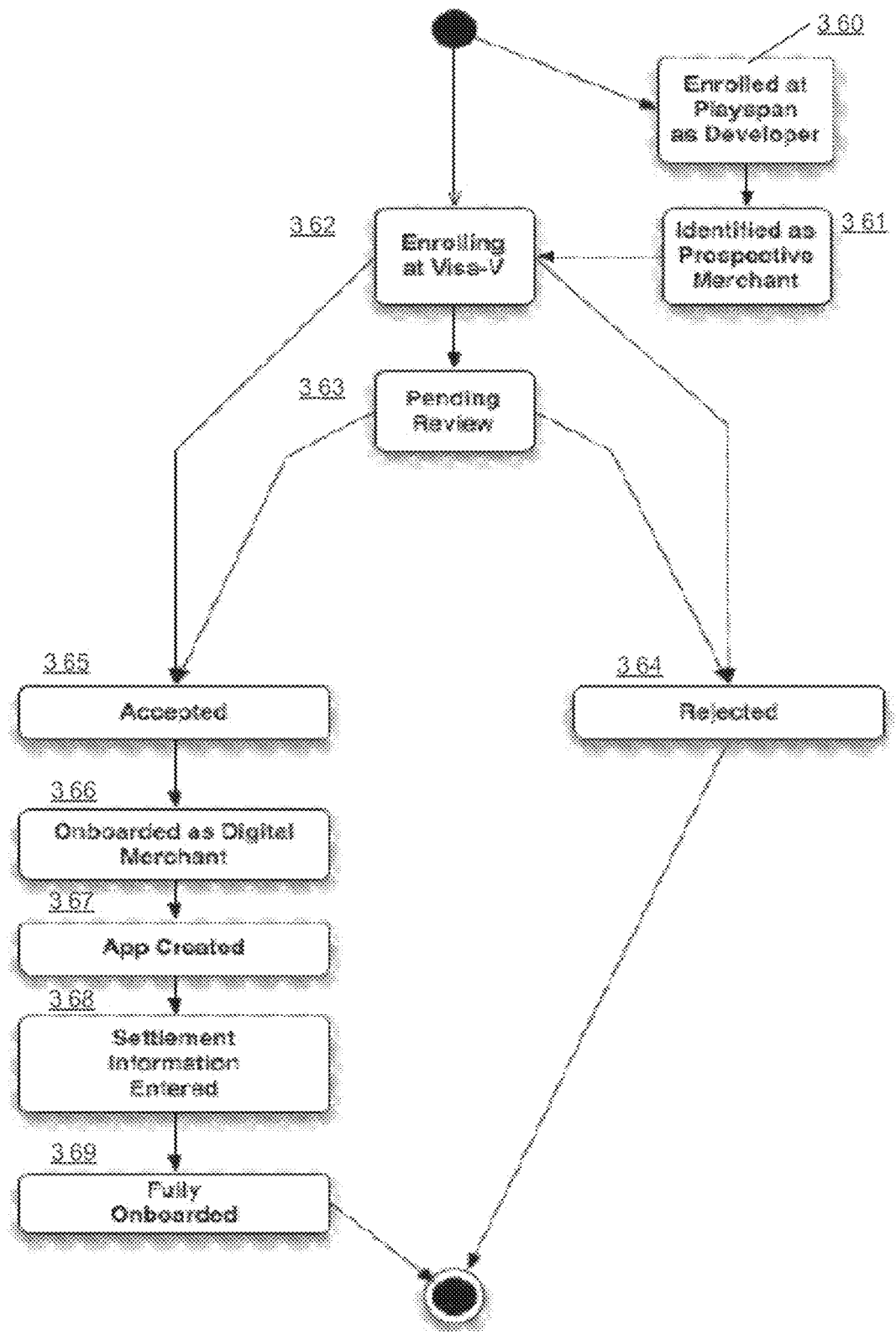

FIGS. 3D-3H provide exemplary logic flow diagrams illustrating alternative embodiments of merchant onboarding within implementations of the MID-Platform. With reference to FIG. 3D, a merchant may enroll at a third party processor (e.g., Playspan checkout platform) as a developer 360, and identify as a prospective merchant 361 to enroll with MID-Platform 362. In one implementation, the enrollment request may be pending review 363 with MID-Platform. If the merchant does not qualify (e.g., low credit rating, fraudulent prior transactions, etc.), the enrollment may be rejected 364. Otherwise, upon accepting the enrollment 365, the merchant may be onboard 366 as a digital merchant. In one implementation, the merchant may create application 367, e.g., creating a site (e.g., see FIGS. 10A-12B), creating lightbox checkout widgets, etc. In one implementation, the merchant may enter settlement information 368, e.g., how a transaction is to be cleared, posting time, waiting period, etc., and complete the onboarding 369.

Figure 3E:
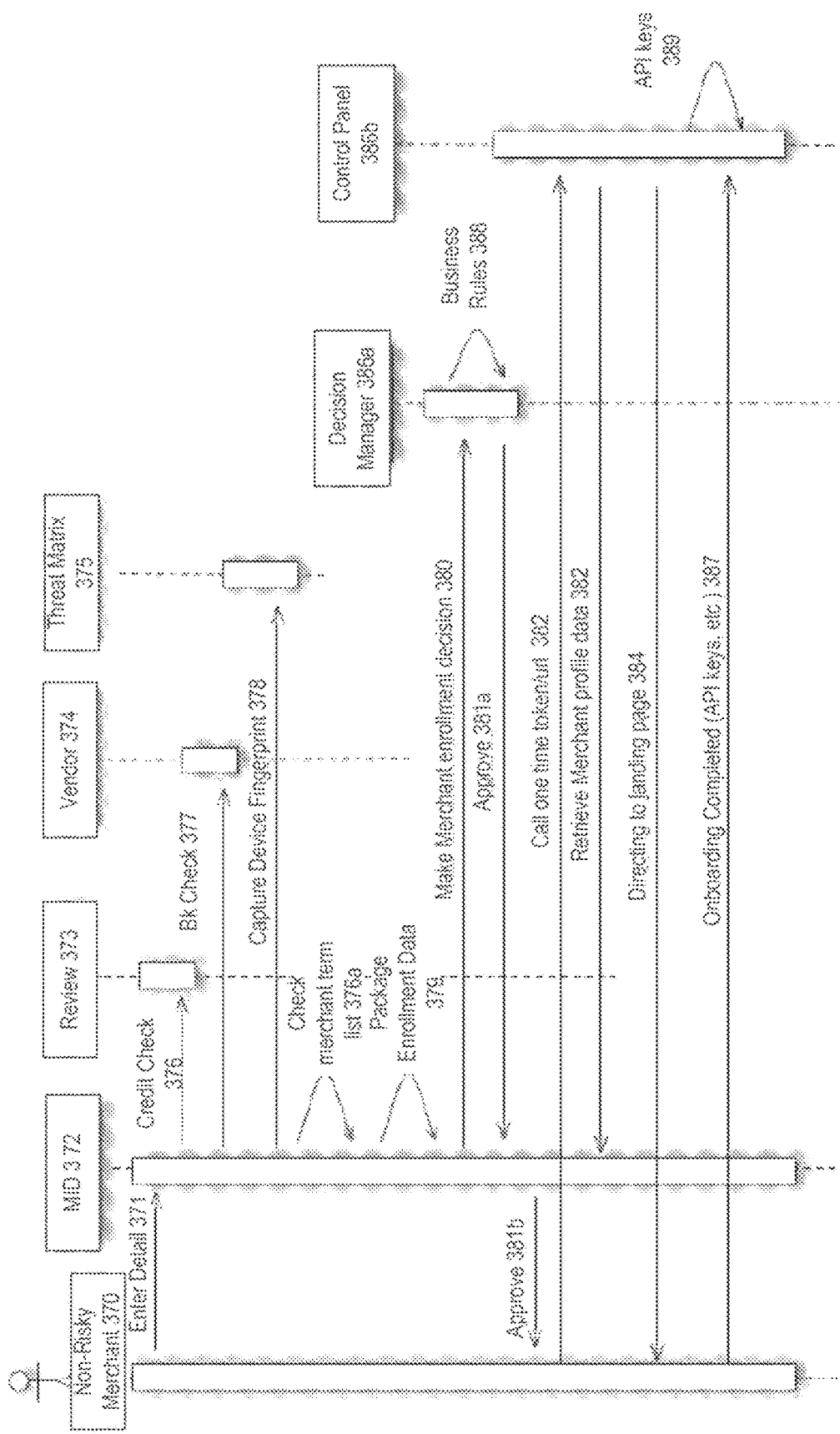

With reference to FIG. 3E, MID-Platform may perform review process with a non-risky merchant, e.g., an established business merchant such as "Terry Luxury," etc. Within implementations, the non-risky merchant 370 may enter enrollment detail 371 to the MID-Platform 372, which may perform credit check 376 with a review processor 373, a background check 377 with a OFAC vendor 374, and capture merchant device fingerprint (e.g., physical address, IP address, hardware ID, etc.) 378 to a threat matrix 375 analysis to determine whether the merchant is related to any fraudulent activities.

In one implementation, the MID-Platform may check the merchant termination list 376a and package the enrollment data 379 to make an enrollment decision 380. A decision manager 386a may apply business rules 388 to verify whether the enrollment data is complete, and approve 381a-b the enrollment. Upon enrollment, the merchant may receive a one time token/URL (e.g., a confirmation URL provided in an email, etc.) 382 to access a control panel 386b, which may retrieve merchant profile data 383 from the MID-Platform, and complete the enrollment to provide a landing page 384 to the merchant. In one implementation, the control panel may generate API keys 389 if the merchant initiates a site creation request 387 (e.g., see FIGS. 17A-B).

Figure 3F:
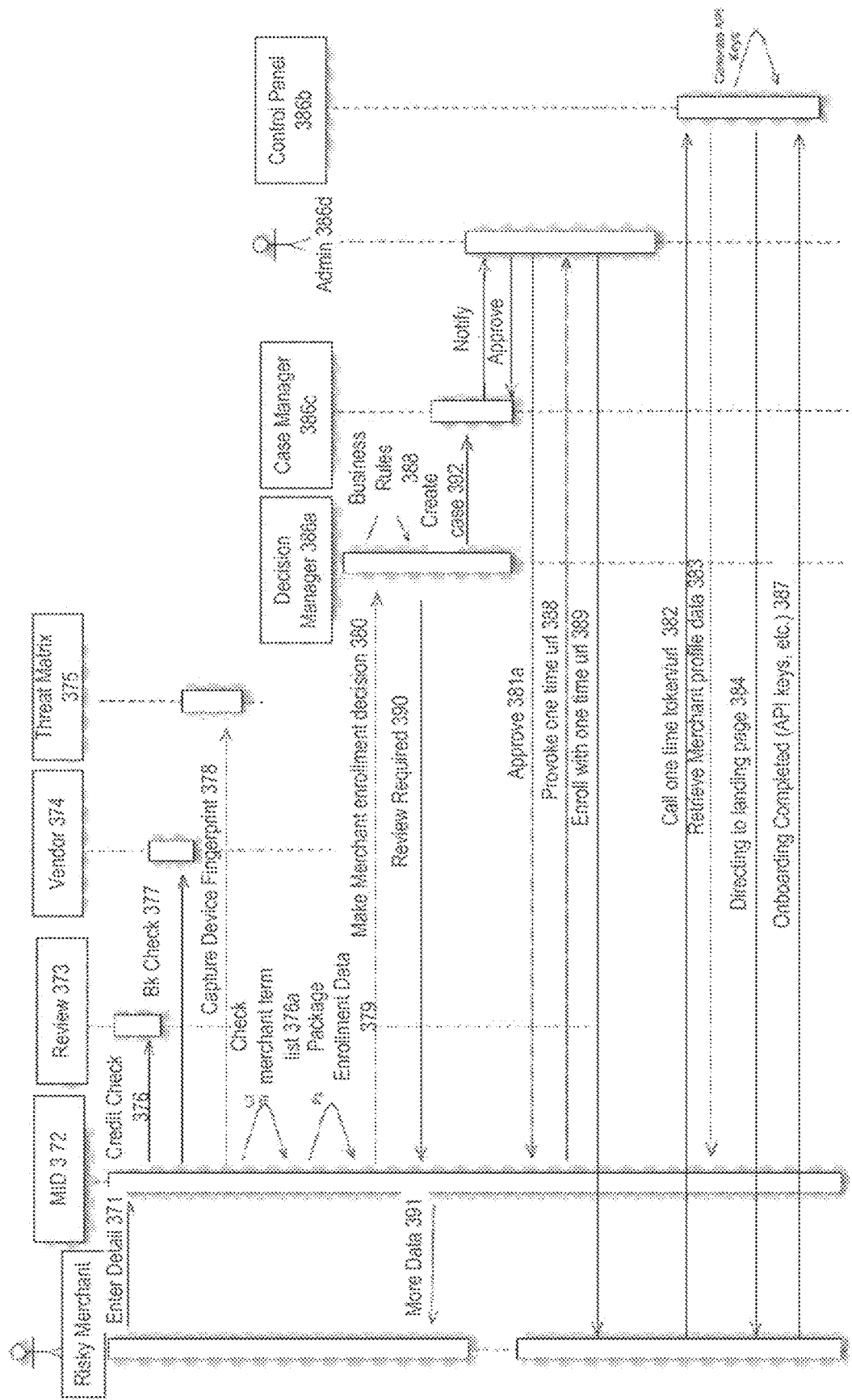

With reference to FIG. 3F, if the merchant is a risky merchant, e.g., an individual seller for first time enrollment with MID-Platform, etc., continuing on with 388, the decision manager 386a may send a review required decision 390 to the MID-Platform 372, which may request more data 391 from the merchant. The decision manager may then create a case 392 for a case manager 386c to review, which may forward the request to an administrator 386d. Upon reviewing, the administrator may approve the enrollment 381a, which prompts the MID-Platform to provoke a one time URL 389. The administrator 386d may send the one time URL 389 to the merchant and request the merchant to enroll with the one time URL.

Figure 3G:
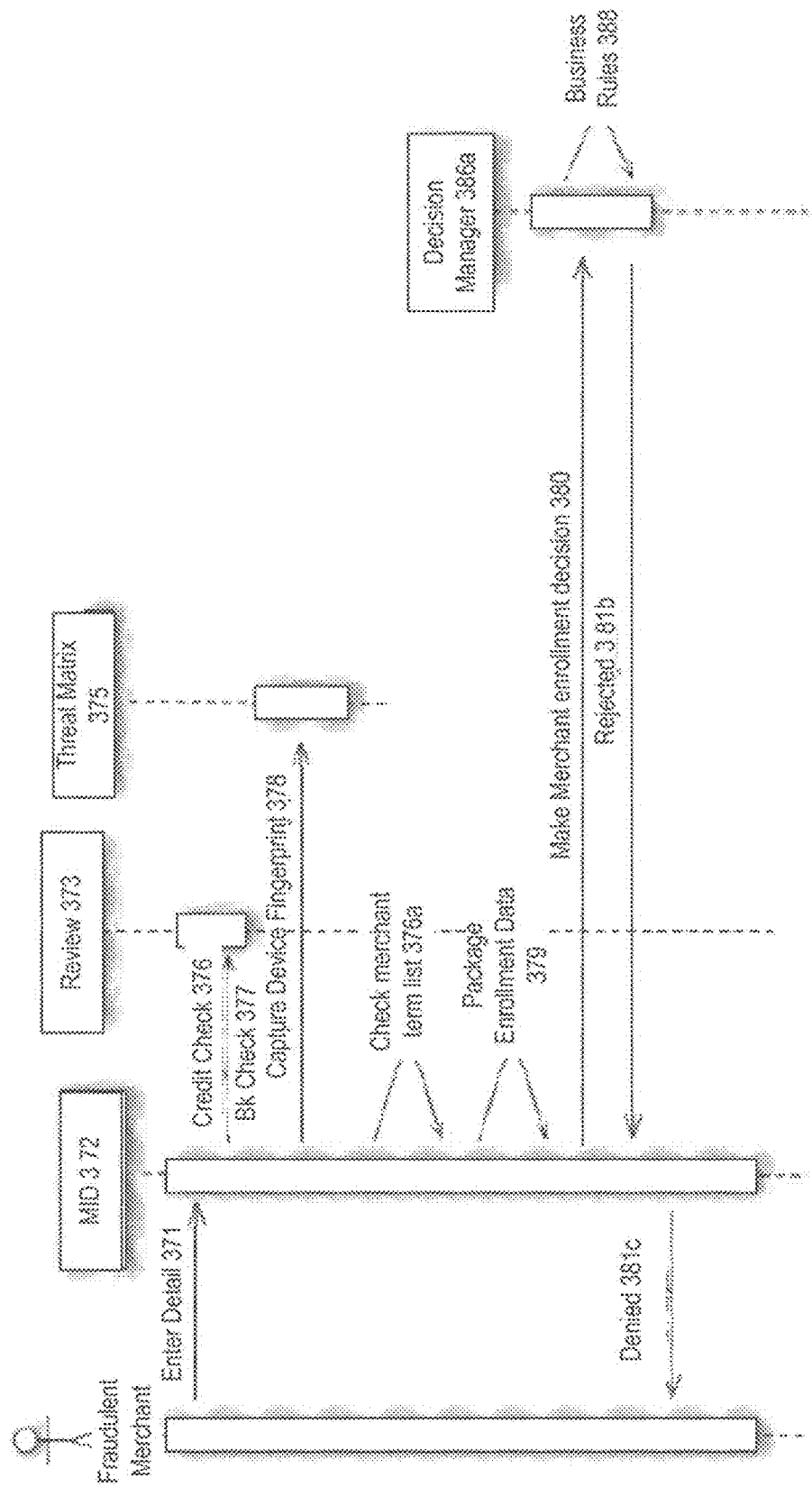

FIG. 3G illustrates an example of denying a fraudulent merchant within implementations of the MID-Platform. In one implementation, upon a fraudulent merchant submitting a registration request, continuing on with 388 where the decision manager apply business rules to review the merchant, if the merchant appears to have prior fraudulent transactions, etc., the decision manager may reject 381b the request, and deny the merchant onboarding 381c.

Figure 3H:
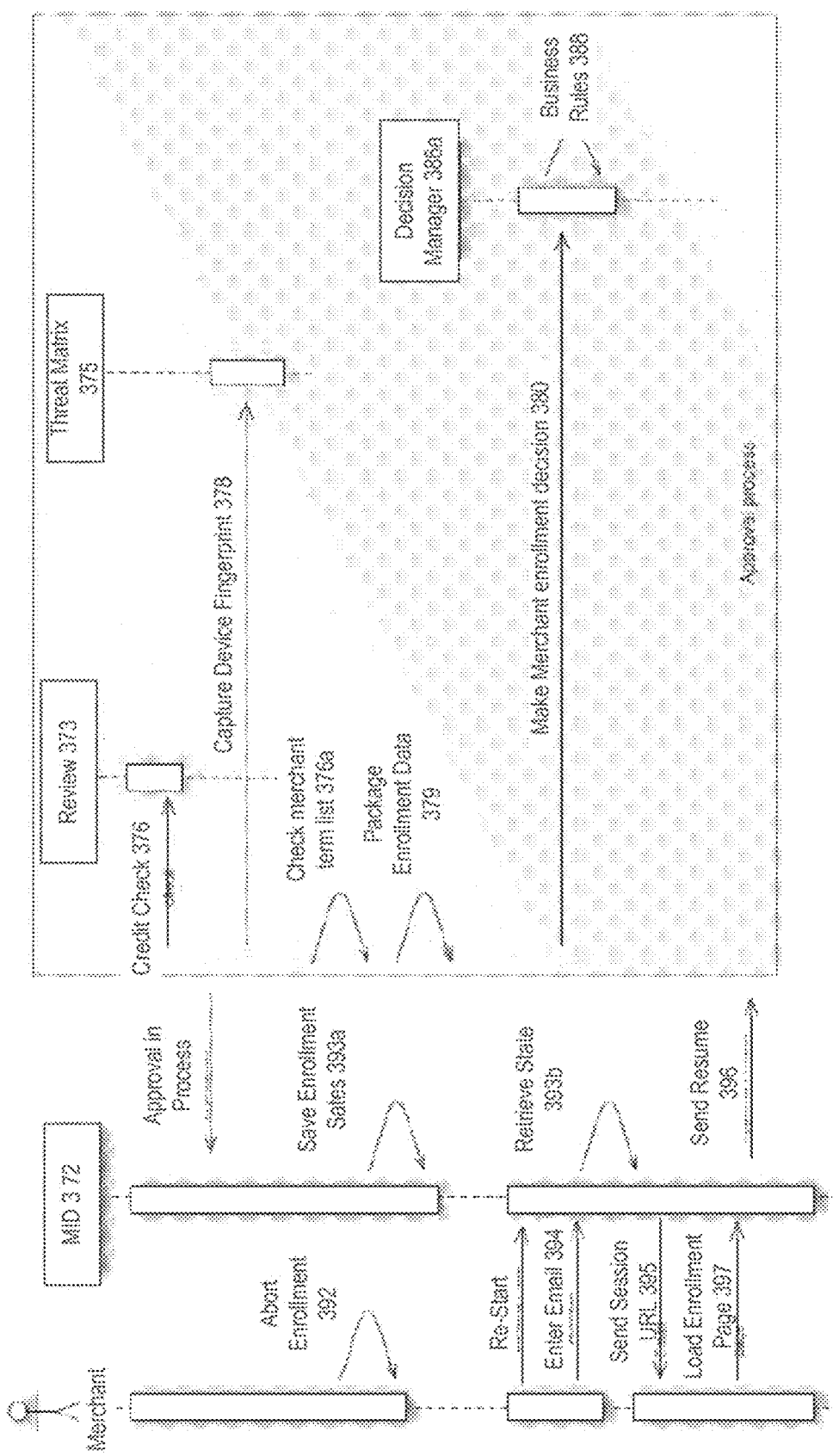

FIG. 3H illustrates an example of merchant aborting an enrollment within implementations of the MID-Platform. In one implementation, if during the enrollment process, e.g., after the merchant sending an enrollment request, the merchant may abort the enrollment 392 (e.g., by closing the browser, etc.), the MID-Platform may save the enrollment state 393a. In one implementation, once the merchant restarts the enrollment, the MID-Platform may retrieve an enrollment state 393b and send a session url 395 to the merchant, e.g., via email. The MID-Platform may then load enrollment page 397 and send merchant resume data 396 to the approval process to resume enrollment.

FIG. 4A provides an exemplary logic flow diagram illustrating aspects of merchant analytics and campaign set-up within embodiments of the MID-Platform. Within implementations, a merchant may access a MID-Platform merchant control panel platform 402, e.g., the web-based dashboard in FIGS. 5, 7B-7C and 8A-8B, and/or a mobile control panel platform as shown at 605 in FIG. 6A. In one implementation, a merchant may submit an analytics request 405 (e.g., 255*a*-*b* in FIG. 2B), whereas the MID-Platform may retrieve transaction data 410 and query for purchasing history of the merchant specified product brand 413. For example, the merchant may specify performance data within interested product category (e.g., 621 in FIG. 6A), per store (e.g., 623 in FIG. 6A), per customer (e.g., 622 in FIG. 6A), and/or the like. The MID-Platform may query on the transaction history to retrieve relevant transaction data (e.g., see 261 in FIG. 2B) and generate merchant analytics and heuristics 415. For example, as shown at 710, 715 in FIGS. 7B-7C, the MID-Platform may flag a percentage of total transactions by state, e.g., the state that has the highest percentage, etc. In one implementation, Flotr Chart, jfree chart, etc. are example library kits that may obtain inquiry results for user chart interaction mechanisms.

Figure 6A:
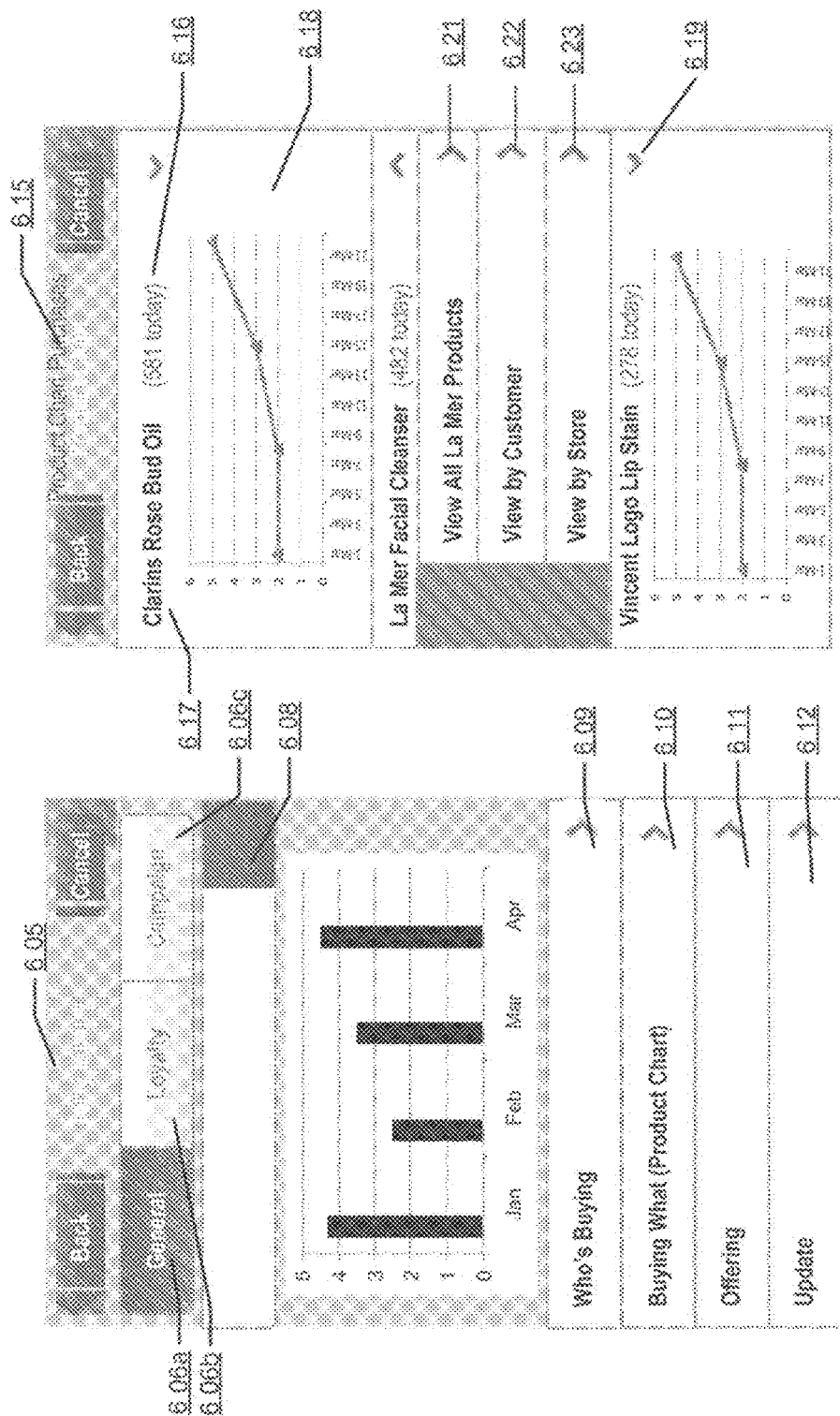
Figure 6B:
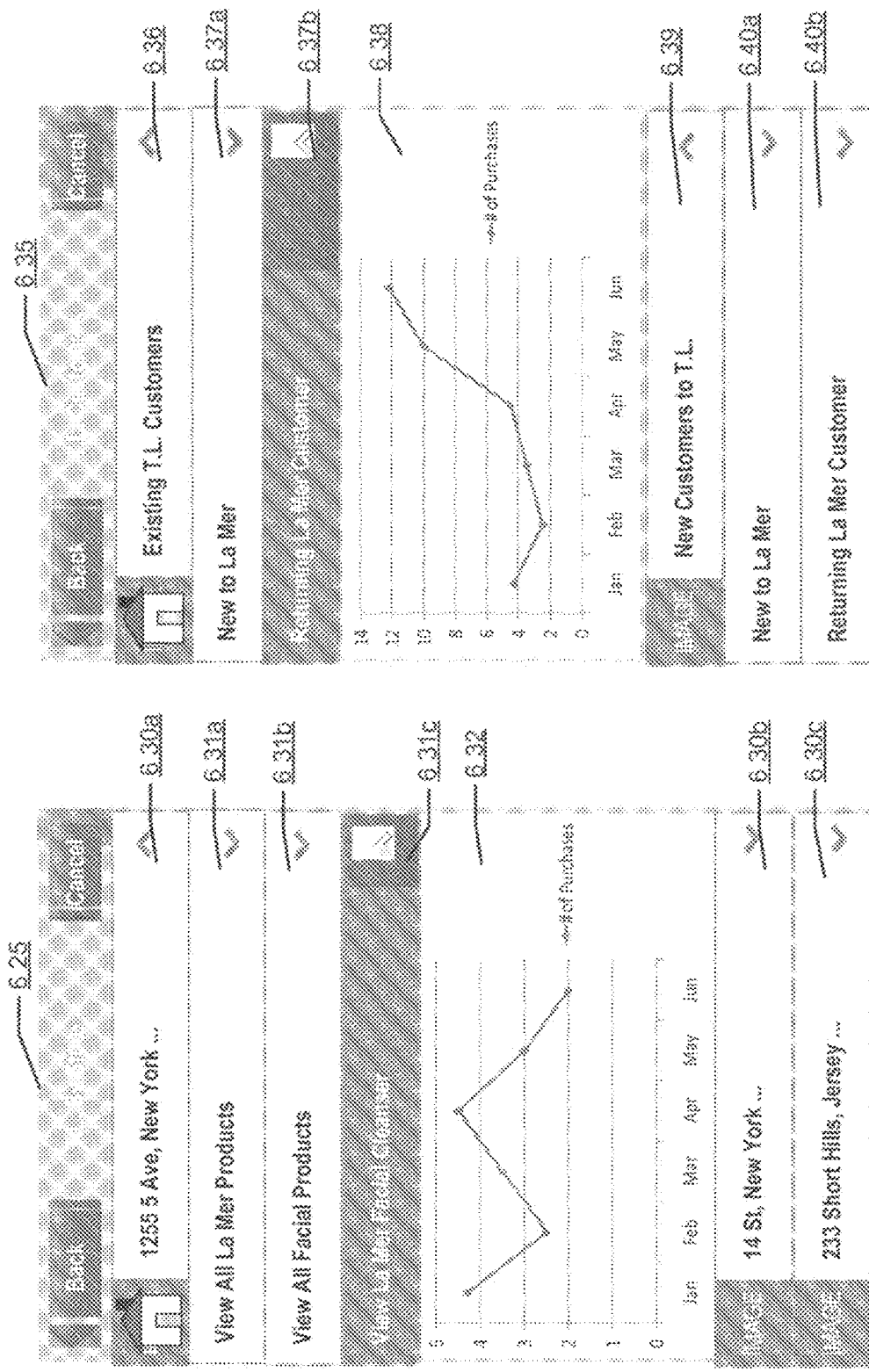
Figure 6C:
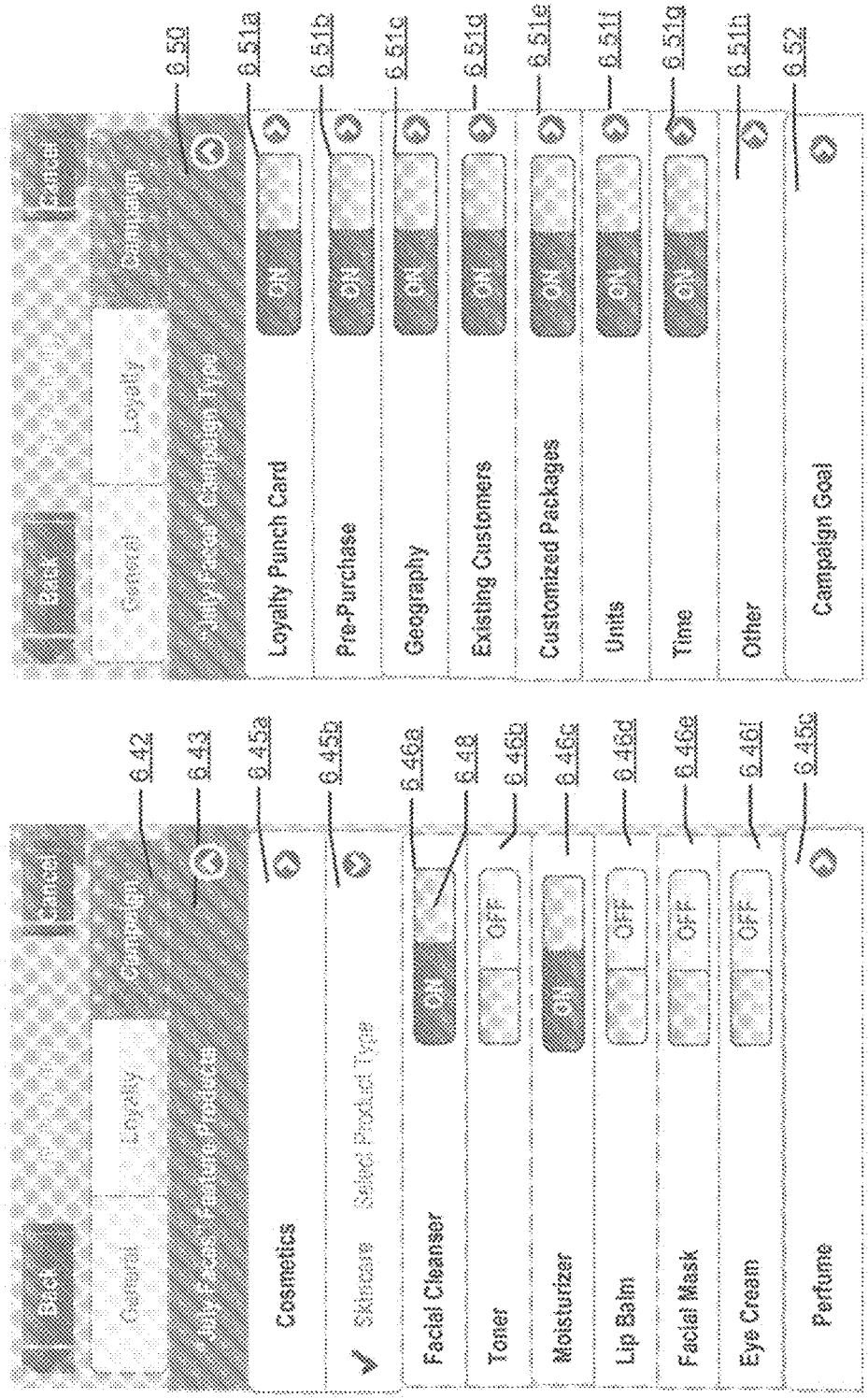
Figure 6D:
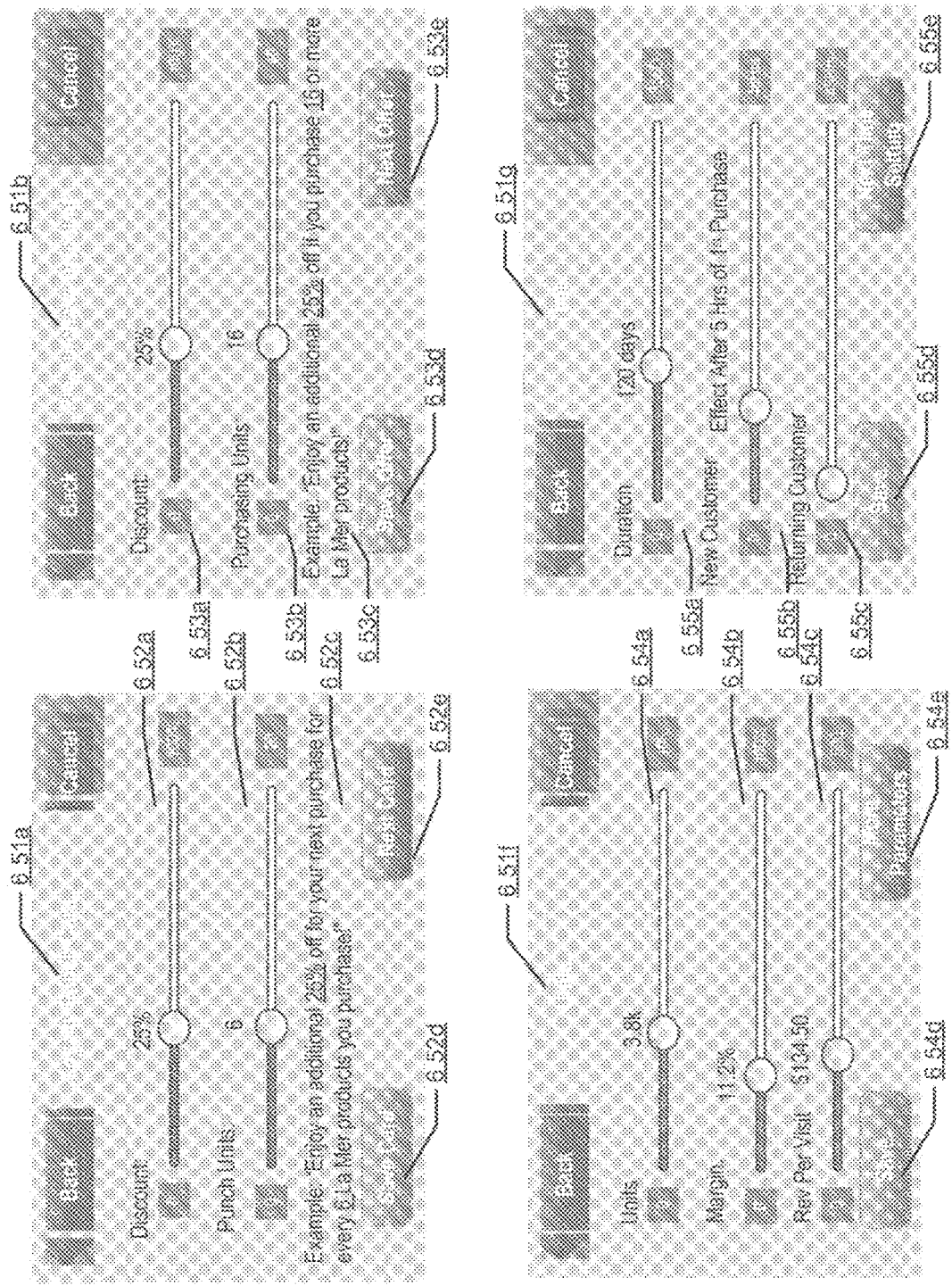
Figure 6E:
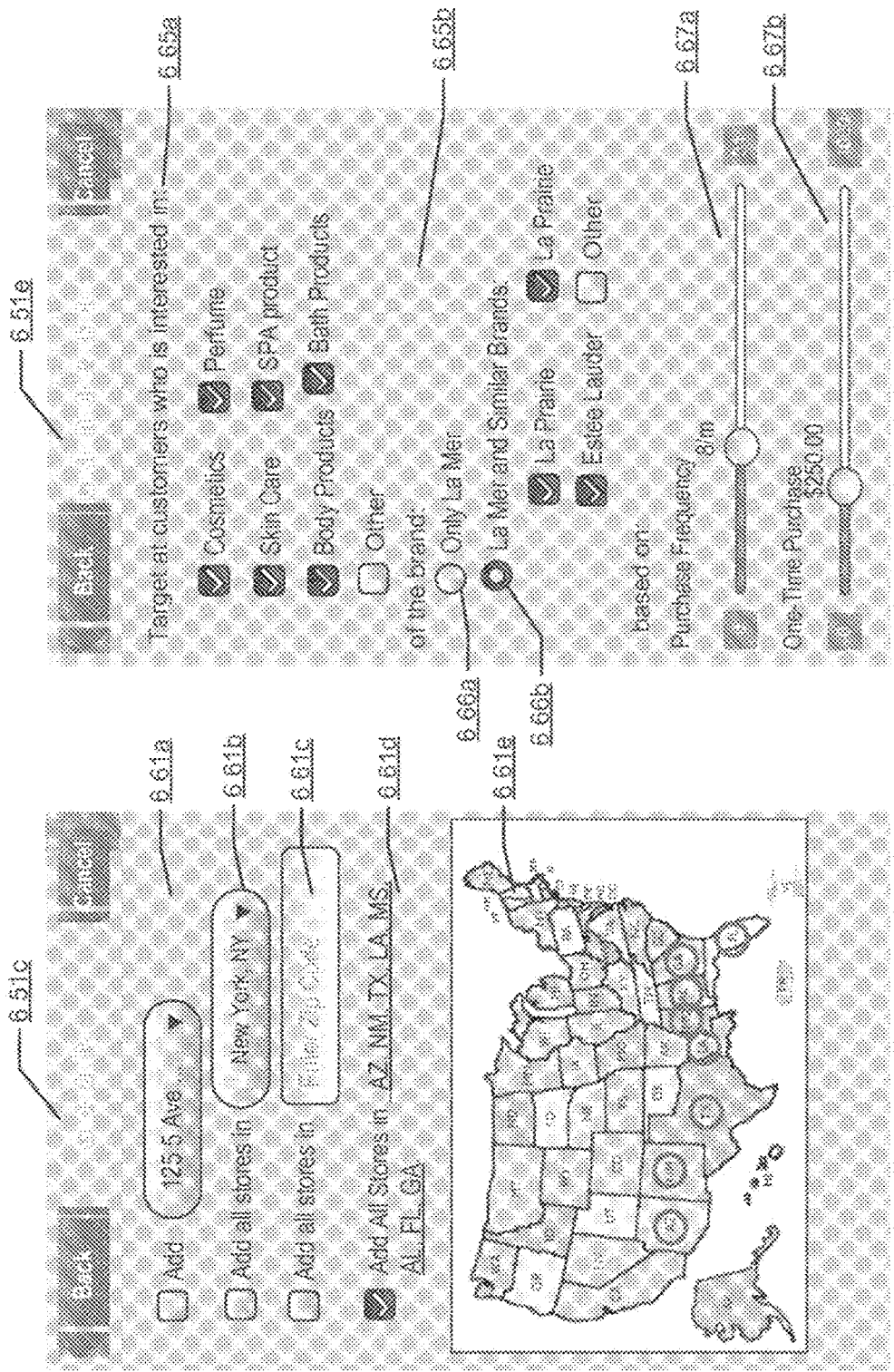

In one implementation, the merchant may receive graphic representation of analytics 420 (e.g., see FIGS. 7B-7C, 8A-8B), and submit campaign parameters 423, such as but not limited to discount rate, loyalty units, duration, campaign targets, and/or the like, e.g., see FIGS. 6D-6E. In another implementation, the merchant may submit interested spots on the performance chart, e.g., a product category with low performance, see 514 in FIG. 5. In one implementation, the MID-Platform may generate campaign recommendations based on heuristics 425. For example, if the merchant is interested in product category with low performance, e.g., "skin care," the MID-Platform may suggest a campaign on skin care brands. In one implementation, the MID-Platform may generate default values for offer parameters (e.g., 652*a*-*b* in FIG. 6D) based on merchant specified campaign objective parameters, e.g., 654*a*-*c* in FIG. 6D.

In one implementation, the MID-Platform may generate a pre-populated campaign set-up form 427 to the merchant, e.g., a stackable campaign control block with recommended campaign parameters which reflect the merchant's indicated interests to improve performance. The merchant may further specify campaign parameters 429, e.g., at FIGS. 6C-6D.

In one implementation, the MID-Platform may generate a campaign plan based on merchant submitted parameters and/or campaign recommendations 431, and distribute to various ad channels 435.

FIG. 4B provides an exemplary logic flow diagram illustrating merchant enrollment with multiple payment processors within embodiments of the MID-Platform. In one implementation, the merchant may manage enrolled sites from a merchant UI (e.g., see FIG. 10A), and select a site from the merchant control platform UI 440. In one implementation, the merchant may submit a request to create a new MID for the selected site 442 (e.g., see 1008*a* in FIG. 10B).

Figure 18A:
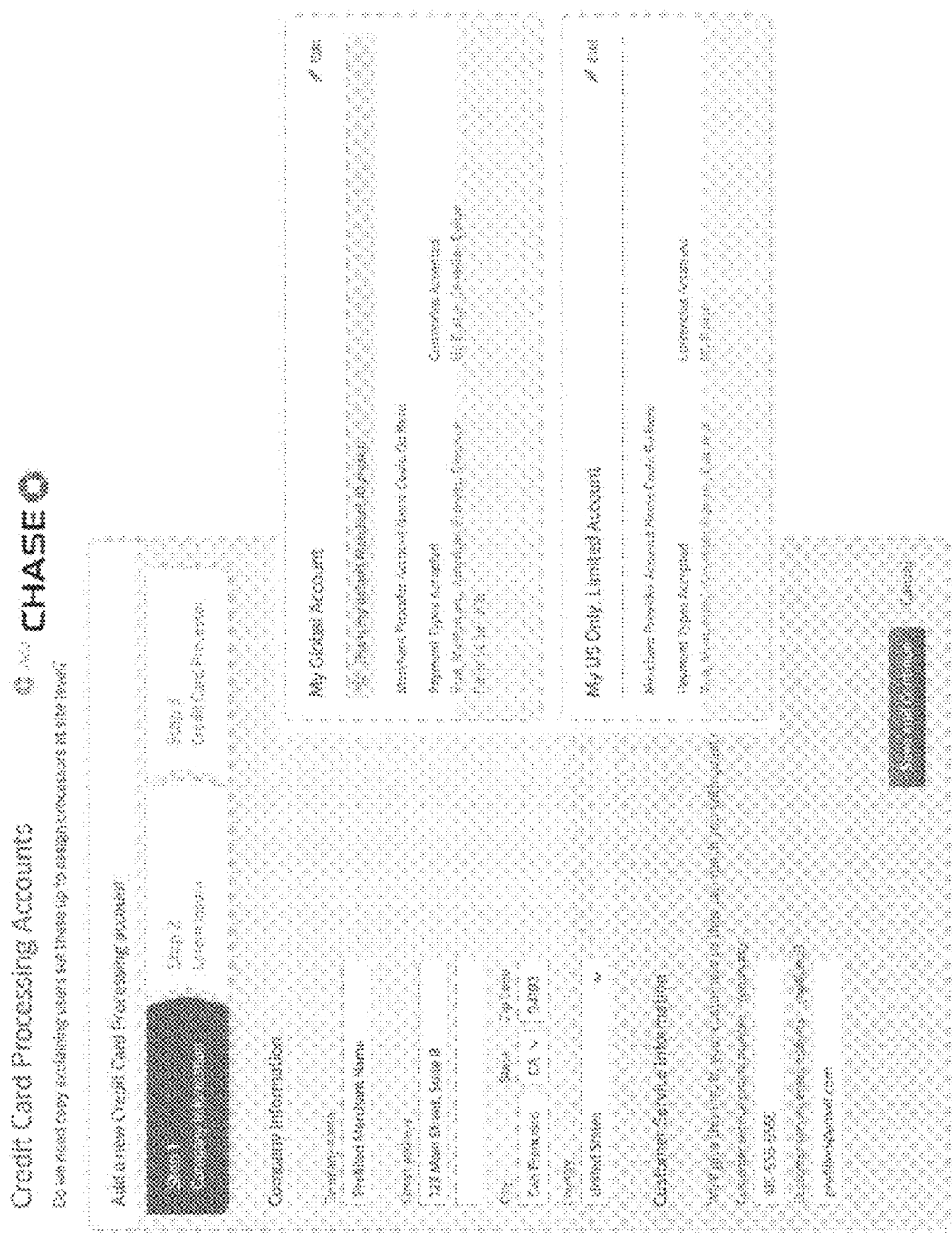
Figure 18B:
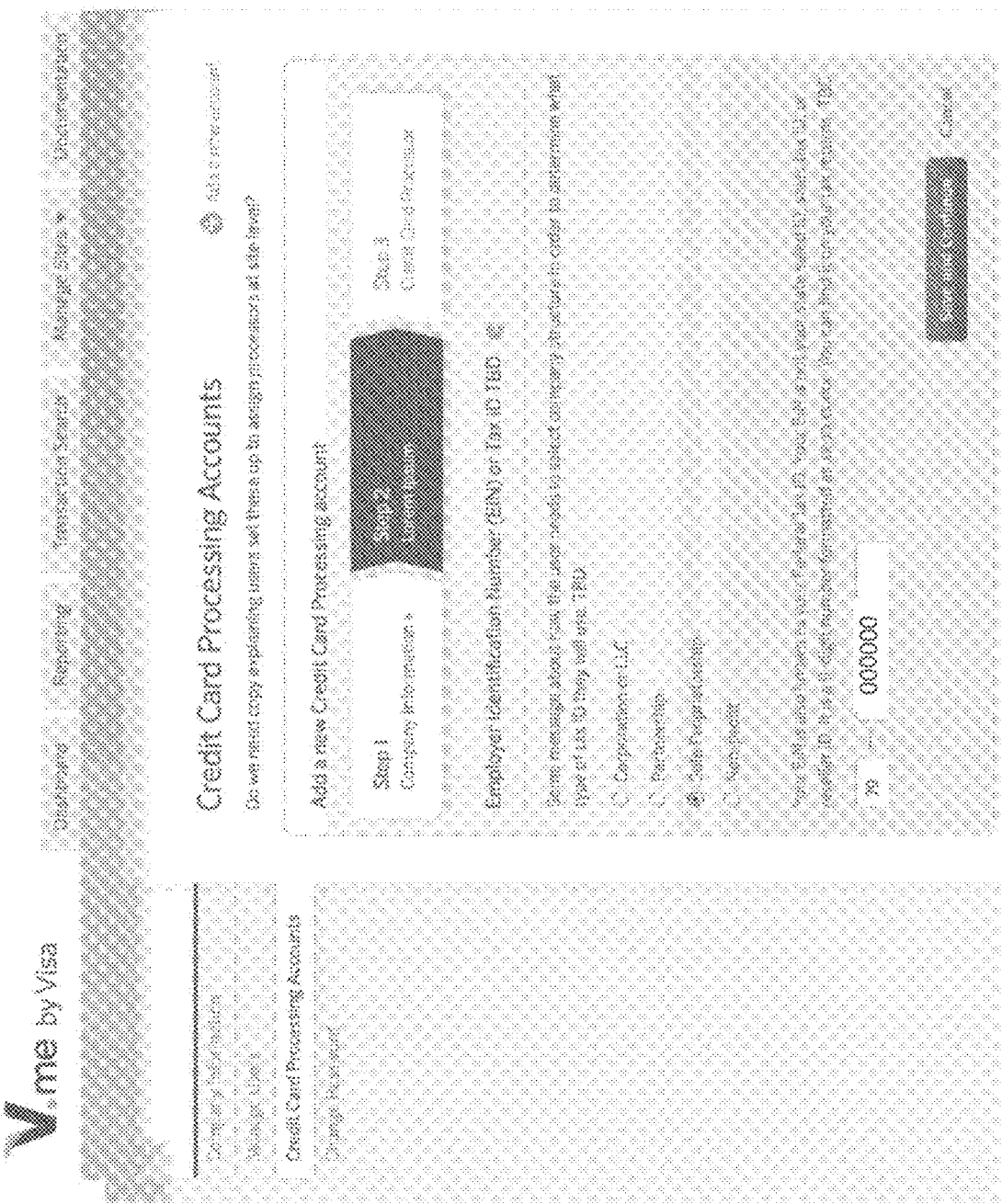
Figure 18C:
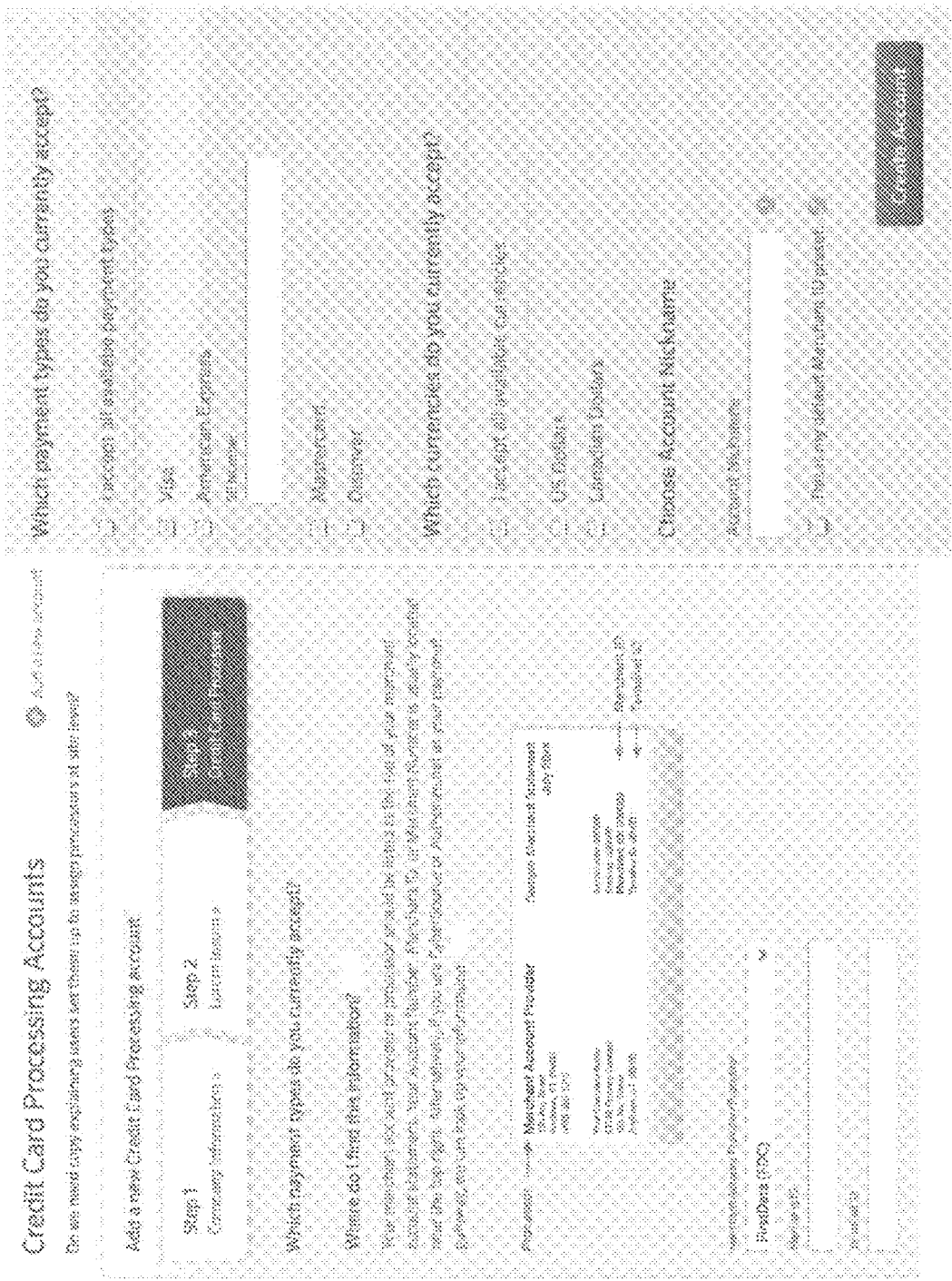
Figure 19A:
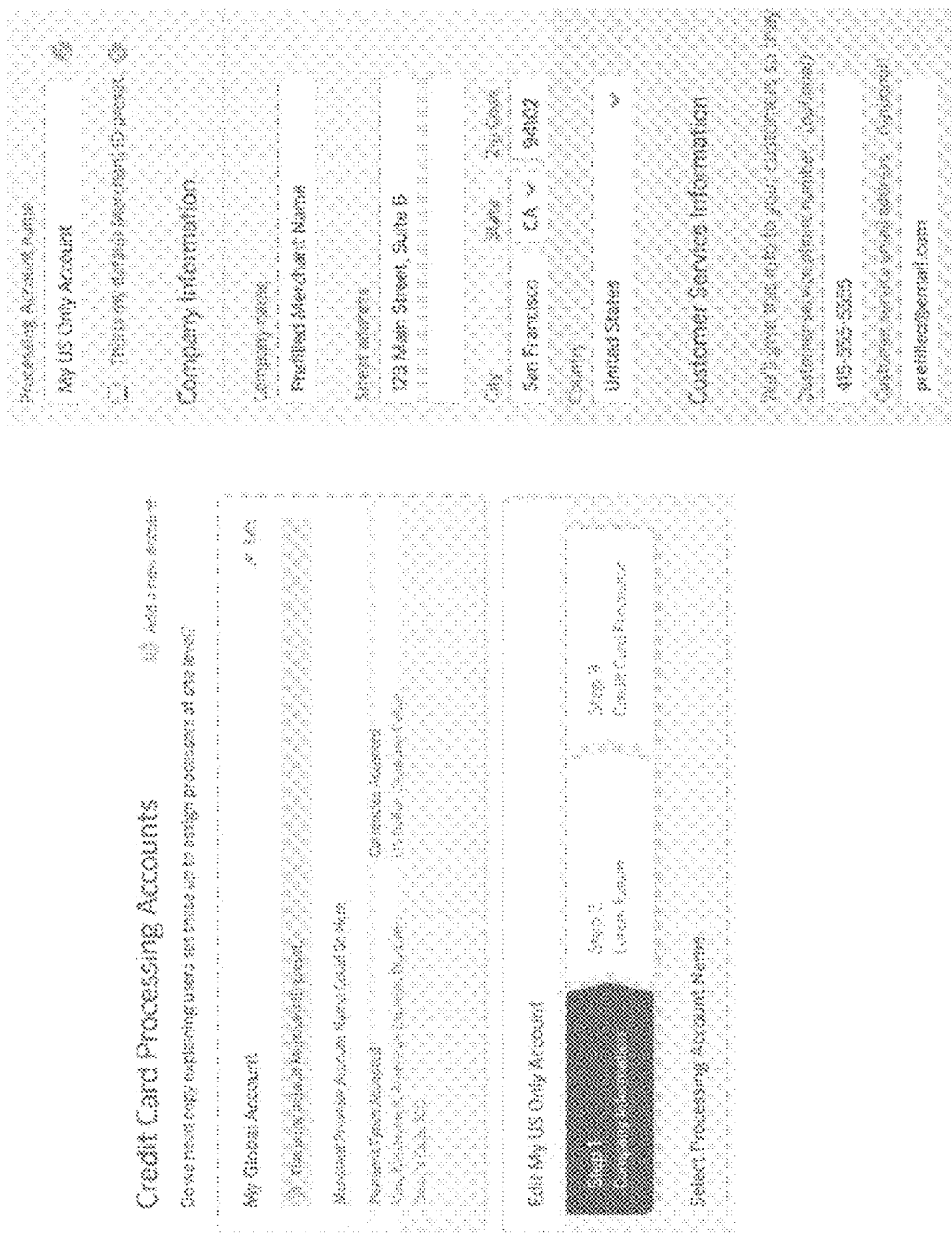
Figure 19B:
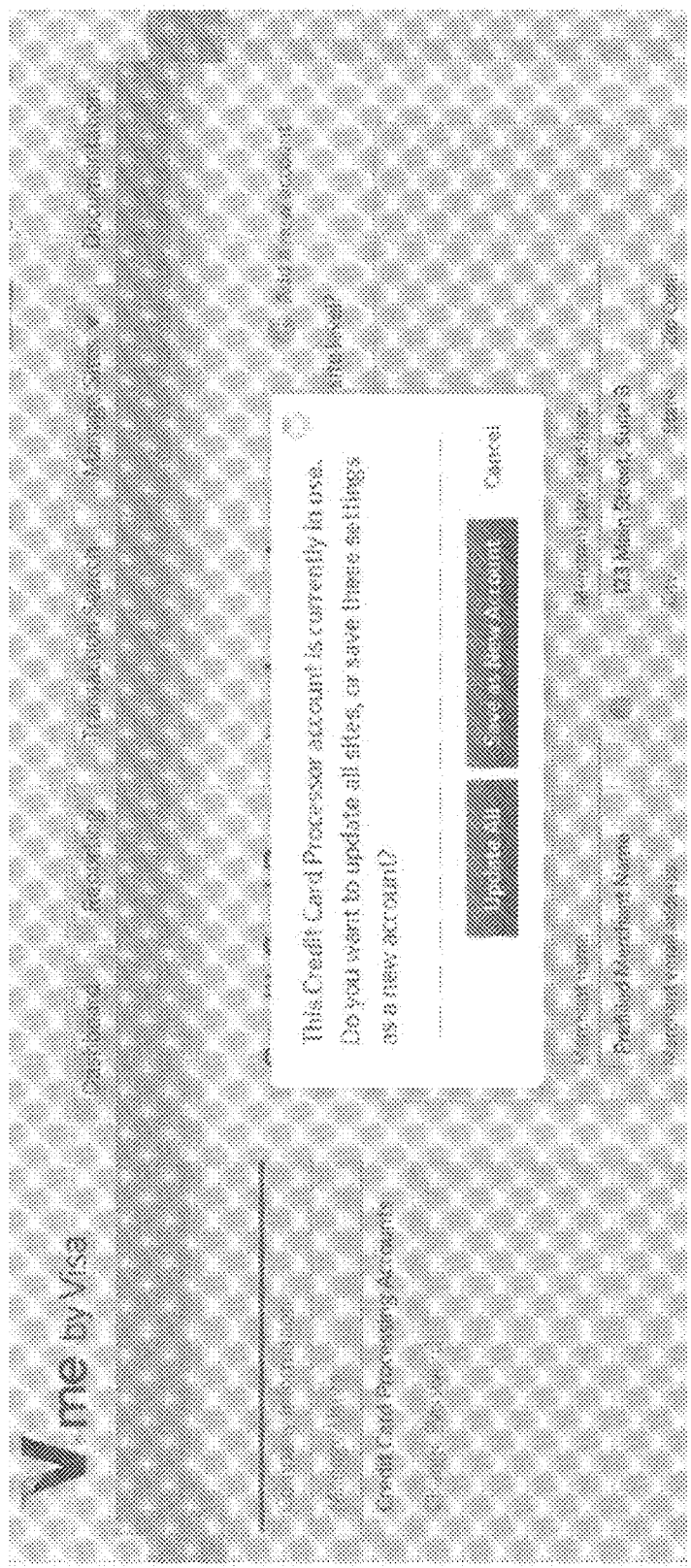

In one implementation, the MID-Platform server may retrieve business rules associated with the payment processor 443, e.g., including but not limited to data fields required, merchant type eligibility (e.g., a payment processor may require a merchant to be a large merchant to be eligible for online payment processing, etc.), and/or the like. In one implementation, the MID-Platform may receive required information fields from the payment processor 444, and automatically generate a payment processed based enrollment form 445 to the merchant. In one implementation, the MID-Platform may encapsulate the business rules from a payment processor required to capture specific bits of information (e.g., merchant business type, company information, etc.), and automatically generate a merchant UI for information input (e.g., see FIG. 18C, etc.).

In one implementation, the merchant payment processor change and/or enrollment may occur in the back-end, while the MID-Platform reconfigures itself on the fly to comply with the merchant-defined processor and settings. In one implementation, the consumer UI (e.g., a "Pay with V.me" checkout lightbox, etc.) may not be affected by the merchant selection of payment processor.

In one implementation, the merchant may obtain the enrollment form 446, and submit requested information requested by the payment processor 447. In further implementations, the merchant may establish preference rules 447 for the payment processor, e.g., the merchant may define a category of transactions via a MID-Platform UI (e.g., see FIG. 10E) may be processed via the payment processor; such category of transaction may be described by the product item category, purchase amount range, SKU range, date, transaction time of the day, location of transaction origins, currency type, and/or the like.

In one implementation, upon receiving merchant submitted information, the MID-Platform may generate an enrollment request to the payment processor 448 for verification. The enrollment request may take a form similar to that described in 215*a*-*b* in FIG. 2, with further information of the preference rules described above.

In one implementation, the payment processor may verify the received merchant information 450, and upon its verification, the MID-Platform may generate a new MID associated with the merchant processing account, and add the MID to the site's List the preference rules 452. The MID-Platform may then update the API key and secret key 453 for the site enrollment (e.g., see 1205*c*-*d* in FIG. 12A), and provide the updated API key and secret key to the merchant via the site enrollment UI (e.g., see FIGS. 10A-10E) 455.

In one implementation, the merchant may establish multiple payment processors with the site, e.g., by applying for another MID for each payment processor selected 456.

Figure 4C:
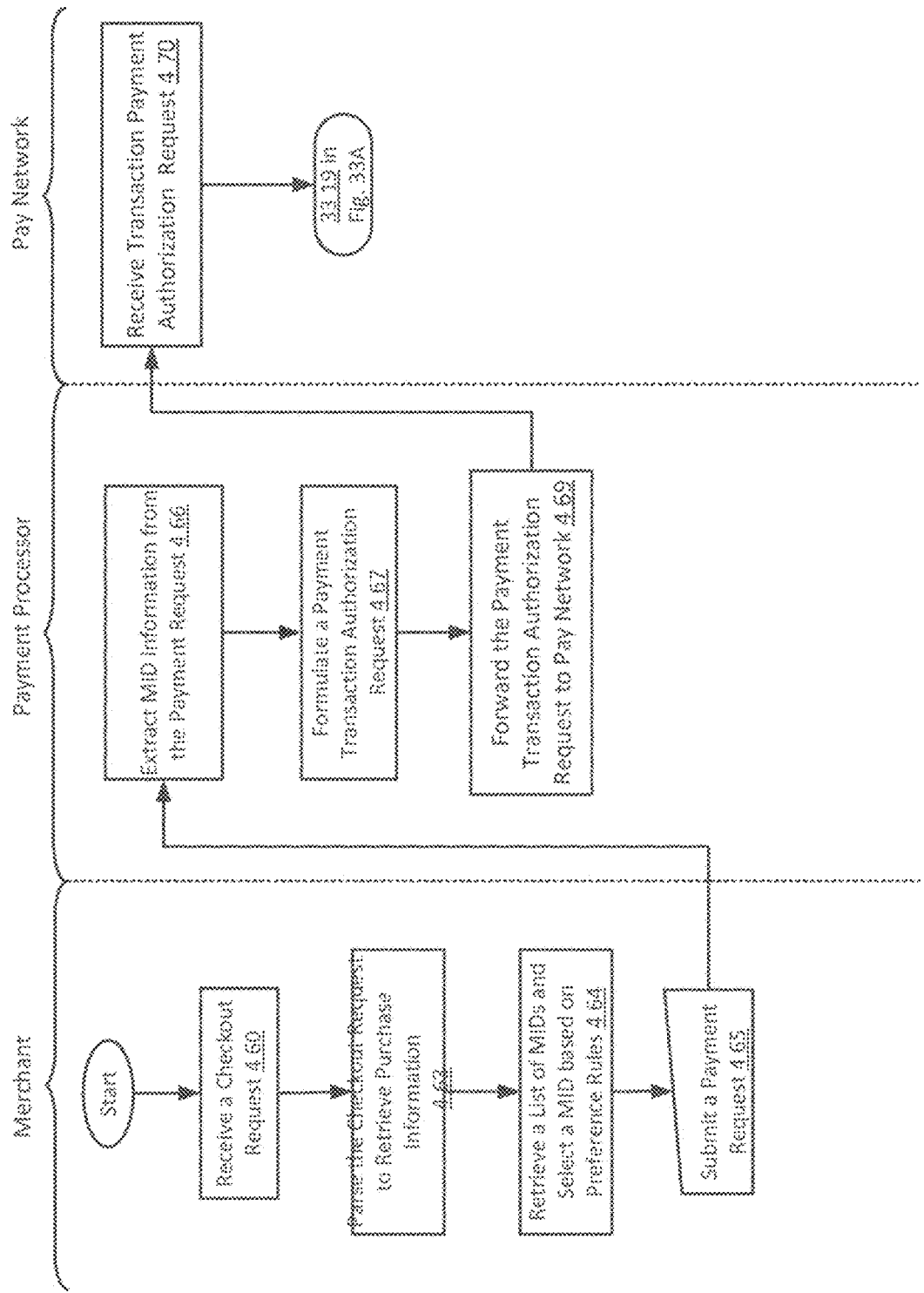

FIG. 4C provides an exemplary logic flow diagram illustrating checkout process with MID selection by the merchant within embodiments of the MID-Platform. In one implementation, the MID-Platform may receive a checkout request 460 (e.g., when a user selects a "Pay with V.me" button at a merchant online shopping site checkout page, see 3113 in FIG. 31, etc.). The merchant may parse the checkout request to retrieve purchase information 463, e.g., the purchase item code, purchase item category, purchase amount, transaction origin, transaction time, and/or the like. In one implementation, the merchant may retrieve a list of enrolled MIDs associated with the shopping site and the preference rules established with each MID. In one implementation, the MID-Platform may automatically select a MID based on the preference rule 464. For example, as discussed at 452 in FIG. 4B, a merchant may have defined a preference rule with the payment processor "Chase" that any transaction using US currency exceeding a total amount of $1000.00 should be sent to "Chase." In this way, if the checkout request uses US currency and has a total amount of more than $1000.00, the merchant may select "Chase" as the payment processor. In one implementation, the payment processor may be selected automatically based on the preference rules the merchant has established during enrollment (and/or a default payment processor). In another implementation, the merchant may select a payment processor via a MID-Platform UI from a list of MIDs.

In one implementation, the merchant may submit a payment request 465 including the MID to the payment processor. The payment processor may extract MID information from the payment request 466, and formulate a payment transaction authorization request (e.g., see 3319 in FIG. 33A, etc.) 467, to forward to the pay network 469. The pay network may receive the transaction authorization request 470, and proceed with PTA processing as discussed in FIGS. 33A-34B.

FIG. 5 provides an exemplary web based UI for a merchant control panel within embodiments of the MID-Platform. As shown in FIG. 5A, a merchant may access a merchant dashboard upon registering with the MID-Platform via a URL address 502. For example, a merchant may access a dashboard page 503 within a browser application, which may provide different applications on different tabs, e.g., loyalty club 504 (e.g., to generate analytics on consumer's loyalty purchases, etc.), campaigns 505 (e.g., for a merchant to set up a campaign, etc.), analytics 506 (e.g., for a merchant to view various campaign analytics data, graphic representations, etc.), and/or the like.

As shown in FIG. 5A, the merchant control panel dashboard may comprise merchant profile information 507, e.g., merchant name, picture, URL, business category, contact phone number, etc. A merchant may elect edit 508 the profile information on the dashboard page.

In one implementation, the merchant may view analytics by selecting analytics target 510, e.g., the number of customers, revenue, number of purchases, etc. Such analytics may be segmented 512 in various ways, such as by zipcode, by product (SKU), by product category, by time, by store, and/or the like. For example, the example pie chart 513 in FIG. 5A illustrates the total revenue of the merchant by product category.

In another implementation, the merchant may elect to view real-time transactions 520, which illustrates to the merchant "who is buying" 522 (e.g., consumer demographics, geographical distribution, etc.), "buying what" 523 (e.g., popular transaction product, etc.).

In another implementation, the merchant dashboard may provide a campaign section for a merchant to click to set a new campaign 516, and/or update a campaign 517. The merchant may view the current campaign performance 518 via a bar chard displayed. Further implementations of the campaign set-up are provided in FIGS. 6B-6D.

In further implementations, the merchant dashboard may provide consumer feedbacks from social platforms 521, e.g., Facebook, Twitter, Amazon, etc., including consumer comments about the product and user ratings, etc.

FIGS. 6A-6F provide exemplary mobile UIs for a merchant control panel within embodiments of the MID-Platform. With reference to FIG. 6A, a merchant, e.g., "Terry Luxury" 605, may operate a mobile device and access a merchant control panel, including general information 606a, loyalty information 606b, campaign 606c tab, and/or the like. In one implementation, when a merchant selects the "performance" option 608, the general information may provide a view of sales performance, e.g., the number of customers over a period of time 608, etc. The merchant may further elect to view "who's buying" 609, which may provide a view of consumer demographics, geographical distribution information, etc.; "buying what" 610, the current sales performance and popular products, etc.; offering 611 and campaign updates 612.

For example, in one implementation, if the merchant tap on the option "Buying What" 610, the MID-Platform may provide a product chart 615, which shows various products that are currently being purchased. For example, the MID-Platform may list products based on its popularity with the most popular product listed on the top, e.g., "Clarins Rose Bud Oil" which has 581 purchases of the day 616, and a performance curve showing the sales curve of the month 618, etc. In one implementation, for every product tab, a merchant may click to expand 619 for more analytics options, e.g., for the product "La Mer Facial Cleanser," the merchant may elect to see the performance analytics for "all La Mer products" 621, "view by customer" (e.g., demographic/geographic statistics, etc.) 622, store distribution 623, and/or the like.

With reference to FIG. 6B, if a merchant selects to view by store (e.g., expand on 623 in FIG. 6A), the merchant may see a page "Terry Luxury by Store" 625, which lists a list of retail stores 630a-c of the merchant brand "Terry Luxury." In one implementation, a listed retail store may be expanded to show several options, e.g., to view performance of a specific brand product ("La Mer" products 631a), view all products under one category (e.g., all facial products) 631b, view a specific product of a specific brand (e.g., La Mer facial cleanser, etc.) 631c, and/or the like.

For example, if a merchant elects to expand the specific product 631c, a sales performance curve may be provided to show the number of purchase over a period of time 632.

In another implementation, if a merchant selects to view by customer (e.g., expand on 622 in FIG. 6A) and/or the "who's buying" 609 option in FIG. 6A, the merchant may see a page "Terry Luxury by customers" 625, which lists the purchasing statistics of existing customers of the merchant 636 and new customers 639.

For example, if the merchant expands on the existing customers panel 636, the merchant may further view a taxonomy of the customers as new to a specific brand (e.g., existing "Terry Luxury" customers but first time "La Mer" buyers, etc.) 637a, returning customer of a specific brand 637b, etc. A performance sales curve may be provided 638 to show the number of purchases made by returning La Mer customers if the merchant taps on the panel 637b.

In another implementation, for new customers to the merchant "Terry Luxury," customers may be grouped as new to both the merchant store and a specific brand 640a, returning customer of a specific brand (e.g., customers new to "Terry Luxury" but have purchased "La Mer" products elsewhere, etc.) 640b, etc. Similar performance curves as 638 may be provided once the merchant taps on the panel.

With reference to FIG. 6C, a merchant may select a "Campaign" tab 642 on the merchant control panel to set up a product campaign. For example, the campaign panel may allow a merchant to configure the featured products of the campaign 643. In one implementation, a merchant may tap on the "feature product" panel 643 to expand to view a list of product categories, such as, but not limited to cosmetics 645a, skin care 645b, perfume 645c, and/or the like. For each product category, the merchant may tap to expand to configure sub-categories. For example, under the product category "skin care" 645b, the merchant may tap to view a sub-list of products 646a-f, and the merchant may slide the "on/off" button to determine whether to include such products into the campaign.

In another implementation, the campaign panel may allow a merchant to configure the campaign type 650. For example, the campaign may have various types of offers to the consumers, such as loyalty punch card 651a (e.g., a consumer may obtain discount once he/she has purchased a count of units, etc.; see 651a in FIG. 6D), pre-purchase discount (e.g., the consumer may enjoy a discount for the first purchase, etc.; see 651b in FIG. 6D) 651b, geographical/store based discount 651c, offers for existing customers 651d (e.g., see 651c in FIG. 6E), customized packages 651e to targeted consumers (e.g., consumers whose purchasing records show an interest into beauty products, etc.; see 651e in FIG. 6E), units for the campaign 651f (e.g., see 651f in FIG. 6D), campaign time duration 651g (e.g., see 651g in FIG. 6D), and other parameters 651h. In another implementation, the merchant may tap on the campaign goal option 652 to expand a panel for objective parameter configuration, e.g., see 682 in FIG. 6F.

With reference to FIG. 6D, at 651a, a merchant may expand a loyalty punch card panel to set the discount percentage 652a and punch units 652b with sliding bars 652a-b. In one implementation, the merchant panel may display a summary of the offer, e.g., "an additional 25% discount off your next purchase for every 6 La Mer products you purchased," to reflect the parameters a merchant has configured. In one implementation, a merchant may select to save the card 652d, and/or to start a new loyalty punch card offer 652e.

At 651b, a merchant may expand a pre-purchase discount panel to set the discount percentage 653a and purchasing units 653b with sliding bars 653a-b. In one implementation, the merchant panel may display a summary of the offer, e.g., "an additional 25% discount off your entire purchase if you purchase 16 or more La Mer products," to reflect the pre-purchase offer parameters a merchant has configured. In one implementation, a merchant may select to save the offer 653d, and/or to start a new offer 653e.

At 651f, a merchant may expand a units panel to set the performance metrics such as units to be sold 654a, profit margin 654b, revenue per visit 654c via sliding bars 654a-c. In one implementation, a merchant may select to save the units configuration 654d, and/or to continue with more parameters 654e. More campaign objective parameters are illustrated at 683a-g in FIG. 6F.

At 651g, a merchant may expand a time configuration panel to set the campaign duration 655a, offer waiting period for first-time consumers 655b (e.g., a new consumer may enjoy a discount a period of time after his first purchase, etc.), and waiting period for returning consumers 655c with sliding bars 655a-c. In one implementation, a merchant may select to save the time configuration 655d, and/or to start a new setting 655e.

It is worth noting that, in one implementation, a merchant may manually set the parameters throughout FIGS. 6A-6F upon the merchant's preference. In another implementation, the MID-Platform may generate a recommended value for parameter setting as a default value based on heuristics. In further implementations, a merchant may set campaign objective parameters at the units panel at 651f, and the MID-Platform may generate recommended parameters as default values. For example, if the merchant has entered an objective of profit margin "11.2%" at 654b and revenue per visit at $134.50 654c, and the merchant taps on a "Pre-Purchase Discount" panel, the MID-Platform may return suggested discount rate of "25%" for every "16 La Mer products" as default parameters.

With reference to FIG. 6E, at 651c, a merchant may expand a geography configuration panel to set the campaign store location. For example, the merchant may check to select a specific store location 661a from a drop-down list, may select all stores within a state 661b, may select all stores within a zipcode range 661c, and/or may add all stores in several states 661d by click on a state distribution map 661e, e.g., the selected states may appear in red circles to reflect selecting southern states, etc.

At 651e, a merchant may expand a customized package panel to set the target consumers. For example, the merchant may select target customers 665a as who are interested in a list of product categories (e.g., as the consumers have purchased such products before, etc.). The merchant may also group consumers who are interested in the specific brand "La Mer" 666a (e.g., who has purchased La Mer products before), and/or consumers who are interested in similar brands 666b. The merchant may further define the heuristics of consumer interests based on a purchase frequency 667a and/or the consumer's maximum one-time purchase value 667b via sliding bars 667a-b.

Figure 6F:
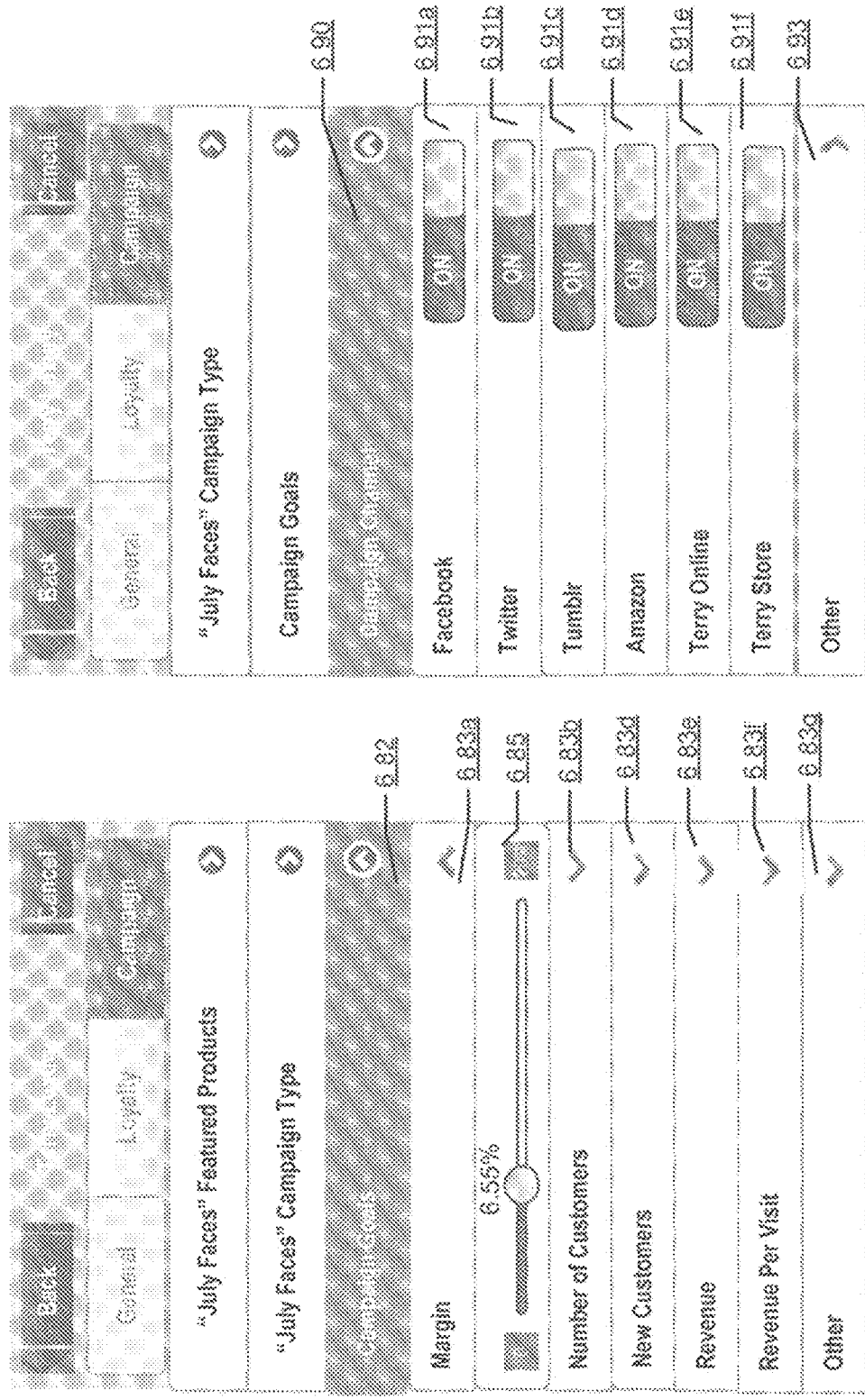

With reference to FIG. 6F, back to the campaign panel, if the merchant expands the campaign goals section 682, the merchant may configure various campaign goal parameters, such as, but not limited to profit margin 683a, number of customers 683b, number of new customers 683d, revenue 683e, revenue per visit 683f, and other 683g. In one implementation, the merchant may set each of the listed goal parameters via a sliding bar 685.

In further implementations, the merchant may configure campaign/ad channels for the campaign 690. For example, the merchant may select a list of available online channels, such as social media platforms 691a-c, shopping sites (e.g., Amazon.com 691d), merchant's own site 691e, merchant stores 691f, and other channels 693. The merchant may expand the "other" section 693 to enter a customized ad channel, e.g., the URL of a new website, a personal blog, group email address, etc.

FIGS. 7A-7C provide exemplary merchant control panel UIs illustrating aspects of MID-Platform merchant control dashboard within embodiments of the MID-Platform. As shown in FIG. 7A, a merchant may access the dashboard site to create a merchant shopping site 710 upon registration. In another implementation, a merchant may view sales performance over a period of time, e.g., number of transactions (e.g., see FIG. 7B), number of return transactions by state (e.g., see FIG. 7C), etc. In one implementation, the MID-Platform may generate heuristics to flag a state that has the highest market share, e.g., see 710/715 in FIGS. 7B-C.

Figure 8A:
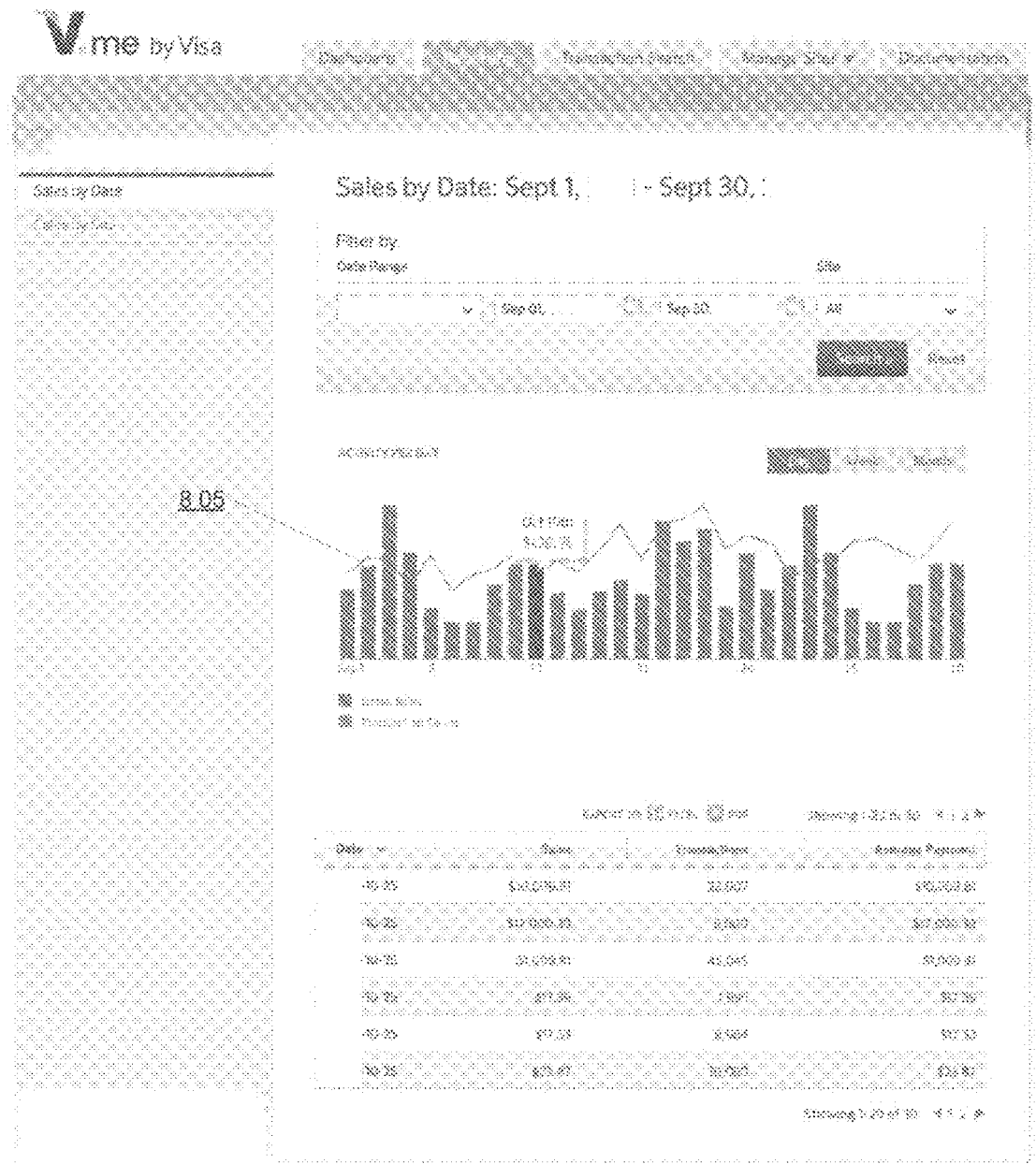
Figure 8B:
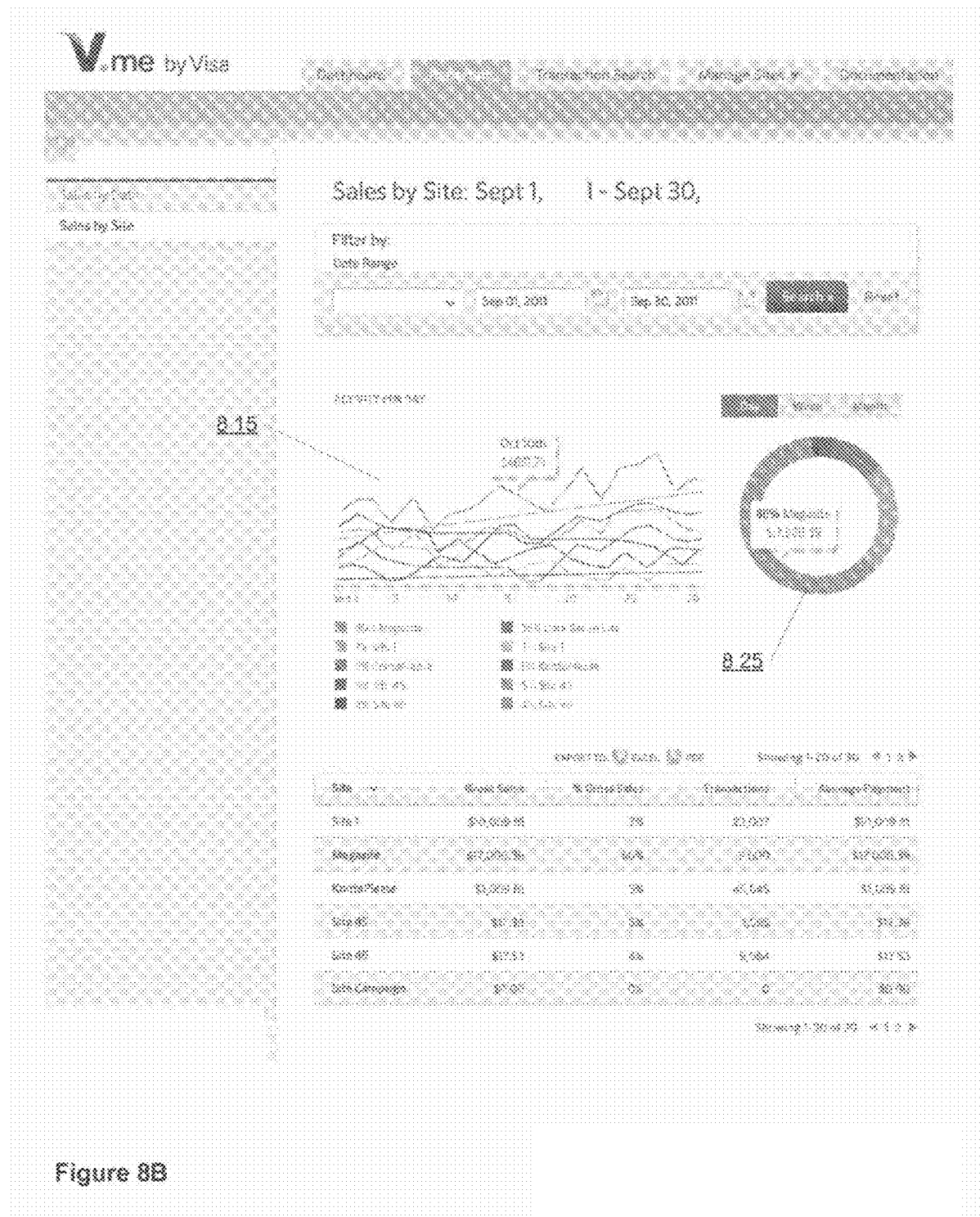

FIGS. 8A-8B provide exemplary merchant control panel UIs illustrating aspects of MID-Platform reporting statistics within embodiments of the MID-Platform. Within implementations, a merchant may elect to generate sales data within a selected period of time, e.g., activity per day 805. In another implementation, as shown in FIG. 8B, a merchant may select to view sales data performance of different category, e.g., an aggregated performance curves of different merchant sites 815, and a pie chart distribution 825, and/or the like. In one implementation, the MID-Platform may generate heuristics, e.g., to flag a site that has the highest sales share, e.g., see 825.

Figure 9A:
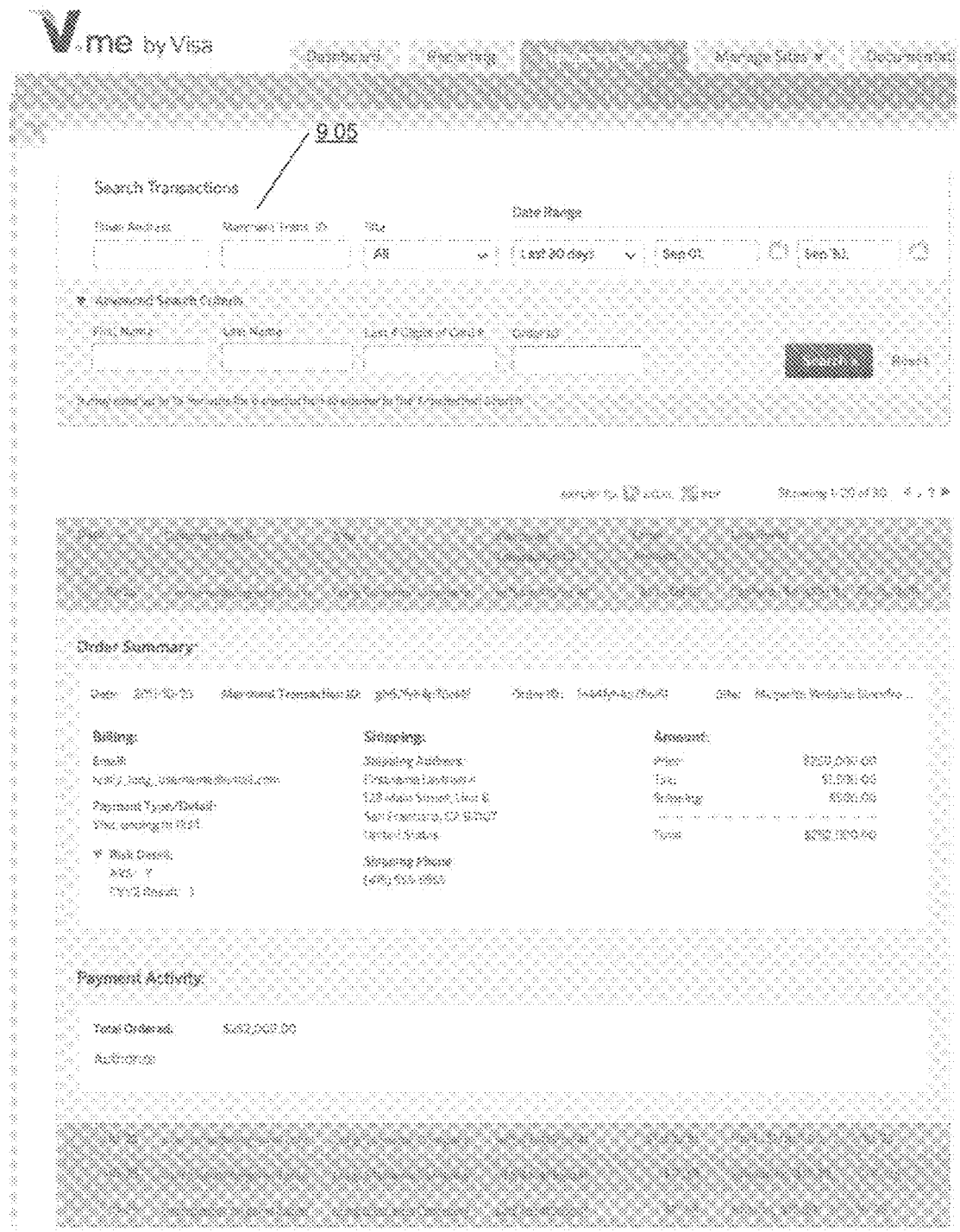
Figure 9B:
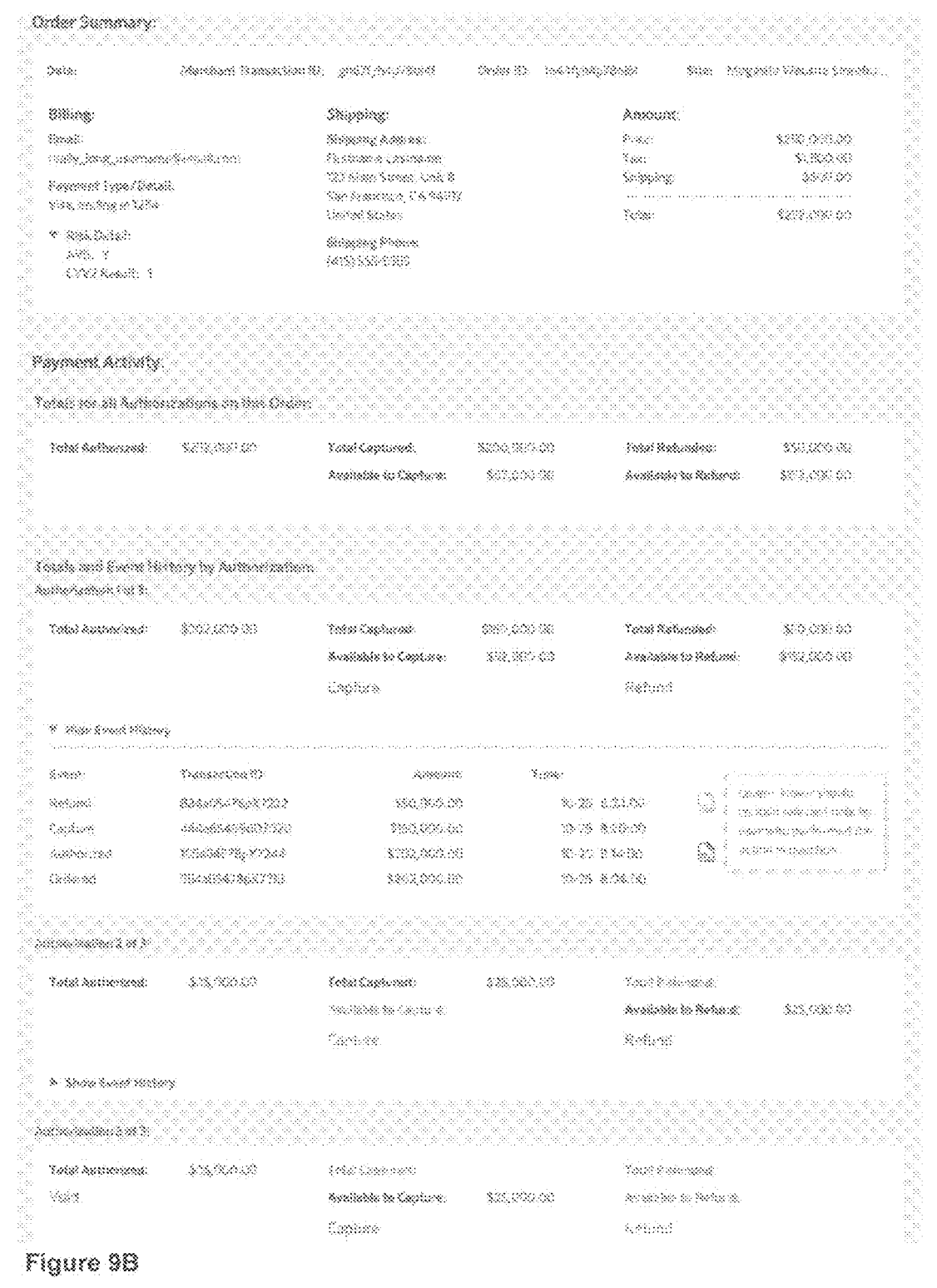
Figure 9C:
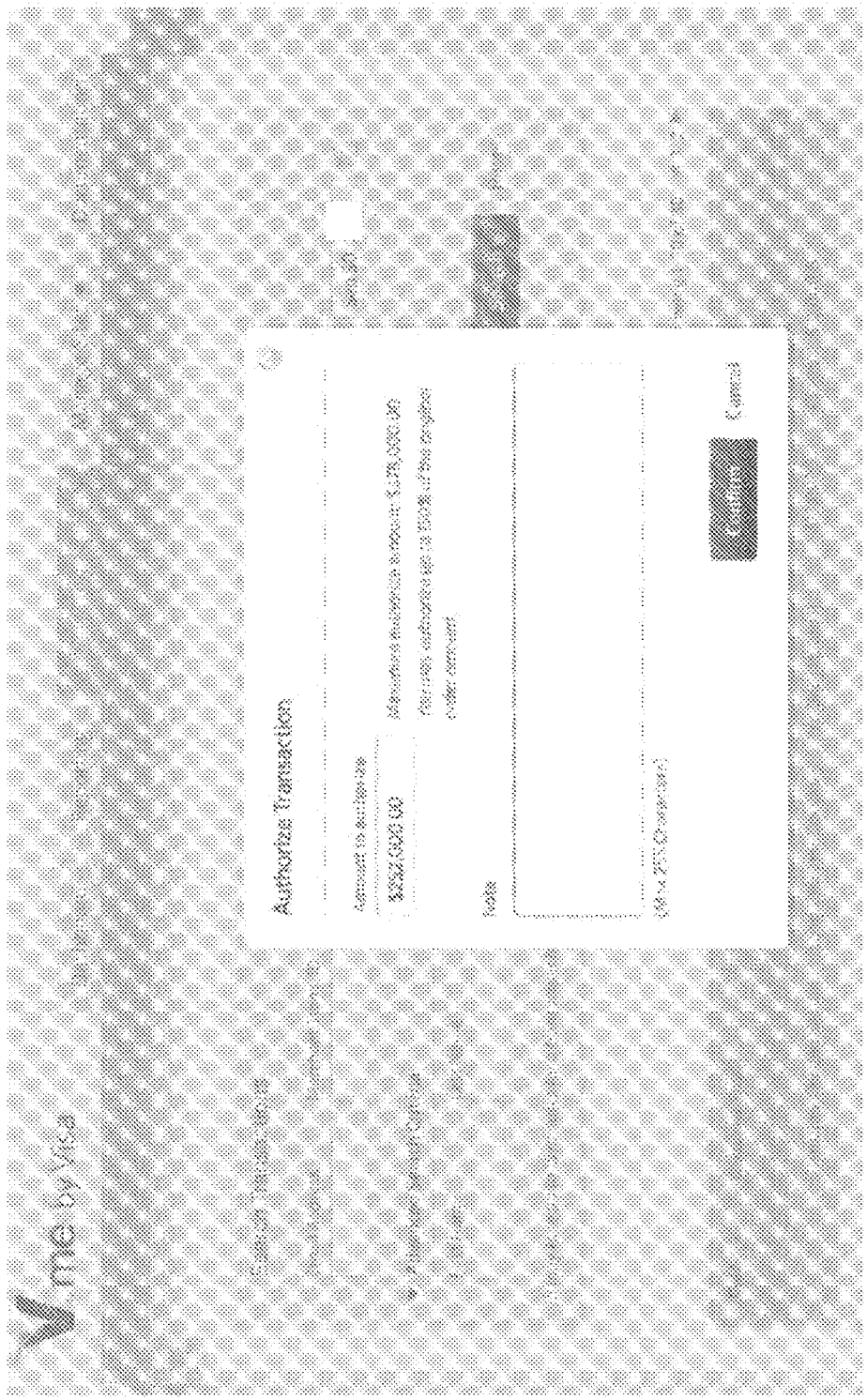
Figure 9D:
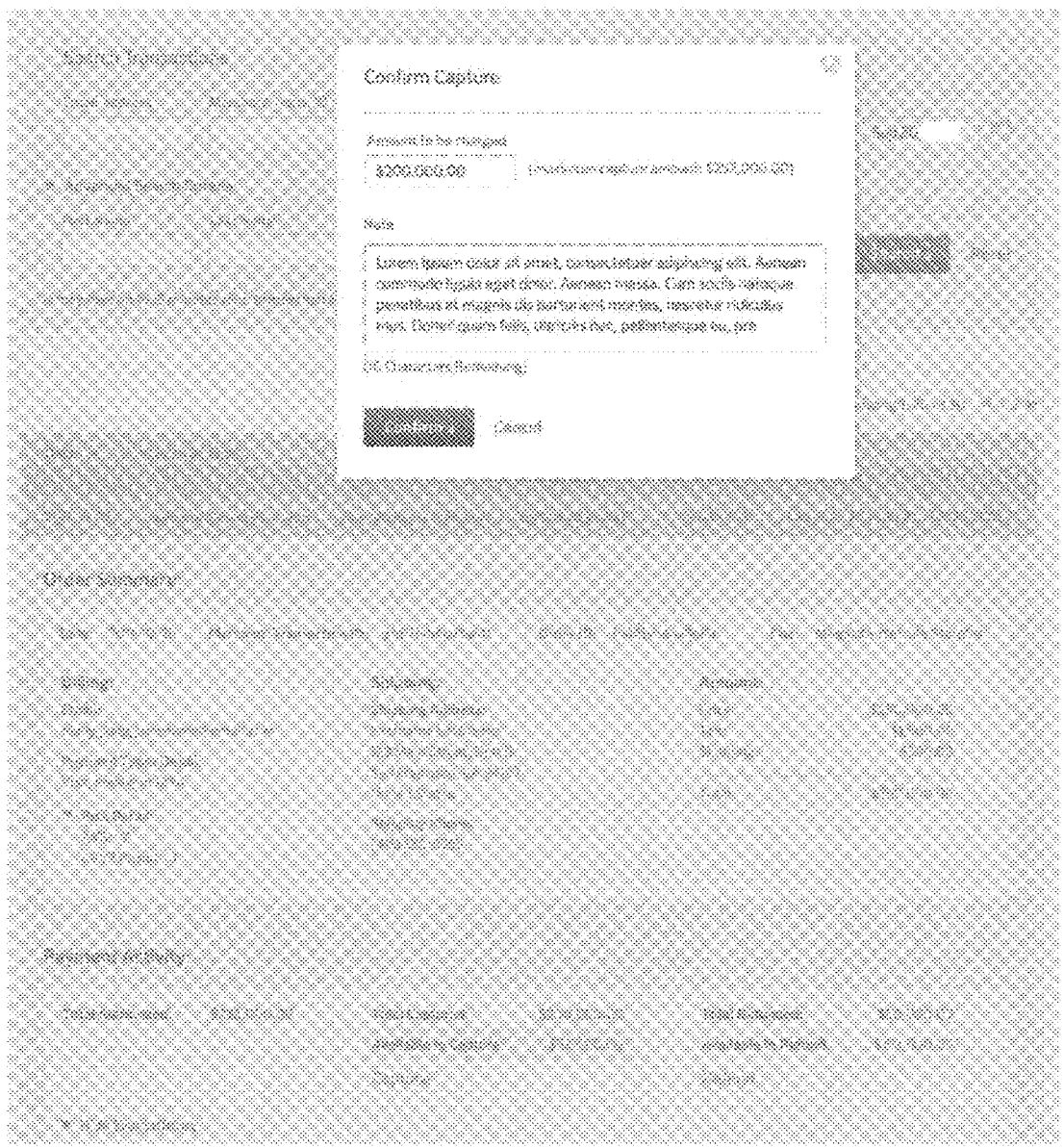
Figure 9E:
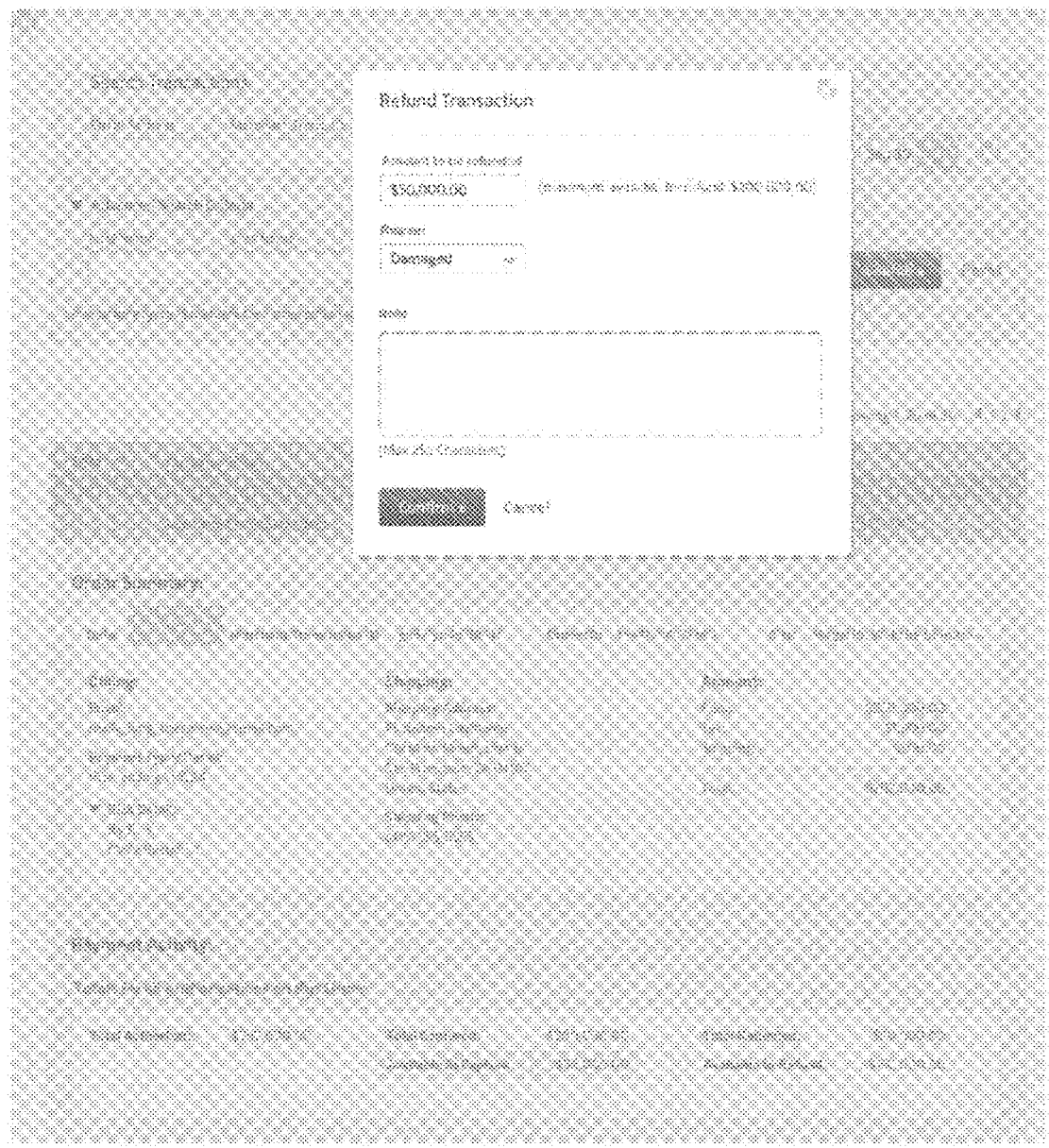
Figure 9F:
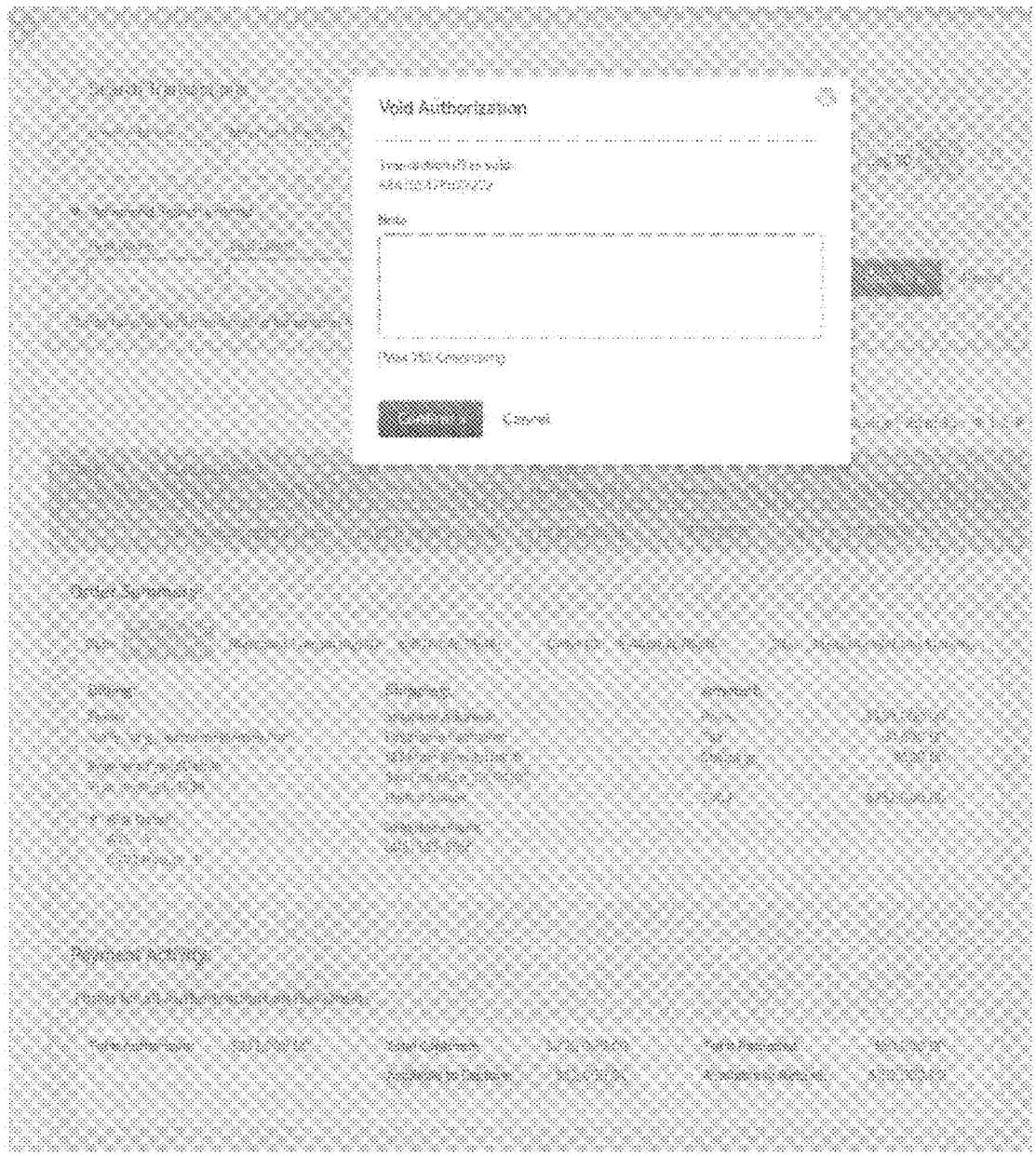

FIGS. 9A-9H provide exemplary merchant control panel UIs illustrating aspects of MID-Platform merchant transaction search within embodiments of the MID-Platform. Within implementations, a merchant may enter search criteria to search a transaction within a period of time, e.g., 905 at FIG. 9A. In further implementations, a merchant may view multiple search results that list the transaction details of transactions satisfying the search criteria, as shown in FIG. 9B. In further implementations, a merchant may authorize a pending transaction, as shown in FIG. 9C. In another implementation, a merchant may authorize a pending transaction, as shown in FIG. 9C. In further implementations, a merchant may confirm a transaction, as shown in FIG. 9D. In further implementations, a merchant may authorize a refund request, as shown in FIG. 9E. In further implementations, a merchant may void a pending transaction upon validating a refund, as shown in FIG. 9F.

Figure 9G:
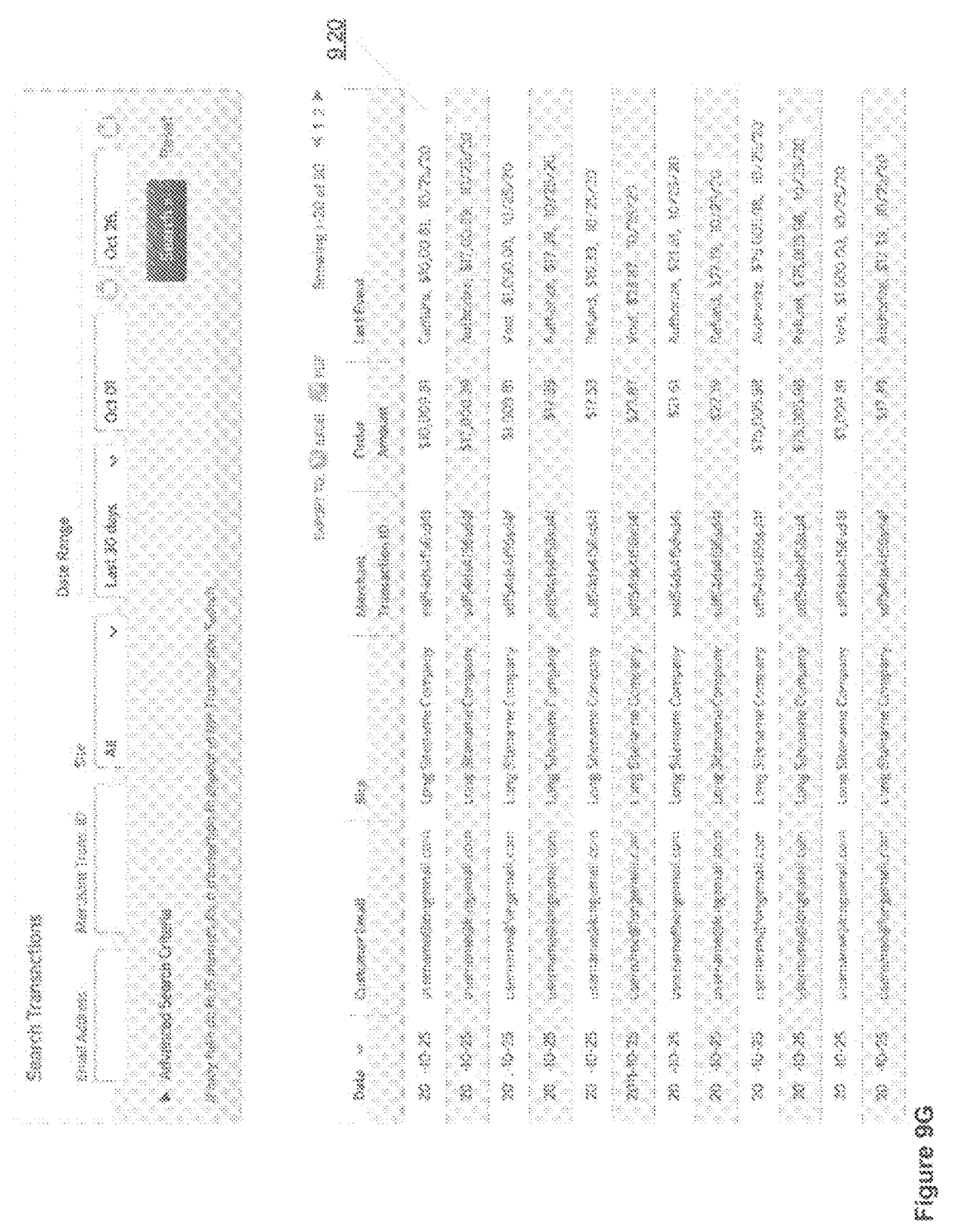
Figure 9H:
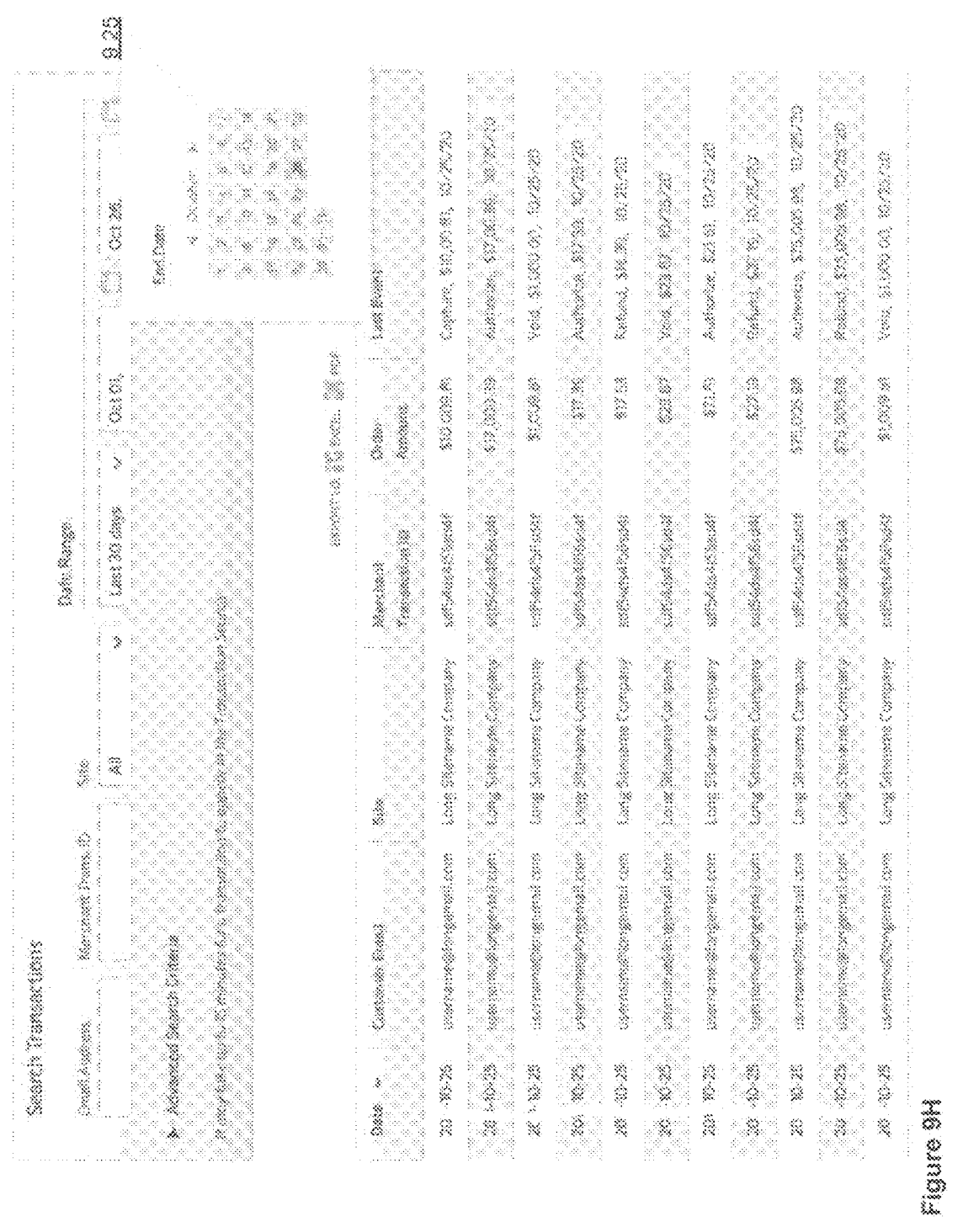

In further implementations, the MID-Platform may update a list of transactions, showing the merchant's latest edits of the transactions (e.g., to authorize, to capture, to allow refund, etc.), as shown at 920 in FIG. 9G. In further implementations, a merchant may edit the date range for transaction searches, as shown at 925 in FIG. 9H.

FIGS. 10A-10E provide exemplary merchant control panel UIs for payment processor enrollment illustrating aspects of MID-Platform merchant managing a shopping site within embodiments of the MID-Platform. In one implementation, a merchant may create a shopping site via MID-Platform upon registration, e.g., see 1005 in FIG. 10A. For example, in one implementation, a merchant may create a list of merchant sites 1008*a-b* by establishing a variety of parameters for integration with a MCP sandbox environment, e.g., see FIG. 10B-C.

As shown in FIG. 10B, a merchant may view a list of sites 1008*a-b* created for the merchant, each associated with information such as but not limited to site URL, merchant account provider, payment types accepted, sites description, currency accepted, and/or the like. In one implementation, a merchant may add more than one merchant account provider for one site 1009.

Figure 10A:
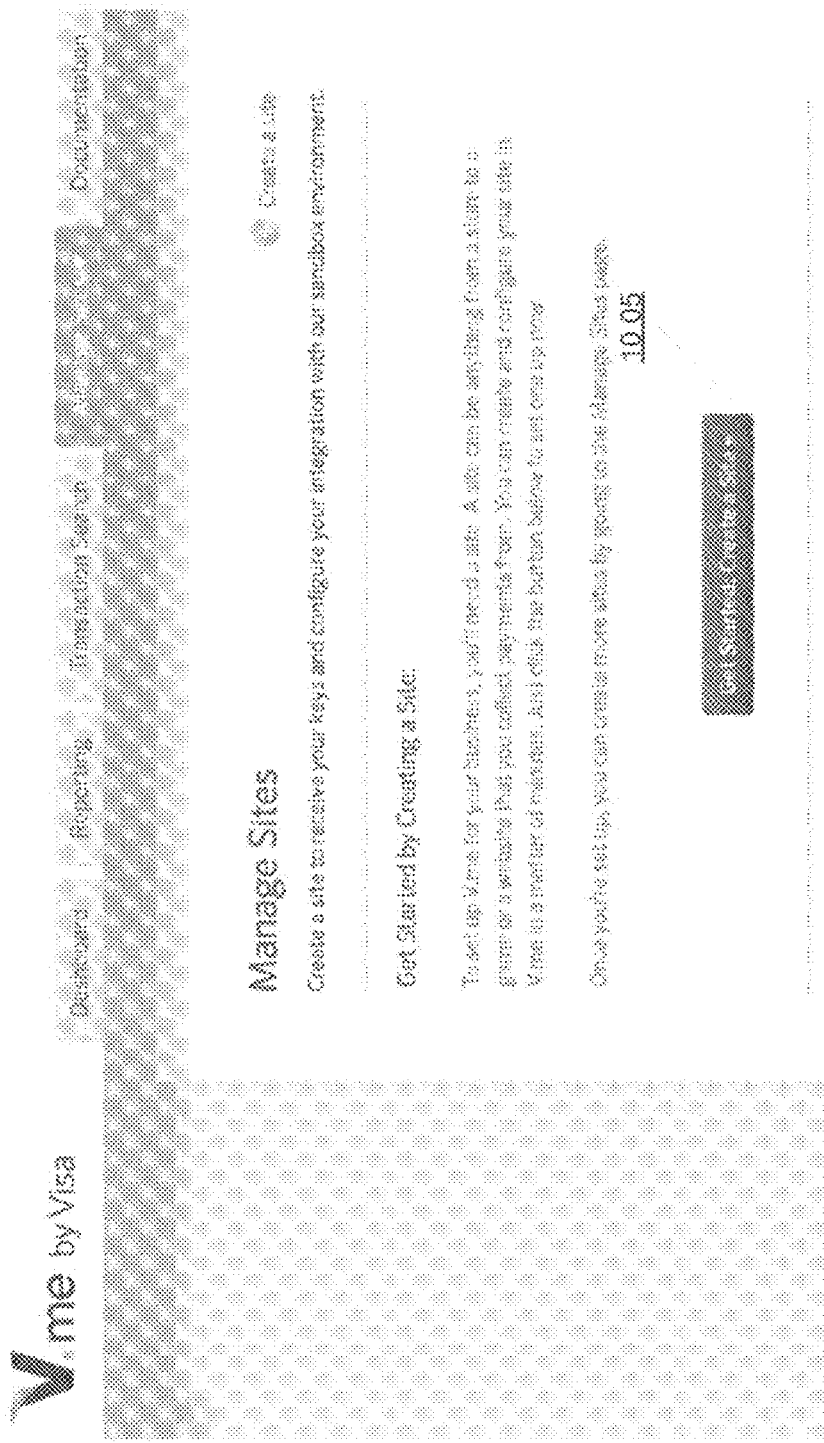
Figure 10B:
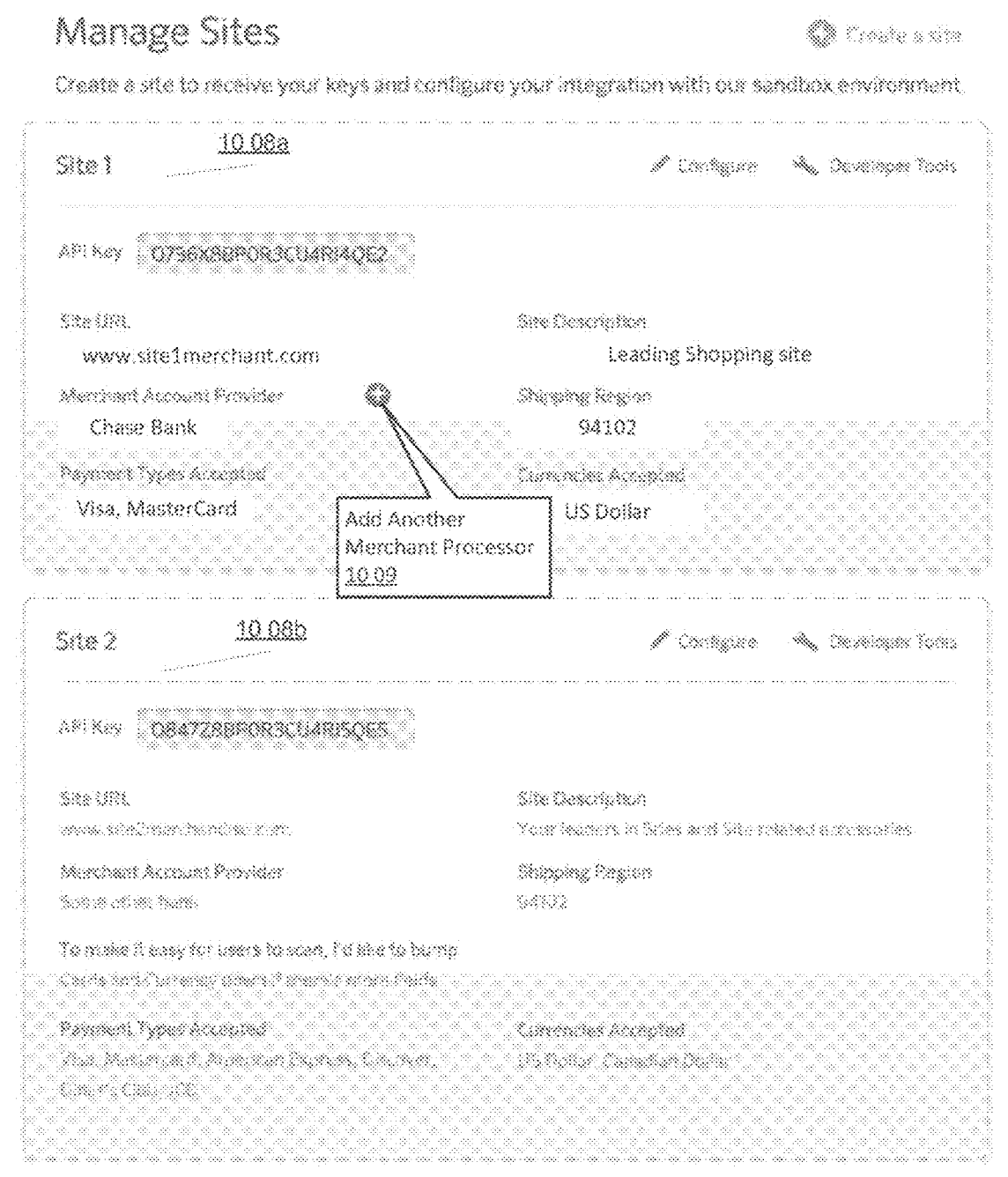
Figure 10C:
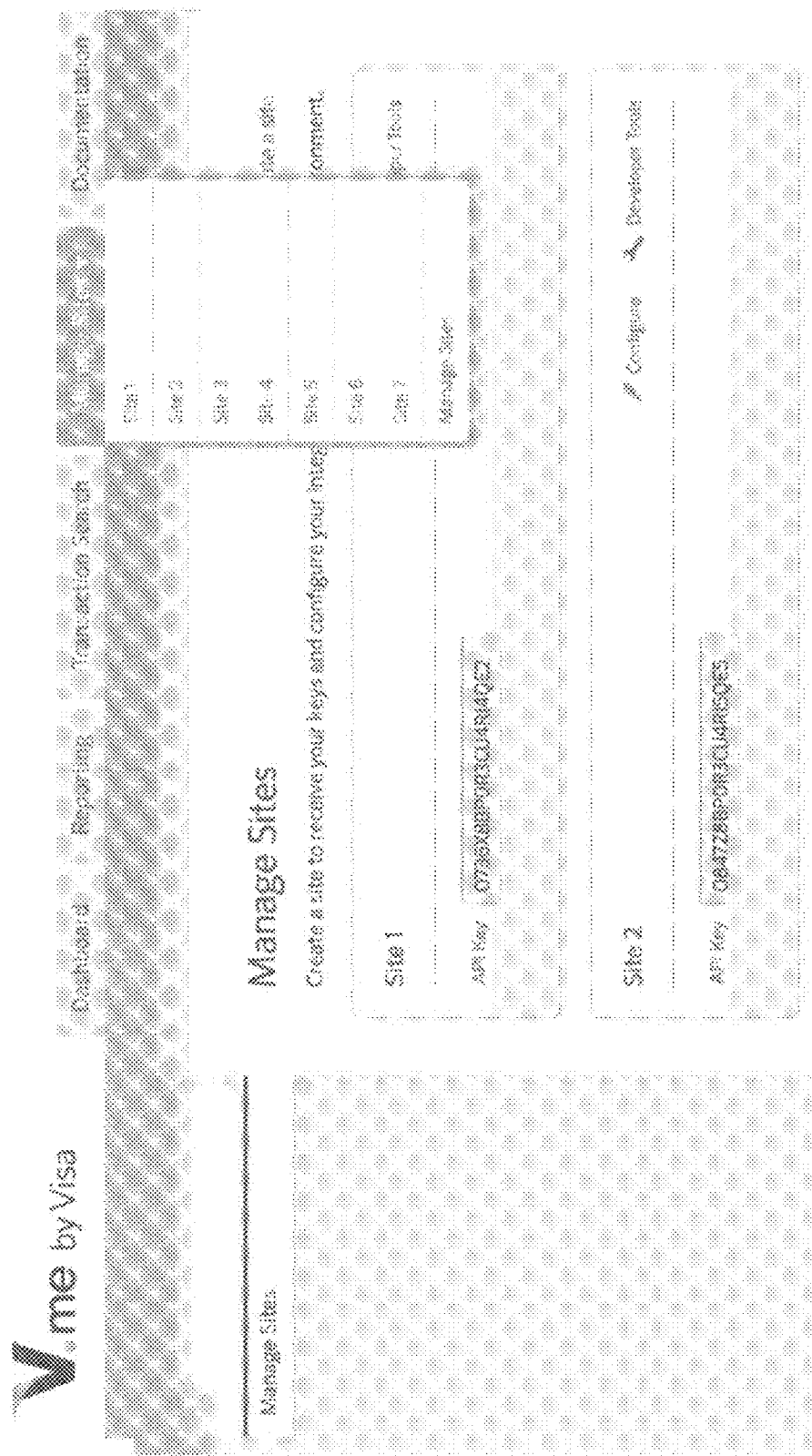
Figure 10D:
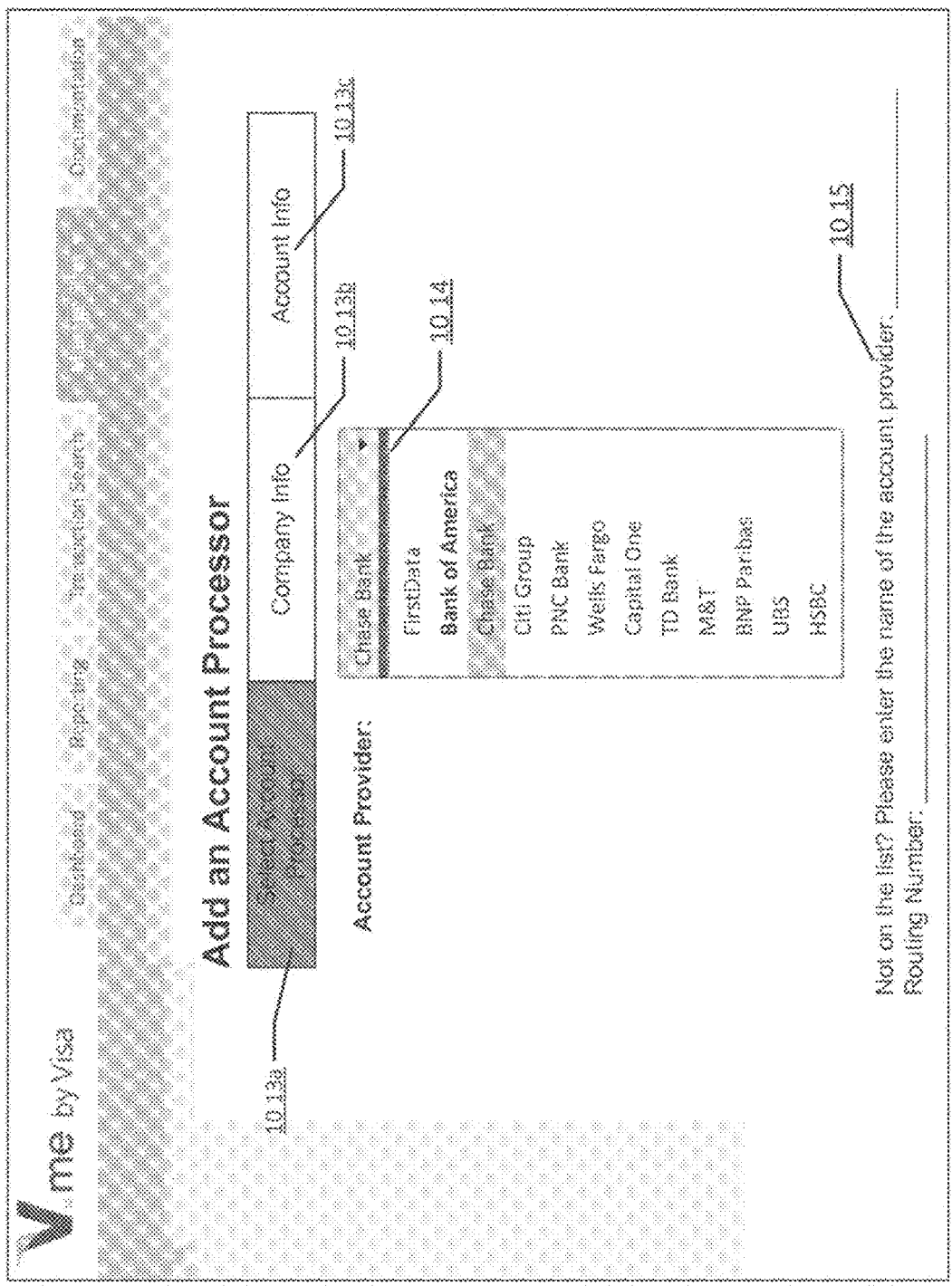

Continuing on with FIG. 10D, upon a merchant selecting to add account processor, the merchant may obtain a MID-Platform page for adding an account processor, e.g., to select account processor 1013*a*, provide company information 1013*b*, and account information 1013*c*. In one implementation, the merchant may select from a list of account providers 1014, and/or enter a routing number of an account provider to manually find an account provider not on the list 1015. In one implementation, the MID-Platform may automatically load a page comprising information fields required by the payment processor, e.g., see FIG. 18A, registration form required by "Chase." Further aspects of account provider enrollment are discussed in FIGS. 18A-20B

Figure 10E:
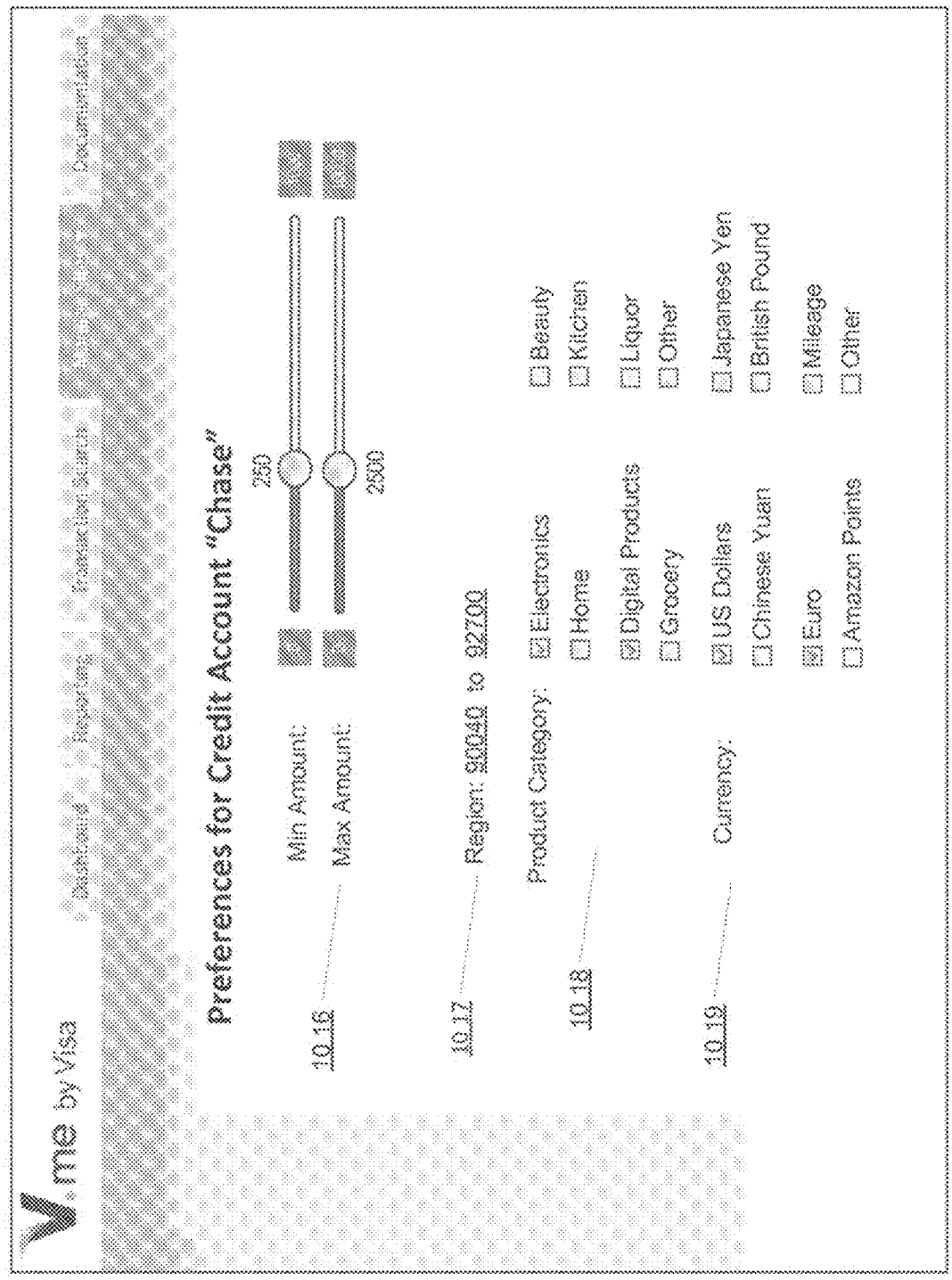

Continuing on with FIG. 10E, a merchant may configure preference rules for the payment processor. For example, for a payment processor "Chase," the merchant may configure the preferred amount range 1016, region of transaction origins 1017 (e.g., a zipcode range, etc.), product categories 1018, accepted currencies 1019, and/or the like. Such preference rules may be used to determine which payment processor to use based on a received user checkout request.

Figure 38:
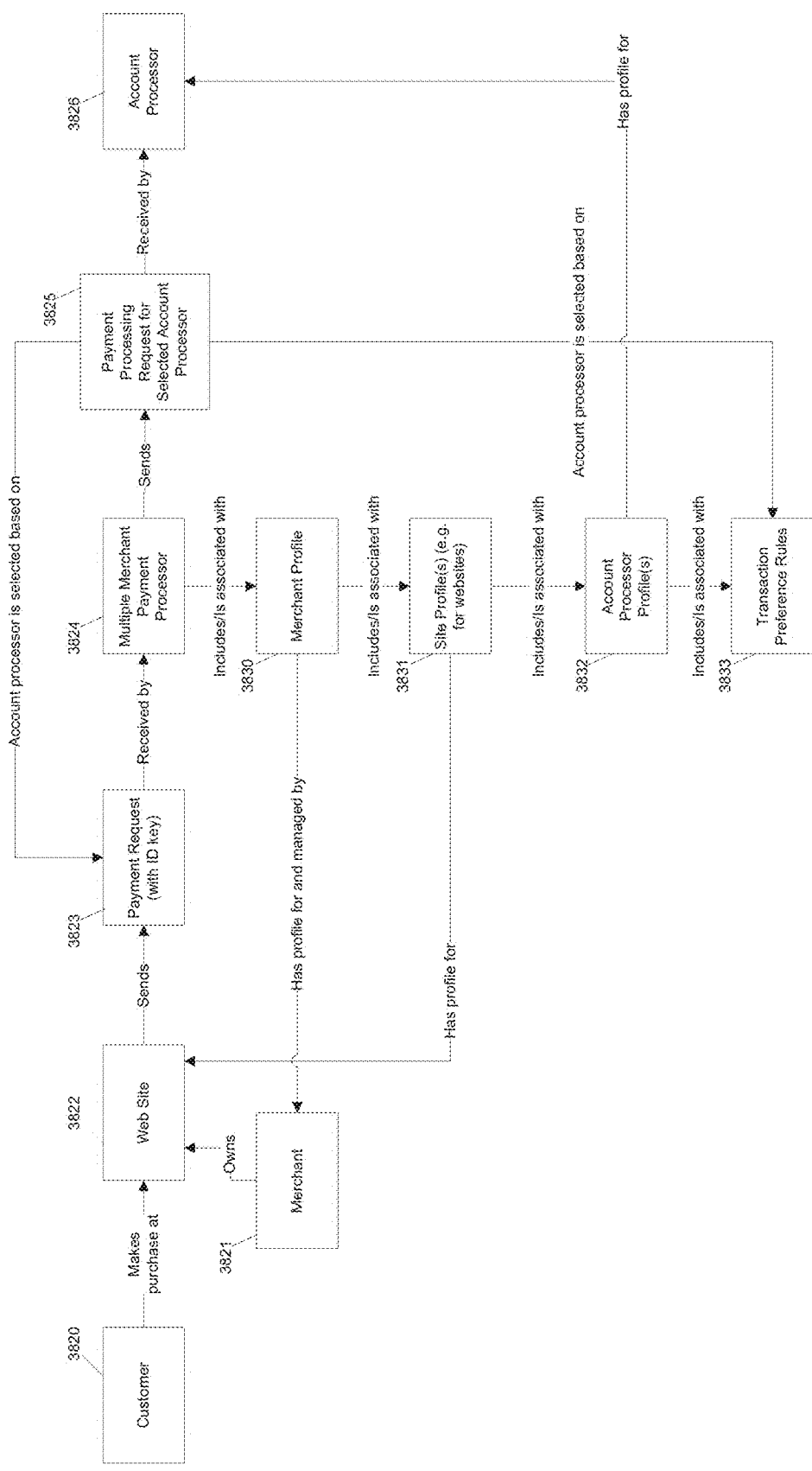
FIG. 38 shows a diagram illustrating example aspects of the MID-Platform configured to process payment requests based on customizable profiles.

FIG. 38 provides a diagram showing one embodiment of the MID-Platform configured to process payment requests based on customizable profiles. For example, a customer 3820 makes a purchase at a merchant's 3821 web site 3822 (or any site where business is transacted). The customer 3820 uses a form of payment (e.g., credit card) that requires authorization from an account processor, thus causing the web site 3822 to send a payment request 3823 to the MID-Platform 3824. The payment request 3823 may include information associated with the customer's purchase transaction, such as the price, currency type, geographic region where the transaction took place, products or services sold, etc. The payment request 3823 may also include information that facilitates processing of the request, such as identifiers used for identifying the web site 3822 and/or the merchant 3821, as well as API key(s) to help the MID-Platform 3824 invoke the proper API(s).

Once the payment request 3823 is received, the MID-Platform 3824 identifies a preferred account processor 3826 specified by the merchant 3821 to process payments. To determine which account processor 3826 to send a payment processing request 3825 to, the MID-Platform 3824 applies one or more merchant-defined transaction preference rules 3833 to information associated with the payment request 3823. For example, the merchant 3821 may want Bank A to process transactions that are in U.S. dollars, and Bank B to process transactions that are in Euro. Once the account processor 3826 is determined, the MID-Platform 3824 sends the payment processing request 3825 to the account processor 3826.

The relevant transaction preference rules 3833 may be associated with a site profile 3831 associated with the site 3822 from which the payment request 3823 is received. The MID-Platform 3824 may identify the site profile 3831 using information included in the payment request 3823. For example, based on merchant information included in the payment request 3823, the MID-Platform 3824 can access a corresponding merchant profile 3830 managed by the merchant 3821. The merchant profile 3830 may be associated with one or more site profiles, one of which being the site profile 3831 for the web site 3822. In another embodiment, the MID-Platform 3824 may instead use site information included in the payment request 3823 to directly access the site profile 3831 for the web site 3822.

The site profile 3831 may be associated with any number of account processors and transaction preference rules 3833. In one embodiment, the site profile 3831 is associated with one or more account processor profiles 3832, each of which corresponds to an account processor of the merchant. For example, the merchant 3821 may want Bank A and Bank B to be the account processors for web site 3822, and therefore may associate the corresponding site profile 3831 with an account processor profile for Bank A and another account processor profile for Bank B. Each of the account processor profiles 3832 may be associated with transaction preference rules 3833, which specify the type of transaction that the corresponding account processor is intended to handle (e.g., transactions in U.S. dollars are to be processed by Bank A). Thus, based on the transaction preference rules 3833 and information associated with the payment request 3823, the MID-Platform 3824 may determine which merchant-defined account processor 3826 to send the payment processing request 3825 to.

Figure 39:
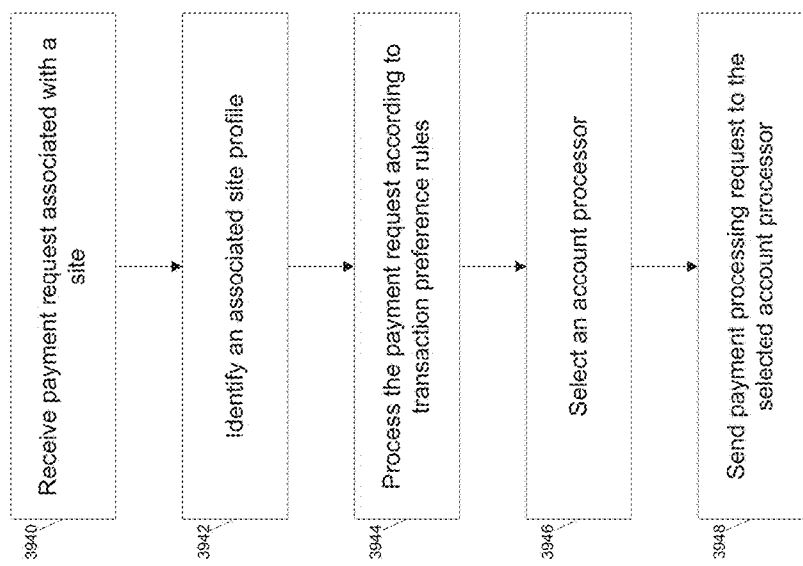
FIG. 39 shows a logic flow diagram illustrating example aspects of processing a payment request.

FIG. 39 provides an exemplary flow diagram showing how a payment request may be processed. At 3940, a payment request associated with a site is received (e.g., the payment request may be sent by a web site that is processing a customer's purchase order). At 3942, a site profile associated with the site is identified. At 3944, transaction preference rules associated with the site profile is used to process the payment request, and at 3946 an account processor is accordingly selected. Then at 3948, a payment processing request is sent to the selected account processor.

Figure 40:
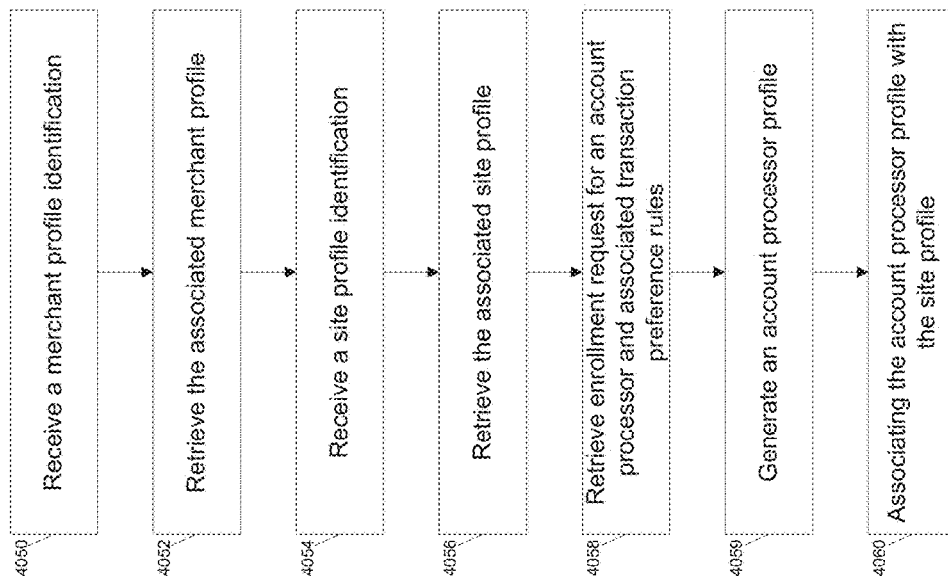
FIG. 40 shows a logic flow diagram illustrating example aspects of associating an account processor profile with a merchant's site profile.

FIG. 40 provides an exemplary flow diagram showing how an account processor profile and the associated transaction preference rules may be added to a site profile. Through a user interface provided by the MID-Platform (or an associated web server), a merchant may first identify itself, resulting in a merchant profile identification being sent to and received by the MID-Platform at 4050. At 4052, the MID-Platform uses the merchant profile identification to retrieve an associated merchant profile. Once retrieved, the MID-Platform may cause a list of sites (e.g., web sites) that are currently associated with the merchant profile to be shown to the merchant. The merchant may select one of the sites, which may causes a site profile identification to be sent to and received by the MID-Platform at 4054. Based on the site profile identification, the MID-Platform retrieves an associated site profile at 4056. At 4058, the MID-Platform receives from the merchant an enrollment request for a new account processor, which is to be associated with the selected site profile. The enrollment request may include information identifying the account processor (e.g., the account processor's routing number and name), as well as transaction preference rules specifying the types of transactions that should be processed by the account processor. At 4059, the MID-Platform generates an account processor profile according to the enrollment request and the transaction preference rules. At 4060, the new account processor profile is associated with the merchant's site profile. If desired, the merchant may associate the same site profile with any additional account processor profiles (e.g., so that different account processors may handle different types of transactions).

Figure 11A:
Figure 11B:
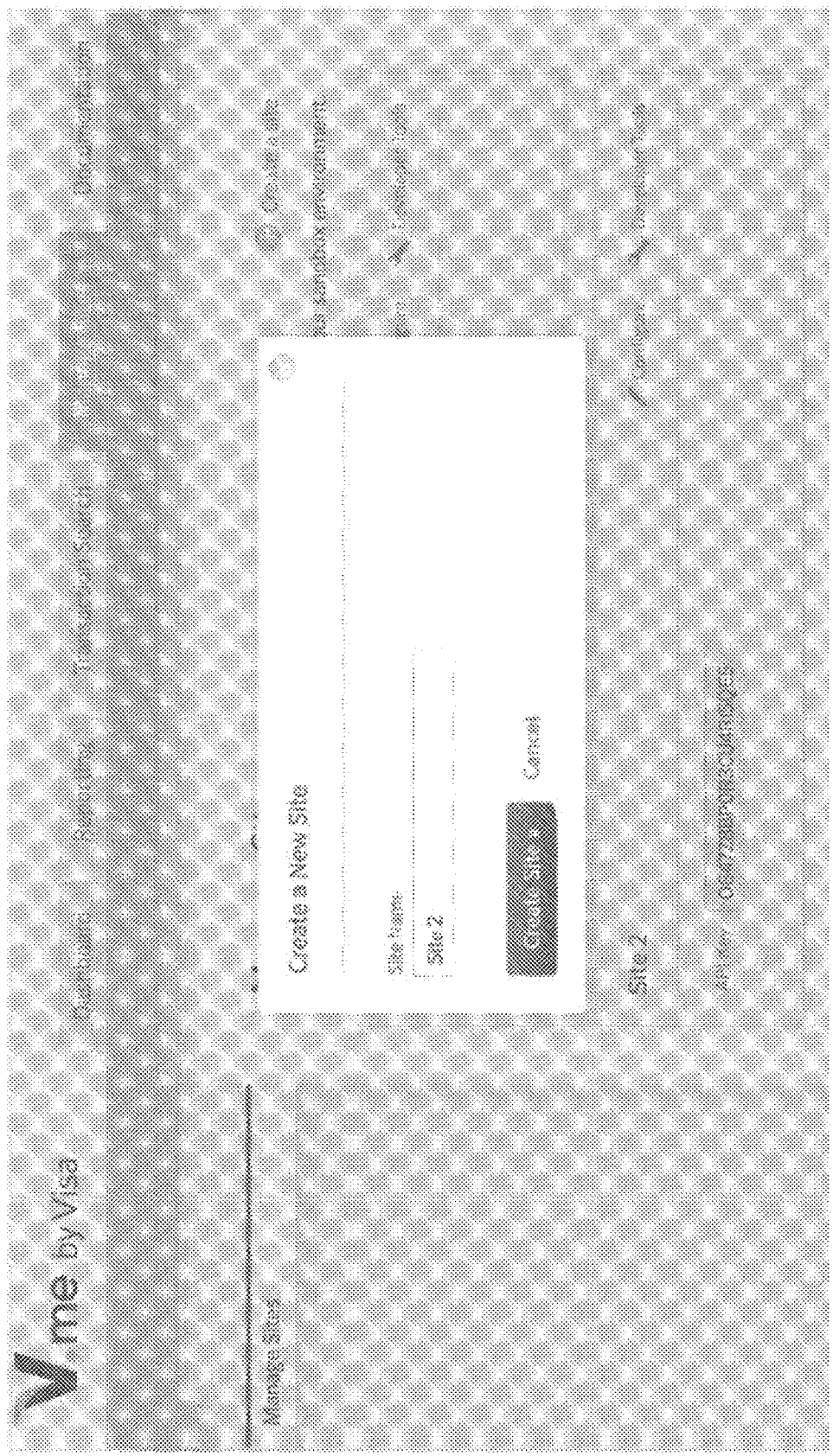

FIGS. 11A-11B provide exemplary merchant control panel UIs illustrating aspects of MID-Platform merchant creating a new site within embodiments of the MID-Platform. In one implementation, a merchant may enter a site name to create a new site and retrieve an API key from the MID-Platform, e.g., see 1105*a-b* in FIG. 11A and FIG. 11B.

Figure 12B:
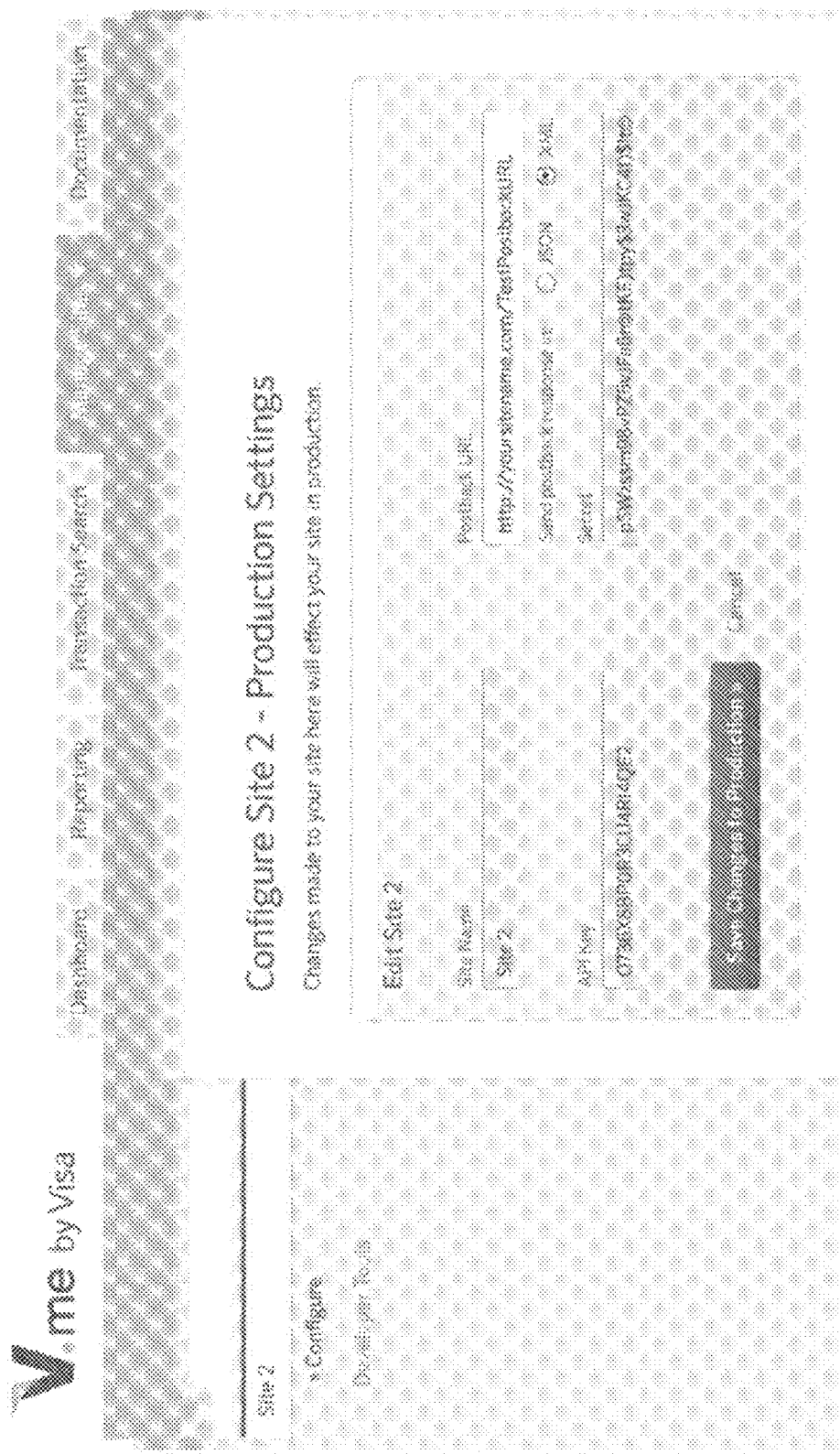
Figure 12C:
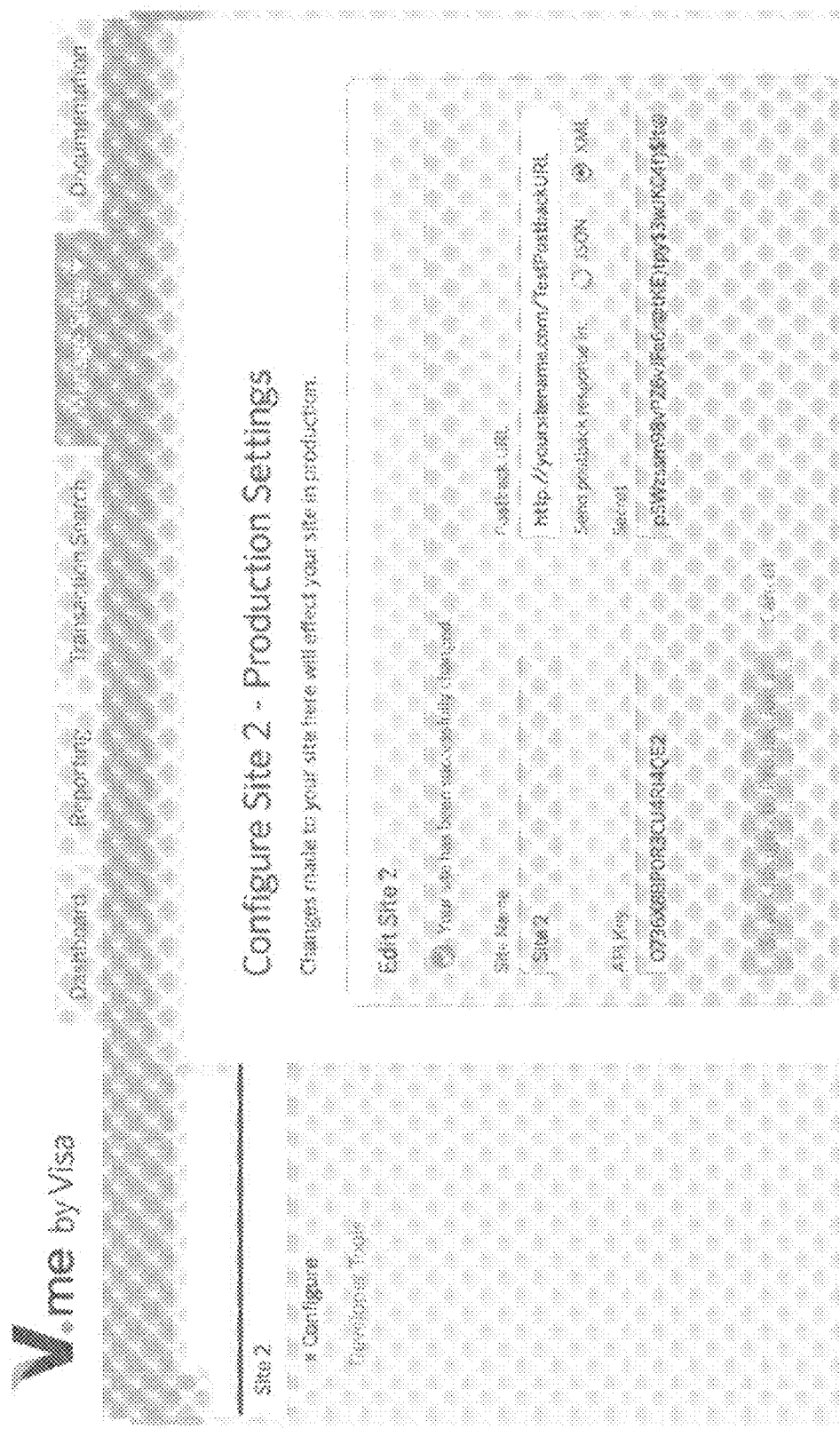

FIGS. 12A-12C provide exemplary merchant control panel UIs illustrating aspects of MID-Platform merchant editing a site within embodiments of the MID-Platform. A merchant may edit site parameters such as site name 1205*a*, post-back URL 1205*b*, etc., and the MID-Platform may update its API key 1205*c*, security signature 1205*d*, and/or the like, as shown in FIGS. 12A-C.

FIGS. 13A-13D provide exemplary merchant control panel UIs illustrating aspects of MID-Platform merchant obtaining a sandbox checkout widget within embodiments of the MID-Platform. A merchant may create a checkout lightbox by entering a variety of parameters, such as amount 1305*a*, currency 1305*b*, product_id 1305*c*, merchant transaction 1305*d*, collect shipping 1305*e*, process 1305*f*, and/or the like, e.g., see FIG. 13A. The MID-Platform may return a block of sample XML code 1310 for the lightbox generation, with a preview 1315. In one implementation, a merchant may enter an email address for obtaining transaction search results, e.g., see FIG. 13C. In one implementation, a merchant may view a purchase contract for the generated checkout widget, e.g., see FIG. 13D.

FIGS. 14A-16C provide exemplary merchant control panel UIs illustrating aspects of MID-Platform merchant profile management within embodiments of the MID-Platform. In one implementation, a merchant may edit company information, e.g., see FIGS. 14A-B. In one implementation, a merchant may manage users and edit administrators who can view and edit user profiles and access parameters, e.g., see FIGS. 15A-16C.

Figure 17A:
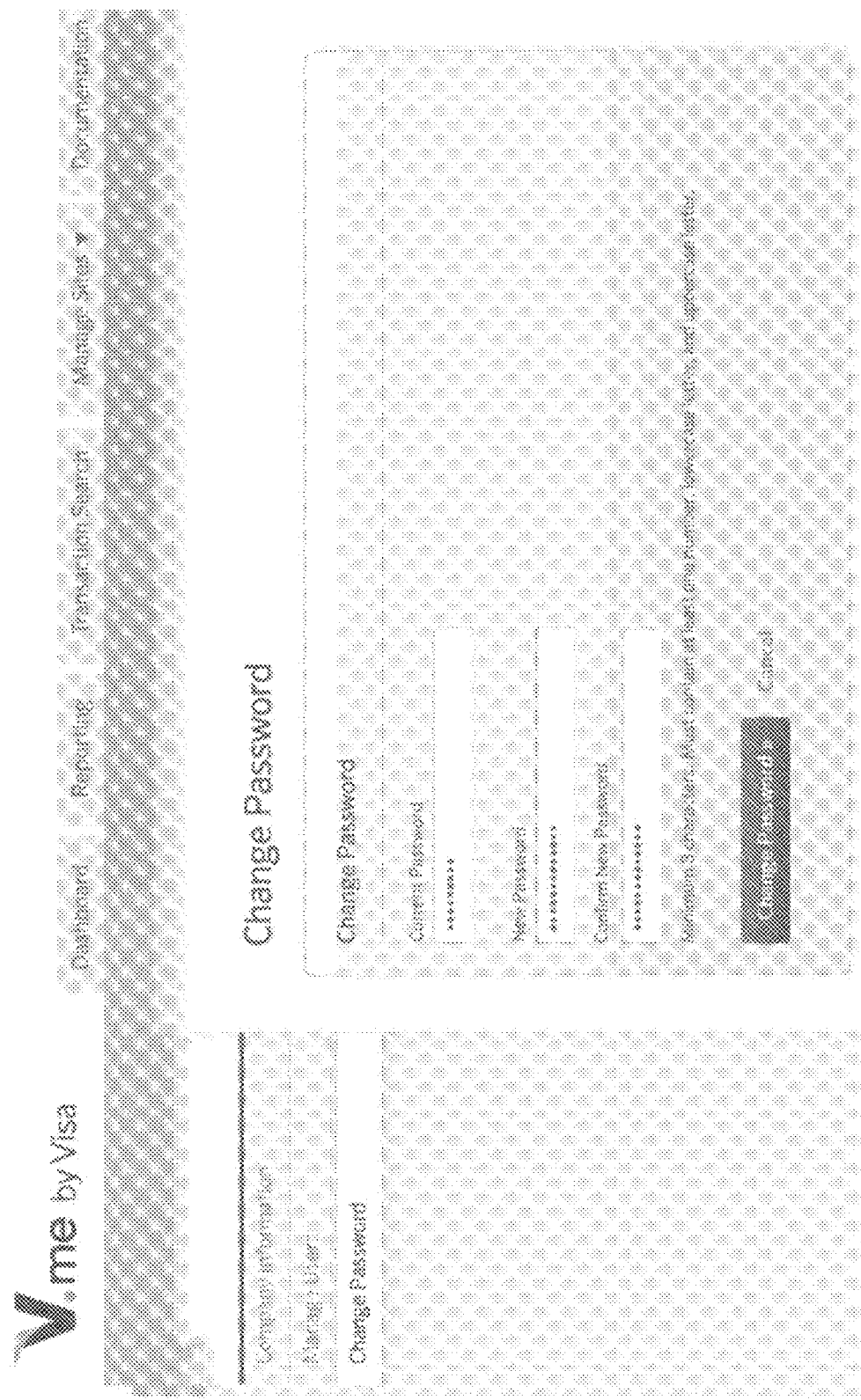
Figure 17B:

FIGS. 17A-17B provide exemplary merchant control panel UIs illustrating aspects of MID-Platform merchant changing a password within embodiments of the MID-Platform.

FIGS. 18A-22 provide exemplary merchant control panel UIs illustrating aspects of MID-Platform merchant managing credit card processing accounts within embodiments of the MID-Platform. In implementation, a merchant may enter various information to establish a payment account, including company information, EID, payment information (e.g., see FIG. 21), etc., e.g., see FIGS. 18A-21. The MID-Platform may list the enrolled merchant accounts, wherein a merchant may specify the usage scope of each account (e.g., a global account or U.S. account for U.S. transactions, etc.), e.g., see FIG. 20.

Figure 22:
Figure 22A:
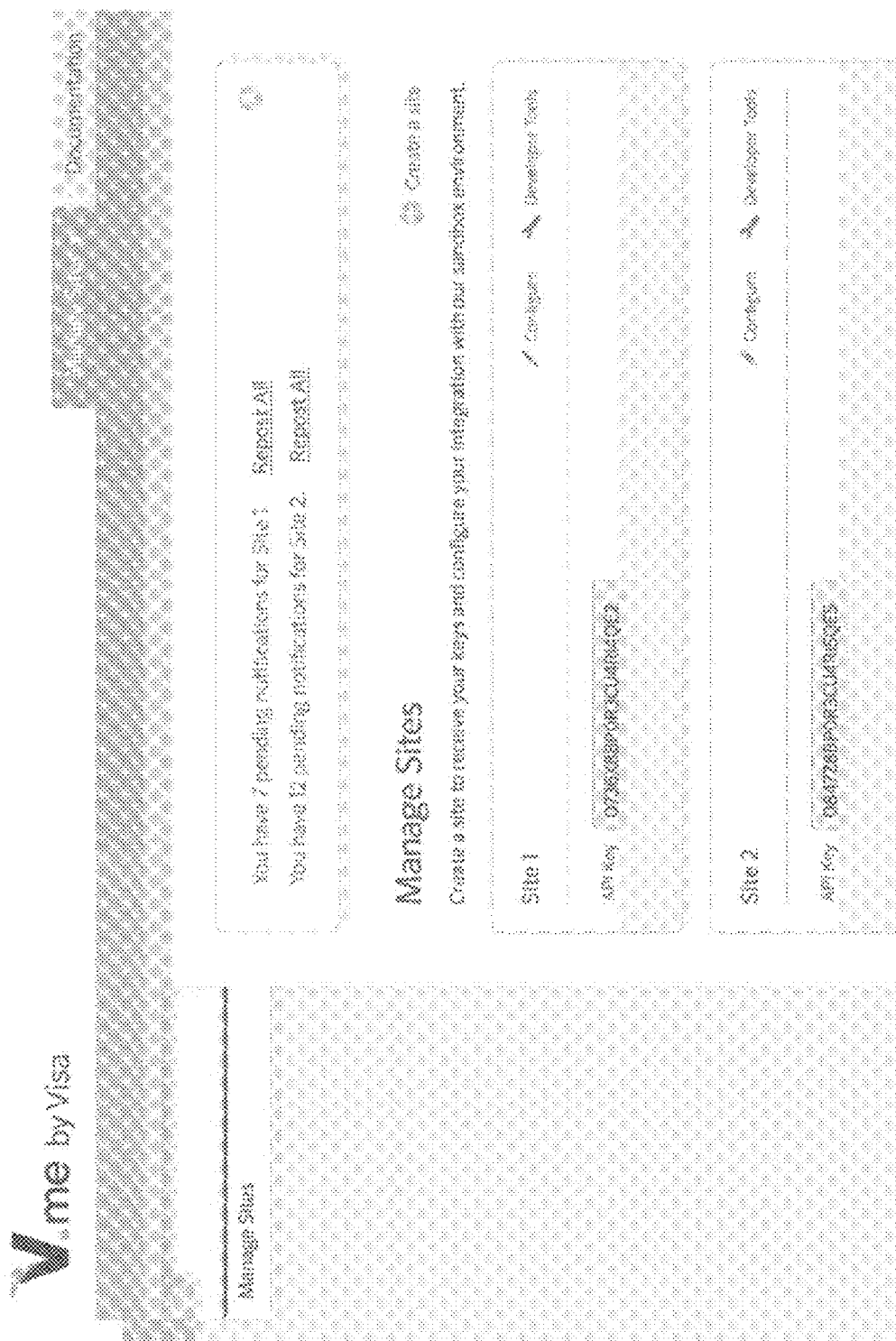
Figure 22B:
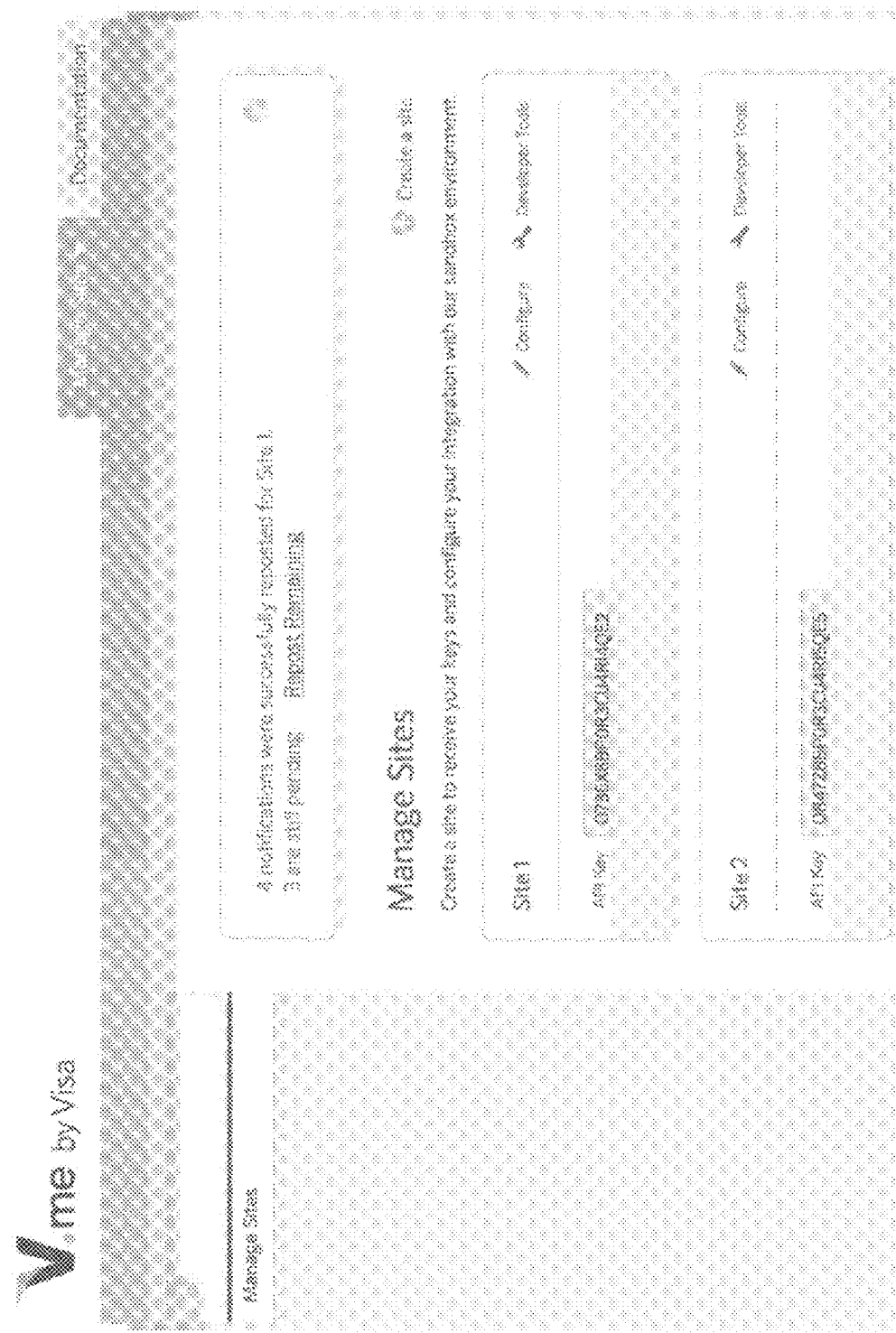

FIGS. 22A-22B provide exemplary merchant control panel UIs illustrating aspects of MID-Platform merchant posting notifications to different sites within embodiments of the MID-Platform. For example, a merchant may post notifications for offers, loyalty rewards, campaign events, fraud alerts, etc. to a created merchant site. A merchant may view pending notifications for each site via the MID-Platform platform, and elect to distribute the notifications to each site, e.g., as shown in FIGS. 22A-B.

FIGS. 23A-26C provide exemplary merchant onboarding UIs illustrating aspects of MID-Platform merchant onboarding within embodiments of the MID-Platform, as discussed with the process flow in FIGS. 3A-3B.

Figure 27:
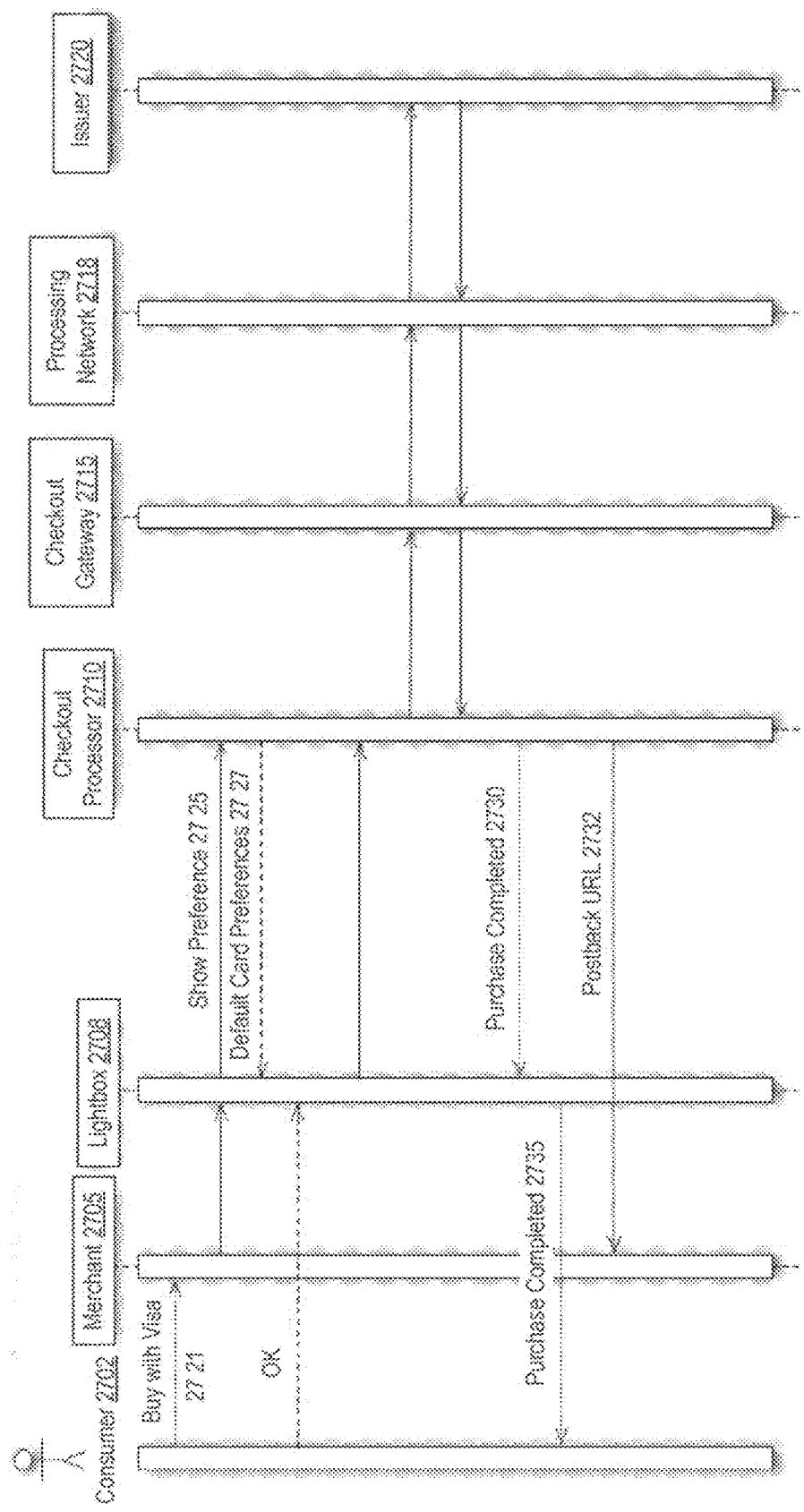
FIGS. 27-30C show logic flow diagrams illustrating example aspects of merchant services upon onboarding in some embodiments of the MID-PLATFORM.

FIGS. 27-30C provide exemplary transaction flows illustrating MID-Platform merchant checkout services within embodiments of the MID-Platform. In one implementation, a processing network may keep a record of merchant transactions. As shown in FIG. 27, a consumer 2702 may start with making a purchase using the lightbox checkout 2708, e.g., Visa V.me purchase checkout box, etc., 2721. The merchant 2705 may forward the lightbox checkout request to the lightbox processor 2708 which may in turn retrieve previously established preference and account information 2725 to a checkout processor 2710 (e.g., Playspan platform, etc.). In one implementation, the payment request may be processed with a checkout gateway 2715 (e.g., a Chase payment gateway, etc.), processing network 2718 (e.g., VisaNet, etc.) and be cleared with an issuer 2720, e.g., further implementations of a card based transaction is discussed in FIGS. 42A-43.

In one implementation, the checkout processor 2710 may provide a notification for purchase completion 2730 to the lightbox processor 2708, which may forward a post-back URL link 2732 to the merchant, and the completion notification 2735 to the consumer 2702.

Figure 28:
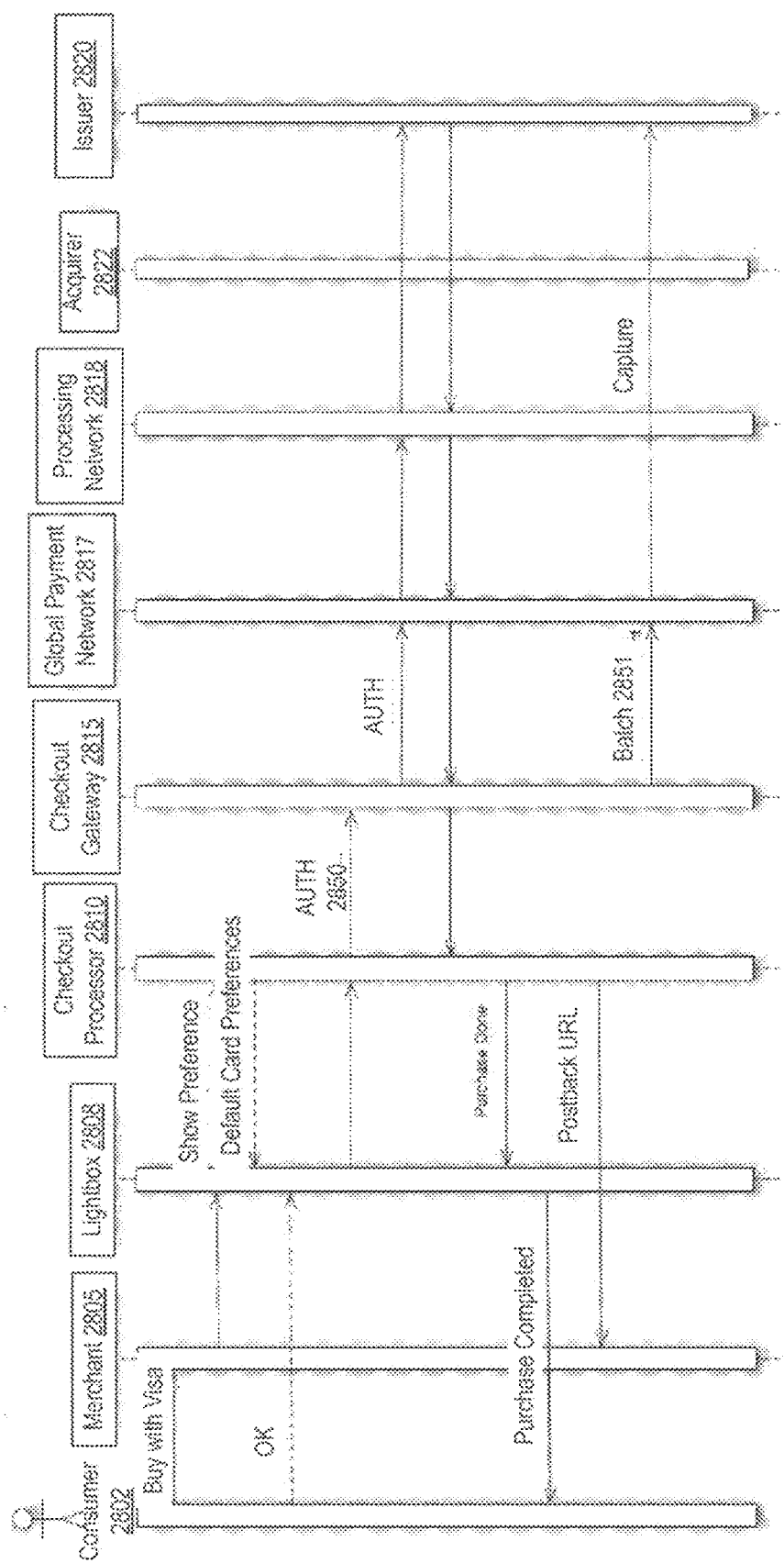

FIG. 28 provides an alternative logic flow diagram illustrating merchant checkout between a consumer 2802, merchant 2805, lightbox 2808, checkout processor 2810, gateway 2815, a global payment network (GPN) 2815, processing network 2818, acquirer 2822, and an issuer 2820. In one implementation, continuing on with the checkout processor 2810 obtaining card preference, an authorization request message 2850 may be routed to the checkout gateway 2815 and forwarded to various entities in a batch 2851 for the acquirer to capture the payment.

Figure 29:
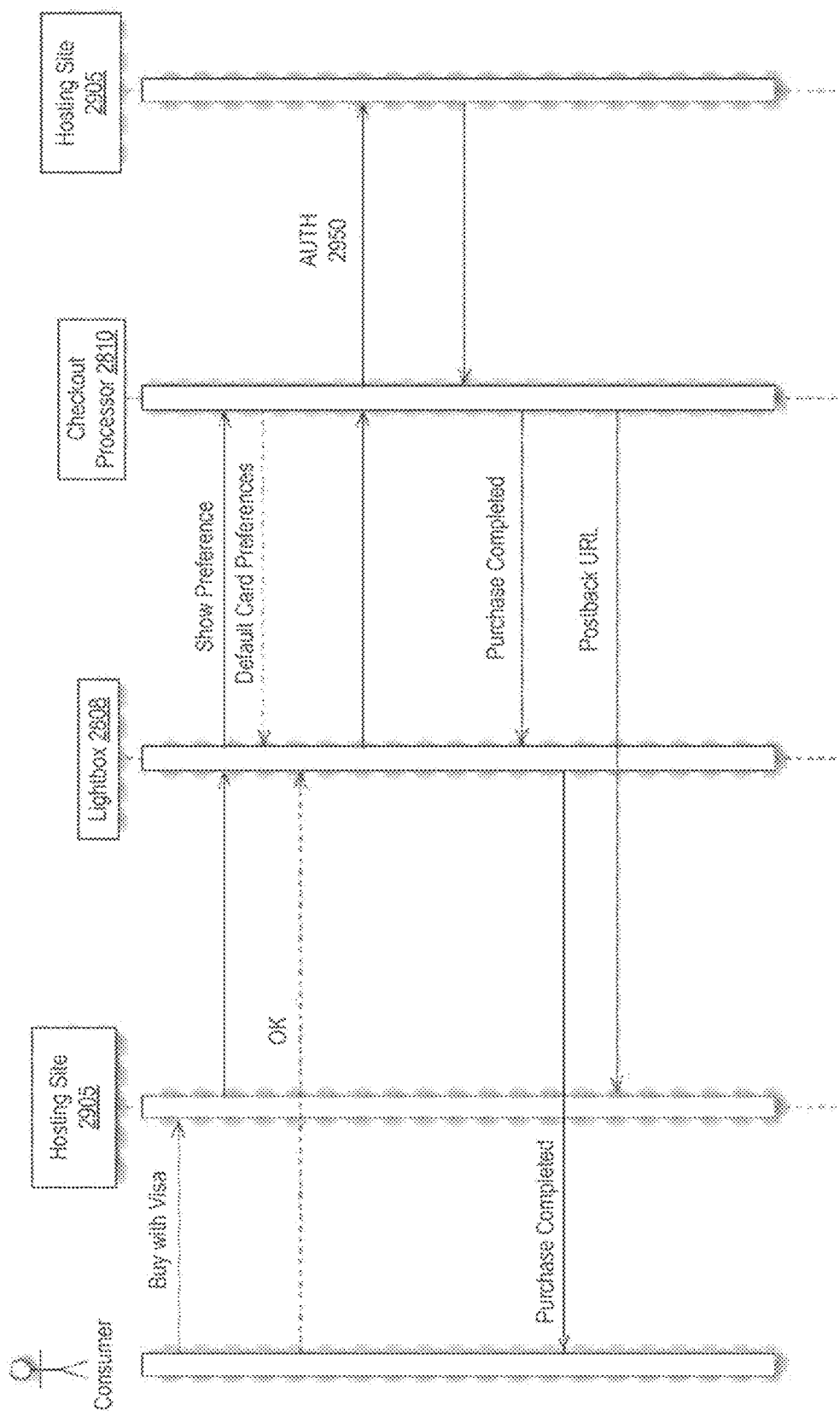

FIG. 29 provides an alternative logic flow diagram illustrating checkout on a hosting site (e.g., Amazon.com, etc.) of the merchant within implementations of the MID-Platform. Within implementations, the authorization message 2950 may be routed to a hosting site server 2905 upon processing from the checkout processor 2810. The remaining process steps may be similar to those in FIG. 28029.

Figure 30A:
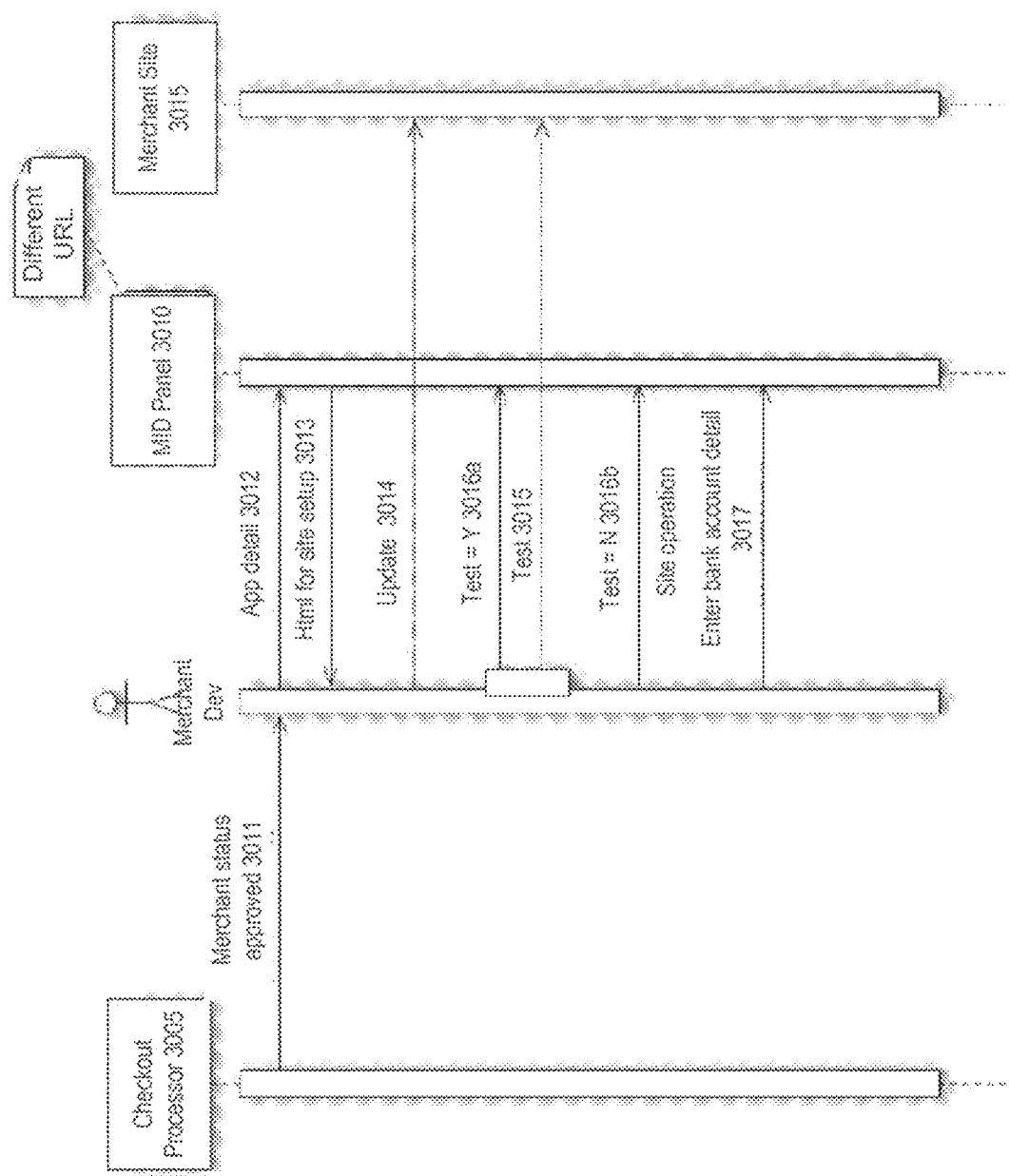
Figure 30B:
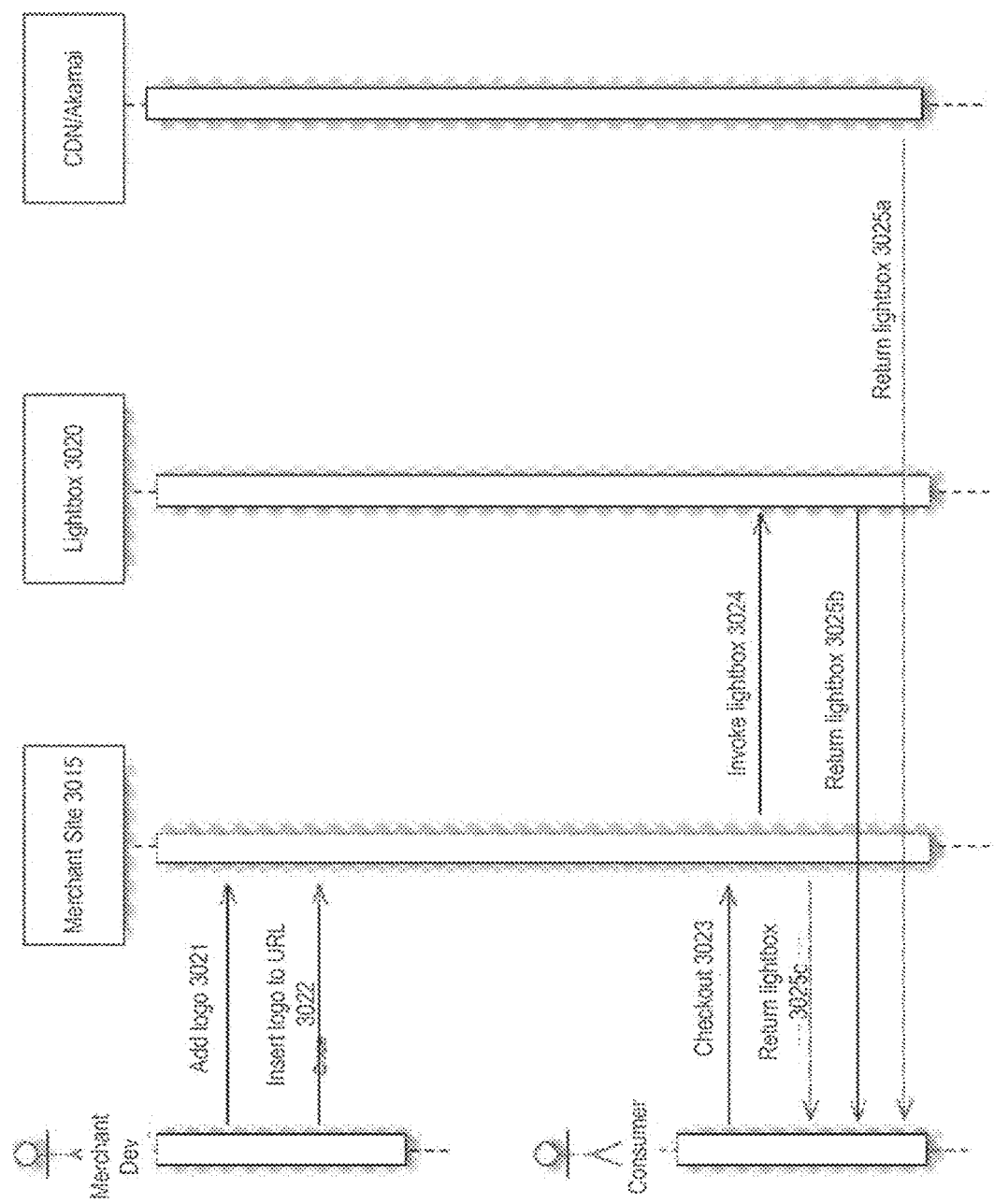
Figure 30C:
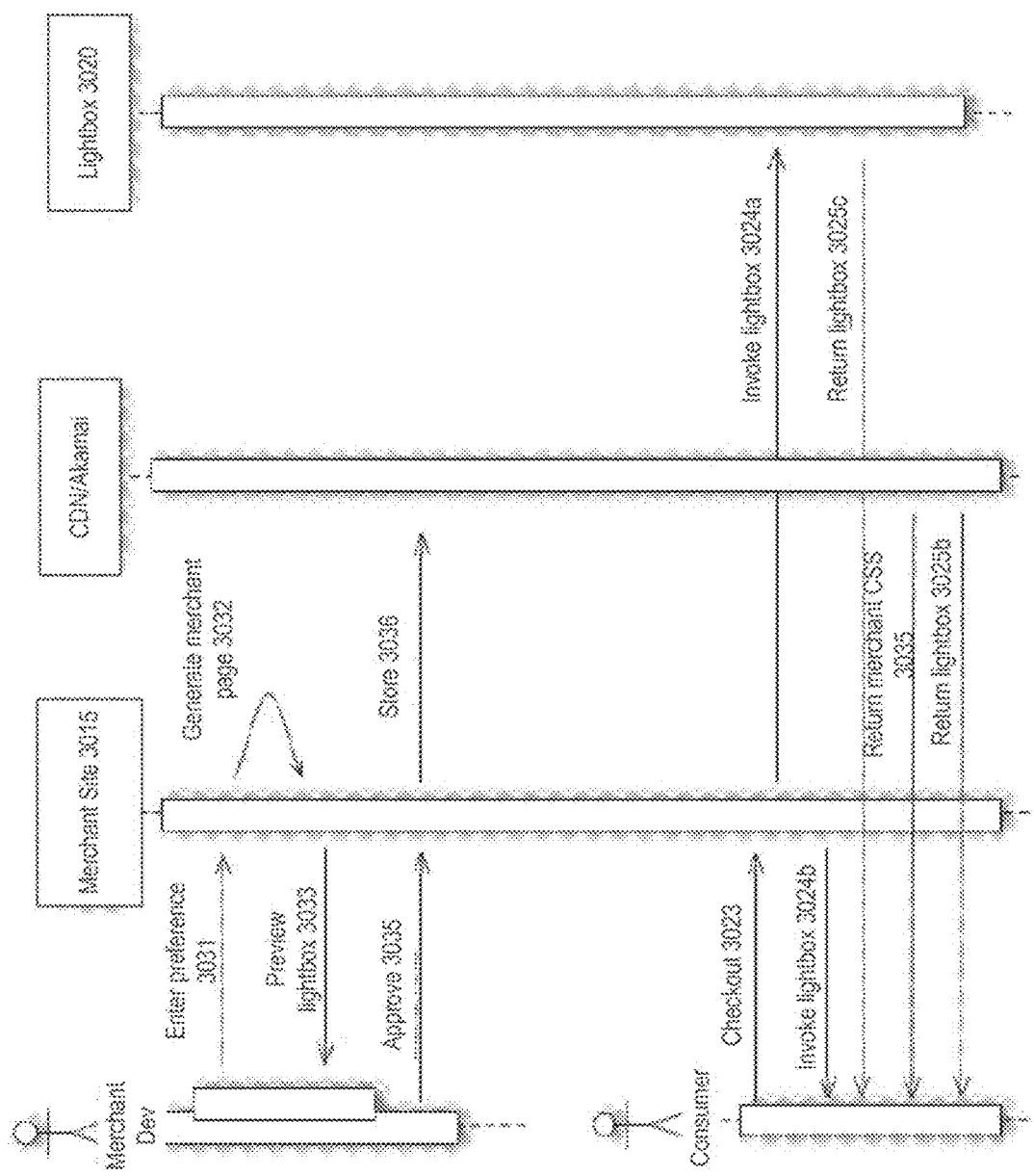

FIGS. 30A-C provide alternative logic flow diagram illustrating merchant creating a lightbox within implementations of the MID-Platform. As shown in FIG. 30A, upon a checkout processor 3005 approves merchant onboarding status 3011, a merchant (e.g., a merchant developer, etc.) may submit application details 3012 to the MID-Platform panel 3010 (which may have a different URL from the MID-Platform site, etc.), e.g., see FIGS. 17A-17B. In one implementation, the MID-Platform may generate XML or html formatted widgets for site setup 3013 to the merchant, who may incorporate into the merchant site 3015 to update 3014. In one implementation, the merchant may test 3015 the generated widget with the merchant site to examine whether the checkout widget is valid 3016a, or invalid 3016b upon site operation. In one implementation, the merchant may enter bank account detail 3017 to the MID-Platform panel to set up, e.g., see FIGS. 19A-22.

With reference to FIG. 30B, a merchant developer may create a logo of the lightbox widget 3021 and insert the logo to a URL 3022. In one implementation, a consumer may checkout 3023 by clicking on "continue to checkout," which may invoke the lightbox 3024 and return a lightbox logo 3025a-c to the consumer page.

With reference to FIG. 30C, a merchant developer may generate a lightbox widget in an alternative implementation. For example, upon merchant developer entering a checkout method preference 3031 (e.g., Visa, Mastercard, etc.), the merchant site 3015 may generate a merchant page 3032, and generate a preview of the lightbox 3033. Once the merchant approves 3035, the merchant site may store the lightbox setup with a CDN 3036.

In one implementation, a consumer may checkout with the merchant site, which may invoke a lightbox 3024a-b to display a lightbox logo to the consumer. In one implementation, the CDN may return a merchant widget page 3035 and the populated lightbox 3025b to the consumer.

Figure 31:
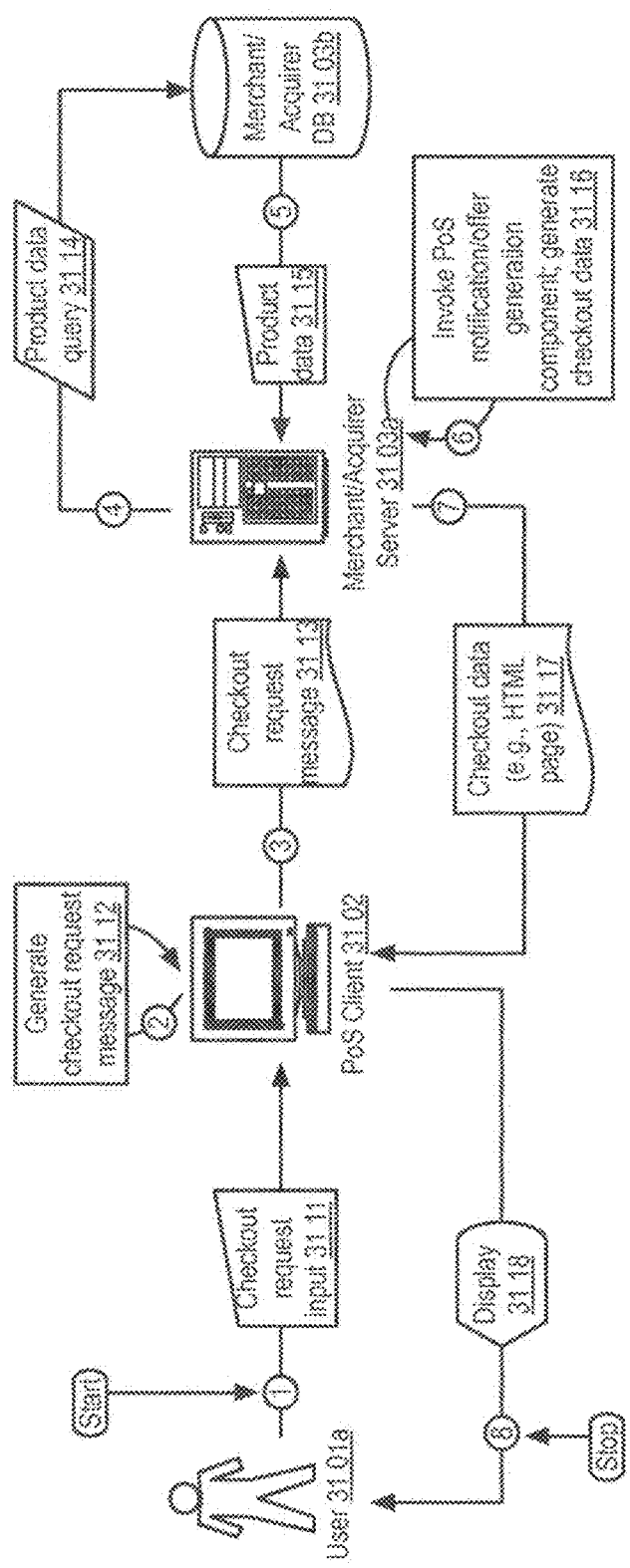
FIG. 31 shows a datagraph diagram illustrating example aspects of transforming a user checkout request input via a User Purchase Checkout ("UPC") component into a checkout data display output.

FIG. 31 shows a datagraph diagram illustrating example aspects of transforming a user checkout request input via a User Purchase Checkout ("UPC") component into a checkout data display. In some embodiments, a user, e.g., 3101a, may desire to purchase a product, service, offering, and/or the like ("product"), from a merchant via a merchant online site or in the merchant's store. The user may communicate with a merchant/acquirer ("merchant") server, e.g., 3103a, via a client such as, but not limited to: a personal computer, mobile device, television, point-of-sale terminal, kiosk, ATM, and/or the like (e.g., 3102). For example, the user may provide user input, e.g., checkout input 3111, into the client indicating the user's desire to purchase the product. In various embodiments, the user input may include, but not be limited to: a single tap (e.g., a one-tap mobile app purchasing embodiment) of a touchscreen interface, keyboard entry, card swipe, activating a RFID/NFC equipped hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. As an example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. For example, the user may activate a user interface element provided by the client to indicate the user's desire to complete the user purchase checkout. The client may generate a checkout request, e.g., 3112, and provide the checkout request, e.g., 3113, to the merchant server. For example, the client may provide a (Secure) Hypertext Transfer Protocol ("HTTP(S)") POST message including the product details for the merchant server in the form of data formatted according to the eXtensible Markup Language ("XML"). An example listing of a checkout request 3112, substantially in the form of a HTTP(S) POST message including XML-formatted data, is provided below:

```
POST /checkoutrequest.php HTTP/1.1
Host: www.merchant.com
Content-Type: Application/XML
Content-Length: 667
<?XML version = "1.0" encoding = "UTF-8"?>
<checkout_request>
    <session_ID>4NFU4RG94</session_ID>
<!--optional parameters-->
    <timestamp>2011-02-22 15:22:41</timestamp>
    <user_ID>john.q.public@gmail.com</user_ID>
    <device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-
        124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_flag>
    </device_fingerprint>
</checkout_request>
```

In some embodiments, the merchant server may obtain the checkout request from the client, and extract the checkout detail (e.g., XML data) from the checkout request. For example, the merchant server may utilize a parser such as the example parsers described below in the discussion with reference to FIG. 37. Based on parsing the checkout request 3112, the merchant server may extract product data (e.g., product identifiers), as well as available PoS client data, from the checkout request. In some embodiments, using the product data, the merchant server may query, e.g., 3114, a merchant/acquirer ("merchant") database, e.g., 3103b, to obtain product data, e.g., 3115, such as product information, product pricing, sales tax, offers, discounts, rewards, and/or other information to process the purchase transaction and/or provide value-added services for the user. For example, the merchant database may be a relational database responsive to Structured Query Language ("SQL") commands. The merchant server may execute a hypertext preprocessor ("PHP") script including SQL commands to query a database table (such as FIG. 37, Products 37191) for product data. An example product data query 3114, substantially in the form of PHP/SQL commands, is provided below:

```
<?PHP
header('Content-Type: text/plain');
mysql_connect("254.93.179.112",$DBserver,$password); // access
database server
mysql_select_db("MID-PLATFORM_DB.SQL"); // select
database table to search
//create query
$query = "SELECT product_title product_attributes_list
    product_price tax_info_list related_products_list offers_list
    discounts_list rewards_list merchants_list merchant_availability_list
    FROM ProductsTable WHERE product_ID LIKE '%' $prodID";
$result = mysql_query($query); // perform the search query
mysql_close("MID-PLATFORM_DB.SQL"); // close database access
?>
```

In some embodiments, in response to obtaining the product data, the merchant server may generate, e.g., 3116, checkout data to provide for the PoS client. In some embodiments, such checkout data, e.g., 3117, may be embodied, in part, in a HyperText Markup Language ("HTML") page including data for display, such as product detail, product pricing, total pricing, tax information, shipping information, offers, discounts, rewards, value-added service information, etc., and input fields to provide payment information to process the purchase transaction, such as account holder name, account number, billing address, shipping address, tip amount, etc. In some embodiments, the checkout data may be embodied, in part, in a Quick Response ("QR") code image that the PoS client can display, so that the user may capture the QR code using a user's device to obtain merchant and/or product data for generating a purchase transaction processing request. In some embodiments, a user alert mechanism may be built into the checkout data. For example, the merchant server may embed a URL specific to the transaction into the checkout data. In some embodiments, the alerts URL may further be embedded into optional level 3 data in card authorization requests, such as those discussed further below with reference to FIGS. 33-34.

The URL may point to a webpage, data file, executable script, etc., stored on the merchant's server dedicated to the transaction that is the subject of the card authorization request. For example, the object pointed to by the URL may include details on the purchase transaction, e.g., products being purchased, purchase cost, time expiry, status of order processing, and/or the like. Thus, the merchant server may provide to the payment network the details of the transaction by passing the URL of the webpage to the payment network. In some embodiments, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like. An example listing of a checkout data 3117, substantially in the form of XML-formatted data, is provided below:

```
<?XML version = "1.0" encoding = "UTF-8"?>
<checkout_data>
    <session_ID>4NFU4RG94</session_ID>
    <!--optional data-->
    <timestamp>2011-02-22 15:22:43</timestamp>
    <expiry_lapse>00:00:30</expiry_lapse>
    <total_cost>$121.49</total_cost>
    <alerts_URL>www.merchant.com/shopcarts.php?sessionID=4NFU4RG94</alerts_URL>
    <user_ID>john.q.public@gmail.com</user_ID>
    <user_device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_flag>
    </user_device_fingerprint>
    <purchase_detail>
        <cart>
            <product>
                <merchant_params>
                    <merchant_id>54TBRELF8</merchant_id>
                    <merchant_name>BARNES, Inc.</merchant_name>
                    <merchant_auth_key>TMN45GER98</merchant_auth_key>
                </merchant_params>
                <product_type>book</product_type>
                <product_params>
                    <product_title>XML for dummies</product_title>
                    <ISBN>938-2-14-168710-0</ISBN>
                    <edition>2nd ed.</edition>
                    <cover>hardbound</cover>
                </product_params>
                <quantity>2</quantity>
                <unit_cost>$14.46</unit_cost>
                <coupon_id>AY34567</coupon_id>
                <social_flag>ON</social_flag>
                <social_message>Look what I bought today!</social_message>
                <social_networks>facebook twitter</social_networks>
            </product>
            <product>
                <merchant_params>
                    <merchant_id>3FBCR4INC</merchant_id>
                    <merchant_name>Books, Inc.</merchant_name>
                    <merchant_auth_key>1N484MID-Platform</merchant_auth_key>
                </merchant_params>
                <product_type>book</product_type>
                <product_params>
                    <product_title>Sophie's World</product_title>
                    <ISBN>955-2-14-112310-0</ISBN>
```

```
                    <edition>NULL</edition>
                    <cover>hardbound</cover>
                </product_params>
                <quantity>1</quantity>
                <unit_cost>$34.78</unit_cost>
                <coupon_id>null</coupon_id>
            <social_flag>OFF</social_flag>
            </product>
    </cart>
    <cart>
            <product>
                <merchant_params>
                    <merchant_id>RFH5IB4FT</merchant_id>
                    <merchant_name>Amzn, Inc.</merchant_name>
                    <merchant_auth_key>44543DSJFG</merchant_auth_key>
                </merchant_params>
                <product_type>book</product_type>
                <product_params>
                    <product_title>XML - a primer</product_title>
                    <ISBN>938-2-14-1436710-0</ISBN>
                    <edition>2nd ed.</edition>
                    <cover>hardbound</cover>
                </product_params>
                <quantity>1</quantity>
                <unit_cost>$12.93</unit_cost>
                <coupon_id>AY34567</coupon_id>
            <social_flag>ON</social_flag>
            <social_message>Look what I bought today!</social_message>
            <social_networks>facebook twitter</social_networks>
            </product>
            <product>
                <merchant_params>
                    <merchant_id>3FBCR4INC</merchant_id>
                    <merchant_name>BestBooks, Inc.</merchant_name>
                    <merchant_auth_key>1N484MID-
Platform</merchant_auth_key>
                </merchant_params>
                <product_type>book</product_type>
                <product_params>
                    <product_title>Sophie's Choice</product_title>
                    <ISBN>938-2-14-168710-0</ISBN>
                    <edition>1st ed.</edition>
                </product_params>
                <quantity>1</quantity>
                <unit_cost>$44.86</unit_cost>
                <coupon_id>null</coupon_id>
            <social_flag>OFF</social_flag>
            </product>
    </cart>
</purchase_detail>
<checkout_data>
```

Upon obtaining the checkout data, e.g., 3117, the PoS client may render and display, e.g., 3118, the checkout data for the user.

Figure 32:
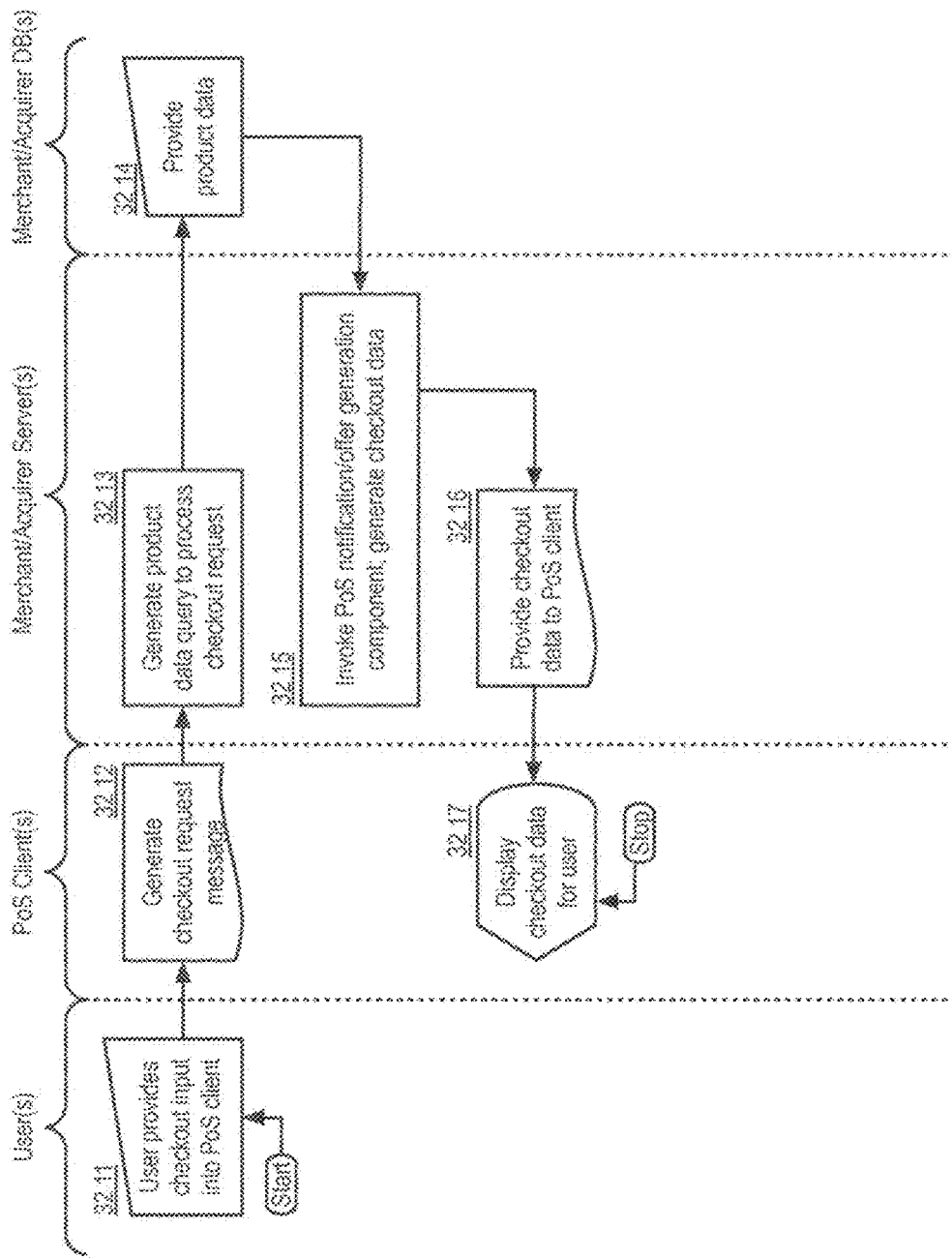
FIG. 32 shows a logic flow diagram illustrating example aspects of transforming a user checkout request input via a User Purchase Checkout ("UPC") component into a checkout data display.

FIG. 32 shows a logic flow diagram illustrating example aspects of transforming a user checkout request input via a User Purchase Checkout ("UPC") component into a checkout data display. In some embodiments, a user may desire to purchase a product, service, offering, and/or the like ("product"), from a merchant via a merchant online site or in the merchant's store. The user may communicate with a merchant/acquirer ("merchant") server via a PoS client. For example, the user may provide user input, e.g., 3201, into the client indicating the user's desire to purchase the product. The client may generate a checkout request, e.g., 3202, and provide the checkout request to the merchant server. In some embodiments, the merchant server may obtain the checkout request from the client, and extract the checkout detail (e.g., XML data) from the checkout request. For example, the merchant server may utilize a parser such as the example parsers described below in the discussion with reference to FIG. 37. Based on parsing the checkout request, the merchant server may extract product data (e.g., product identifiers), as well as available PoS client data, from the checkout request. In some embodiments, using the product data, the merchant server may query, e.g., 3203, a merchant/acquirer ("merchant") database to obtain product data, e.g., 3204, such as product information, product pricing, sales tax, offers, discounts, rewards, and/or other information to process the purchase transaction and/or provide value-added services for the user. In some embodiments, in response to obtaining the product data, the merchant server may generate, e.g., 3205, checkout data to provide, e.g., 3206, for the PoS client. Upon obtaining the checkout data, the PoS client may render and display, e.g., 3207, the checkout data for the user.

Figure 33A:
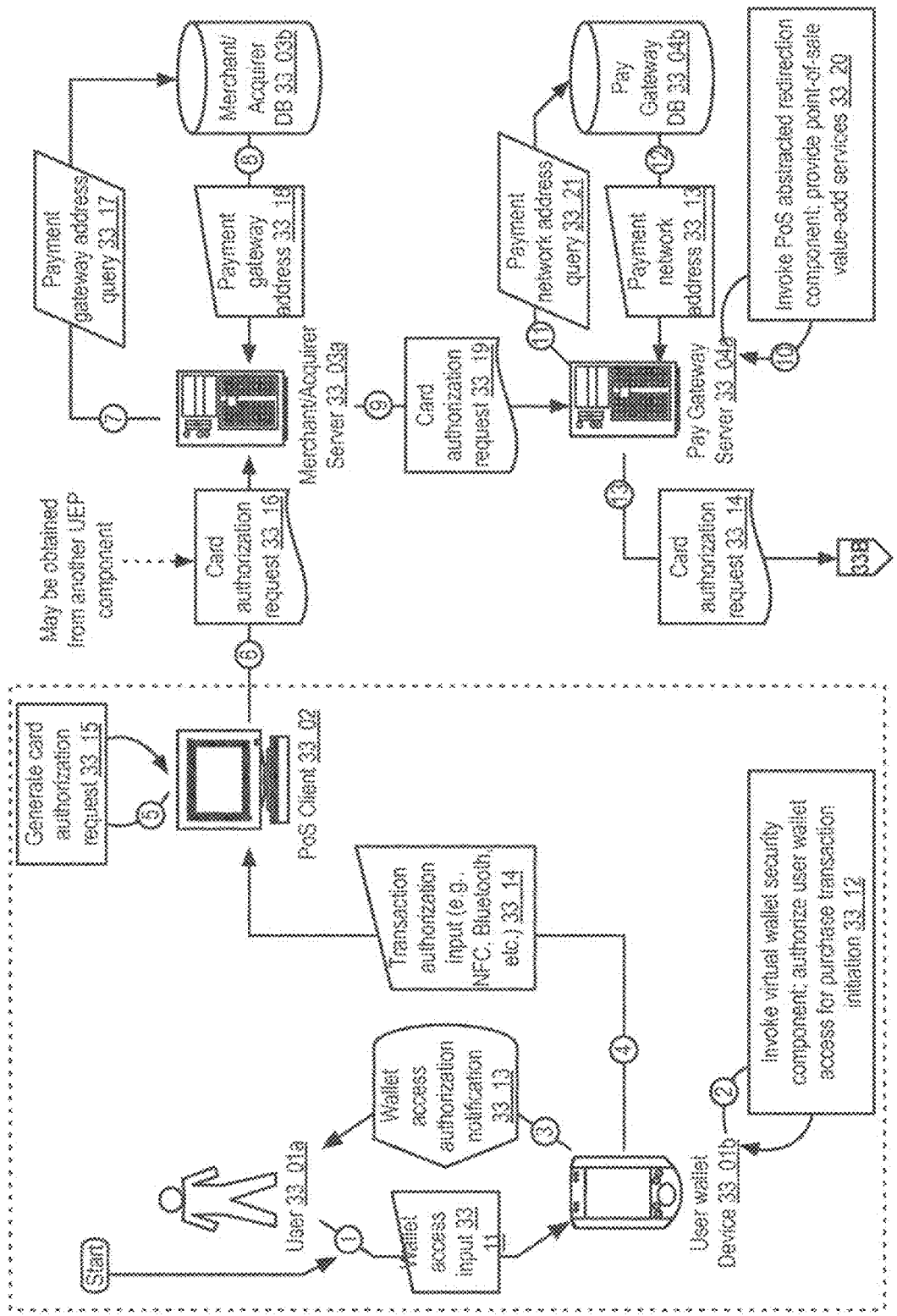
FIGS. 33A-B show datagraph diagrams illustrating example aspects of transforming a user virtual wallet access input via a Purchase Transaction Authorization ("PTA") component into a purchase transaction receipt notification.
Figure 33B:
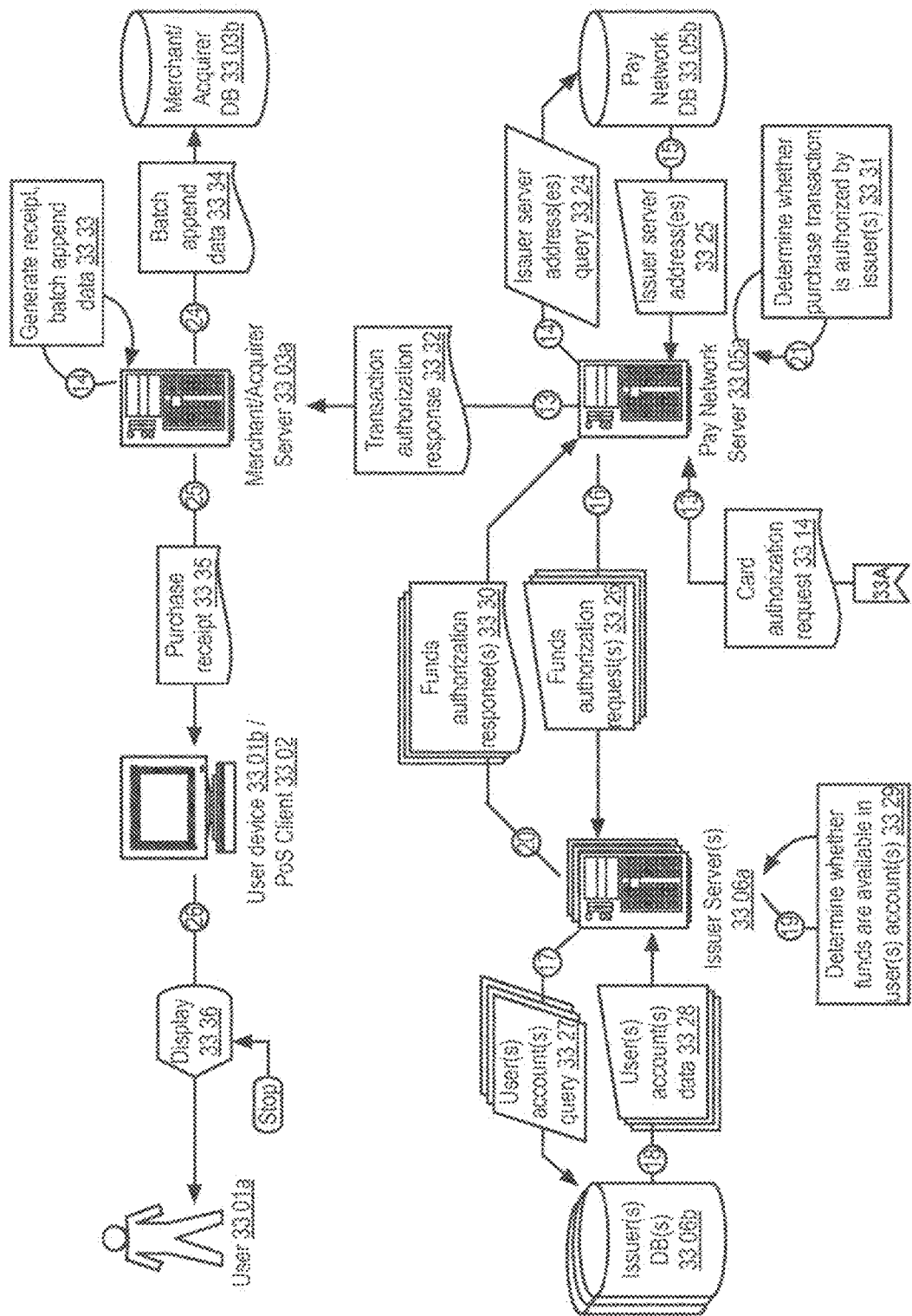

FIGS. 33A-B show datagraph diagrams illustrating example aspects of transforming a user virtual wallet access input via a Purchase Transaction Authorization ("PTA") component into a purchase transaction receipt notification. With reference to FIG. 33A, in some embodiments, a user, e.g., 3301a, may wish to utilize a virtual wallet account to purchase a product, service, offering, and/or the like ("product"), from a merchant via a merchant online site or in the merchant's store. The user may utilize a physical card, or a user wallet device, e.g., 3301*b*, to access the user's virtual wallet account. For example, the user wallet device may be a personal/laptop computer, cellular telephone, smartphone, tablet, eBook reader, netbook, gaming console, and/or the like. The user may provide a wallet access input, e.g., 3311 into the user wallet device. In various embodiments, the user input may include, but not be limited to: a single tap (e.g., a one-tap mobile app purchasing embodiment) of a touch-screen interface, keyboard entry, card swipe, activating a RFID/NFC equipped hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user.

In some embodiments, upon authenticating the user for access to virtual wallet features, the user wallet device may provide a transaction authorization input, e.g., 3314, to a point-of-sale ("PoS") client, e.g., 3302. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 3314, track 1 data from the user's plastic card (e.g., credit card, debit card, prepaid card, charge card, etc.), such as the example track 1 data provided below:

---

%B123456789012345^PUBLIC/J.Q.^99011200000000000000\*\*901\*\*\*\*\*\*?\*
(wherein '123456789012345' is the card number of 'J.Q. Public' and has a CVV number of 901. '990112' is a service code, and \*\*\* represents decimal digits which change randomly each time the card is used.)

---

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 3314, substantially in the form of XML-formatted data, is provided below:

---

```
<?XML version = "1.0" encoding = "UTF-8"?>
<transaction_authorization_input>
    <payment_data>
        <account>
            <charge_priority>1</charge_priority>
            <charge_ratio>40%</charge_ratio>
            <account_type>debit</account_type>
            <value_exchange_symbol>USD</value_exchange_symbol>
            <account_number>123456789012345</account_number>
            <account_name>John Q. Public</account_name>
            <bill_add>987 Green St #456, Chicago, IL 94652</bill_add>
            <ship_add>987 Green St #456, Chicago, IL 94652</ship_add>
            <CVV_type>dynamic<CVV_type>
            <CVV>http://www.paynet.com/dcvv.php?sessionID=4NFU4RG94</CVV>
            <cloak_flag>ON</cloak_flag>
            <alert_rules>tar1 tar4 tar12</alert_rules>
            <mode>NFC</mode>
        </account>
        <account>
            <charge_priority>1</charge_priority>
            <charge_ratio>60%</charge_ratio>
            <account_type>rewards</account_type>
            <value_exchange_symbol>VME</value_exchange_symbol>
            <account_number>234567890123456</account_number>
            <account_name>John Q. Public</account_name>
            <bill_add>987 Green St #456, Chicago, IL 94652</bill_add>
            <ship_add>987 Green St #456, Chicago, IL 94652</ship_add>
            <CVV_type>static<CVV_type>
            <CVV>173</CVV>
            <cloak_flag>ON</cloak_flag>
            <alert_rules>tar1 tar4 tar12</alert_rules>
            <mode>Bluetooth</mode>
        </account>
        <account>
            <charge_priority>2</charge_priority>
            <charge_ratio>100%</charge_ratio>
            <account_number>345678901234567</account_number>
            <account_type>credit</account type>
            <value_exchange_symbol>USD</value_exchange_symbol>
```

```
            <account_name>John Q. Public</account_name>
            <bill_add>987 Green St #456, Chicago, IL 94652</bill_add>
            <ship_add>987 Green St #456, Chicago, IL 94652</ship_add>
            <CVV_type>static<CVV_type>
            <CVV>173</CVV>
            <cloak_flag>ON</cloak_flag>
            <alert_rules>tar1 tar4 tar12</alert_rules>
            <mode>NFC</mode>
        </account>
    </payment_data>
    <!--optional data-->
    <timestamp>2011-02-22 15:22:43</timestamp>
    <expiry_lapse>00:00:30</expiry_lapse>
    <secure_key>044532907059862348795654332</secure_key>
    <alerts_track_flag>TRUE</alerts_track_flag>
    <device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_flag>
    </device_fingerprint>
</transaction_authorization_input>
```

In some embodiments, the PoS client may generate a card authorization request, e.g., 3315, using the obtained transaction authorization input from the user wallet device, and/or product/checkout data (see, e.g., FIG. 31, 3115-3117). An example listing of a card authorization request 3315-3316, substantially in the form of a HTTP(S) POST message including XML-formatted data, is provided below:

```
POST /authorizationrequests.php HTTP/1.1
Host: www.acquirer.com
Content-Type: Application/XML
Content-Length: 1306
<?XML version = "1.0" encoding = "UTF-8"?>
<card_authorization_request>
    <session_ID>4NFU4RG94</order_ID>
    <!--optional data-->
    <timestamp>2011-02-22 15:22:43</timestamp>
    <expiry>00:00:30</expiry>
    <alerts_URL>www.merchant.com/shopcarts.php?sessionID=AEBB4356</alerts_URL>
    <user_ID>john.q.public@gmail.com</user_ID>
    <device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_flag>
    </device_fingerprint>
    <purchase_details>
        <total_cost>$121.49</total_cost>
        <cart>
            <product>
                <merchant_params>
                    <merchant_id>54TBRELF8</merchant_id>
                    <merchant_name>BARNES, Inc.</merchant_name>
                    <merchant_auth_key>TMN45GER98</merchant_auth_key>
                </merchant_params>
                <product_type>book</product_type>
                <product_params>
                    <product_title>XML for dummies</product_title>
```

```
                    <ISBN>938-2-14-168710-0</ISBN>
                    <edition>2nd ed.</edition>
                    <cover>hardbound</cover>
                </product_params>
                <quantity>2</quantity>
                <unit_cost>$14.46</unit_cost>
                <coupon_id>AY34567</coupon_id>
            <social_flag>ON</social_flag>
            <social_message>Look what I bought today!</social_message>
            <social_networks>facebook twitter</social_networks>
            </product>
            <product>
                <merchant_params>
                    <merchant_id>3FBCR4INC</merchant_id>
                    <merchant_name>Books, Inc.</merchant_name>
                    <merchant_auth_key>1N484MID-
Platform</merchant_auth_key>
                </merchant_params>
                <product_type>book</product_type>
                <product_params>
                    <product_title>Sophie's World</product_title>
                    <ISBN>955-2-14-112310-0</ISBN>
                    <edition>NULL</edition>
                    <cover>hardbound</cover>
                </product_params>
                <quantity>1</quantity>
                <unit_cost>$34.78</unit_cost>
                <coupon_id>null</coupon_id>
            <social_flag>OFF</social_flag>
            </product>
        </cart>
        <cart>
            <product>
                <merchant_params>
                    <merchant_id>RFH5IB4FT</merchant_id>
                    <merchant_name>Amzn, Inc.</merchant_name>
                    <merchant_auth_key>44543DSJFG</merchant_auth_key>
                </merchant_params>
                <product_type>book</product_type>
                <product_params>
                    <product_title>XML - a primer</product_title>
                    <ISBN>938-2-14-1436710-0</ISBN>
                    <edition>2nd ed.</edition>
                    <cover>hardbound</cover>
                </product_params>
                <quantity>1</quantity>
                <unit_cost>$12.93</unit_cost>
                <coupon_id>AY34567</coupon_id>
            <social_flag>ON</social_flag>
            <social_message>Look what I bought today!</social_message>
            <social_networks>facebook twitter</social_networks>
            </product>
            <product>
                <merchant_params>
                    <merchant_id>3FBCR4INC</merchant_id>
                    <merchant_name>BestBooks, Inc.</merchant_name>
                    <merchant_auth_key>1N484MID-
Platform</merchant_auth_key>
                </merchant_params>
                <product_type>book</product_type>
                <product_params>
                    <product_title>Sophie's Choice</product_title>
                    <ISBN>938-2-14-168710-0</ISBN>
                    <edition>1st ed.</edition>
                </product_params>
                <quantity>1</quantity>
                <unit_cost>$44.86</unit_cost>
                <coupon_id>null</coupon_id>
            <social_flag>OFF</social_flag>
            </product>
        </cart>
    </purchase_details>
    <account_params>
        <account>
            <charge_priority>1</charge_priority>
            <charge_ratio>40%</charge_ratio>
            <account_type>debit</account_type>
            <value_exchange_symbol>USD</value_exchange_symbol>
            <account_number>123456789012345</account_number>
```

```
        <account_name>John Q. Public</account_name>
        <bill_add>987 Green St #456, Chicago, IL 94652</bill_add>
        <ship_add>987 Green St #456, Chicago, IL 94652</ship_add>
        <CVV_type>dynamic<CVV_type>
        <CVV>http://www.paynet.com/dcvv.php?sessionID=4NFU4RG94</CVV>
        <cloak_flag>ON</cloak_flag>
        <alert_rules>tar1 tar4 tar12</alert_rules>
        <mode>NFC</mode>
    </account>
    <account>
        <charge_priority>1</charge_priority>
        <charge_ratio>60%</charge_ratio>
        <account_type>rewards</account_type>
        <value_exchange_symbol>VME</value_exchange_symbol>
        <account_number>234567890123456</account_number>
        <account_name>John Q. Public</account_name>
        <bill_add>987 Green St #456, Chicago, IL 94652</bill_add>
        <ship_add>987 Green St #456, Chicago, IL 94652</ship_add>
        <CVV_type>static<CVV_type>
        <CVV>173</CVV>
        <cloak_flag>ON</cloak_flag>
        <alert_rules>tar1 tar4 tar12</alert_rules>
        <mode>Bluetooth</mode>
    </account>
    <account>
        <charge_priority>2</charge_priority>
        <charge_ratio>100%</charge_ratio>
        <account_number>345678901234567</account_number>
        <account_type>credit</account_type>
        <value_exchange_symbol>USD</value_exchange_symbol>
        <account_name>John Q. Public</account_name>
        <bill_add>987 Green St #456, Chicago, IL 94652</bill_add>
        <ship_add>987 Green St #456, Chicago, IL 94652</ship_add>
        <CVV_type>static<CVV_type>
        <CVV>173</CVV>
        <cloak_flag>ON</cloak_flag>
        <alert_rules>tar1 tar4 tar12</alert_rules>
        <mode>NFC</mode>
    </account>
</account_params>
<shipping_info>
    <shipping_adress>#ref-ANON-123-45-678</shipping_address>
    <ship_type>expedited</ship_type>
    <ship_carrier>FedEx</ship_carrier>
    <ship_account>ANON-123-45-678</ship_account>
    <tracking_flag>true</tracking_flag>
    <sign_flag>false</sign_flag>
</shipping_info>
</card_authorization_request>
```

In some embodiments, the card authorization request generated by the user device may include a minimum of information required to process the purchase transaction. For example, this may improve the efficiency of communicating the purchase transaction request, and may also advantageously improve the privacy protections provided to the user and/or merchant. For example, in some embodiments, the card authorization request may include at least a session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant. In some embodiments, the PoS client may provide the generated card authorization request to the merchant server, e.g., 3316. The merchant server may forward the card authorization request to a pay gateway server, e.g., 3304a, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., merchant/acquirer database 3303b, for a network address of the payment gateway server, for example by using a portion of a user payment card number, or a user ID (such as an email address) as a keyword for the database query. For example, the merchant server may issue PHP/SQL commands to query a database table (such as FIG. 37, Pay Gateways 3719h) for a URL of the pay gateway server. An example payment gateway address query 3317, substantially in the form of PHP/SQL commands, is provided below:

```
<?PHP
header('Content-Type: text/plain');
mysql_connect("254.93.179.112", $DBserver, $password); // access
database server
mysql_select_db("MID-PLATFORM_DB.SQL"); // select database
table to search
//create query
$query = "SELECT paygate_id paygate_address paygate_URL
    paygate_name FROM PayGatewayTable WHERE card_num LIKE
    '%' $cardnum";
```

```
$result = mysql_query($query); // perform the search query
mysql_close("MID-PLATFORM_DB.SQL"); // close database access
?>
```

In response, the merchant/acquirer database may provide the requested payment gateway address, e.g., 3318. The merchant server may forward the card authorization request to the pay gateway server using the provided address, e.g., 3319. In some embodiments, upon receiving the card authorization request from the merchant server, the pay gateway server may invoke a component to provide one or more services associated with purchase transaction authorization. For example, the pay gateway server may invoke components for fraud prevention, loyalty and/or rewards, and/or other services for which the user-merchant combination is authorized. The pay gateway server may forward the card authorization request to a pay network server, e.g., 3305a, for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., pay gateway database 3304b, for a network address of the payment network server, for example by using a portion of a user payment card number, or a user ID (such as an email address) as a keyword for the database query. For example, the pay gateway server may issue PHP/SQL commands to query a database table (such as FIG. 37, Pay Gateways 3719h) for a URL of the pay network server. An example payment network address query 3321, substantially in the form of PHP/SQL commands, is provided below:

```
<?PHP
header('Content-Type: text/plain');
mysql_connect("254.93.179.112", $DBserver, $password); // access database server
mysql_select_db("MID-PLATFORM_DB.SQL"); // select database table to search
//create query
$query = "SELECT payNET_id payNET_address payNET_URL
    payNET_name FROM PayGatewayTable WHERE card_num LIKE
    '%' $cardnum";
$result = mysql_query($query); // perform the search query
mysql_close("MID-PLATFORM_DB.SQL"); // close database access
?>
```

In response, the payment gateway database may provide the requested payment network address, e.g., 3322. The pay gateway server may forward the card authorization request to the pay network server using the provided address, e.g., 3323.

With reference to FIG. 33B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

In some embodiments, the pay network server may generate a query, e.g., 3324, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 3306a, of the issuer(s) may maintain details of the user's account(s). In some embodiments, a database, e.g., pay network database 3305b, may store details of the issuer server(s) associated with the issuer(s). In some embodiments, the pay network server may query a database, e.g., pay network database 3305b, for a network address of the issuer(s) server(s), for example by using a portion of a user payment card number, or a user ID (such as an email address) as a keyword for the database query. For example, the merchant server may issue PHP/SQL commands to query a database table (such as FIG. 37, Issuers 3719f) for network address(es) of the issuer(s) server(s). An example issuer server address(es) query 3324, substantially in the form of PHP/SQL commands, is provided below:

```
<?PHP
header('Content-Type: text/plain');
mysql_connect("254.93.179.112", $DBserver, $password); // access database server
mysql_select_db("MID-PLATFORM_DB.SQL"); // select database table to search
//create query
$query = "SELECT issuer_id issuer_address issuer_URL issuer_name
    FROM IssuersTable WHERE card_num LIKE '%' $cardnum";
$result = mysql_query($query); // perform the search query
mysql_close("MID-PLATFORM_DB.SQL"); // close database access
?>
```

In response to obtaining the issuer server query, e.g., 3324, the pay network database may provide, e.g., 3325, the requested issuer server data to the pay network server. In some embodiments, the pay network server may utilize the issuer server data to generate funds authorization request(s), e.g., 3326, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 3326, substantially in the form of a HTTP(S) POST message including XML-formatted data, is provided below:

```
POST /fundsauthorizationrequest.php HTTP/1.1
Host: www.issuer.com
Content-Type: Application/XML
Content-Length: 624
<?XML version = "1.0" encoding = "UTF-8"?>
<funds_authorization_request>
    <request_ID>VNEI39FK</request_ID>
    <timestamp>2011-02-22 15:22:44</timestamp>
```

```
<debit_amount>$72.89</debit_amount>
<account_params>
    <account>
        <account_type>debit</account_type>
        <value_exchange_symbol>USD</value_exchange_symbol>
        <account_number>123456789012345</account_number>
        <account_name>John Q. Public</account_name>
        <bill_add>987 Green St #456, Chicago, IL 94652</bill_add>
        <ship_add>987 Green St #456, Chicago, IL 94652</ship_add>
        <CVV>1234</CVV>
    </account>
</account_params>
<!--optional parameters-->
<user_device_fingerprint>
    <device_IP>192.168.23.126</device_IP>
    <device_MAC>0123.4567.89ab</device_MAC>
    <device_serial>312456768798765432</device_serial>
    <device_ECID>00000AEBCDF12345</device_ECID>
    <device_identifier>jqp_air</device_identifier>
    <device_UDID>21343e34-14f4-8jn4-7yfe-124578632134</device_UDID>
    <device_browser>firefox 2.2</device_browser>
    <device_type>smartphone</device_type>
    <device_model>HTC Hero</device_model>
    <OS>Android 2.2</OS>
    <wallet_app_installed_flag>true</wallet_app_installed_flag>
</user_device_fingerprint>
</funds_authorization_request>
```

In some embodiments, an issuer server may parse the authorization request(s), and based on the request details may query a database, e.g., user profile database 3306b, for data associated with an account linked to the user. For example, the merchant server may issue PHP/SQL commands to query a database table (such as FIG. 37, Accounts 3719d) for user account(s) data. An example user account(s) query 3327, substantially in the form of PHP/SQL commands, is provided below:

```
<?PHP
header('Content-Type: text/plain');
mysql_connect("254.93.179.112", $DBserver, $password); // access
database server
mysql_select_db("MID-PLATFORM_DB.SQL"); // select database
table to search
//create query
$query = "SELECT issuer user_id user_name user_balance
    account_type FROM AccountsTable WHERE account_num LIKE
    '%' $accountnum";
$result = mysql_query($query); // perform the search query
mysql_close("MID-PLATFORM_DB.SQL"); // close database access
?>
```

In some embodiments, on obtaining the user account(s) data, e.g., 3328, the issuer server may determine whether the user can pay for the transaction using funds available in the account, 3329. For example, the issuer server may determine whether the user has a sufficient balance remaining in the account, sufficient credit associated with the account, and/or the like. Based on the determination, the issuer server(s) may provide a funds authorization response, e.g., 3330, to the pay network server. For example, the issuer server(s) may provide a HTTP(S) POST message similar to the examples above. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 3331, the pay network server may invoke a component to provide value-add services for the user.

In some embodiments, the pay network server may generate a transaction data record from the authorization request and/or authorization response, and store the details of the transaction and authorization relating to the transaction in a transactions database. For example, the pay network server may issue PHP/SQL commands to store the data to a database table (such as FIG. 37, Transactions 3719i). An example transaction store command, substantially in the form of PHP/SQL commands, is provided below:

```
<?PHP
header('Content-Type: text/plain');
mysql_connect("254.92.185.103", $DBserver, $password); // access database server
mysql_select("MID-PLATFORM_DB.SQL"); // select database to append
mysql_query("INSERT INTO TransactionsTable (PurchasesTable (timestamp,
    purchase_summary_list, num_products, product_summary, product_quantity,
    transaction_cost, account_params_list, account_name, account_type,
    account_num, billing_addres, zipcode, phone, sign, merchant_params_list,
    merchant_id, merchant_name, merchant_auth_key)
```

-continued

```
VALUES (time( ), $purchase_summary_list, $num_products, $product_summary,
    $product_quantity, $transaction_cost, $account_params_list, $account_name,
    $account_type, $account_num, $billing_addres, $zipcode, $phone, $sign,
    $merchant_params_list, $merchant_id, $merchant_name, $merchant_auth_key)");
    // add data to table in database
mysql_close("MID-PLATFORM_DB.SQL"); // close connection to database
?>
```

In some embodiments, the pay network server may forward a transaction authorization response, e.g., 3332, to the user wallet device, PoS client, and/or merchant server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 3333, and store the XML data file, e.g., 3334, in a database, e.g., merchant database 404. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MID-Platform59CHB27365</merchant_auth_key>
    <account_number>123456789</account_number>
</merchant_data>
<transaction_data>
    <transaction 1>
        ...
    </transaction 1>
    <transaction 2>
        ...
    </transaction 2>
    .
    .
    .
    <transaction n>
        ...
    </transaction n>
</transaction_data>
```

In some embodiments, the server may also generate a purchase receipt, e.g., 3333, and provide the purchase receipt to the client, e.g., 3335. The client may render and display, e.g., 3336, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 34A:
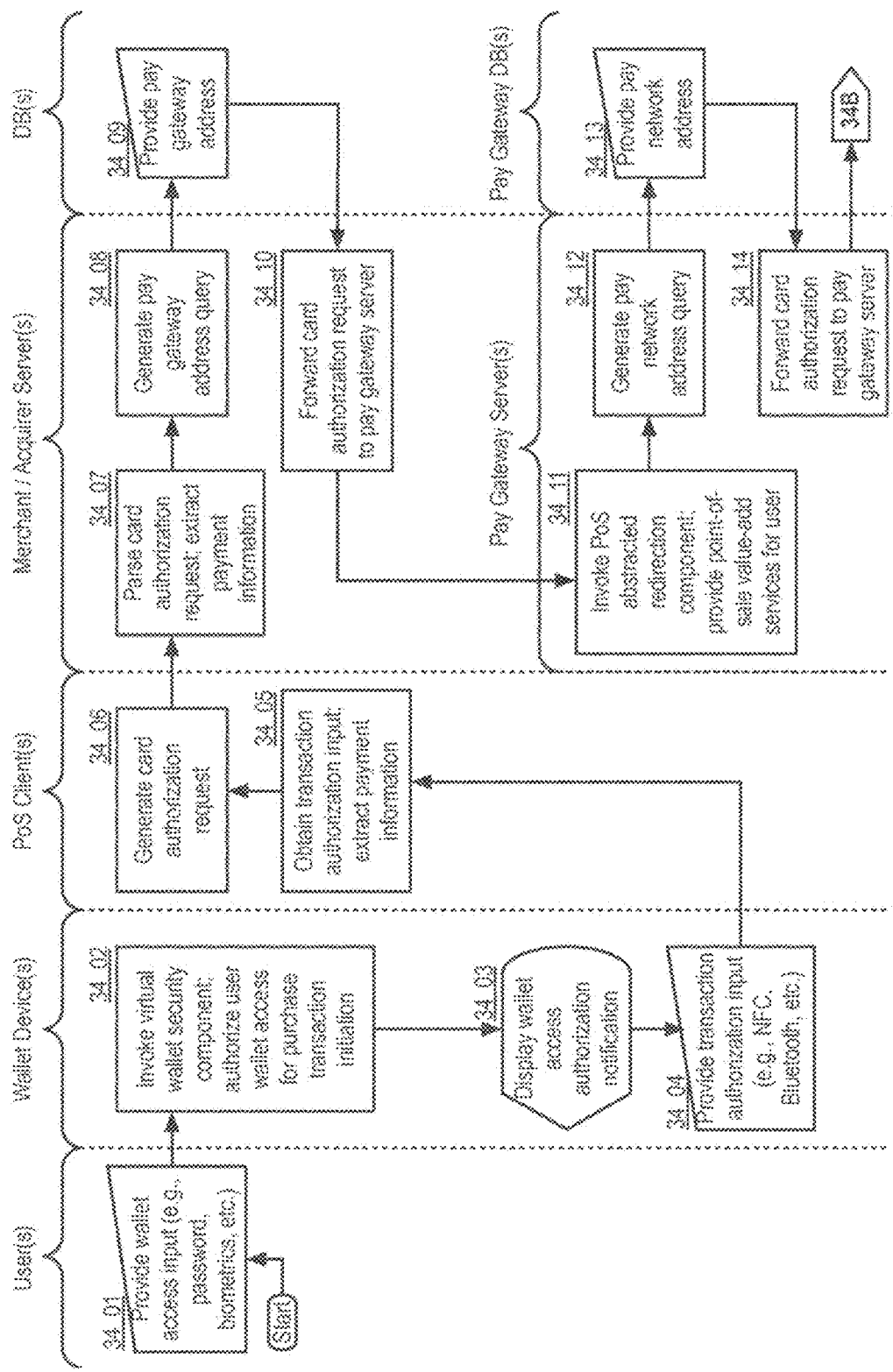
FIGS. 34A-B show logic flow diagrams illustrating example aspects of transforming a user virtual wallet access input via a Purchase Transaction Authorization ("PTA") component into a purchase transaction receipt notification.
Figure 34B:
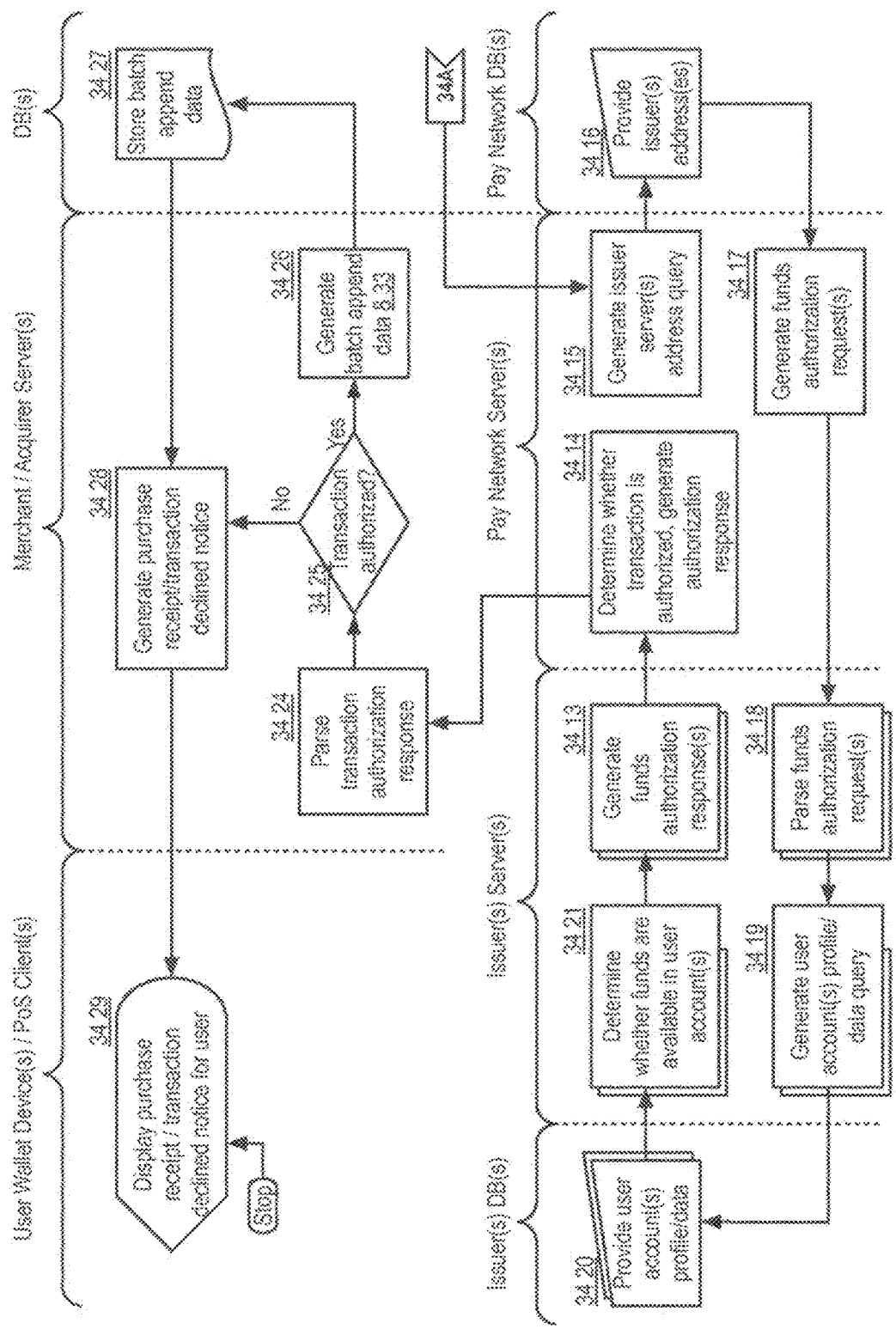

FIGS. 34A-B show logic flow diagrams illustrating example aspects of transforming a user virtual wallet access input via a Purchase Transaction Authorization ("PTA") component into a purchase transaction receipt notification. With reference to FIG. 34A, in some embodiments, a user may wish to utilize a virtual wallet account to purchase a product, service, offering, and/or the like ("product"), from a merchant via a merchant online site or in the merchant's store. The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 3401, into the user wallet device. In various embodiments, the user input may include, but not be limited to: a single tap (e.g., a one-tap mobile app purchasing embodiment) of a touchscreen interface, keyboard entry, card swipe, activating a RFID/NFC equipped hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user, e.g., 3402-3403.

In some embodiments, upon authenticating the user for access to virtual wallet features, the user wallet device may provide a transaction authorization input, e.g., 3404, to a point-of-sale ("PoS") client. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may obtain the transaction authorization input, and parse the input to extract payment information from the transaction authorization input, e.g., 3405. For example, the PoS client may utilize a parser, such as the example parsers provided below in the discussion with reference to FIG. 37. The PoS client may generate a card authorization request, e.g., 3406, using the obtained transaction authorization input from the user wallet device, and/or product/checkout data (see, e.g., FIG. 31, 3115-3117).

In some embodiments, the PoS client may provide the generated card authorization request to the merchant server. The merchant server may forward the card authorization request to a pay gateway server, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., 3408, for a network address of the payment gateway server, for example by using a portion of a user payment card number, or a user ID (such as an email address) as a keyword for the database query. In response, the merchant/acquirer database may provide the requested payment gateway address, e.g., 3410. The merchant server may forward the card authorization request to the pay gateway server using the provided address. In some embodiments, upon receiving the card authorization request from the merchant server, the pay gateway server may invoke a component to provide one or more service associated with purchase transaction authorization, e.g., 3411. For example, the pay gateway server may invoke components for fraud prevention (see e.g., VerifyChat, FIG. 3E), loyalty and/or rewards, and/or other services for which the user-merchant combination is authorized.

The pay gateway server may forward the card authorization request to a pay network server for payment processing, e.g., 3414. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., 3412, for a network address of the payment network server, for example by using a portion of a user payment card number, or a user ID (such as an email address) as a keyword for the database query. In response, the payment gateway database may provide the requested payment network address, e.g., 3413. The pay gateway server may forward the card authorization request to the pay network server using the provided address, e.g., 3414.

With reference to FIG. 34B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some embodiments, the pay network server may generate a query, e.g., 3415, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a pay network database, may store details of the issuer server(s) associated with the issuer(s). In some embodiments, the pay network server may query a database, e.g., 3415, for a network address of the issuer(s) server(s), for example by using a portion of a user payment card number, or a user ID (such as an email address) as a keyword for the database query.

In response to obtaining the issuer server query, the pay network database may provide, e.g., 3416, the requested issuer server data to the pay network server. In some embodiments, the pay network server may utilize the issuer server data to generate funds authorization request(s), e.g., 3417, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 3418, and based on the request details may query a database, e.g., 3419, for data associated with an account linked to the user.

In some embodiments, on obtaining the user account(s) data, e.g., 3420, the issuer server may determine whether the user can pay for the transaction using funds available in the account, e.g., 3421. For example, the issuer server may determine whether the user has a sufficient balance remaining in the account, sufficient credit associated with the account, and/or the like. Based on the determination, the issuer server(s) may provide a funds authorization response, e.g., 3422, to the pay network server. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 3423, the pay network server may invoke a component to provide value-add services for the user, e.g., 3423.

In some embodiments, the pay network server may forward a transaction authorization response to the user wallet device, PoS client, and/or merchant server. The merchant may parse, e.g., 3424, the transaction authorization response, and determine from it that the user possesses sufficient funds in the card account to conduct the transaction, e.g., 3425, option "Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 3426, and store the XML data file, e.g., 3427, in a database. In some embodiments, the server may also generate a purchase receipt, e.g., 3428, and provide the purchase receipt to the client. The client may render and display, e.g., 3429, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 35A:
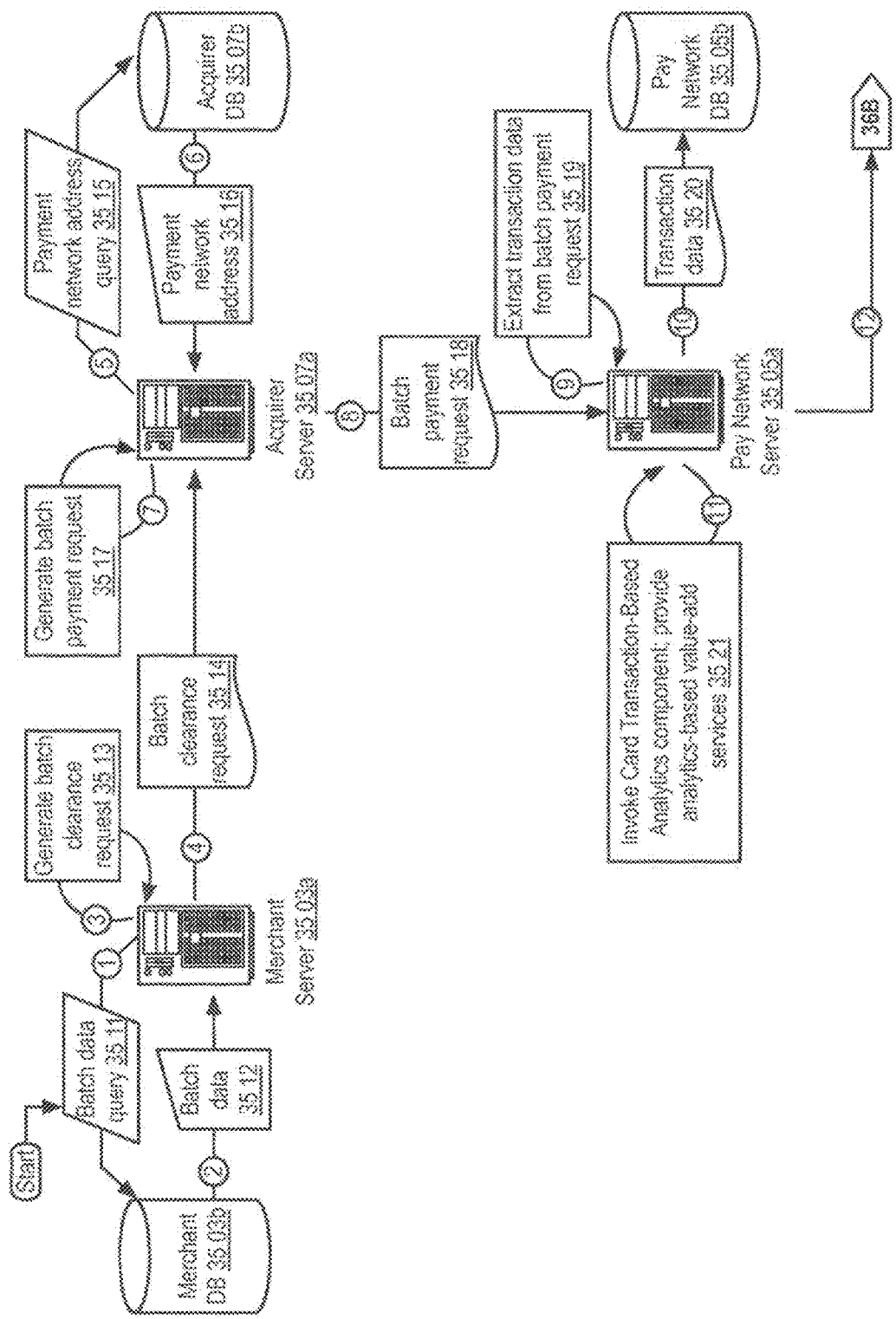
FIGS. 35A-B show datagraph diagrams illustrating example aspects of transforming a merchant transaction batch data query via a Purchase Transaction Clearance ("PTC") component into an updated payment ledger record.
Figure 35B:
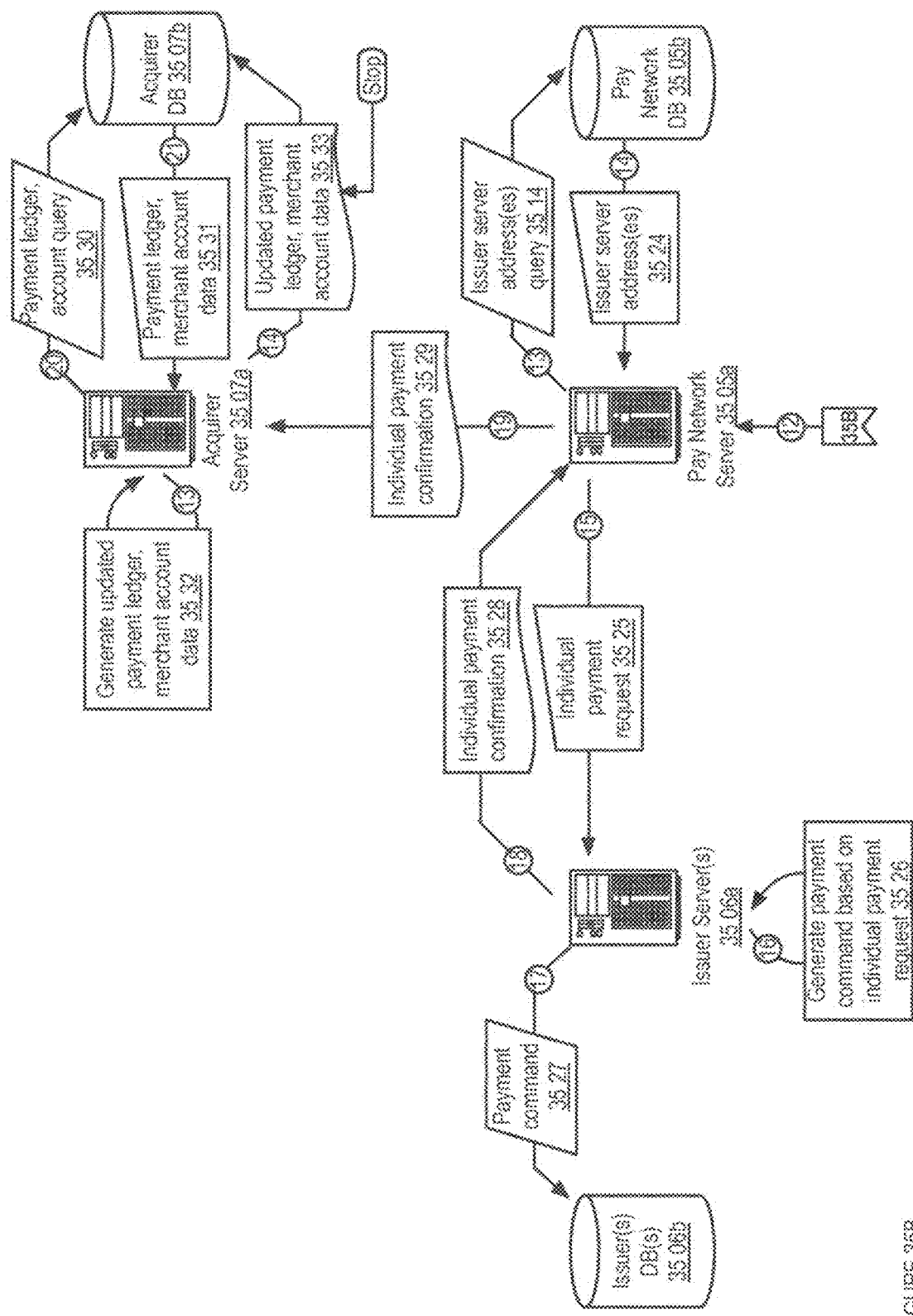

FIGS. 35A-B show data flow diagrams illustrating example aspects of transforming a merchant transaction batch data query via a Purchase Transaction Clearance ("PTC") component into an updated payment ledger record. With reference to FIG. 35A, in some embodiments, a merchant server, e.g., 3503*a*, may initiate clearance of a batch of authorized transactions. For example, the merchant server may generate a batch data request, e.g., 3511, and provide the request, to a merchant database, e.g., 3503*b*. For example, the merchant server may utilize PHP/SQL commands similar to the examples provided above to query a relational database. In response to the batch data request, the database may provide the requested batch data, e.g., 3512. The server may generate a batch clearance request, e.g., 3513, using the batch data obtained from the database, and provide, e.g., 3514, the batch clearance request to an acquirer server, e.g., 3507*a*. For example, the merchant server may provide a HTTP(S) POST message including XML-formatted batch data in the message body for the acquirer server. The acquirer server may generate, e.g., 3515, a batch payment request using the obtained batch clearance request, and provide, e.g., 3518, the batch payment request to the pay network server, e.g., 3505*a*. The pay network server may parse the batch payment request, and extract the transaction data for each transaction stored in the batch payment request, e.g., 3519. The pay network server may store the transaction data, e.g., 3520, for each transaction in a database, e.g., pay network database 3505*b*. In some embodiments, the pay network server may invoke a component to provide value-add analytics services based on analysis of the transactions of the merchant for whom the MID-PLATFORM is clearing purchase transactions. Thus, in some embodiments, the pay network server may provide analytics-based value-added services for the merchant and/ or the merchant's users.

With reference to FIG. 35B, in some embodiments, for each extracted transaction, the pay network server may query, e.g., 3523, a database, e.g., pay network database 3505*b*, for an address of an issuer server. For example, the pay network server may utilize PHP/SQL commands similar to the examples provided above. The pay network server may generate an individual payment request, e.g., 3525, for each transaction for which it has extracted transaction data, and provide the individual payment request, e.g., 3525, to the issuer server, e.g., 3506*a*. For example, the pay network server may provide an individual payment request to the issuer server(s) as a HTTP(S) POST message including XML-formatted data. An example listing of an individual payment request 3525, substantially in the form of a HTTP (S) POST message including XML-formatted data, is provided below:

```
POST /paymentrequest.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$72.89</pay_amount>
    <account_params>
        <account>
            <account_type>debit</account_type>
            <value_exchange_symbol>USD</value_exchange_symbol>
            <account_number>123456789012345</account_number>
            <account_name>John Q. Public</account_name>
            <bill_add>987 Green St #456, Chicago, IL 94652</bill_add>
            <ship_add>987 Green St #456, Chicago, IL 94652</ship_add>
            <CVV>1234</CVV>
        </account>
    </account_params>
</pay_request>
```

In some embodiments, the issuer server may generate a payment command, e.g., 3527. For example, the issuer server may issue a command to deduct funds from the user's account (or add a charge to the user's credit card account). The issuer server may issue a payment command, e.g., 3527, to a database storing the user's account information, e.g., user profile database 3506*b*. The issuer server may provide an individual payment confirmation, e.g., 3528, to the pay network server, which may forward, e.g., 3529, the funds transfer message to the acquirer server. An example listing of an individual payment confirmation 3528, substantially in the form of a HTTP(S) POST message including XML-formatted data, is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$72.89</deposit_amount>
</deposit_ack>
```

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 3530, an acquirer database 3507b for payment ledger and/or merchant account data, e.g., 3531. The acquirer server may utilize payment ledger and/or merchant account data from the acquirer database, along with the individual payment confirmation, to generate updated payment ledger and/or merchant account data, e.g., 3532. The acquirer server may then store, e.g., 3533, the updated payment ledger and/or merchant account data to the acquire database.

Figure 36A:
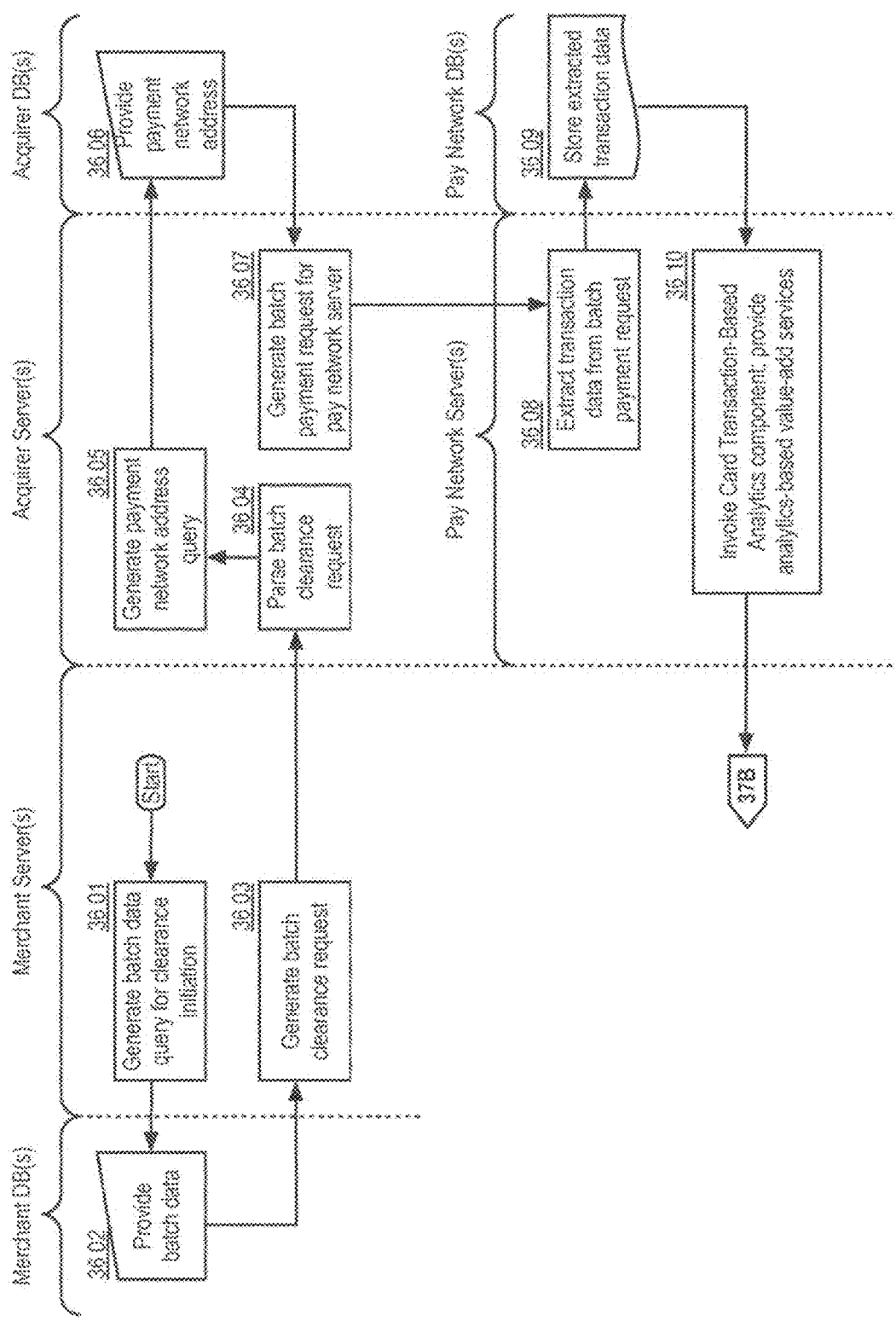
FIGS. 36A-B show logic flow diagrams illustrating example aspects of transforming a merchant transaction batch data query via a Purchase Transaction Clearance ("PTC") component into an updated payment ledger record.
Figure 36B:
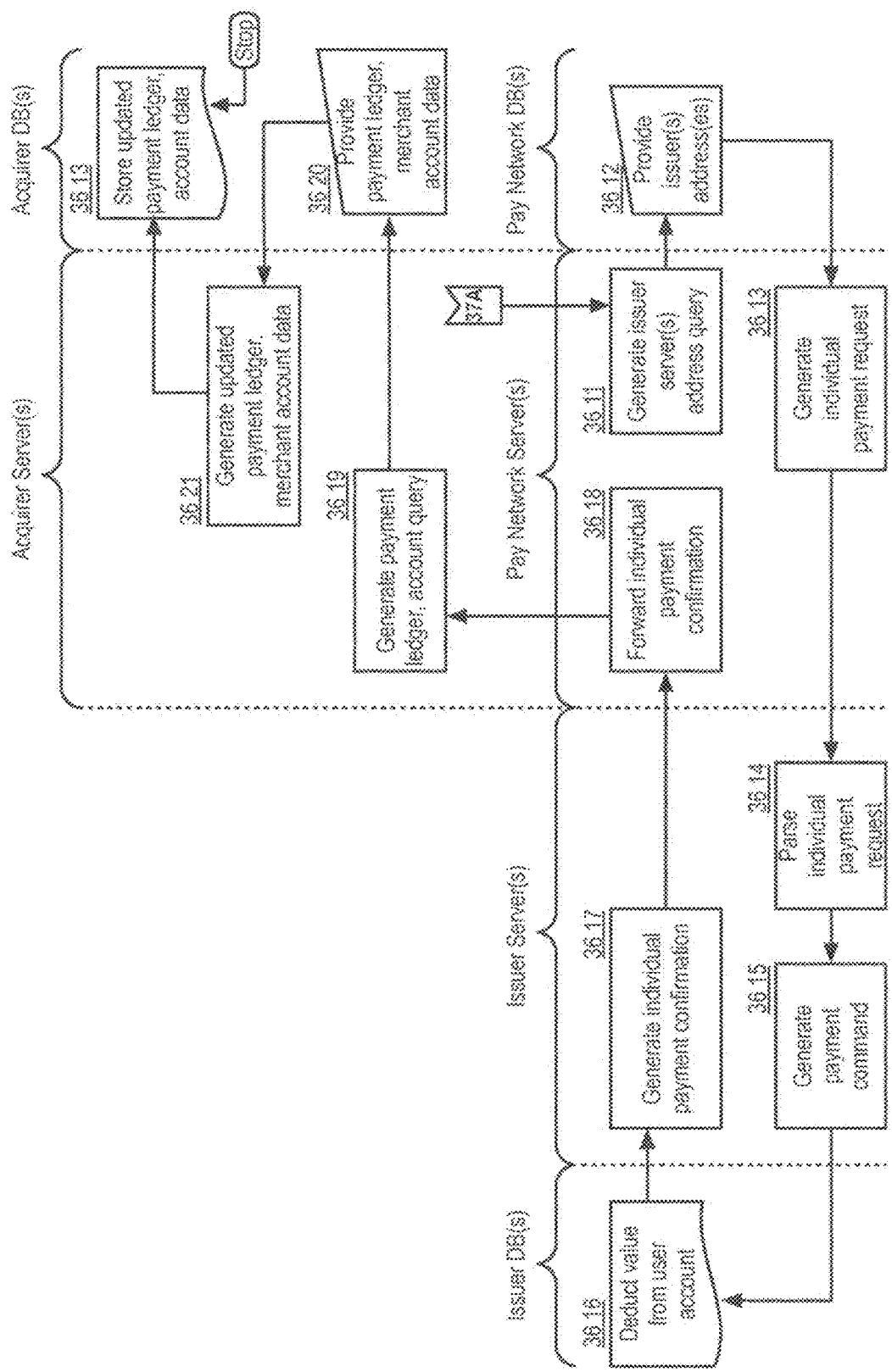

FIGS. 36A-B show logic flow diagrams illustrating example aspects of transforming a merchant transaction batch data query via a Purchase Transaction Clearance ("PTC") component into an updated payment ledger record. With reference to FIG. 36A, in some embodiments, a merchant server may initiate clearance of a batch of authorized transactions. For example, the merchant server may generate a batch data request, e.g., 3601, and provide the request to a merchant database. In response to the batch data request, the database may provide the requested batch data, e.g., 3602. The server may generate a batch clearance request, e.g., 3603, using the batch data obtained from the database, and provide the batch clearance request to an acquirer server. The acquirer server may parse, e.g., 3604, the obtained batch clearance request, and generate, e.g., 3607, a batch payment request using the obtained batch clearance request to provide, the batch payment request to a pay network server. For example, the acquirer server may query, e.g., 3605, an acquirer database for an address of a payment network server, and utilize the obtained address, e.g., 3606, to forward the generated batch payment request to the pay network server.

The pay network server may parse the batch payment request obtained from the acquirer server, and extract the transaction data for each transaction stored in the batch payment request, e.g., 3608. The pay network server may store the transaction data, e.g., 3609, for each transaction in a pay network database. In some embodiments, the pay network server may invoke a component, e.g., 3610, to provide analytics based on the transactions of the merchant for whom purchase transaction are being cleared.

With reference to FIG. 36B, in some embodiments, for each extracted transaction, the pay network server may query, e.g., 3611, a pay network database for an address of an issuer server. The pay network server may generate an individual payment request, e.g., 3613, for each transaction for which it has extracted transaction data, and provide the individual payment request to the issuer server. In some embodiments, the issuer server may parse the individual payment request, e.g., 3614, and generate a payment command, e.g., 3615, based on the parsed individual payment request. For example, the issuer server may issue a command to deduct funds from the user's account (or add a charge to the user's credit card account). The issuer server may issue a payment command, e.g., 3615, to a database storing the user's account information, e.g., a user profile database. The issuer server may provide an individual payment confirmation, e.g., 3617, to the pay network server, which may forward, e.g., 3618, the individual payment confirmation to the acquirer server.

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 3619, an acquirer database for payment ledger and/or merchant account data, e.g., 3620. The acquirer server may utilize payment ledger and/or merchant account data from the acquirer database, along with the individual payment confirmation, to generate updated payment ledger and/or merchant account data, e.g., 3621. The acquirer server may then store, e.g., 3622, the updated payment ledger and/or merchant account data to the acquire database.

MID-PLATFORM Controller

FIG. 37 shows a block diagram illustrating example aspects of a MID-PLATFORM controller 3701. In this embodiment, the MID-PLATFORM controller 3701 may serve to aggregate, process, store, search, serve, identify, instruct, generate, match, and/or facilitate interactions with a computer through various technologies, and/or other related data.

Users, e.g., 3733a, which may be people and/or other systems, may engage information technology systems (e.g., computers) to facilitate information processing. In turn, computers employ processors to process information; such processors 3703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MID-PLATFORM controller 3701 may be connected to and/or communicate with entities such as, but not limited to: one or more users from user input devices 3711; peripheral devices 3712; an optional cryptographic processor device 3728; and/or a communications network 3713. For example, the MID-PLATFORM controller 3701 may be connected to and/or communicate with users, e.g., 3733a, operating client device(s), e.g., 3733b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MID-PLATFORM controller 3701 may be based on computer systems that may comprise, but are not limited to, components such as: a computer systemization 3702 connected to memory 3729.

Computer Systemization

A computer systemization 3702 may comprise a clock 3730, central processing unit ("CPU(s)" and/or "processor(s)" (these terms are used interchangeably throughout the disclosure unless noted to the contrary)) 3703, a memory 3729 (e.g., a read only memory (ROM) 3706, a random access memory (RAM) 3705, etc.), and/or an interface bus 3707, and most frequently, although not necessarily, are all interconnected and/or communicating through a system bus 3704 on one or more (mother)board(s) 3702 having conductive and/or otherwise transportive circuit pathways through which instructions (e.g., binary encoded signals) may travel to effectuate communications, operations, storage, etc. The computer systemization may be connected to a power source 3786; e.g., optionally the power source may be internal. Optionally, a cryptographic processor 3726 and/or transceivers (e.g., ICs) 3774 may be connected to the system bus. In another embodiment, the cryptographic processor and/or transceivers may be connected as either internal and/or external peripheral devices 3712 via the interface bus I/O. In turn, the transceivers may be connected to antenna(s) 3775, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing MID-PLATFORM controller to determine its location)); Broadcom BCM4329FKUBG transceiver chip (e.g., providing 802.11n, Bluetooth 2.1+ EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 3729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the MID-PLATFORM controller and beyond through various interfaces. Should processing requirements dictate a greater amount speed and/or capacity, distributed processors (e.g., Distributed MID-PLATFORM), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the MID-PLATFORM may be achieved by implementing a microcontroller such as CAST's R8051XC2 microcontroller; Intel's MCS 51 (i.e., 8051 microcontroller); and/or the like. Also, to implement certain features of the MID-PLATFORM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MID-PLATFORM component collection (distributed or otherwise) and/or features may be implemented via the microprocessor and/or via embedded components; e.g., via ASIC, coprocessor, DSP, FPGA, and/or the like. Alternately, some implementations of the MID-PLATFORM may be implemented with embedded components that are configured and used to achieve a variety of features or signal processing.

Depending on the particular implementation, the embedded components may include software solutions, hardware solutions, and/or some combination of both hardware/software solutions. For example, MID-PLATFORM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MID-PLATFORM features. A hierarchy of programmable interconnects allow logic blocks to be interconnected as needed by the MID-PLATFORM system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the MID-PLATFORM may be developed on regular FPGAs and then migrated into a fixed version that more resembles ASIC implementations. Alternate or coordinating implementations may migrate MID-PLATFORM controller features to a final ASIC instead of or in addition to FPGAs. Depending on the implementation all of the aforementioned embedded components and microprocessors may be considered the "CPU" and/or "processor" for the MID-PLATFORM.

Power Source

The power source 3786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3786 is connected to at least one of the interconnected subsequent components of the MID-PLATFORM thereby providing an electric current to all the interconnected components. In one example, the power source 3786 is connected to the system bus component 3704. In an alternative embodiment, an outside power source 3786 is provided through a connection across the I/O 3708 interface. For example, a USB and/or IEEE 1394 connection carries both data and power across the connection and is therefore a suitable source of power.

Interface Adapters

Interface bus(ses) 3707 may accept, connect, and/or communicate to a number of interface adapters, frequently, although not necessarily in the form of adapter cards, such as but not limited to: input output interfaces (I/O) 3708, storage interfaces 3709, network interfaces 3710, and/or the like. Optionally, cryptographic processor interfaces 3727 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 3709 may accept, communicate, and/or connect to a number of storage devices such as, but not limited to: storage devices 3714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 3710 may accept, communicate, and/or connect to a communications network 3713. Through a communications network 3713, the MID-PLATFORM controller is accessible through remote clients 3733b (e.g., computers with web browsers) by users 3733a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed MID-PLATFORM), architectures may similarly be employed to pool, load balance, and/or otherwise increase the communicative bandwidth required by the MID-PLATFORM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 3710 may be used to engage with various communications network types 3713. For example, multiple network interfaces may be employed to allow for the communication over broadcast, multicast, and/or unicast networks.

Input Output interfaces (I/O) 3708 may accept, communicate, and/or connect to user input devices 3711, peripheral devices 3712, cryptographic processor devices 3728, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 3711 often are a type of peripheral device 3712 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 3712 may be connected and/or communicate to I/O and/or other facilities of the like such as network interfaces, storage interfaces, directly to the interface bus, system bus, the CPU, and/or the like. Peripheral devices may be external, internal and/or part of the MID-PLATFORM controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 3728), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the MID-PLATFORM controller may be embodied as an embedded, dedicated, and/or monitor-less (i.e., headless) device, wherein access would be provided over a network interface connection.

Cryptographic units such as, but not limited to, microcontrollers, processors 3726, interfaces 3727, and/or devices 3728 may be attached, and/or communicate with the MID-PLATFORM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 3729. However, memory is a fungible technology and resource, thus, any number of memory embodiments may be employed in lieu of or in concert with one another. It is to be understood that the MID-PLATFORM controller and/or a computer systemization may employ various forms of memory 3729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 3729 may include ROM 3706, RAM 3705, and a storage device 3714. A storage device 3714 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/Re-Writable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 3729 may contain a collection of program and/or database components and/or data such as, but not limited to: operating system component(s) 3715 (operating system); information server component(s) 3716 (information server); user interface component(s) 3717 (user interface); Web browser component(s) 3718 (Web browser); database(s) 3719; mail server component(s) 3721; mail client component(s) 3722; cryptographic server component (s) 3720 (cryptographic server); the MID-PLATFORM component(s) 3735 (e.g., UPC 3741; PTA 3742; PTC 3743; merchant enrollment 3744, merchant analytics 3745, campaign setup 3746, and/or the like); and/or the like (i.e., collectively a component collection). These components may be stored and accessed from the storage devices and/or from storage devices accessible through an interface bus. Although non-conventional program components such as those in the component collection may be stored in a local storage device 3714, they may also be loaded and/or stored in memory such as: peripheral devices, RAM, remote storage facilities through a communications network, ROM, various forms of memory, and/or the like.

Operating System

The operating system component 3715 is an executable program component facilitating the operation of the MID-PLATFORM controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MID-PLATFORM controller to communicate with other entities through a communications network 3713. Various communication protocols may be used by the MID-PLATFORM controller as a subcarrier transport mechanism for interaction, such as, but not limited to: multicast, TCP/IP, UDP, unicast, and/or the like.

Information Server

An information server component 3716 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MID-PLATFORM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MID-PLATFORM database 3719, operating systems, other program components, user interfaces, Web browsers, and/or the like.

Access to the MID-PLATFORM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MID-PLATFORM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MID-PLATFORM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 3717 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3718 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the MID-PLATFORM equipped nodes. The combined application may be nugatory on systems employing standard Web browsers.

Mail Server

A mail server component 3721 is a stored program component that is executed by a CPU 3703. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MID-PLATFORM.

Access to the MID-PLATFORM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3722 is a stored program component that is executed by a CPU 3703. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3720 is a stored program component that is executed by a CPU 3703, cryptographic processor 3726, cryptographic processor interface 3727, cryptographic processor device 3728, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the MID-PLATFORM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MID-PLATFORM component to engage in secure transactions if so desired. The cryptographic component facilitates the secure accessing of resources on the MID-PLATFORM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MID-PLATFORM Database

The MID-PLATFORM database component 3719 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the MID-PLATFORM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MID-PLATFORM database is implemented as a data-structure, the use of the MID-PLATFORM database 3719 may be integrated into another component such as the MID-PLATFORM component 3735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3719 includes several tables 3719*a-t*. A Users table 3719*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a MID-PLATFORM. A Devices table 3719*b* may include fields such as, but not limited to: device_ID, device_name, device_IP, device_GPS, device_MAC, device_serial, device_ECID, device_UDID, device_browser, device_type, device_model, device_version, device_OS, device_apps_list, device_securekey, wallet_app_installed_flag, and/or the like. An Apps table 3719*c* may include fields such as, but not limited to: app_ID, app_name, app_type, app_dependencies, app_access_code, user_pin, and/or the like. An Accounts table 3719*d* may include fields such as, but not limited to: account_number, account_security_code, account_name, issuer_acquirer_flag, issuer_name, acquirer_name, account_address, routing_number, access_API_call, linked_wallets_list, and/or the like. A Merchants table 3719*e* may include fields such as, but not limited to: merchant_id, merchant_name, merchant_address, store_id, ip_address, mac_address, auth_key, port_num, security_settings_list, and/or the like. An Issuers table 3719*f* may include fields such as, but not limited to: issuer_id, issuer_name, issuer_address, ip_address, mac_address, auth_key, port_num, security_settings_list, and/or the like. An Acquirers table 3719*g* may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 3719*h* may include fields such as, but not limited to: gateway_ID, gateway_IP, gateway_MAC, gateway_secure_key, gateway_access_list, gateway_API_call_list, gateway_services_list, and/or the like. A Shop Sessions table 3719*i* may include fields such as, but not limited to: user_id, session_id, alerts_URL, timestamp, expiry_lapse, merchant_id, store_id, device_type, device_ID, device_IP, device_MAC, device_browser, device_serial, device_ECID, device_model, device_OS, wallet_app_installed, total_cost, cart_ID_list, product_params_list, social_flag, social_message, social_networks_list, coupon_lists, accounts_list, CVV2_lists, charge_ratio_list, charge_priority_list, value_exchange_symbols_list, bill_address, ship_address, cloak_flag, pay_mode, alerts_rules_list, and/or the like. A Transactions table 3719*j* may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 3719*k* may include fields such as, but not limited to: batch_id, transaction_id_list, timestamp_list, cleared flag_list, clearance_trigger settings, and/or the like. A Ledgers table 3719l may include fields such as, but not limited to: request_id, timestamp, deposit_amount, batch_id, transaction_id, clear_flag, deposit_account, transaction_summary, payor_name, payor_account, and/or the like. A Products table 3719*m* may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 3719*n* may include fields such as, but not limited to: offer_ID, offer_title, offer_attributes_list, offer_price, offer_expiry, related_products_list, discounts_list, rewards_list, merchants_list, merchant_availability_list, and/or the like. A Behavior Data table 37190 may include fields such as, but not limited to: user_id, timestamp, activity_type, activity_location, activity_attribute_list, activity_attribute_values_list, and/or the like. An Analytics table 3719*p* may include fields such as, but not limited to: report_id, user_id, report_type, report_algorithm_id, report_destination_address, and/or the like. A Campaign Set-Up Page table 3719*q* may include fields such as, but not limited to: page_id, page_template_id, page_fields, page_fields_default_value, page_merchant_type, page_issuer type, and/or the like. An enrollment form table 3719*r* may include fields such as, but not limited to: form_id, form_name, form_type, form_acquirer_id, form_merchant_id, form_merchant_type, form_field, form_field_defaultvalue, and/or the like. A Campaign table 3719*s* may include fields such as, but not limited to: campaign_id, campaign_name, campaign_type, campaign_merchant_id, campaign_merchant_type, campaign_units, campaign_discount, campaign_brand, campaign_term, and/or the like. An API table 3719*t* may include fields such as, but not limited to: API_id, API_id, API_site_name, API_site_id, API_type API_template_id, API_key, secret, token, sample code, and/or the like.

In one embodiment, the MID-PLATFORM database may interact with other database systems. For example, employing a distributed database system, queries and data access by search MID-PLATFORM component may treat the combination of the MID-PLATFORM database, an integrated data security layer database as a single database entity.

In one embodiment, user programs may contain various user interface primitives, which may serve to update the MID-PLATFORM. Also, various accounts may require custom database tables depending upon the environments and the types of clients the MID-PLATFORM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3719*a*-*t*. The MID-PLATFORM may be configured to keep track of various settings, inputs, and parameters via database controllers.

The MID-PLATFORM database may communicate to and/or with other components in a component collection, including itself, and/or facilities of the like. Most frequently, the MID-PLATFORM database communicates with the MID-PLATFORM component, other program components, and/or the like. The database may contain, retain, and provide information regarding other nodes and data.

The MID-PLATFORMs

The MID-PLATFORM component 3735 is a stored program component that is executed by a CPU. In one embodiment, the MID-PLATFORM component incorporates any and/or all combinations of the aspects of the MID-PLATFORM discussed in the previous figures. As such, the MID-PLATFORM affects accessing, obtaining and the provision of information, services, transactions, and/or the like across various communications networks. The features and embodiments of the MID-PLATFORM discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MID-PLATFORM's features and facilities, and in many cases reduce the costs, energy consumption/requirements, and extend the life of MID-PLATFORM's underlying infrastructure; this has the added benefit of making the MID-PLATFORM more reliable. Similarly, many of the features and mechanisms are designed to be easier for users to use and access, thereby broadening the audience that may enjoy/employ and exploit the feature sets of the MID-PLATFORM; such ease of use also helps to increase the reliability of the MID-PLATFORM. In addition, the feature sets include heightened security as noted via the Cryptographic components 3720, 3726, 3728 and throughout, making access to the features and data more reliable and secure.

The MID-PLATFORM component may transform merchant transaction record and onboarding request via MID-PLATFORM components into merchant registration output, campaign ads and/or the like and use of the MID-PLATFORM. In one embodiment, the MID-PLATFORM component 3735 takes inputs (e.g., merchant profile information 215*a*-*b*, checkout request 3111; product data 3115; wallet access input 3311; transaction authorization input 3314; payment gateway address 3318; payment network address 3322; issuer server address(es) 3325; funds authorization request(s) 3326; user(s) account(s) data 3328; batch data 3512; payment network address 3516; issuer server address(es) 3524; individual payment request 3525; payment ledger, merchant account data 3531; and/or the like) etc., and transforms the inputs via various components (e.g., UPC 3741; PTA 3742; PTC 3743; merchant enrollment 3744, merchant analytics 3745, campaign setup 3746, and/or the like), into outputs (e.g., checkout widget 234, campaign plan 276, checkout request message 3113; checkout data 3117; card authorization request 3316, 3323; funds authorization response(s) 3330; transaction authorization response 3332; batch append data 3334; purchase receipt 3335; batch clearance request 3514; batch payment request 3518; transaction data 3520; individual payment confirmation 3528, 3529; updated payment ledger, merchant account data 3533; and/or the like).

The MID-PLATFORM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the MID-PLATFORM server employs a cryptographic server to encrypt and decrypt communications. The MID-PLATFORM component may communicate to and/or with other components in a component collection, including itself, and/or facilities of the like. Most frequently, the MID-PLATFORM component communicates with the MID-PLATFORM database, operating systems, other program components, and/or the like. The MID-PLATFORM may contain, communicate, generate, obtain, and/or provide program component, system, user, and/or data communications, requests, and/or responses.

Distributed MID-PLATFORMs

The structure and/or operation of any of the MID-PLATFORM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MID-PLATFORM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MID-PLATFORM controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132", $DBserver, $password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm
    .IBMDI.doc/referenceguide295.htm and other parser implementations:

http://publib.boulder.ibm.com/infocenter/tivihelp/v2r1/index.jsp?topic=/com.ibm
    .IBMDI.doc/referenceguide259.htm all of which are hereby expressly incorporated by reference herein.

In order to address various issues and advance the art, the entirety of this application for MULTIPLE MERCHANT PAYMENT PROCESSOR PLATFORM APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MID-PLATFORM individual and/or enterprise user, database configuration and/or relational model, data type, data transmission and/or network framework, syntax structure, and/or the like, various embodiments of the MID-PLATFORM may be implemented that allow a great deal of flexibility and customization. For example, aspects of the MID-PLATFORM may be adapted for offer targeting. While various embodiments and discussions of the MID-PLATFORM have been directed to electronic transactions, however, it is to be understood that the embodiments described herein may be readily configured and/or customized for a wide variety of other applications and/or implementations.

What is claimed is:

1. A computer-implemented multiple merchant payment processor method, comprising:

receiving, using one or more data processors, a payment request associated with a site of a merchant;

determining whether the payment request includes a previously assigned merchant identification ("ID");

in response to the determining that the payment request includes the previously assigned merchant ID being positive, formulating a payment transaction authorization request in a HTTP(S) POST message based on the previously assigned merchant ID and the payment request;

transmitting the payment transaction authorization request via a payment network in a form of a HTTP(S) POST message for processing of the payment transaction authorization request;

in response to the determining that the payment request fails to include the previously assigned merchant ID being negative, generating, using the one or more data processors, one or more site-level profile profiles for the site of the merchant, each of the one or more site-level profile profiles being associated with a merchant identification ("MID") of the site of the merchant, wherein the one or more site-level profiles are based on an identification key included in the payment request, wherein the one or more site-level profile profiles are associated with one account processor and one or more transaction preference rules for selecting the one account processor for processing the payment request, wherein the one or more data processors provide a graphical user interface (GUI) having user interface elements for modifying and configuring the one or more transaction preference rules for the one account processor, wherein the one or more data processors further, as part of the GUI:

send a payment checkout widget for the site of the merchant;

upon registration information from the merchant, generate an application programming interface (API) key and a shared secret key for the merchant, said API key and said shared secret key for invoking the payment checkout widget at the site of the merchant; and associate the MID with each of the one or more site-level profile profiles;

processing, using the one or more data processors, information associated with the payment request according to one or more transaction preference rules to select the one account processor; and sending, using the one or more data processors, a payment processing request based on the payment request to the selected one account processor, wherein the one or more data processors invoke a transaction UI based on the API key and the shared secret key in response to sending.

2. The method of claim 1, wherein the one or more site-level profile profiles are associated with a merchant profile.

3. The method of claim 2, wherein the merchant profile is associated with one or more site-level profiles.

4. The method of claim 2, wherein the merchant profile is managed by a merchant who transacts business on or at the site.

5. The method of claim 1, wherein the site is a website.

6. The method of claim 1, wherein the one or more site-level profile profiles are associated with one or more account processor profiles corresponding to the one or more account processors.

7. The method of claim 6, wherein one of the account processor profiles is associated with a subset of the one or more transaction preference rules.

8. The method of claim 1, wherein one of the one or more transaction preference rules is associated with transaction characteristics selected from the group including currency type, currency amount, geographic region, product category, and service category.

9. The method of claim 1, wherein one of the account processors is comprises a financial institution.

10. The method of claim 1, wherein the information associated with the payment request includes transaction information.

11. A computer-implemented multiple merchant payment processor system, comprising:

a memory;

one or more data processors disposed in communication with said memory, and configured to process a plurality of processing instructions stored in said memory, wherein the one or more data processors process instructions to:

receive receiving a payment request associated with a site of a merchant, determine determining whether the payment request includes a previously assigned merchant identification ("ID");

in response to the determine determining that the payment request includes the previously assigned merchant ID being positive, formulate formulating a payment transaction authorization request in a HTTP (S) POST message based on the previously assigned merchant ID and the payment request;

transmit transmitting the payment transaction authorization request via a payment network in a form of a HTTP(S) POST message for processing of the payment transaction authorization request;

in response to the determine determining that the payment request fails to include the previously assigned merchant ID being negative, generate generating one or more site-level profile profiles for the site of the merchant, each of the one or more site-level profile profiles being associated with a merchant identification ("MID") of the site of the merchant, wherein the one or more site-level profiles are based on an identification key included in the payment request, wherein the one or more site-level profile profiles are associated with one account processor and one or more transaction preference rules for selecting the one account processor for processing the payment request, wherein the one or more data processors provide a graphical user interface (GUI) having user interface elements for modifying and configuring the one or more transaction preference rules for the one account processor, wherein the one or more data processors further, as part of the GUI:

send sending a payment checkout widget for the site of the merchant;

upon registration information from the merchant, generate generating an application programming interface (API) key and a shared secret key for the merchant, said API key and said shared secret key for invoking the payment checkout widget at the site of the merchant; and associate associating the MID with each of the one or more site-level profile profiles;

process processing information associated with the payment request according to one or more transaction preference rules to select the one account processor; and send sending a payment processing request based on the payment request to the selected one account processor, wherein the one or more data processors invoke a transaction UI based on the API key and the shared secret key in response to sending.

12. The system of claim 11, wherein the one or more site-level profiles are associated with a merchant profile.

13. The system of claim 11, wherein the one or more site-level profiles are associated with one or more account processor profiles corresponding to the one account processor.

14. The system of claim 13, wherein one of the account processor profiles is associated with a subset of the one or more transaction preference rules.

15. The system of claim 11, wherein one of the one or more transaction preference rules is associated with transaction characteristics selected from the group including currency type, currency amount, geographic region, product category, and service category.

16. The system of claim 11, wherein the information associated with the payment request includes transaction information.

17. A non-transitory merchant payment processor-readable non-transitory medium storing instructions executable by a data processor to:

receive receiving a payment request associated with a site of a merchant, determine determining whether the payment request includes a previously assigned merchant identification ("ID");

in response to the determine determining that the payment request includes the previously assigned merchant ID being positive, formulate formulating a payment transaction authorization request in a HTTP(S) POST message based on the previously assigned merchant ID and the payment request;

transmit transmitting the payment transaction authorization request via a payment network in a HTTP(S) POST message for processing of the payment transaction authorization request;

in response to the determine determining that the payment request fails to include the previously assigned merchant ID being negative, generate generating one or more site-level profile profiles for the site of the merchant, each of the one or more site-level profile profiles being associated with a merchant identification ("MID") of the site of the merchant, wherein the one or more site-level profiles are based on an identification key included in the payment request, wherein the one or more site-level profile profiles are associated with one account processors and one or more transaction preference rules for selecting the one account processor for processing the payment request, wherein the one or more data processors provide a graphical user interface (GUI) having user interface elements for modifying and configuring the one or more transaction preference rules for the one account processor, wherein the one or more data processors further, as part of the GUI:

send sending a payment checkout widget for the site of the merchant;

upon registration information from the merchant, generate generating an application programming interface (API) key and a shared secret key for the merchant, said API key and said shared secret key for invoking the payment checkout widget at the site of the merchant; and associate associating the MID with each of the one or more site-level profile profiles;

process processing information associated with the payment request according to one or more transaction preference rules to select one of the account processors; and invoke invoking a transaction UI based on the API key and the shared secret key to send a payment processing request to the selected account processor.

18. The processor readable medium of claim 17, wherein one of the one or more transaction preference rules is associated with transaction characteristics selected from the group including currency type, currency amount, geographic region, product category, and service category.

19. The processor readable medium of claim 17, wherein the one or more site-level profiles are associated with one or more account processor profiles corresponding to the one account processor.

20. The processor readable medium of claim 17, wherein one of the account processor profiles is associated with a subset of the one or more transaction preference rules.

* * * * *